US006073139A

United States Patent [19]

Jain et al.

[11] Patent Number: 6,073,139

[45] **Date of Patent: *Jun. 6, 2000**

[54] INTEGRATED DATA COMMUNICATION AND DATA ACCESS SYSTEM INCLUDING THE APPLICATION DATA INTERFACE

[75] Inventors: Pradeep Jain, Sugar Land; Shamim Ahmed, Houston, both of Tex.

[73] Assignee: GioQuest, a division of Schlumberger Technology Corp., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/848,205

[22] Filed: Apr. 30, 1997

Related U.S. Application Data

[63] Continuation-in-part of application No. 08/758,833, Dec. 4, 1996.

[60] Provisional application No. 60/023,945, Aug. 19, 1996, and provisional application No. 60/023,689, Aug. 15, 1996.

[51] Int. Cl.[7] .................................................... G06F 17/30

[52] U.S. Cl. .......................... 707/203; 707/103; 709/216

[58] Field of Search ............................... 707/200, 8, 203, 707/103; 711/133, 135, 138, 142, 159, 144; 709/203, 204, 216

[56] References Cited

U.S. PATENT DOCUMENTS

| | | | |
|---|---|---|---|
| 4,713,751 | 12/1987 | Dutton et al. . | |
| 5,050,104 | 9/1991 | Heyen et al. | 395/514 |
| 5,062,037 | 10/1991 | Shorter et al. | 364/200 |
| 5,287,496 | 2/1994 | Chen et al. | 707/203 |
| 5,524,253 | 6/1996 | Pham et al. | 395/200.32 |
| 5,557,798 | 9/1996 | Skeen et al. | 705/35 |
| 5,574,917 | 11/1996 | Good et al. . | |
| 5,692,187 | 11/1997 | Goldman et al. | 707/203 |
| 5,742,778 | 4/1998 | Hao et al. | 345/332 |
| 5,752,159 | 5/1998 | Faust et al. | 455/5.1 |
| 5,758,149 | 5/1998 | Bierma et al. | 707/8 |
| 5,761,500 | 6/1998 | Gallant et al. | 707/10 |
| 5,787,280 | 7/1998 | Joseph et al. | 707/203 |
| 5,806,075 | 9/1998 | Jain et al. | 707/201 |
| 5,822,529 | 10/1998 | Kawai | 395/200.49 |
| 5,826,253 | 10/1998 | Bredenberg | 707/2 |
| 5,881,292 | 3/1999 | Sigal et al. | 395/712 |

OTHER PUBLICATIONS

Microsoft Corp. "The Component Object Model Specification", pp 1–13. 1995.

*Primary Examiner*—Thomas G. Black
*Assistant Examiner*—Uyen Le
*Attorney, Agent, or Firm*—John H. Bouchard

[57] ABSTRACT

An integrated data communication and data access system includes a first cache memory operatively connected to a first application and a first conversion means operatively connected to the first cache memory and interfacing between a first operator of the first application and the first cache memory for receiving original data having a first format from the first operator and converting the original data having the first format into original data having a second format, the first application storing the original data having the second format in the first cache memory and in a database when the first application sets a persistant or a transient storage state. A second application independently inquires about the existance of the original data having the second format, independently of the first application, by querying the database for such original data, the second application expressing interest in such original data to the first application via a server, receiving any subsequently modified versions of such data having the second format directly from the first application, and storing the subsequently modified versions of such data having the second format in the second cache memory and in the database if the second application sets the persistant storage state.

12 Claims, 45 Drawing Sheets

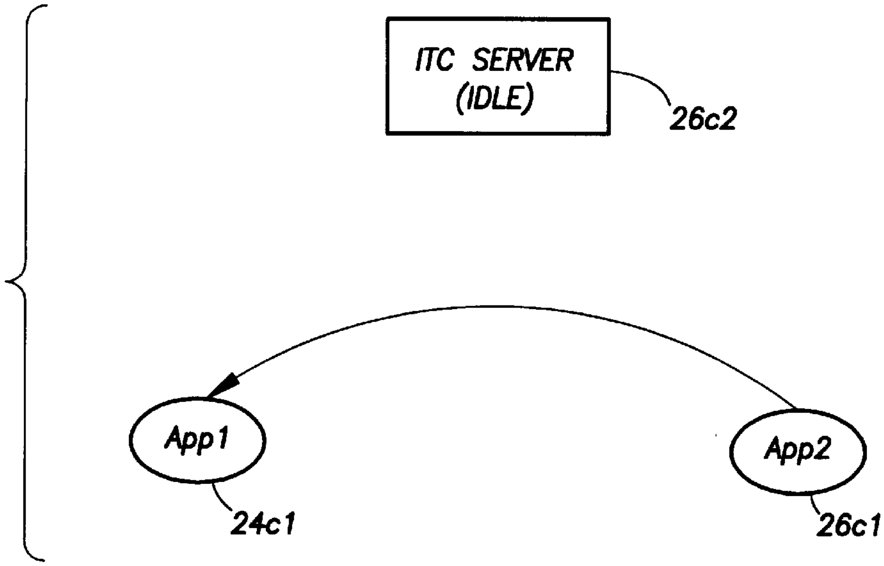
FIG.9A
FIG.9B
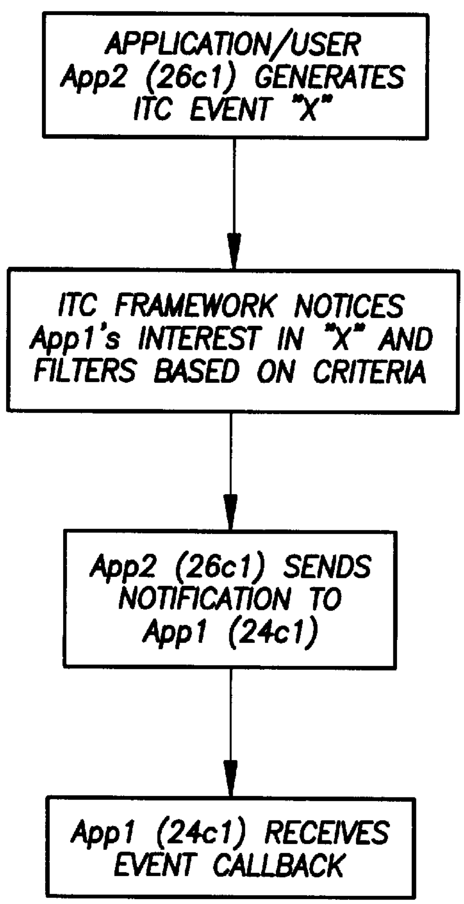

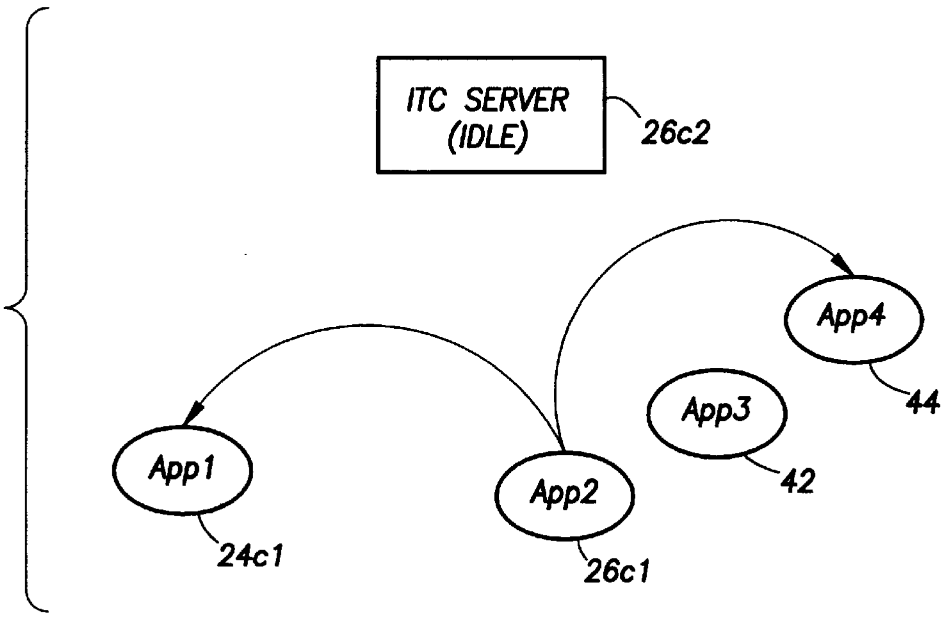
FIG. 10A
FIG. 10B
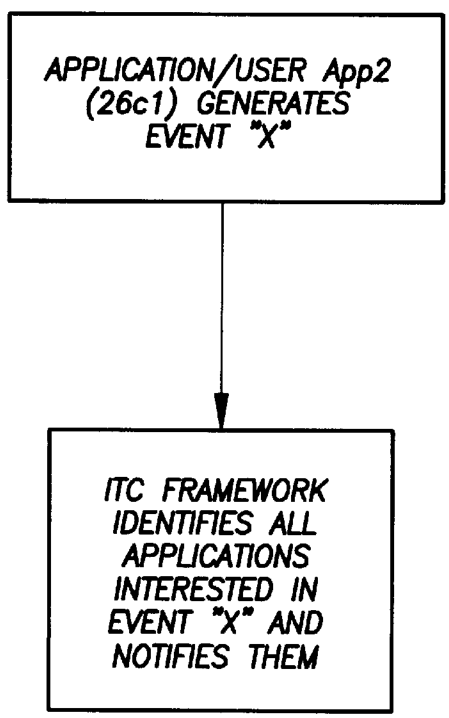

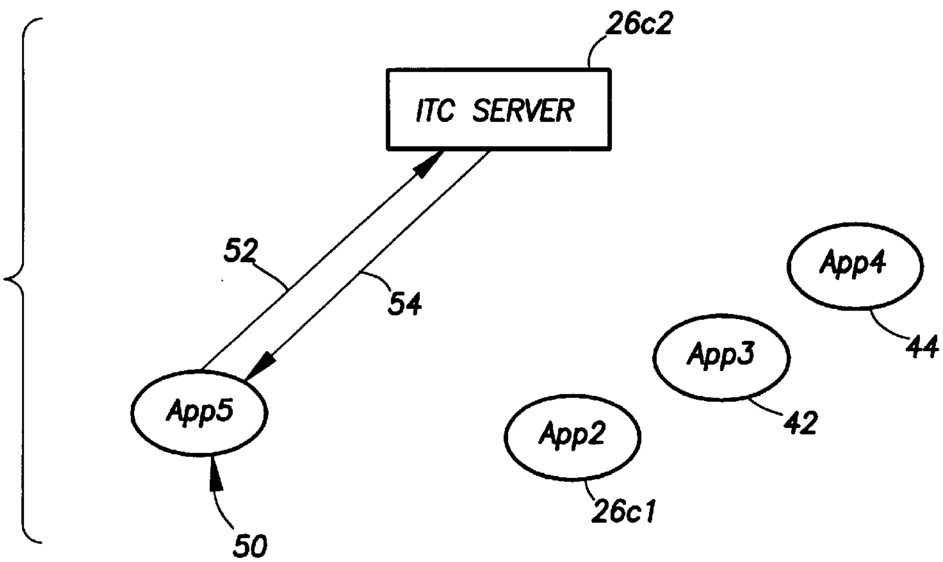
FIG. 13A
FIG. 13B
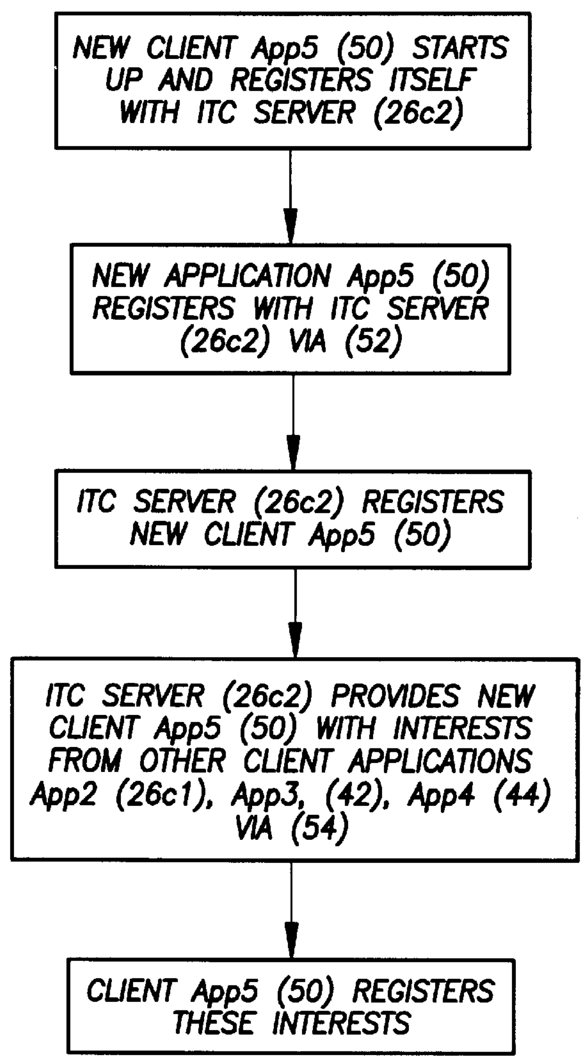

```
#include <wk_itc_hi/itc_hi_public.h>
#include <wk_itc_hi/itc_hi_synonym.h>
#include <wk_itc_data/itc_diselection.h>
...
void
udm_SingleDIEditor::PopulateEventList(void)
{
    itc_hi_EventInfo_t Event;

    /* Initialize the filter info list */
   Event =
(itc_hi_EventInfo_t)utl_CallocBlock(sizeof(itc_hi_EventInfo_st));

   Event->EventToken       = qITC_DISELECTION;
   Event->EventHIName      = qDISELECTION;
   Event->SendToggleState= ITC_ON;
   Event->ReceiveToggleState= ITC_ON;
   Event->ReceiveEventCB = ReceiveDISelection_cb;
   Event->ReceiveEventCBData= (vt_Datum_t) this;

   EventList = (itc_hi_EventInfoL_t)vt_CreateList(vt_DatumL_vt, 1);
        vt_AddToList((itc_hi_EventInfoL_t)EventList, (vt_Datum_t)Event);
}

void
udm_SingleDIEditor::SetupITC(void)
{
   itc_Status_t MyStat;
   ...
   //Populate the eventlist
   PopulateEventList();

   //Set ITC HI for this SubModule Run
   ITCBanner    = itc_hi_FilterAndSession(
                              SubModuleRun,
                              ITCForm,
                              OneLineHelp,
                              EventList,
                              ITC_CLOSED,
                              BroadcastDISelection_cb,
                              (XtPointer) this,
                              &MyStat);
   ...
   //Free Event List and elements

   itc_hi_EventInfo_t Event = (itc_hi_EventInfo_t) vt_Nth(EventList, 0);
   if(Event)
      utl_FreeBlock(Event);
   vt_DeleteList(EventList);
   EventList = NULL;
   ....
```

FIG.28

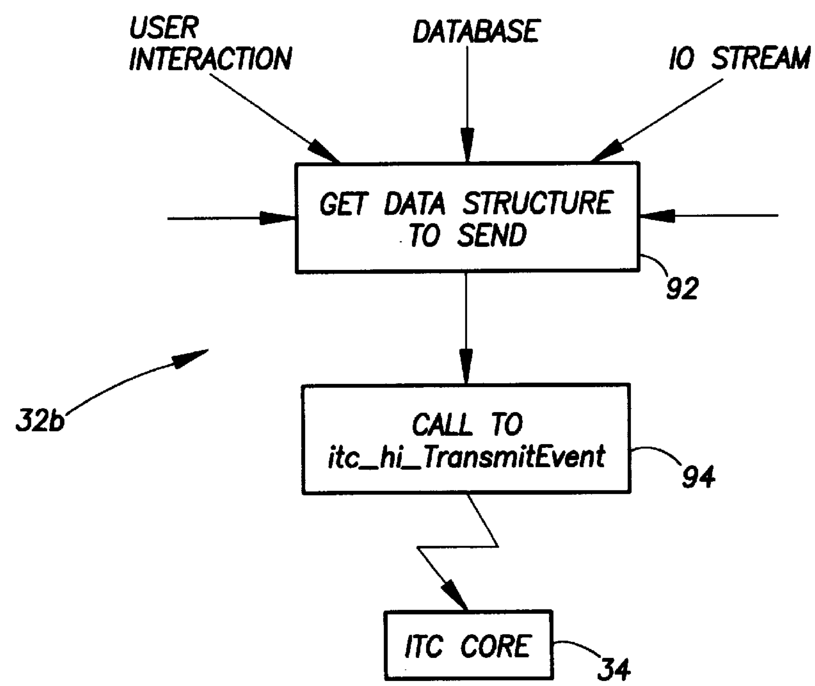

```
#include <wk_itc_hi/itc_hi_public.h>
...
void
udm_ObjectListInfo::SendSubDI(void)
{
    itc_Status_t ITCStat;
    aqi_DataItemL_t DIsToSend = GetSelection();
    itc_hi_t Banner = NULL;

    if (!DIsToSend)
       DIsToSend = (aqi_DataItemL_t)vt_CreateList(vt_DatumL_vt, 2);
    DIsToSend = (aqi_DataItemL_t)vt_AddToList((vt_DatumL_t)DIsToSend,
                                              (vt_Datum_t)DataItem);

    Banner = Manager->GetITCBanner();

    if (Banner && DISToSend)
    {
     itc_hi_TransmitEvent(
                      Banner,
                      EventHIName,
                      (vt_Datum_t)DIsToSend,
                      &ITCStat);
     vt_DeleteList(DISToSend);
    }
}
```

FIG.30

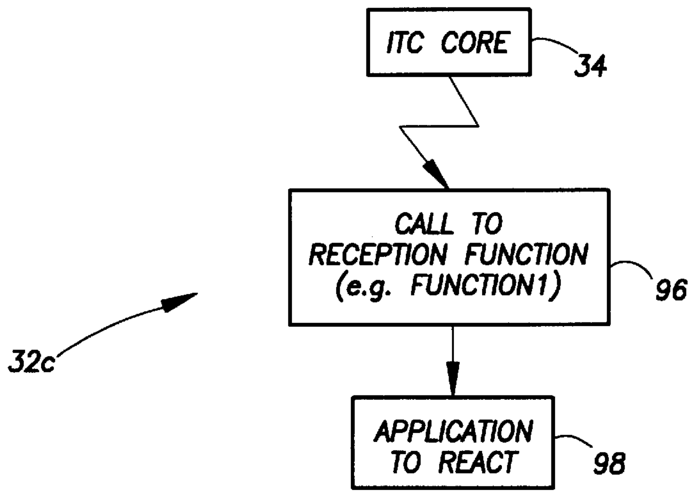

```
void
udm_WellDataManager::CheckAndReact (aqi_Data_ItemL_t SelectDataItems)
{
  Int32_t Count = vt_LengthList(SelectedDataItems);
  for(int i = 0; i < Count; i++)
  {
    aqi_DataItem_t DI = (aqi_DataItem_t)vt_Nth(SelectedDataItems, i);
    DIType = gdm_GetDIType(DI);

    // I do nothing if I receive "myself"
    if(DI != DataItem)
    {
      if(DIType == qWell)
      {
        SwitchDataItem(DI);
        break;
      }
      if(DIType == qBorehole)
      {
        vt_DatumL_t ObjList = GetSubList();
        if(ObjList)
        {
          Int32_t Count2 = vt_LengthList(ObjList);
          for(int j = 0; j < Count2; j++)
          {
            udm_OjectListInfo *Elt =
                (udm_ObjectListInfo*)vt_Nth(ObjList, j);
            Elt->Select(DI);
          }
        }
        break;
      }
    }
  }
}
```

INTEGRATED DATA COMMUNICATION AND DATA ACCESS SYSTEM INCLUDING THE APPLICATION DATA INTERFACE

CROSS REFERENCE TO RELATED APPLICATIONS

This specification is a Continuation-in-Part application of prior pending application Ser. No. 08/758,833 filed Dec. 4, 1996 and entitled "Distributed Framework for Intertask Communication Between Workstation Applications", and this specification is also a 35 USC 119(e) (1) application of prior pending provisional application Ser. No. 60/023,945 filed Aug. 19, 1996 and entitled "Distributed Framework for Inter--Process Communication Between Workstation Applications", and this specification is also a 35 USC 119(e) (1) application of prior pending provisional application Ser. No. 60/023,689 filed Aug. 15, 1996 and entitled "Application Data Interface (ADI)".

BACKGROUND OF THE INVENTION

The subject matter of the present invention relates to an integrated data communication and data access system, and more particularly, to a data communication system adapted for practicing an event in a first application, creating a data object by the first application during the practice of the event, and communicating between the first application and a cache memory and a database following the practice of the event by independently storing the data object in the cache memory and in the database during a persistant or transient storage state; and to a data access system adapted for independently accessing the database by a second application to retrieve the data object, determining an interest by the second application in subsequently created ones of the data object, expressing the second application's interest in the data objects by transmitting an interest object from the second application to the first application via a server application, and transmitting the subsequently created ones of the data object directly from the first application to the second application.

The "Description of the Preferred Embodiment" is divided into two parts: (1) Part 1 (Distributed Framework for Intertask Communication Between Workstation Applications) which is set forth in prior pending application Ser. No. 08/758,833 filed Dec. 4, 1996 and entitled "Distributed Framework for Intertask Communication Between Workstation Applications" and in prior pending provisional application Ser. No. 60/023,945 filed Aug. 19, 1996 and entitled "Distributed Framework for Inter-Process Communication Between Workstation Applications", and (2) Part 2 (Integrated Data Communication and Data Access System including the Application Data Interface) which is set forth in prior pending provisional application Ser. No. 60/023,689 filed Aug. 15, 1996 and entitled "Application Data Interface (ADI)".

Computer progams that operate with a network often have multiple programs operating concurrently. It is frequently necessary for information, such as events, to be transferred from one program to another, either within a single workstation or across a network of interconnected computer workstations. An operator at one of the workstations may process information by using different programs operating concurrently in the workstation or across the network of workstations. The operator may also retrieve information by using a multiple number of computer programs executing concurrently in the single workstation or across the network of interconnected workstations. It is therefore important that information be quickly and easily transferred between the multiple number of programs operating in the one or more interconnected workstations.

Windowing software technology is applied where it is important for an operator to display and interact with multiple programs executing concurrently in a computer system comprising one or more interconnected workstations. A "window" is defined to be a portion of a display screen, such as a cathode ray tube (CRT). The window covers less than the entirety of the screen. As a result, there may be a multiple number of windows on the screen at one time. Typically, the user moves a cursor around the screen by use of an input device known as a mouse or by use of multiple keys on a keyboard. The cursor can be moved from one window to another on the screen, and, when the cursor is present within a particular window on the screen, the user/operator is placed in communication with the application program which generated that particular window on the screen. As a result, the operator may access a multiple number of different application programs thereby accomplishing multiple tasks without having to load a new program each time a new task must be performed.

However, when concurrently accessing a multiple number of different application programs executing in a workstation or across a network of workstations, is is often necessary for a user/operator to transfer information from one windowed program executing in a first workstation to another windowed program executing in either the first workstation or in a second, different workstation connected to the first workstation across the network. Transferring information between programs operating in a windowing environment is disclosed in this specification; however, such a windowing environment is not necessary in order to practice the invention of this specification as claimed.

There are at least three conventional techniques for transferring information between concurrently operating programs in a computer system.

The first conventional technique is called "cut and paste". This comprises pointing to and selecting information such as text or data in one window to highlight it and thereby separate it from the remaining information in the window. The user presses a special button or key which moves the selected information to an area of memory specially designated by the operating system and known as the "paste memory" or "clipboard". The user then moves the cursor to another window which is adapted to receive the information. A "paste button" or command is invoked by the user to retrieve the stored information from the designated memory area and place it at the location of the cursor. Note that all steps of this process are carried out by the user.

The second conventional technique establishes a programmed connection between two programs, each of which may display information in a window. Both programs must be designed to respond to a predetermined input command that causes information to be shifted from one program to another. This operation may also be entirely under the control of the user and requires a user input in order to function. Each communication path between pairs of programs must be programmed into the code of both programs, which creates an inflexible system. It is also difficult to add new communication paths or to change existing communication paths.

The third conventional technique is described in U.S. Pat. No. 5,448,738 to Good et al issued Sep. 5, 1995, and in European Patent Application number 0 380 211 published on Aug. 1, 1990 and entitled "Method for Information Communication between Concurrently Operating Computer Programs" to William E. Good et al (hereinafter called "the Good et al disclosure"), the disclosures of which are incorporated by reference into the specification of this application. In the Good et al disclosure, the user interfaces with application programs through one or more window displays and an input device on a computer workstation. One or more information codes and one or more corresponding application programs are registered with a dispatcher program (otherwise known as a "server"). As a result, a list is formed in the dispatcher program, the list including a plurality of information codes and a corresponding plurality of application program identifiers. Then, when a first application program wants to send event information to another concurrently executing second application program, a template, which includes event information and a corresponding information code, is generated by the first application program and the template is transmitted by the first application program to the dispatcher program. The information code in the template from the first application program is compared with the information code in the list registered with the dispatcher program. If a match between information codes is found, the event information associated with the information code in the template is transmitted to the application program that is associated with the information code in the list registered with the dispatcher program.

The Good et al disclosure is similar to other conventional, prior art tools for enabling inter-process communication between application programs, all of which are based on "client-server techniques". Examples of such conventional tools include the "X Window System" and Sun's "Tooltalk". In the Good et al disclosure and the other conventional tools, when using the prior art client-server techniques, all of the data to be communicated between concurrently executing computer program applications must be routed through a server program (the "server program" being similar to the "dispatcher program" in the Good et al disclosure). If many concurrently executing program applications exist in the network, the server or dispatcher may have too many event messages to transmit at any one time. This results in slower throughput as well as increased network traffic. In addition, when using the prior art client-server technique, the user operator executing a first application program can send only certain preselected event information messages to a second application program. That is, the user can send only a fixed set of predefined event information messages which are allowed by the system network; he cannot define or customize his own event information messages for transmission to the second application program. For example, if a font size was changed in one application, using the conventional client-server technique (where all event messages must be routed through the server), there was no way to communicate the changed font size, changed in one application, to any other application in the network because the "changed font size" was not among the fixed set of predefined event information messages allowed for transmission from one application to another application in the network. In addition, when using the conventional client-server technique, particular event information data must always be communicated from a first computer program application to a server program and from the server program to a second program application. Yet, that server program may not know if any other program applications are interested in receiving that particular event data. As a result, when the server receives the particular event information data from the first program application,(the server must then determine if any other applications are interested in receiving that particular event data. If no other applications are interested in receiving the particular event data, the server program wasted its resources in handling the particular event data because it will never be communicated to any other application.

Furthermore, data communicated while using the conventional tools are poorly structured (forming "globs") and provide no mechanism for checking for errors in the data communicated. It is the responsibility of the application programs to interpret the data in the correct manner and handle error conditions. Therefore, when using the conventional tools, the ability of the application programmer to inter-communicate complex data structures between concurrently executing computer program applications is very limited.

As noted earlier, the conventional tools do not provide a mechanism which would allow application programmers to selectively extend or customize the type of events and/or data which could be inter-communicated between concurrently executing applications executing in one or more computer workstations. As a result, the absence of a sufficiently high level of programming abstraction in these conventional tools requires application programmers to be concerned with low level issues, such as data formats on various platforms and communication rendevous (such as, a known property name of a known window, as in the prior art "X Window System").

Finally, these conventional tools provide no easy way for end-users of applications to control the flow of data and visualize the connectivity between applications.

In addition, the conventional tools had a different interface relative to the invention of this application in connection with methods for dealing with events and persistant storage. When data was written into an executing first application, the writer of that data was required to take specific steps, during the introduction of that data, toward the communication that data to another second application. When the data was introduced to the first application, that data was always communicated to the second application via the dispatcher application; and when the receiving second application received that data from the dispatcher application, the receiving second application did not possess a fine "granularity" with regard to the type of data received. That is, the receiving second application could, for example, receive "well data"; however, the receiving second application could not receive a specific subset or type of that well data.

Therefore, a "new framework" was needed that would allow fast communication and sharing of complex data, allow strong typing of data structures, and provide a degree of extensibility when using application-defined data types and events. In addition, that "new framework" should also allow end users of workstation applications to visualize the connectivity network between workstation applications by enabling the end users sitting at those workstations to control the inter-process data communication between computer program applications which are concurrently executing in one or more computer workstation environments.

The above referenced "new framework" is disclosed in a prior pending application Ser. No. 08/758,833 filed Dec. 4, 1996 entitled "Distributed Framework for Intertask Communication Between Workstation Applications", to Shamim Ahmed and Serge J. Dacic (hereinafter called the "ITC Application"), the disclosure of which is incorporated by reference into this specification.

Although not disclosed in the "ITC Application", the "new framework" utilizes an underlying apparatus called the "Application Data Interface" disclosed in this specification. When the "Application Data Interface" is embodied in the Integrated Data Communication and Data Access System of the present invention, a first application of that System is allowed to independently inquire about the existance of certain newly created data in a database, independently of a second or third application concurrently executing in that System, for the ultimate purpose of possibly expressing interest in and receiving any subsequently created and updated versions of that data which may be generated by the second or third application of that System.

However, conventional systems do not allow a first application in the system to inquire about the existance of certain stored data independently of any other applications concurrently executing in the system. For example, if a conventional system includes concurrently executing first and second applications, if the first application is interested in inquiring about the existance of certain data, it must do so by querying the second application. The first application cannot inquire about the existance of that certain data independently of the second application.

Accordingly, there is a need for an integrated data communication and data access system, including at least a first and a second concurrently executing application program, that will allow the second application to store certain data in a cache memory and a database when the second application sets persistant or a transient storage state thereby allowing the first application to independently inquire about the existance of such certain data, independently of the second application, by querying the database for such certain data for the ultimate purpose of expressing interest in and receiving any subsequently modified versions of such certain data.

SUMMARY OF THE INVENTION

Accordingly, it is a primary object of the present invention to provide an integrated data communication and data access system which includes at least a first application and a second application concurrently executing in said system and which is adapted for allowing the second application to store certain data in a second cache memory and a database when the second application sets a persistant or a transient storage state thereby allowing the first application to independently inquire about the existance of such certain data, independently of the second application, by querying the database for such certain data for the ultimate purpose of expressing interest in and receiving any subsequently modified versions of such certain data.

It is a further object of the present invention to provide the above referenced integrated data communication and data access system which is additionally adapted for allowing the second application to store the certain data in the second cache memory but not in the database when the second application sets a memory storage state.

It is a further object of the present invention to provide the above referenced integrated data communication and data access system which further includes a first cache memory operatively connected to the first application and a first conversion means operatively connected to the first cache memory and interfacing between a first operator of the first application and the first cache memory for receiving data having a first format from the first operator and converting the data having the first format into data having a second format, the first application storing the data having the second format in the first cache memory and in the database when the first application sets the persistant or transient storage state, the second application independently inquiring about the existance of such data having the second format, independently of the first application, by querying the database for such data having the second format, expressing interest in such data having the second format, receiving any subsequently modified versions of such data having the second format, and storing the subsequently modified versions of such data having the second format in the second cache memory.

It is a further object of the present invention to provide the above referenced integrated data communication and data access system which further includes a second conversion means operatively connected to the second cache memory and interfacing between a second operator of the second application and the second cache memory for receiving such data having the second format from the second cache memory and converting such data having the second format into data having a third format, the data having the third format being presented to the second operator of said second application.

In accordance with these and other objects of the present invention, an integrated data communication and data access system in accordance with the present invention includes: a first application, a first cache memory operatively connected to the first application, and a first conversion unit operatively connected to the first cache memory and interfacing between a first operator of the first application and the first cache memory; a second application, a second cache memory operatively connected to the second application, and a second conversion unit operatively connected to the second cache memory and interfacing between a second operator of the second application and the second cache memory; a database operatively connected to the first cache memory and the second cache memory; and a server operatively connected to the first application and the second application.

In operation, the first operator practices an "event" and the practice of that "event" introduces data having a first format into the first conversion unit. The first conversion unit converts the data having the first format into other data having a second format. The first application receives the data having the second format and stores the data having the second format in the first cache memory and in the database when the first or second application sets a persistant or a transient storage state. On the other hand, the first application stores the data having the second format in the first cache memory but does not store such data in the database when a memory storage state is set. The second application queries the database for the data having the second format and the second conversion unit converts the data having the second format into other data having a third format, the data having the third format being presented to the second operator of the second application. The second operator introduces an interest object into said conversion unit thereby expressing interest in any "subsequently modified versions of the data" generated by the first application, but the interest object does not undergo conversion in the conversion unit. The second application transmits the interest object to the server and the server retransmits the interest object to the first application. The first conversion unit receives the interest object, but the interest object does not undergo conversion in the first conversion unit, and the interest object is presented to the first operator of the first application. The first operator repractices the same "event" and the repractice of that same "event" introduces the "subsequently modified versions of the data" having the first format into the first conversion unit. The conversion unit converts the "subsequently modified version of the data having the first format" into a "subsequently modified version of the data having the second format", and the Subsequently modified data of the second format is stored in the first cache memory. If the first application sets the persistant storage state, the "subsequently modified version of the data having the second format" will also be stored in the database. However, if the first application sets either the transient or the memory storage state, the "subsequently modified version of the data having the second format" will not be stored in the database.

The storage state rules are as follows: an original data set is stored in the cache memory and the database during the persistant or transient storage state, but any subsequently modified data, generated after the original data set is generated, will not be stored in the database during the transient storage state. In addition, both the original and the modified data will not be stored in the database during a memory storage state.

When the "subsequently modified version of the data having the asecond format" is stored in the first cache memory associated with the first application, that data will be transmitted directly from the first application to the second application without registering that data with the server. When the second application receives that data, the "subsequently modified version of the data having the second format" will be stored in the second cache memory, and such data having the second format will then be introduced into the second conversion unit. The second conversion unit will convert the "subsequently modified version of the data having the second format" into a "subsequently modified version of the data having a third format". As a result, the "subsequently modified version of the data having the third format" will be presented to the second operator of the second application for his consideration.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 1 through 32 are presented in connection with the first part of this specification entitled the "Distributed Framework for Intertask Communication Between Workstation Applications", of which FIGS. 1–32 illustrate the following:

FIG. 1 illustrates a computer workstation having a display which includes one or more window displays representing the execution of one or more client application programs;

FIG. 2 illustrates a plurality of client application programs which display a corresponding plurality of window displays on one or a plurality of workstations similar to that shown in FIG. 1, each of the plurality of client applications being interconnected together by an intertask communication (ITC) apparatus which comprises a server program application and one or more individual client applications;

FIG. 3 illustrates a first workstation executing a first client application and a second workstation executing a second client application and also storing the server application software;

FIG. 4 illustrates a more detailed construction of the first client application (client 1 software) and the second client application (client 2 software) in the first and second workstations of FIG. 3;

FIG. 5 illustrates a more detailed construction of the ITC-Human Interface Code of FIG. 4;

FIGS. 6 through **13*b* illustrate a detailed construction and the functional operation of the ITC Framework (ITC Core) of FIG. 4**;

FIGS. 14 through 25 illustrate a detailed construction of the Operator Interaction Display Software of FIG. 5, FIG. 14 illustrating the status icons and the broadcast icon, FIGS. **15*a* through 15*e* illustrating the event filter icon with its subwindow display, and FIGS. 16–25** illustrate the use of these icons on a window display being displayed on a display screen of a workstation;

FIGS. 26 and 27 illustrate a detailed construction of the ITC HI Setup software of FIG. 5;

FIGS. 28 and 29 illustrate a detailed construction of the Send An Event Software of FIG. 5;

FIGS. 30 and 31 illustrate a detailed construction of the Receive An Event Software of FIG. 5;

FIG. 32 illustrates an Intertask Communication (ITC) Sessions Model referenced in the ITC Framework portion of the "Detailed Description of the Preferred Embodiment";

FIGS. 33 through 76 are presented in connection with the second part of this specification entitled the "Integrated Data Communication and Data Access System including the Application Data Interface", of which FIGS. 33–76 illustrate or include the following:

FIGS. 33 through 35 illustrate again the drawings of FIGS. 6, 8A, and 9A, FIGS. 36 through 44 are presented for reference in conjunction with a general discussion of the concepts associated with the "Integrated Data Communication and Data Access System" of the present invention, and FIGS. 45 through 76 are presented for reference in conjunction with a detailed discussion of the "Application Data Interface" which is embodied in the "Integrated Data Communication and Data Access System" of the present invention.

DESCRIPTION OF THE PREFERRED EMBODIMENT

This specification is divided into two parts:

(1) a first part (Part 1) that reviews the structure and the functional operation of an invention entitled "Distributed Framework for Intertask Communication Between Workstation Applications" which is set forth in a prior pending application Ser. No. 08/758,833, filed Dec. 4, 1996 (hereinafter called the "ITC Application"), the disclosure of which is incorporated by reference into the specification of this application; the invention of the "ITC Application" describes how direct inter-task communications (ITC) are achieved between concurrently operating computer program applications executing in one or more computer workstations that provide a window display to an operator; and (2) a second part (Part 2) in accordance with the present invention set forth below in this specification entitled "Integrated Data Communication and Data Access System including the Application Data Interface".

Part 1—a Distributed Framework for Intertask Communication Between Workstation Applications The following description of the "Distributed Framework for Intertask Communication Between Workstation Applications" (hereinafter called the "ITC Application") is fully disclosed in the prior pending application Ser. No. 08/758,833, filed Dec. 4, 1996, already incorporated herein by reference.

Figure 1:
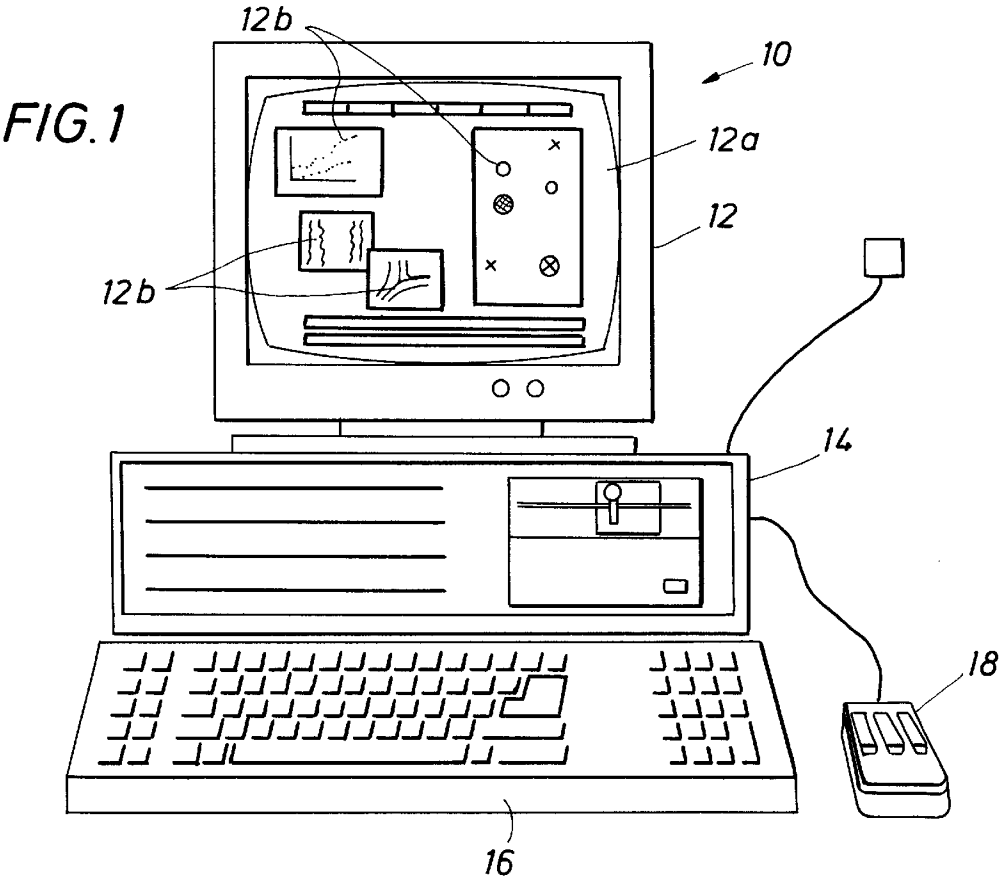

Referring to FIG. 1, a computer workstation is illustrated which has a display that includes one or more window displays representing the execution of one or more client application programs.

In FIG. 1, a computer workstation 10 is illustrated. The workstation includes a monitor 12, a processor 14, a keyboard 16, and a mouse 18. The monitor 12 includes a cathode ray tube (CRT) that provides a display screen 12*a*. In FIG. 1, the display screen 12*a* has a plurality of windows 12*b* displayed thereon, each window 12*b* being displayed on the display screen 12*a* in response to the execution, within the workstation 10, of a separate client application program. As noted below in FIG. 2, each of the plurality of windows 12*b* provide a different display of wellbore-related data from which an operator can interpret whether or not underground deposits of hydrocarbons are present within an earth formation. An operator sitting at the workstation 10 will use the mouse 18 to select various ones of the windows 12*b* for viewing and/or manipulation or selection of the data in that window.

Figure 2:
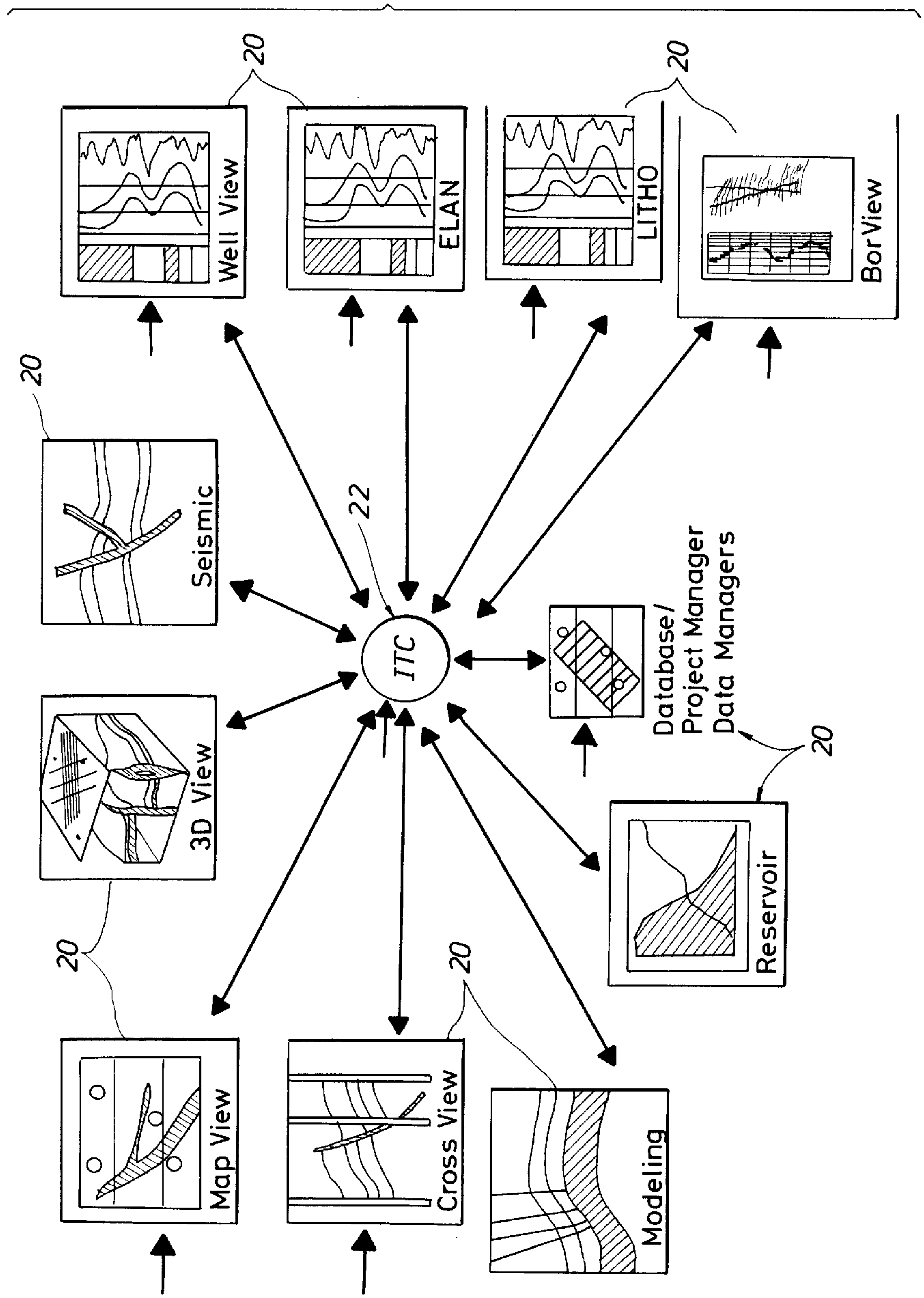

Referring to FIG. 2, a plurality of client application programs (hereinafter called "client applications") are illustrated which display a corresponding plurality of window displays on one of a plurality of workstations similar to the workstation 10 shown in FIG. 1 and which are interconnected together by an intertask communication (ITC) apparatus.

Figure 6:
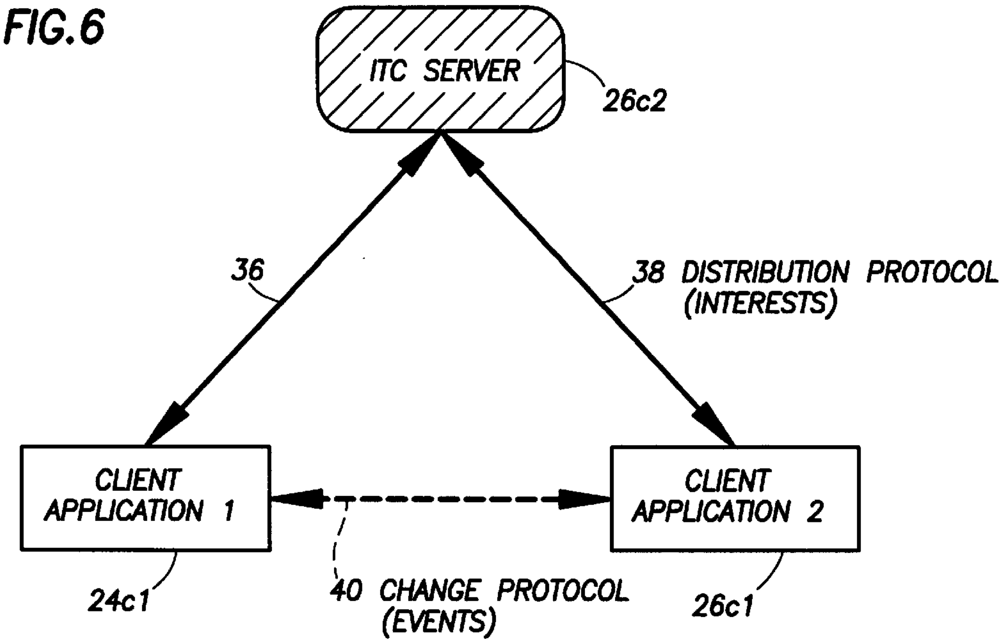

In FIG. 2, a plurality of client applications 20 are interconnected together by an intertask communication (ITC) apparatus 22. Recall that a "client application" is a computer program which is executing in the workstation 10 of FIG. 1 and which is responsible for displaying one of the windows 12*b* on the display screen 12*a* of the monitor 12 of the workstation 10 of FIG. 1. The ITC apparatus 22 of FIG. 2 allows each of the client applications 20 to communicate directly with one another. In general, as shown in FIG. 6, the ITC apparatus 22 is a generic term which includes a first client application and a second client application which are interconnected together in the manner shown in FIG. 6. The ITC apparatus 22 of FIG. 2 enables all of the client applications 20 to communicate directly and simultaneously with one another. As a result, events being practiced in one client application 20 can be viewed simultaneously in another client application 20. This functional capability will be discussed in more detail later in this specification.

Figure 3:
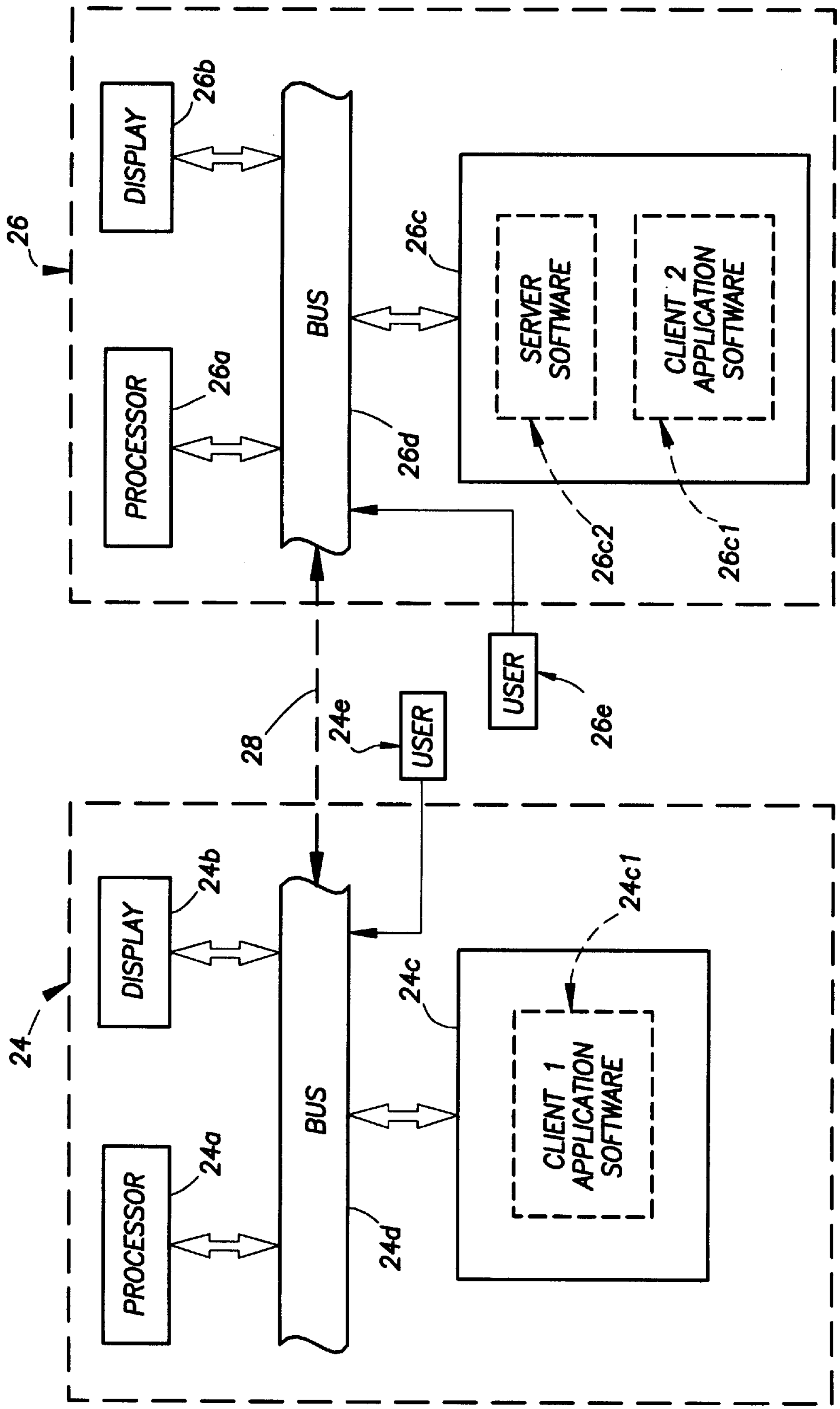

Referring to FIG. 3, a system including a pair of interconnected workstations (each of which are similar to the workstation 10 of FIG. 1) is illustrated.

In FIG. 3, a first workstation 24 is interconnected to a second workstation 26. The first workstation 24 includes a processor 24*a* connected to a system bus 24*d*, a display 24*b* (similar to the display screen 12*a* of FIG. 1) connected to the system bus 24*b*, a memory 24*c* connected to the system bus 24*d*, and a user interface 24*e* (the mouse 18 and keyboard 16 of FIG. 1) connected to the system bus 24*d*. The second workstation 26 includes a processor 26*a* connected to a system bus 26*d*, a display 26*b* (similar to the display screen 12*a* of FIG. 1) connected to the system bus 26*b*, a memory 26*c* connected to the system bus 26*d* and a user interface 26*e* (the mouse 18 and keyboard 16 of FIG. 1) connected to the system bus 26*d*. The first workstation 24 is electrically or optically connected to the second workstation 26 via a communication link 28. The memory 24*c* of the first workstation 24 stores a first client application program called the "client 1 application software" 24*c*1, and the memory 26*c* of the second workstation 26 stores a second client application program called the "client 2 application software" 26*c*1. However, the memory 26*c* of the second workstation 26 also stores a server software 26*c*2. The server software 26*c*2 distributes interest objects between client applications. See the "dispatcher program" which is discussed in the Good et al disclosure (i.e.—in U.S. Pat. No. 5,448,738 entitled "Method for Information Communication between Concurrently Operating Computer Programs"), the disclosure of which has already been incorporated herein by reference. The client 1 application software 24*c*1, when executed by the processor 24*a*, generates a visual image on the display 24*b* which is similar to one of the client applications 20 shown in FIG. 2. Similarly, the client 2 application software 26*c*1, when executed by the processor 26*a*, generates a visual image on the display 26*b* which is similar to one of the other client applications 20 shown in FIG. 2. The function of the system shown in FIG. 3 will become apparent from a reading of the remaining parts of this specification.

Figure 4:
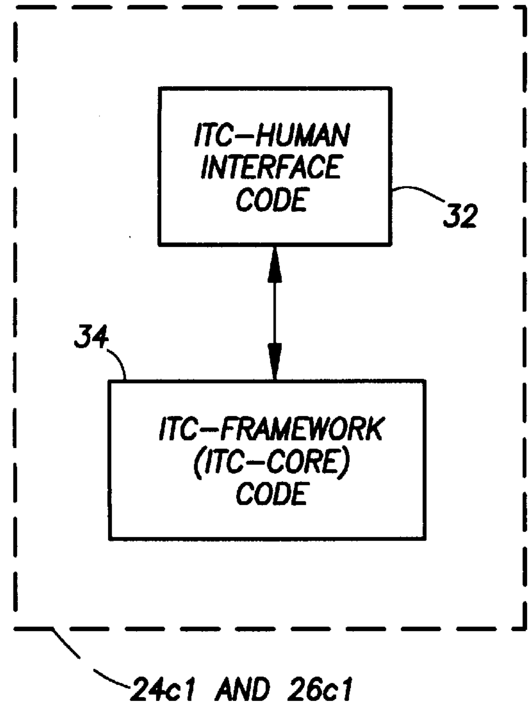

Referring to FIG. 4, a more detailed construction of the client 1 application software 24*c*1 and the client 2 application software 26*c*1 of FIG. 3 is illustrated.

In FIG. 4, the client 1 application software 24*c*1 and the client 2 application software 26*c*1 each include: (1) a first set of software hereinafter known as the "ITC Human Interface Code" 32, and (2) a second set of software hereinafter known as the "ITC Framework (ITC Core) Code" 34. From a functional standpoint, an internal application code invokes the Human Interface Code 32, and the Human Interface Code 32 invokes the Framework Code 34. The ITC Human Interface code 32 and the ITC Framework Code 34 are discussed in greater detail later in this specification and the function of the Human Interface code 32 and the Framework Code 34 will become apparent from a reading of the remaining parts of this specification.

Figure 5:
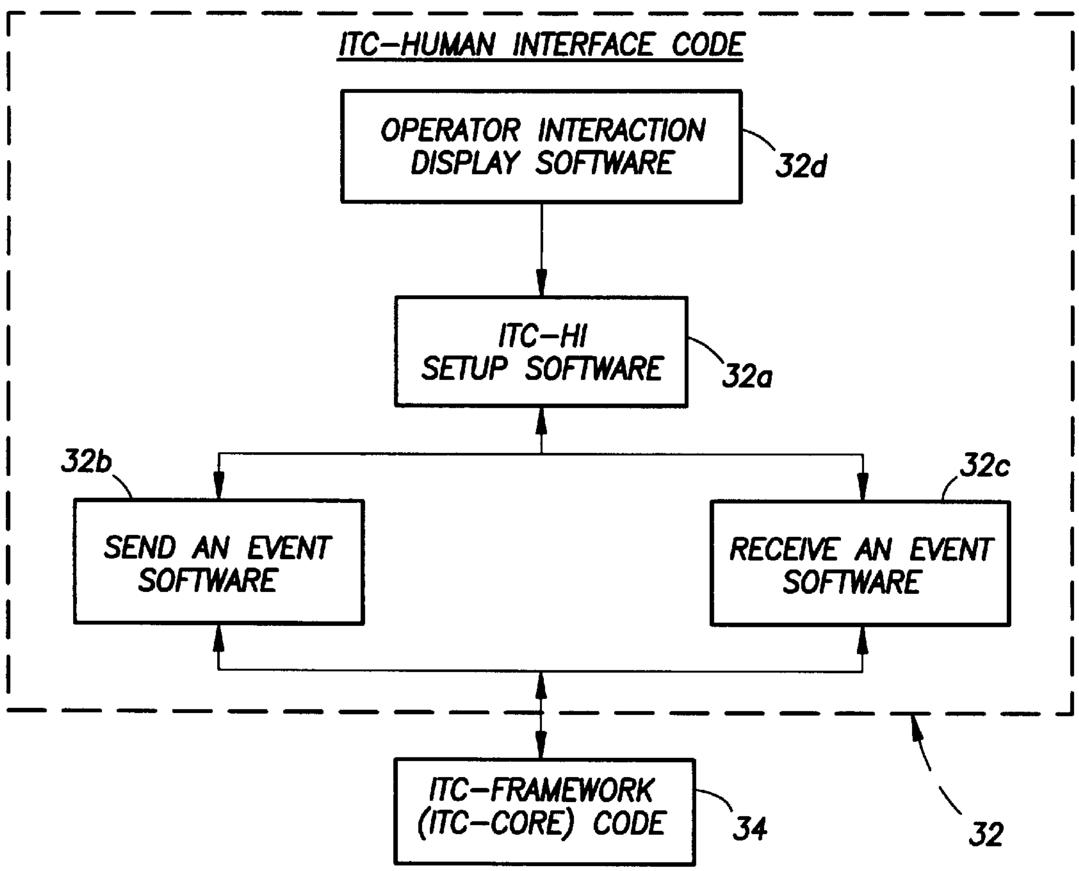

Referring to FIG. 5, a more detailed construction of the ITC Human Interface Code 32 of FIG. 4 is illustrated.

In FIG. 5, the Human Interface Code 32 of FIG. 4 is comprised of four parts: (1) an Operator Interaction Display Software 32*d*, (2) an ITC-HI Setup software 32*a* operatively connected to the Operator Interaction Display software 32*d*, (3) a Send An Event software 32*b* operatively connected to the ITC HI Setup software 32*a*, and (4) a Receive An Event Software 32*c* operatively connected to the ITC HI Setup software 32*a*. The ITC Framework (ITC Core) code 34 will be operatively connected to both the Send an Event software 32*b* and the Receive an Event software 32*c*. The Operator Interaction Display software 32*d* will generate displays of icons on the windows 12*b* of the display screen 12*a*, and it will also display, on the windows 12*b*, the "event information" which is requested from other client applications (this will be discussed later in this specification).

In operation, referring to FIG. 5, an operator at workstation 10 of FIG. 1, which is executing a particular client application, will view a variety of icons on a window display 12*b* on the display screen 12*a* of the FIG. 1 workstation for that particular client application. The operator will click "on" one or more of the icons thereby allowing an interest object in particular "event information" to be transmitted from the particular client application (e.g.—from the client 1 application 24c1 of FIG. 3) to other client applications (e.g.—client 2 application 26c1 of FIG. 3) via the server 26c2. The operator interaction display software 32d of FIG. 5 will display the window display 12b and the one or more icons in the window display 12b on the display screen 12a of the FIG. 1 workstation. When the operator clicks "on" the one or more icons in the window display 12b, the operator interaction display software 32d will inform the ITC-HI Setup Software 32a, and the ITC-HI Setup Software 32a will drive the Send An Event software 32b. The Send An Event Software 32b will instruct the ITC-Framework Code 34 of the particular client application (e.g.—client 1 application) to send the interest object in the particular event information to the other client applications (e.g.—client 2 application) via the server 26c2. When the other client applications generate the requested event information, the other client applications will send the requested event information directly to the ITC Framework Code 34 of the particular client application without passing through and registering with the server 26c2. When the requested event information is received by the particular client application (e.g.—client 1), the ITC Framework Code 34 of the particular client application will, in turn, inform the Receive An Event Software 32c of the particular client application. The Receive An Event Software 32c of the particular client application will inform the ITC-HI Setup Software 32a of the particular client application that the requested event information has been received from another client application. The ITC HI Setup Software 32a of the particular client application will, in turn, instruct the Operator Interation Display Software 32d of the particular client application to display the requested "event information" on the display screen 12a of the workstation 10 of FIG. 1.

Each of these four parts of the Human Interface Code 32 will be discussed later in this specification.

Referring to FIGS. 3, and 6 through 13b, a functional operation of the ITC Framework (ITC Core) Code 34 of each client application, such as the client 1 application 24c1 and the client 2 application 26c1, is illustrated.

Each client application includes the ITC Framework (ITC Core) Code 34. For example, the client 1 application software 24c1 and the client 2 application software 26c1 of FIG. 3 each include an ITC Framework Code 34. The ITC Framework code 34 associated with any particular client application interacts functionally with the server 26c2 and the ITC Framework code 34 associated with each other client application. For example, the ITC Framework code 34 of the client 1 application 24c1 in the first workstation 24 of FIG. 3 interacts functionally with the server software 26c2 and the ITC Framework code 34 of the client 2 application software 26c1 in the second workstation 26. The Framework code 34 of a first client application 24c1 will transmit interest objects to the server 26c2; it will transmit event information associated with an event "X" to the Framework code 34 of a second client application 26c1; and it will receive event information associated with an event "X" from the Framework code 34 of the second client application 26c1. This functional interaction between the Framework code 34 of one client application 24c1 and the server 26c2 and the Framework code 34 of other client applications 26c1 is discussed in further detail in the following paragraphs with reference to FIGS. 3 and 6 through 13b of the drawings.

In FIGS. 3 and 6, referring initially to FIG. 6, a high level schematic for distribution of events and interests is illustrated.

In FIG. 3, note the location of the client 1 application software 24c1 in the first workstation 24, and note the location of the client 2 application software 26c1 and the server software 26c2 in the second workstation 26.

In FIG. 6, a Client Application 1 24c1 (hereinafter called "Application 1") is interconnected to a Client Application 2 26c1 (hereinafter called "Application 2"), both Application 1 and Application 2 being connected to an ITC server 26c2. The "Client Application 1" 24c1 of FIG. 6 represents the client 1 application software 24c1 of FIG. 3, the "Client Application 2" 26c1 of FIG. 6 representing the client 2 application software 26c1 of FIG. 3, and the ITC server 26c2 of FIG. 6 representing the server software 26c2 of FIG. 3. When the Client Application 1 24c1 of FIG. 6 is executing in the first workstation 24 of FIG. 3, a window display (similar to one of the window displays 12b of FIG. 1) will appear on the display screen of the monitor of the first workstation 24. Similarly, when the Client Application 2 26c1 of FIG. 6 is executing in the second workstation 26 of FIG. 3, another window display (similar to one of the window displays 12b of FIG. 1) will appear on the display screen of the monitor of the second workstation 26. The window displays appearing on both monitors of the first and second workstations 24 and 26 could be any of those shown in FIG. 2.

In FIG. 6, assume that the Client Application 1 24c1 ("Application 1") is executing a first client application. In addition, assume that the Client Application 2 26c1 ("Application 2") is executing a second client application and, during the execution of the second client application by Application 2, certain "event information" will be generated by Application 2.

The term "event information" and/or the term "event" will be defined in the next three paragraphs by way of the following three examples.

For a first example, during the execution of the second client application by Application 2 at workstation 26, the operator sitting at the Workstation 26 may use the mouse 18 of FIG. 1 to place a cursor over one of the windows 12b of FIG. 1 and to thereby select certain information in that window 12b. The "selection" of certain information on that window 12b by Application 2 at workstation 26 may involve either dragging the cursor or deleting information or creating information. The "selection" of that certain information in that window 12b would be an "event" and that event would generate "event information". Application 1 may be interested in receiving that event information.

For a second example, Application 1 is being executed in France and it involves an examination of the geology of the earth. Application 2 is being executed in Houston and it involves a petrophysical application that is examining a pressure in a wellbore. There is nothing in common between Application 1 and Application 2 except for one one parameter: the pressure at a certain depth in the earth. The Application 1 may want to examine the pressure v. depth curve being generated in Application 2. Therefore, the pressure v. depth curve in Application 2 and any changes made thereto by an operator at the second workstation 26 would constitute "event information". Application 1 would be interested in receiving that event information.

For a third example, called "cursor tracking", Application 1, executing in the first workstation 24 of FIG. 3, is displaying a map having x, y, and z coordinates and an operator at the first workstation 24 can move a cursor across the map which would generate x, y, and z "event information". However, Application 2, executing the second workstation 26 of FIG. 3, is viewing a three-dimensional "cube" representation of an underground reservoir and Application 2 may be interested in receiving the x, y, and z "event information" from Application 1 whenever that event information is generated by Application 1. Therefore, when the operator at the first workstation 24 executing Application 1 moves the cursor across the map, the x, y, and z "event information" is generated from Application 1. If Application 2 previously expressed an interest in receiving that "event information" and when the event information is generated by Application 1, the Application 1 in the first workstation 24 would send that "event information" to Application 2 in the second workstation 26.

In FIG. 6, when Application 1 **24*c*1 is executing the first client application, assume that Application 1 is interested in receiving certain "particular event information" from Application 2 26*c*1 when Application 2 generates that particular event information. In that case, Application 1 24*c*1 generates an "interest object" signal (which is propagated along line 36 in FIG. 6) from Application 1 24*c*1 to the ITC server 26*c*2. The server 26*c*2 informs Application 2 26*c*1 of the Application 1 interest in the particular event information by re-propagating the aforementioned "interest object" signal from the server 26*c*2 to the Application 2 26*c*1 (along line 38 in FIG. 6). The interest object signal from Application 1 contains an identifier which uniquely identifies Application 1. Therefore, when Application 2 receives the interest object signal (from line 38 in FIG. 6), Application 2 26*c*1 knows that Application 1 24*c*1 was interested in receiving the "particular event information" when the particular event information is generated by Application 2. As a result, when Application 2 generates the "particular event information" (i.e.—the operator at workstation 26 selects something by placing the mouse 18 in a window 12*b* and depressing a key on the mouse), since Application 2 knows that Application 1 is interested in receiving the particular event information, Application 2 will send that particular event information "directly" to Application 1 (via line 40). That is, the particular event information will not be sent from Application 2 26*c*1 to the server 26*c*2 (via line 38) and from the server 26*c*2 to Application 1 24*c*1 (via the line 36). Because the server 26*c*2 is not involved in the transfer of the particular event information from Application 2 to Application 1, valuable processing time is saved. As a result, the "Distributed Framework for Intertask Communication Between Workstation Applications" of the present invention is "extensible". That is, for any particular client application program executing in a workstation as represented by one of the windows 12*b* being displayed in FIG. 1**, an application developer can define: (1) the type of events that the particular client application will receive from another concurrently executing client application, and (2) the type of data associated with those events that will be received from the other client application whenever those events are transmitted from the other client applications.

Figure 7:
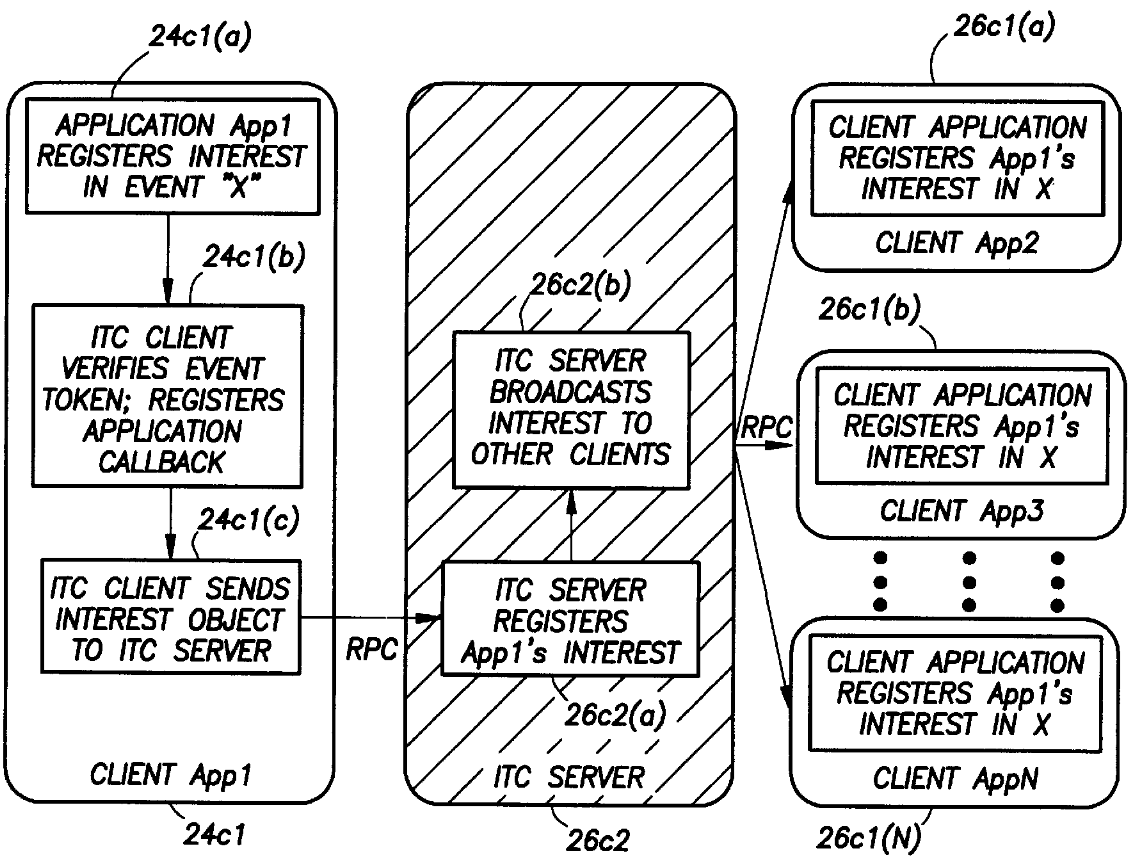

In FIG. 7, a flowchart of interest registration and distribution is illustrated. This flowchart discusses some of the concepts discussed above with reference to FIG. 6. In FIG. 7, when Client Application 1 **24*c*1 wants to register an interest in an event (i.e.—Application 1 wants to register an interest in an event because it wants to receive information from one or more other client applications when the other client applications practice or execute the event), a number of process steps are practiced by Application 1 24*c*1, the server 26*c*2, and Application 2 26*c*1**:

1. In FIG. 7, block **24*c*1(a), the Client Application 1 24*c*1** ("Application 1") includes two parts: (1) a first client application ("client application 1"), and (2) an Intertask Communication (ITC) client ("ITC client"). When Application 1 is executing the first client application and if the first client application requires information concerning an event which will hereinafter be called "event X", the first client application will register an interest in event X with the ITC client by sending an "interest object" to the ITC client. The interest object contains an "event token".

2. In FIG. 7, block **24*c*1**(b), the ITC client stores certain event tokens. When the ITC client receives the interest object from the first client application, the ITC client will verify the event token present in the interest object by locating a match between the event token in the interest object with an event token catalogued in a database. When a match between event tokens is located, the ITC client will "register an application callback"; that is, the ITC will send an acknowledgement signal back to the first client application.

3. In FIG. 7, block **24*c*1(c), the ITC client will then send an "interest object" signal to the ITC server 26*c*2**.

4. In FIG. 7, block **26*c*2**(a), the ITC server will receive the interest object signal from the ITC client and, in response thereto, the ITC server will register within itself (i.e., the ITC server will store within itself) data or information regarding the interest in event X which the "first client application" of "Application 1" had previously generated. Recall that the first client application of Application 1 previously indicated (by sending the interest object signal to the ITC server) that it wants to receive certain information from the other client applications that is generated when the "event X" is executed or practiced by the other client applications.

5. In FIG. 7, block **26*c*2(b), when the ITC server registers within itself the information regarding the first client application's interest in receiving the event X information from other client applications pursuant to block 26*c*2(a), the ITC server will broadcast to all such other client applications such first client application's interest. As a result, all the other client applications (i.e.—all the other client application programs being executed in all of the workstations in the network of workstations) will know that the first client application of Application 1 24*c*1** is interested in receiving certain specific information from the other client applications, the specific information being generated from the other client applications only when the "event X" is executed or practiced by the other client applications.

6. In FIG. 7, blocks **24*c*1(a), 24*c*1(b), . . . , and 24*c*1(N), all of the other client applications ("client application 2" 26*c*1(a), "client application 3" 26*c*1(b), . . . , and "client application N" 26*c*1**(N)) will register therein (that is, store therein) the first client application's interest in receiving information regarding "event X" whenever any one or all of client application 2, client application 3, . . . , or client application N practice or execute the "event X".

Figure 8A:
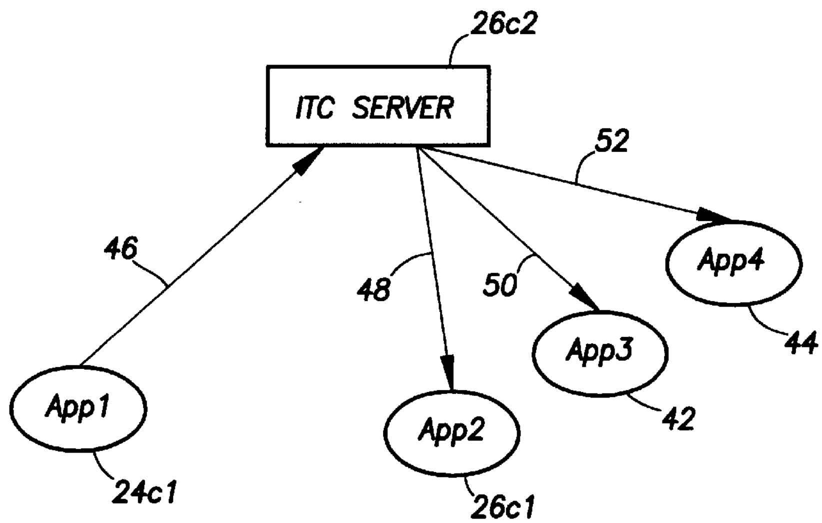
Figure 8B:
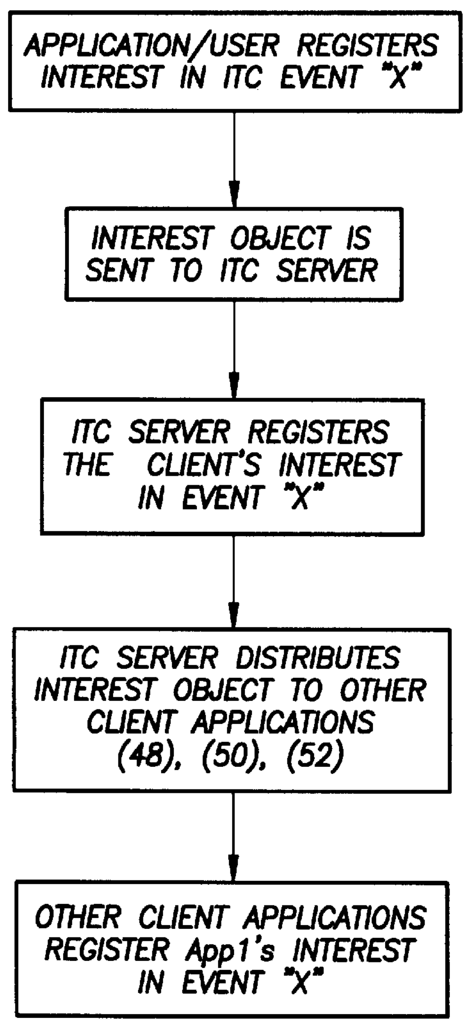

In FIGS. **8*a*–8*b*, another flowchart of interest registration and distribution (which will discuss concepts similar to the concepts discussed above in connection with the flowcharts of FIGS. 6 and 7) is illustrated. In the flowchart of FIGS. 8*a*–8*b*, the "client application 1" 24*c*1 ("Application 1") is shown to be communicating with the server 26*c*2 and the "client application 2" 26*c*1 ("Application 2") as previously illustrated in FIGS. 6 and 7. However, in addition, in FIGS. 8*a*–8*b*, two other client applications are illustrated: "client application 3" 42 ("Application 3") and "client application 4" 44 ("Application 4"). In operation, referring to FIGS. 8*a*–8*b*, assume for purposes of discussion that Application 1, Application 2, Application 3, and Application 4 represent client application programs which are executing in four (4) different workstations similar to the workstation of FIG. 1. Assume further that each of the four applications (Application 1 through Application 4) generate a window display at their respective workstations similar to the window display 12***b* shown in FIG. 1. Assume further that the Application 1 of FIG. 8*a* is represented by the "client 1 software" 24*c*1 in FIG. 3, the Application 2 of FIG. 8*a* is represented by the "client 2 software" 26*c*1 in FIG. 3, and the server 26*c*2 of FIG. 8*a* is represented by the "server software" 26*c*2 in FIG. 3. In FIGS. 8*a*–8*b*, Application 1 24*c*1 registers an interest in an ITC event called "event X" (the actual mechanics behind the registration of that interest will be better understood with reference to FIG. 14). An interest object is sent from Application 1 24*c*1 to the server 26*c*2 via line 46 in FIG. 8*a*. When the interest object is received by the server 26*c*2, the server 26*c*2 will register, within itself, the interest from Application 1 24*c*1 in event X. The server 26*c*2 will then re-distribute the interest object to: "Application 2" 26*c*1 via line 48, "Application 3" 42 via line 50, and "Application 4" 44 via line 52. When the server 26*c*2 re-distributes the interest object from Application 1 to the other client applications, Applications 2, 3, and 4, the other client applications (Applications 2, 3, and 4) will register within themselves Application 1's interest in the event X.

In FIGS. 9*a*–9*b*, a high level schematic of event propagation using peer to peer communication is illustrated. Recall from FIGS. 8*a*–8*b*that Application 1 24*c*1 transmitted an interest object signal to the server 26*c*2 and the server 26*c*2 redistributed that interest object signal to Application 2 26*c*1. The interest object signal (which identifies Application 1 as being its originator) was registered in Application 2 as originating from Application 1 and it expressed an interest by Application 1 in certain specific information which would be generated by Application 2 when an "event X" is practiced or executed by Application 2. As a result, in FIGS. 9*a*–9*b*, since the interest object signal previously sent to Application 2 by the server 26*c*2 identified Application 1 as being the requestor of such specific information concerning "event X", when Application 2 26*c*1 practices or executes the "event X", the aforesaid certain specific information concerning the execution or practice of "event X" will be sent directly from "Application 2" 26*c*1 to "Application 1" 24*c*1 (that is, the aforesaid certain specific information will not be transmitted from Application 2 to the server 26*c*2 and from the server 26*c*2 to Application 1; the server 26*c*2 has been bypassed).

The transmission of the aforementioned certain specific information (concerning the practice by Application 2 of event X) directly from Application 2 to Application 1, without passing through and registering with the server, is an improvement over the Good et al disclosure of the prior art, referenced in the background section of this specification. Recall that, in the Good et al disclosure, all of the data to be communicated between concurrently executing computer program applications must be routed through an intervening server program or dispatcher program.

In FIGS. 10*a*–10*b*, a high level schematic depicting the multi-casting of event information from Application 2 to other multiple interested client applications is illustrated.

Referring briefly to FIGS. 8*a*–8*b*, recall that an interest object was sent from Application 1 24*c*1 to the server 26*c*2 via line 46 in FIG. 8*a*. Recall further that, when the interest object was received by the server 26*c*2, the server 26*c*2 registered, within itself, the interest from Application 1 24*c*1 in event X. The server 26*c*2 then re-distributed the interest object to: "Application 2" 26*c*1 via line 48, "Application 3" 42 via line 50, and "Application 4" 44 via line 52. However, now that the interest object, in "event X", was re-distributed from the server 26*c*2 to Applications 2, 3, and 4, if any one or all of Applications 2, 3, and/or 4 practice or execute the "event X", the responsible Application (2, 3, and/or 4) will transmit information concerning the "event X" directly back to the requestor, which is Application 1 24*c*1, without re-registering with or passing through the server 26*c*2 (the server 26*c*2 remains idle).

Therefore, in FIGS. 10*a*–10*b*, assume that the requestor of event X was both "Application 1" 24*c*1 and "Application 4" 44 (Application 1 and Application 4 both previously sent an interest object in "event X" to the server 26*c*2, and the server 26*c*2 redistributed that interest object in event X to Application 2). Therefore, Application 2 knows that Applications 1 and 4 are interested in receiving information concerning the practice of "event X". As a result, when "Application 2" 26*c*1 practices or executes the "event X", information concerning the execution of "event X" will be sent directly from Application 2 to both "Application 1" 24*c*1 and "Application 4" 44 (that information regarding the execution of event X will not re-register with or be routed through the server 26*c*2 and, as a result, the server 26*c*2 will be bypassed).

Figure 11A:
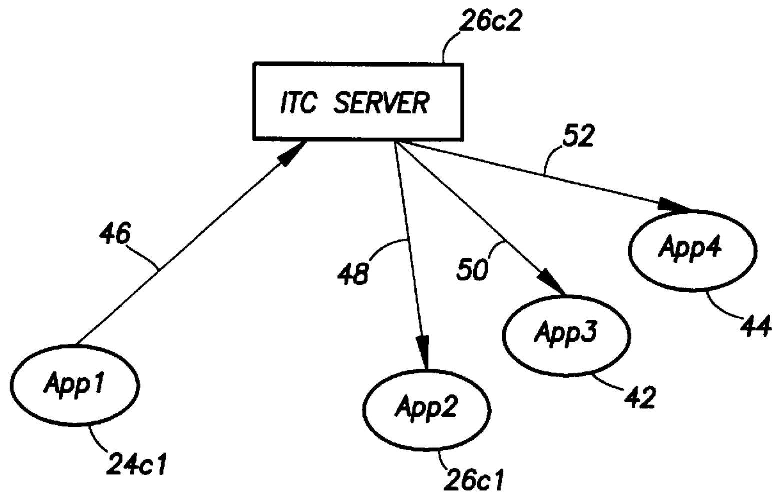
Figure 11B:
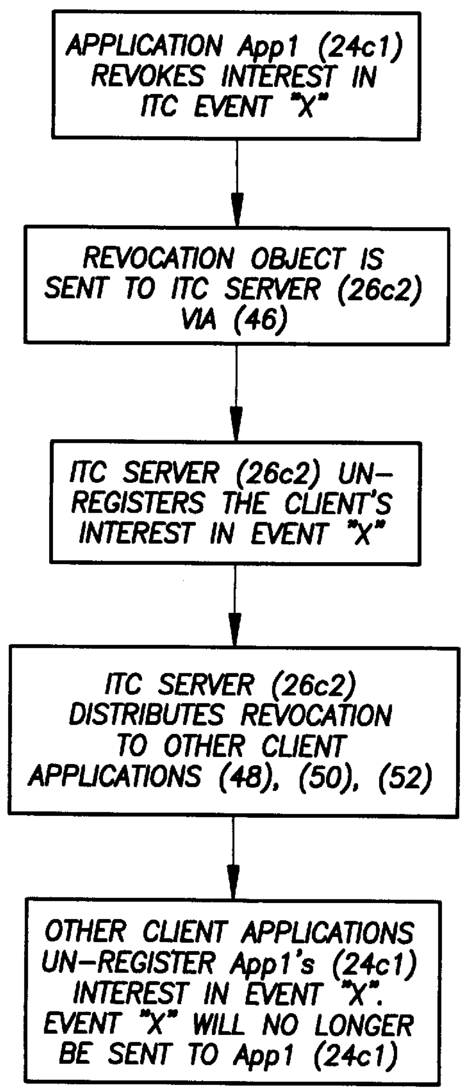

In figures 11*a*–11*b*, a high level schematic showing "interest revocation" is illustrated. Assume that Client Application 124*c*1 (Application 1) previously registered an interest in event X with the server 26*c*2 (by sending an interest object to the server), and then the server 26*c*2 redistributed that interest object in event X to Client Application 2 26*c*1 (Application 2), Client Application 3 42 (Application 3), and Client Application 444 (Application 4). Then, assume that Application 1 wants to revoke its interest in "event X". In order to revoke its interest in "event X", the Application 1 will send a "revocation object" to the server 26*c*2 (via line 46 in FIG. 11), the "revocation object" representing Application 1's indication to other client applications that is no longer wants to receive any information concerning the practice or execution, by other applications, of the "event X". In response to the receipt of the revocation object, the server 26*c*2 un-registers, within itself, Application 1's interest in receiving information regarding the execution, by other client applications, of "event X" when event X is practiced by other applications. Then, the server 26*c*2 re-distributes the revocation object, originating from Application 1, to all the other client applications; that is, in figure 11a, the server 26*c*2 re-distributes the revocation object to Application 2 (via line 48), Application 3 (via line 50) and Application 4 (via line 52). When the other client applications (Applications 2, 3, and 4) receive the "revocation object", the other client applications (Applications 2, 3, and 4) will un-register Application 1's interest in "event X". As a result, information concerning the practice or execution, by the other Client Applications 2, 3, or 4, of event X, will no longer be sent to Application 1.

Figure 12A:
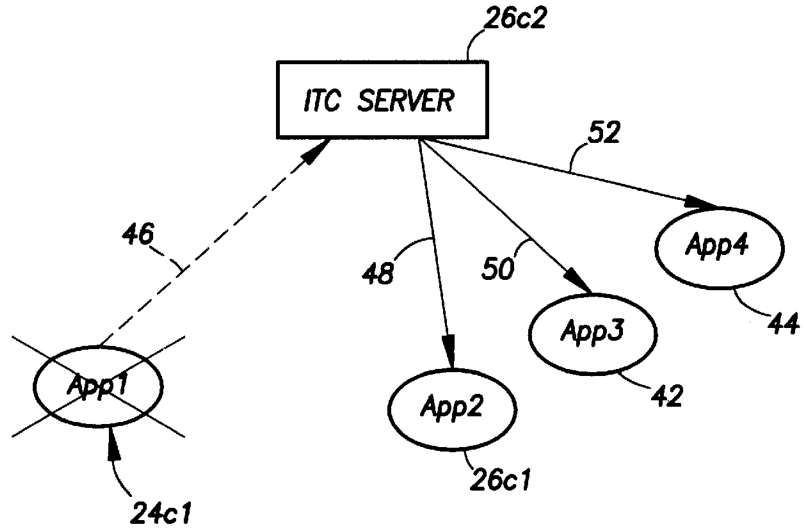
Figure 12B:
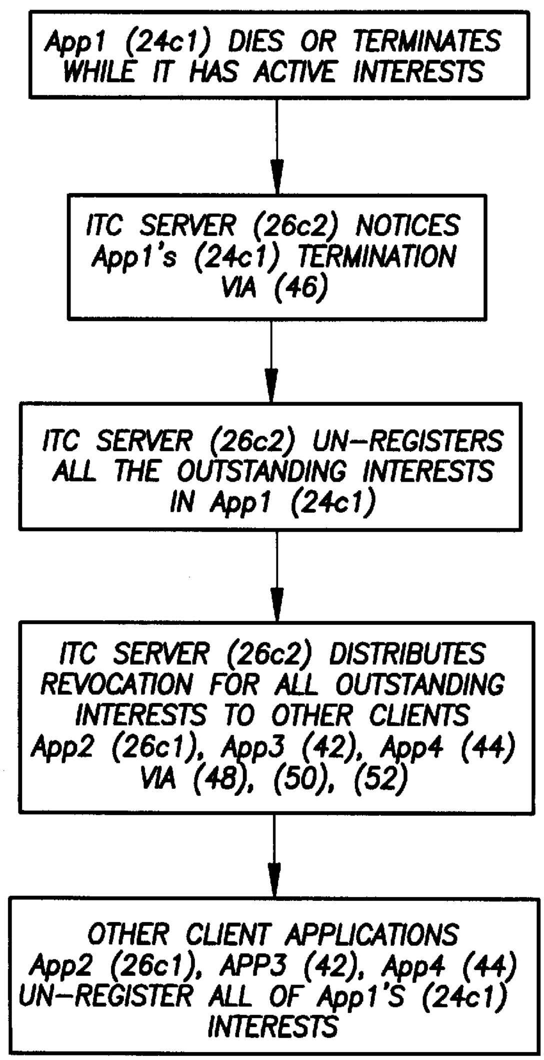

In FIGS. 12*a*–12*b*, a high level schematic of implicit interest revocation for a terminated client is illustrated. Assume that Application 1 24*c*1 dies or terminates while it has active interests outstanding. Recall that Application 1 has active interests outstanding because Application 1 previously transmitted an interest object in "event X" (and perhaps other events) to the server 26*c*2 and the server 26*c*2 previously redistributed that interest object in event X, and other events, to the other client applications, "Application 2" 26*c*1, "Application 3" 42, and "Application 4" 44. In FIGS. 12*a*–12b, if Application 1 dies or terminates, the server 26*c*2 will notice Application 1's termination. When the server

**26*c*2 notices the termination of Application 1 24*c*1 (the Application 1 program ceases to execute), the server 26*c*2 will un-register, within itself, all of the outstanding interests which Application 1 previously sent to the server 26*c*2 (via line 46). Then, the server 26*c*2 will distribute a "revocation object" corresponding to all of Application 1's outstanding interests in all events to all other client applications, that is, to "Application 2" 26*c*1, "Application 3" 42, and "Application 4" 44 in FIG. 12. When the other client applications (Applications 2, 3, and 4) receive the revocation object from the server 26*c*2 associated with all of Application 1's outstanding interests in all events, the other client applications (Applications 2, 3, and 4 in FIG. 12) will un-register all of the interests in all events which "Client Application 1" 24*c*1 had previously transmitted to Applications 2, 3, and 4 via the server 26*c*2**.

In FIGS. **13*a*–13*b*, a high level schematic showing the distribution of outstanding interests in a new client application is illustrated. Assume now that a new client application, "Client Application 5" 50 ("Application 5"), in FIG. 13*a*, begins execution in a workstation in the network of workstations, similar to the workstation 10 of FIG. 1. When the Application 5 program executes, a window would be displayed on the workstation similar to the window displays 12*b* of FIG. 1. When Application 5 begins to execute, Application 5 will register itself with the server 26*c*2 in FIG. 13 by sending a "registration signal" (via line 52 in FIG. 13) from the "Application 5" 50 to the server 26*c*2. In response to the "registration signal", the server 26*c*2 will register, within itself, the existance of the new client application, "Application 5" 50. Assume now that "Application 2" 26*c*1, "Application 3" 42, and "Application 4" 44 in FIG. 13 previously sent to the server 26*c*2 an "interest object" in an event, called "event X", and perhaps other events. In that case, after the server 26*c*2 registers within itself the existance of the new client "Application 5", the server 26*c*2 will redistribute the interest objects originating from all the other client applications (Applications 2, 3, and 4) to the new client "Application 5" (via line 54 in FIG. 13*a*). In the example of FIG. 13*a*, the server 26*c*2 will redistribute to Application 5: (1) the Application 2's previously expressed interest in event X and other events, (2) the Application 3's previously expressed interest in event X and other events, and (3) the Application 4's previously expressed interest in event X and other events (hereinafter called "previously expressed interests"). When new client "Application 5" 50 receives the previously expressed interests (i.e.—the interest objects) in event X and other events (which originated from Application's 2, 3, and 4) from the server 26*c*2, the "Application 5" will register, within itself, the previously expressed interests. When such previously expressed interests (i.e.—the interest objects) from Applications 2, 3, and 4 are registered within Application 5, the Application 5 will know that Applications 2, 3 and 4 require certain specific information regarding the execution and/or practice of the "event X" and other events. As a result, when the event X or other events are executed by Application 5, the Application 5 will send that certain specific information directly to Applications 2, 3, and 4 (that certain specific information will not pass through and register with the server 26*c*2** like it did in the Good et al disclosure).

Referring to FIGS. 14 through 25, a detailed discussion and a functional operation of the Operator Interaction Display Software **32*d* of FIG. 5** is illustrated.

In the above paragraphs, the functional operation of the ITC Framework 34 in FIG. 4 was discussed in connection with the client 1 application software and the client 2 application software **24*c*1 and 26*c*1 stored in the workstations of FIG. 3. Recall that the ITC Framework 34 of the client application 1 24*c*1 in FIG. 6 sent any requests for event information (associated with "event X") to the server 26*c*2, whereupon the server 26*c*2 sent that request for event information to client application 2 26*c*1. However, when the client application 2 practices or executes the "event X", the event information associated with event X was sent directly from client application 2 to client application 1 (via line 40 in FIG. 6) without passing through or registering with the server 26*c*2**.

However, the operator sitting at the second workstation 26 in FIG. 3 can decide how much, if any, of the event information associated with "event X" will be transmitted from the second workstation 26, and the operator sitting at the first workstation 24 in FIG. 3 can decide how much, if any, of the event information associated with "event X" will be received in the first workstation 24.

The operators can make that decision and act upon that decision by utilizing certain "icons" which appear within each window display (**12*b* of FIG. 1) on the display screen (12*a* of FIG. 1) of their particular workstation (10 of FIG. 1**). For example, the operator at a workstation can click on a first icon and enable the transmission or reception of all event information to and from his client application, or the operator can click on a second icon and completely disable the transmission or reception of all event information to or from his client application, or the operator can click on a third icon and selectively choose how much of what kind of event information will be transmitted from or received into his client application.

The following paragraphs will describe each icon and its function. The icons will appear at the bottom right hand corner of each window display (**12*b* of FIG. 1) on the display screen (12*a* of FIG. 1) of the workstation 10. There are three main types of icons: the status icon 60, the broadcast icon 62, and the event filter icon 64. There are three types of status icon: the open state icon 60*a*, the closed state icon 60*b*, and the locked state icon 60*c***.

Figure 14:
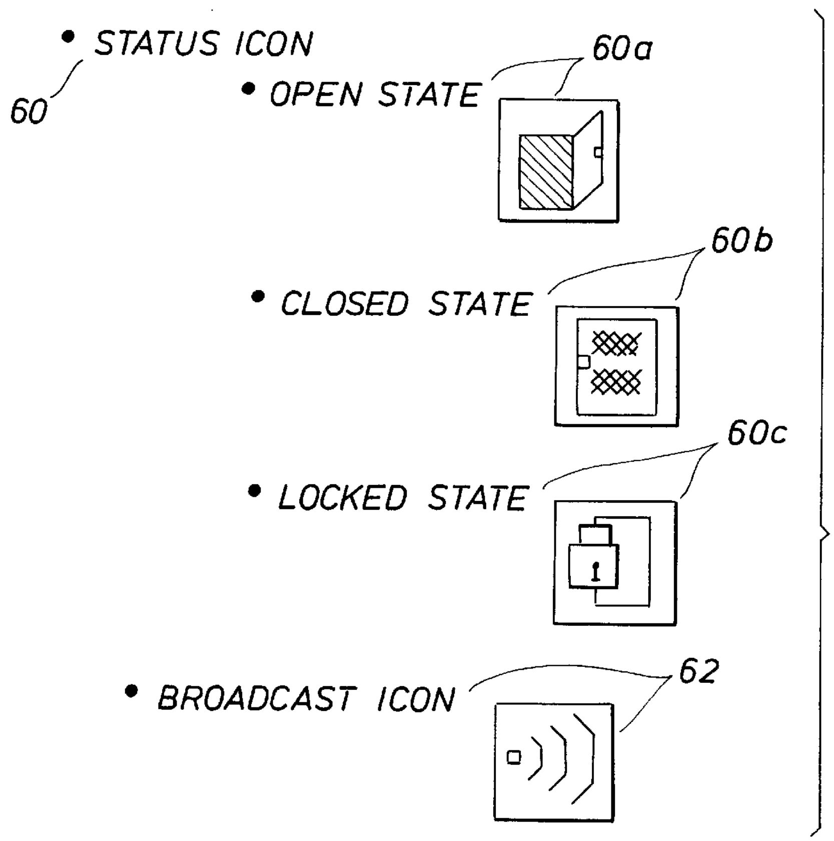

In FIG. 14, the status icons 60 and the broadcast icon 62 are illustrated. The status icons 60 include the open state status icon **60*a*, the closed state status icon 60*b*, and the locked state status icon 60*c***. Each of these icons will be discussed below.

Open State Status Icon **60*a* of FIG. 14**

The open state status icon **60*a* is accessible to an operator and it will appear on the bottom right hand corner of a window display (similar to window display 12*b* of FIG. 1). The operator sitting at a workstation (like workstation 24 or 26 in FIG. 3) would locate a window display (12*b* of FIG. 1) on the display screen (12*a* of FIG. 1) and click on the open state status icon 60*a* which appears at the bottom right hand corner of the window display 12*b*. When the operator clicks on the open state status icon 60*a* of a window display 12*b* for a particular client application, that particular client application is open and it will receive all event information from other client applications; furthermore, that particular client application is open and it will transmit all event information to other client applications. For example, an operator may change a font size (which is an "event" that generates "event information"). If the open state status icon 60*a*** is clicked "on" by the operator for a particular client application program, the font size change event information will be transmitted to all the other interested client applications that requested the font size change event information (via an interest object in the font size change event sent from the other client applications to the particular client application by way of the intervening server).

For example, if an operator sitting at the workstation 24 of FIG. 3 clicks on the open state status icon 60*a* on the window display 12*b* of FIG. 1 for the client 1 application 24*c*1 of FIG. 3, the client 1 application 24*c*1 will receive all requested event information from the client 2 application 26*c*1 of FIG. 3, and the client 1 application will transmit all requested event information to the client 2 application 26*c*1.

Closed State Status Icon 60*b* of FIG. 14

The closed state status icon 60*b* is accessible to an operator and it will appear on the bottom right hand corner of a window display (similar to window display 12*b* of FIG. 1). The operator sitting at a workstation (like workstation 24 or 26 in FIG. 3) can locate a window display (12*b* of FIG. 1) on the display screen (12*a* of FIG. 1) and click on the closed state status icon 60*b* which appears at the bottom right hand corner of the window display. When the operator clicks on the closed state status icon 60*b* of a window display 12*b* for a particular client application, that particular client application is closed and it will not receive any event information from other client applications, and that particular client application is closed and it will not transmit any event information to other client applications.

For example, if an operator sitting at the workstation 24 of FIG. 3 clicks on the closed state status icon 60*b* on the window display 12*b* of FIG. 1 for the client 1 application 24*c*1 of FIG. 3, the client 1 application 24*c*1 will not receive any requested event information from the client 2 application 26*c*1 of FIG. 3, and the client 1 application will not transmit any requested event information to the client 2 application 26*c*1.

Locked State Status Icon 60*c*

The locked state status icon 60*c* is accessible to both an operator and to the programmer of a particular client application. The locked state status icon 60*c* will appear at the bottom right hand corner of a window display (12*b* of FIG. 1) of the particular client application. In some cases, the operator at a workstation may click "on" the open state status icon 60*a* in a window display 12*b* for the particular client application. However, the application programmer may have previously decided that, for the aforementioned particular client application, absolutely no event information can be transmitted from or received in that particular client application. As a result, the application programmer, that programmed the particular client application, may have required (internally within the particular client application code) that the particular client application be closed (as if the closed state status icon 60*b* were clicked "on"). In that event, the locked state status icon 60*c* will appear to click "on", by itself, in response to the requirement to close the particular client application, which requirement would be placed inside the particular client application code. An unstable state could cause the locked state status icon 60*c* to automatically click "on".

However, the operator could also click "on" the locked state status icon 60*c*. When the locked state status icon 60*c* is clicked "on,", this is equivalent to clicking "on" the closed state status icon 60*b*. That is, when the locked state status icon 60*c* is clicked "on", event information will not be received by a particular client application from other client applications (via line 40 in FIG. 6), event information will not be sent from the particular client application to other client applications, and an interest object associated with a particular event will not be send by the particular client application to the server 26*c*2 (via line 36 in FIG. 6) for further transmission to other client applications (via line 38 in FIG. 6).

Broadcast Icon 62

The broadcast icon 62 will appear at the bottom right hand corner of a particular window display (12*b* of FIG. 1) which is generated by a particular client application program, such as client 1 or client 2 of FIG. 3, executing within a workstation (10 of FIG. 1). Assume that, for that particular client application program, the closed state status icon 60*b* has been clicked "on" for a period of time. A plurality of newly created events (such as, changes to font size, changes to color, or dashed lines) which were generated during that period of time will not be transmitted by the particular client application to other interested client applications executing in the subject workstation or other workstations in the network of workstations. However, when the broadcast icon 62 is clicked "on" within the window display (12*b*) by an operator sitting at the workstation (10 of FIG. 1) using the mouse (18 of FIG. 1), all of the plurality of newly created events in the particular client application (12*b*), which were generated by an operator at the workstation 10 during the aforementioned period of time when the closed state status icon 60*b* was clicked "on", will be transmitted simultaneously from the particular client application to all other "interested client applications" executing in the network of workstations (the words "interested client applications" indicating that "interest objects" in the newly created events were previously transmitted from the other client applications to the server 26*c*2 and from the server 26*c*2 to the particular client application).

In FIGS. 15*a* through 15*e*, the Event Filter icon 64 is illustrated. The event filter icon 64 will be discussed in the following paragraph.

Event Filter Icon 64

In FIG. 5, recall that each client application, such as the client 1 application 24*c*1 and the client 2 application 26*c*1 of FIG. 3, include an ITC-HI Setup software 32*a* (FIG. 5). The ITC-Setup software 32*a* includes a coded and stored "list of events" and a "list of functions" corresponding, respectively, to the "list of events" (this list of events and corresponding list of functions will be discussed in greater detail in this specification with reference to FIG. 26 of the drawings).

Therefore, when a particular client application (such as the client 1 or client 2 application of FIG. 3) sends an interest object in an "event X" to another client application via the server 26*c*2 for the purpose of receiving event information from the other client applications regarding the practice of that event X, the "event X" must, of necessity, be one of the events in the "list of events" (of FIG. 26) coded within the ITC Setup Software 32*a* of FIG. 5 for that particular client application.

Similarly, if a particular client application intends to send "event information" to other client applications that is associated with the practice by the particular client application of a "particular event", that "particular event" must be one of the events stored in the "list of events" (of FIG. 26) coded within the ITC Setup Software 32*a* of FIG. 5 for that particular client application.

Consequently, since each particular client application is said to be "interested" in receiving a plurality of "event information" associated with a plurality of events from other client applications, the plurality of events are stored in the "list of events" coded within the ITC Setup software 32*a* (see FIG. 26 for the "list of events") for said each particular client application. Similarly, since each particular client application will send "event information" associated with a plurality of events to other interested client applications, those plurality of events are stored in the "list of events" coded within the ITC Setup software 32*a*.

However, by using the "Event Filter" icon 64 of FIG. 15, an operator or user, monitoring the particular client application on a window display (12*b* of FIG. 1) at his workstation (10 of FIG. 1), can selectively decide how many of the plurality of events in the list of events coded within the ITC Setup software 32*a* he will transmit to other client applications via the server 26*c*2 and how many of the plurality of events in the list of events coded within the ITC Setup software 32*a* he will receive from the other client applications via the server 26*c*2.

Figures 15A, 15B, 15C, 15D, 15E:
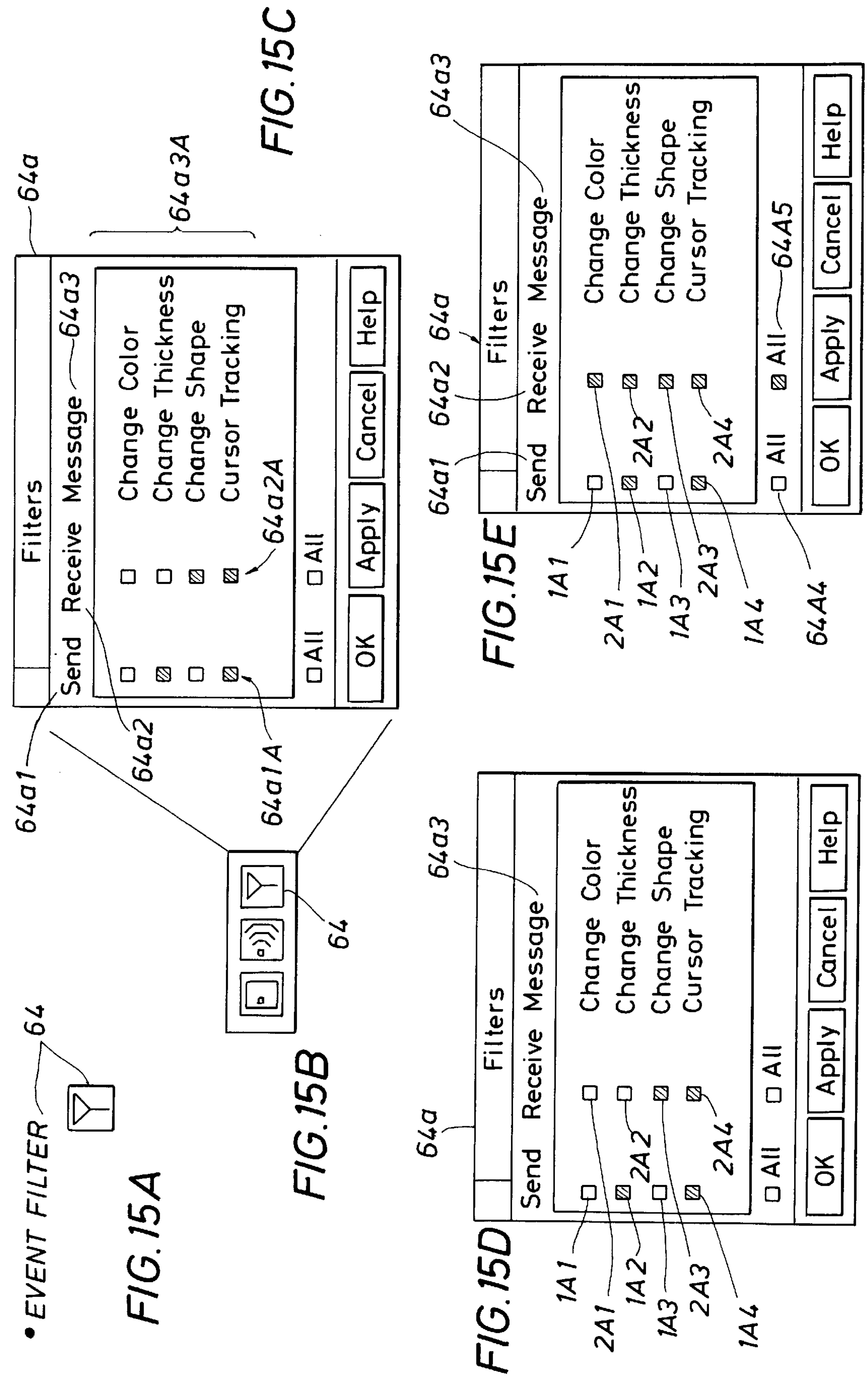

In FIGS. 15*a* through 15*e*, the event filter icon 64 of FIGS. 15*a* and 15*b* will be located at the bottom right hand corner of each window display (12*b*) on the display screen (12*a*) of a workstation (10). As shown in FIG. 15*b*, when the operator at the workstation (10) uses the mouse 18 to click "on" the event filter 64 which appear on a window display 12*b*, a subwindow display 64*a* shown in FIGS. 15*c* will be presented to the operator on the display screen (12*a*).

In FIG. 15*c*, the subwindow display 64*a* (which appears on the display screen 12*a* of the workstation 10 when the event filter icon 64 in a window display 12*b* for a particular client application is clicked "on" by an operator) includes three columns: (1) the send column 64*a*1, (2) the receive column 64*a*2, and (3) the message or event column 64*a*3. A plurality of messages or events 64*a*3A are printed under the message column 64*a*3. These plurality of messages or events 64*a*3A represent a plurality of events for which: (1) a corresponding plurality of event information could be received from other client applications, and (2) a corresponding plurality of event information could be sent or transmitted to other client applications. A plurality of send boxes 64*a*1A appear under the send column 64*a*1, and a plurality of receive boxes 64*a*2A appear under the receive column 64*a*2. For each of the plurality of messages 64*a*3A, there is one send box 64*a*1A and one receive box 64*a*2A. An operator would use the mouse 18 of FIG. 1 to click within a send box and/or a receive box for each of the plurality of events 64*a*3A.

If the operator clicked within a send box 64*a*1A for a particular message or event (one of events 64*a*3A in FIG. 15*c*) for a particular client application, "event information" associated with that particular event will, in fact, be sent from the particular client application to the other client applications that registered an interest in the particular event with the particular client application; however, if the operator did not click within the send box 64*a*1A for that particular event 64*a*3A for that particular client application, "event information" associated with that particular event 64*a*3A will not be sent from the particular client application to the other client applications that registered an interest in the particular event with the particular client application.

In addition, If the operator clicked within a receive box 64*a*2A for a particular message or event 64*a*3A for a particular client application, "event information" associated with that particular event 64*a*3A will, in fact, be received from other client applications in response to the registry by the particular client application with the other client applications in that particular event; however, if the operator did not click within the receive box 64*a*2A for that particular event 64*a*3A for that particular client application, "event information" associated with that particular event 64*a*3A will not be received from the other client applications in response to the registry by the particular client application with the other client applications in that particular event.

In FIGS. 15*d* and 15*e*, consider the examples of the use of the event filter 64 and the subsequent use of the subwindow display 64*a* for that event filter 64 illustrated in FIGS. 15*d* and 15*e*.

In the example of FIG. 15*d*, four events appear under the events column 64*a*3 of the subwindow display 64*a* of the event filter 64 (appearing in a window display 12*b* on the display screen 12*a* of a workstation 10 for a particular client application): (1) change color, (2) change thickness, (3) change shape, and (4) cursor tracking. Note, for each of these events, whether the send boxes 64*a*1A and/or the receive boxes 64*a*2A are clicked "on" (by placing a black mark in the box).

In FIG. 15*d*, taking each event in order, for the "change color" event of FIG. 15*d*, the send box 1A1 is not clicked, and the receive box 2A1 is not clicked. As a result, for the "change color" event for the particular client application, event information for the "change color" event will not be transmitted to other client applications, and event information for the "change color" event will not be received from other client applications.

In FIG. 15*d*, for the "change thickness" event, the send box 1A2 is clicked, but the receive box 2A2 is not clicked. As a result, for the "change thickness" event for the particular client application, event information for the "change thickness" event will be transmitted to other client applications, but event information for the "change thickness" event will not be received from other client applications.

In FIG. 15*d*, for the "change shape" event, the send box 1A3 is not clicked, but the receive box 2A3 is clicked. As a result, for the "change shape" event for the particular client application, event information for the "change shape" event will be not transmitted to other client applications, but event information for the "change shape" event will be received from other client applications.

In FIG. 15*d*, for the "cursor tracking" event, the send box 1A4 is clicked, and the receive box 2A4 is clicked. As a result, for the "cursor tracking" event for the particular client application, event information for the "cursor tracking" event will be transmitted to other client applications, and event information for the "cursor tracking" event will be received from other client applications.

However, in the example of FIG. 15*e*, the same four events appear under the events column 64*a*3 of the subwindow display 64*a* of the event filter 64 (appearing in a window display 12*b* on the display screen 12*a* of a workstation 10 for a particular client application): (1) change color, (2) change thickness, (3) change shape, and (4) cursor tracking. The subwindow display 64*a* in FIG. 15*e* further includes an "all" box 64*a*4 under the "send" column 64*a*1 and another "all" box 64*a*5 under the "receive" column 64*a*2. When an "all" box is clicked "on", each of the individual (send or receive) boxes above the "all" box will be clicked "on"; however, if the "all" box is not clicked "on", each of the individual boxes above the "all" box must be individually clicked "on" or "off". For example, note that the "all" box 64*a*5 under the receive column 64*a*2 is clicked "on", but the "all" box 64*a*4 under the send column 64*a*1 is not clicked "on". Since the "all" box 64*a*5 under the receive column 64*a*2 is clicked "on", all of the receive boxes 2A1, 2A2, 2A3, and 2A4 in the subwindow display 64*a*in FIG. 15*e* are clicked "on". However, since the "all" box 64*a*4 under the "send" column 64*a*1 is not clicked "on", each of the individual boxes 1A1, 1A2, 1A3, and 1A4 must be individually clicked as either "on" or "off". As a result, in FIG. 15*e*, the "change color" event will not be sent from the particular client application to other client applications but it will be received by the particular client application from other client applications. In addition, the "change thickness" event will be sent from the particular client application to other client applications and it will be received by the particular client application from the other client applications. The "change shape" event will not be sent by the particular client application to other client applications, but it will be received by the particular client application from other client applications. The "cursor tracking" event will be sent by the particular client application to the other client applications and it will be received by the particular client application from the other client applications.

The functional operation of the event filter 64 and its subwindow 64*a* will be set forth again below in connection with a discussion of FIG. 26 and the functional operation of the present invention.

In FIGS. 16 through 23, examples of the use of all the icons of FIGS. 14 and 15*a*, including the open state icon 60*a*, the closed state icon 60*b*, the locked state icon 60*c*, the broadcast icon 62, and the event filter icon 64, are illustrated.

Figure 16:
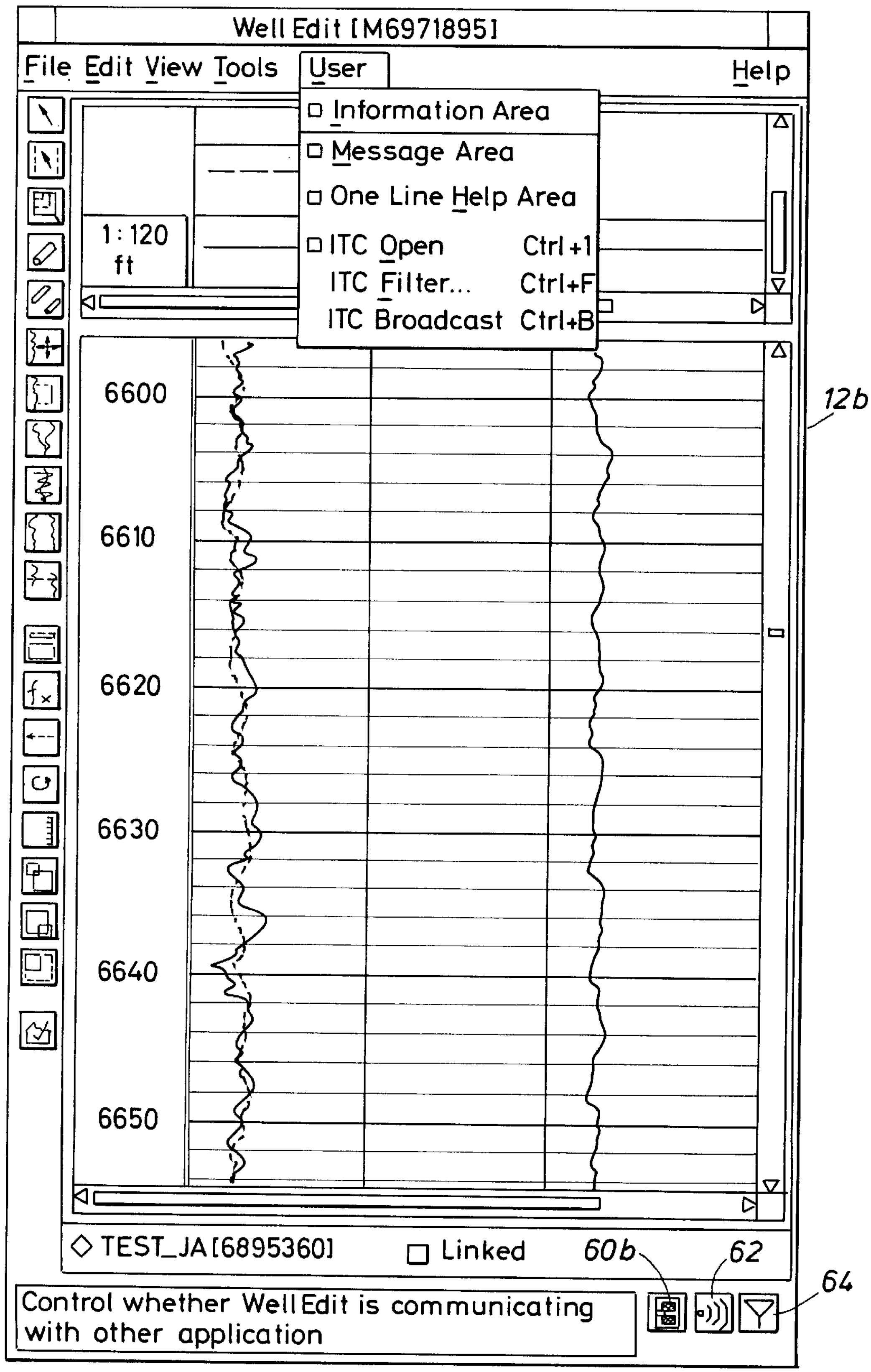

In FIG. 16, a window display, which could be one of the window displays 12*b* of FIG. 1, has a group of icons in the bottom right hand corner of the window display, the icons including a closed state status icon 60*b*, a broadcast icon 62, and an event filter 64.

Figure 17:
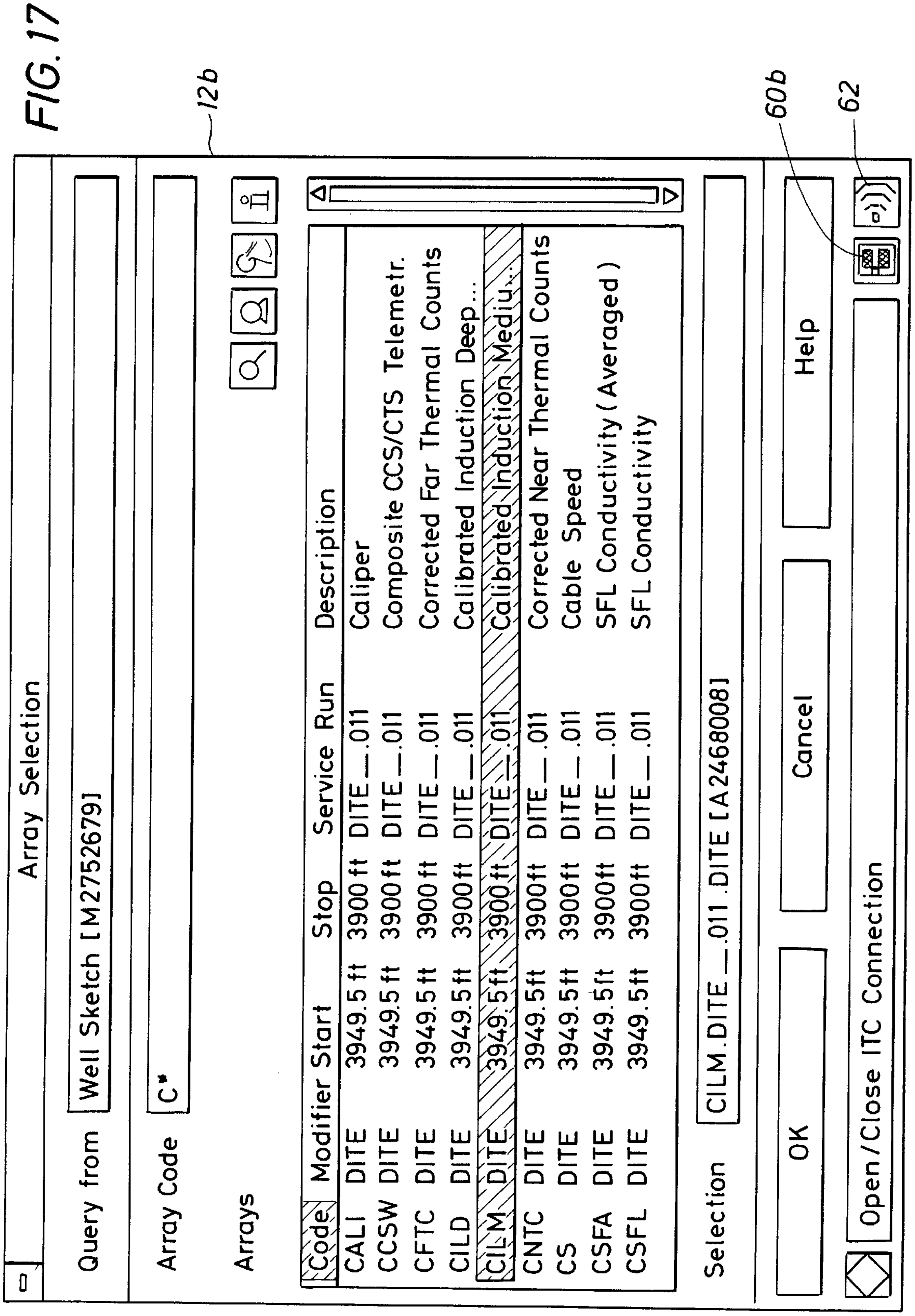

In FIG. 17, another window display 12*b* has a closed state status icon 60*b* and a broadcast icon 62 in the bottom right hand corner of the window display 12*b*.

Figure 18:
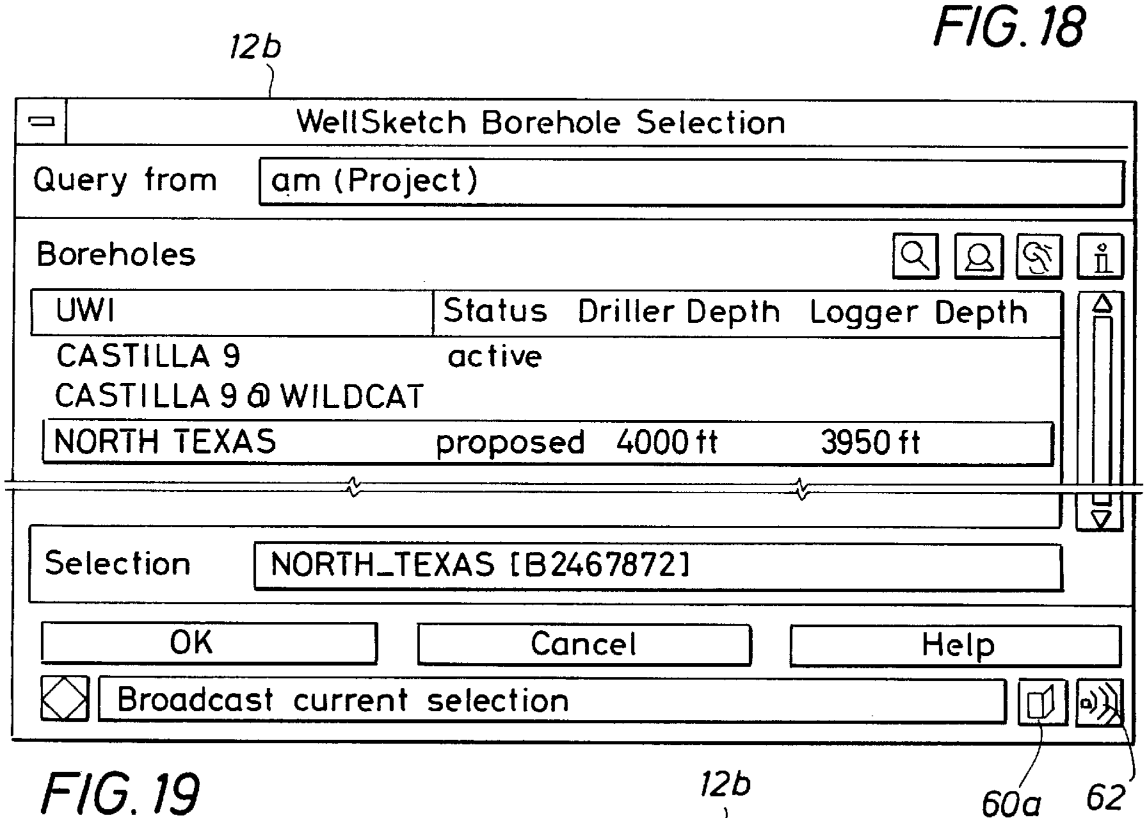

In FIG. 18, another window display 12*b* has an open state status icon 60*a* and a broadcast icon 62 in the bottom right hand corner of the window display 12*b*.

Figure 19:
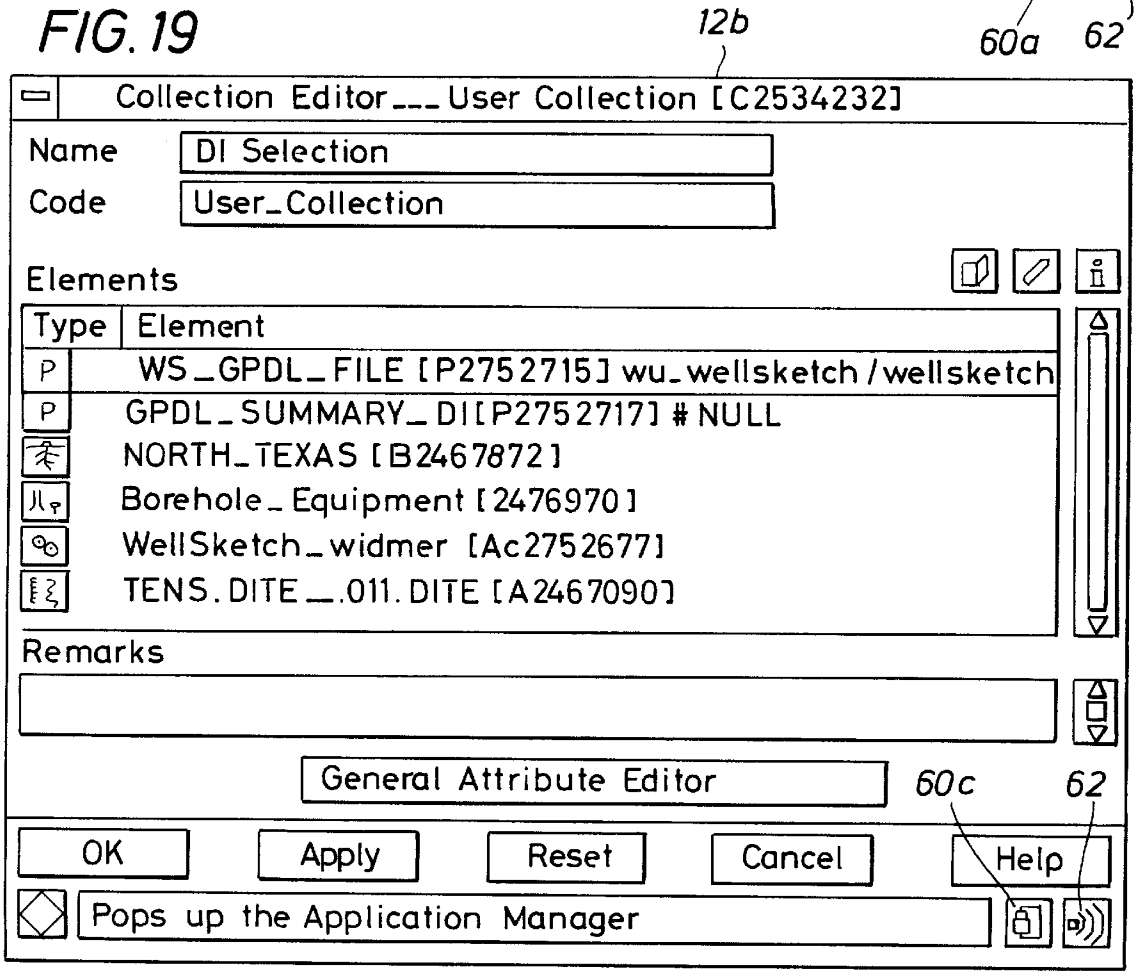

In FIG. 19, another window display 12*b* has a locked state status icon 60*c* and a broadcast icon 62 in the bottom right hand corner of the window display 12*b*.

Figure 20:
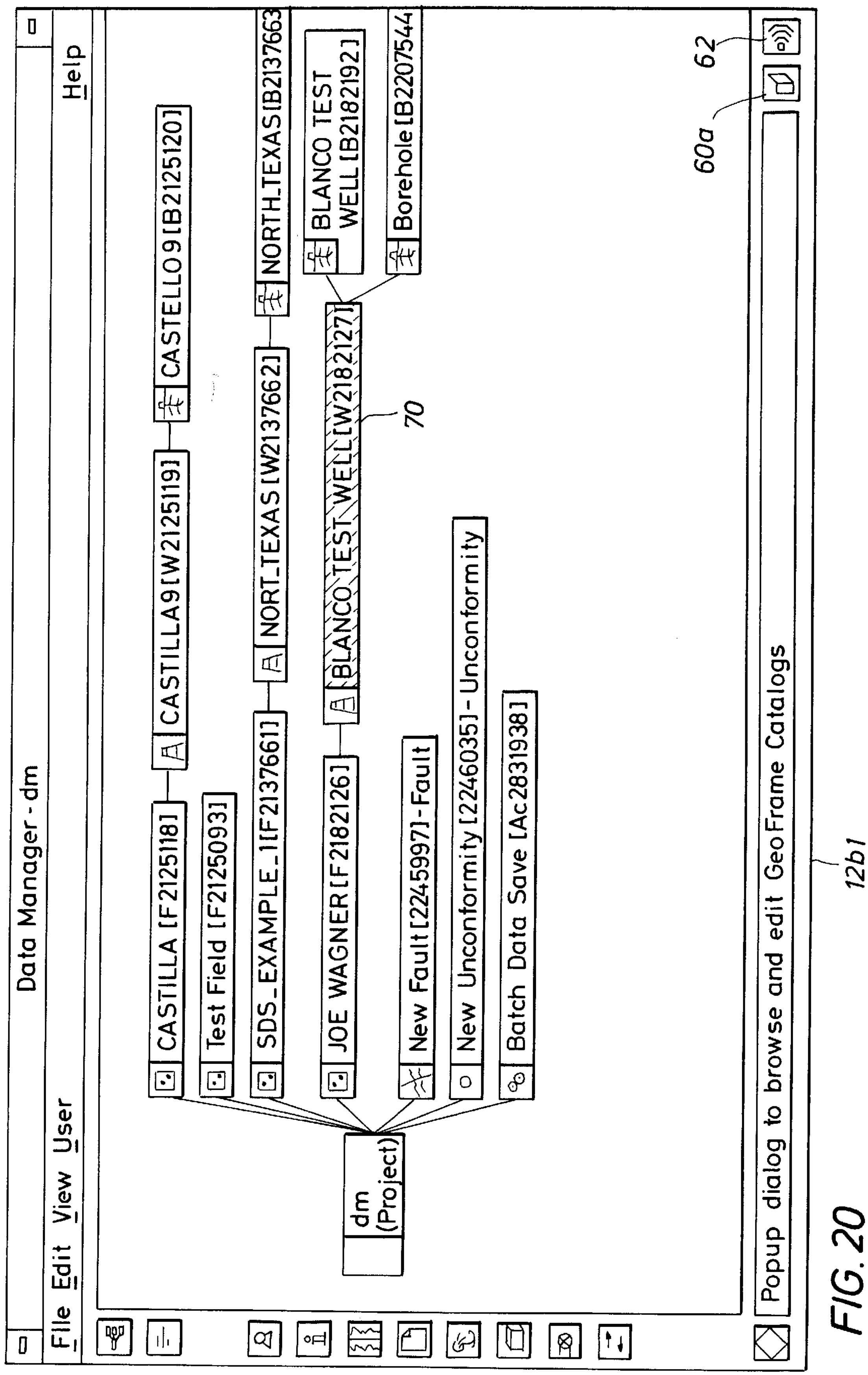
Figure 21:
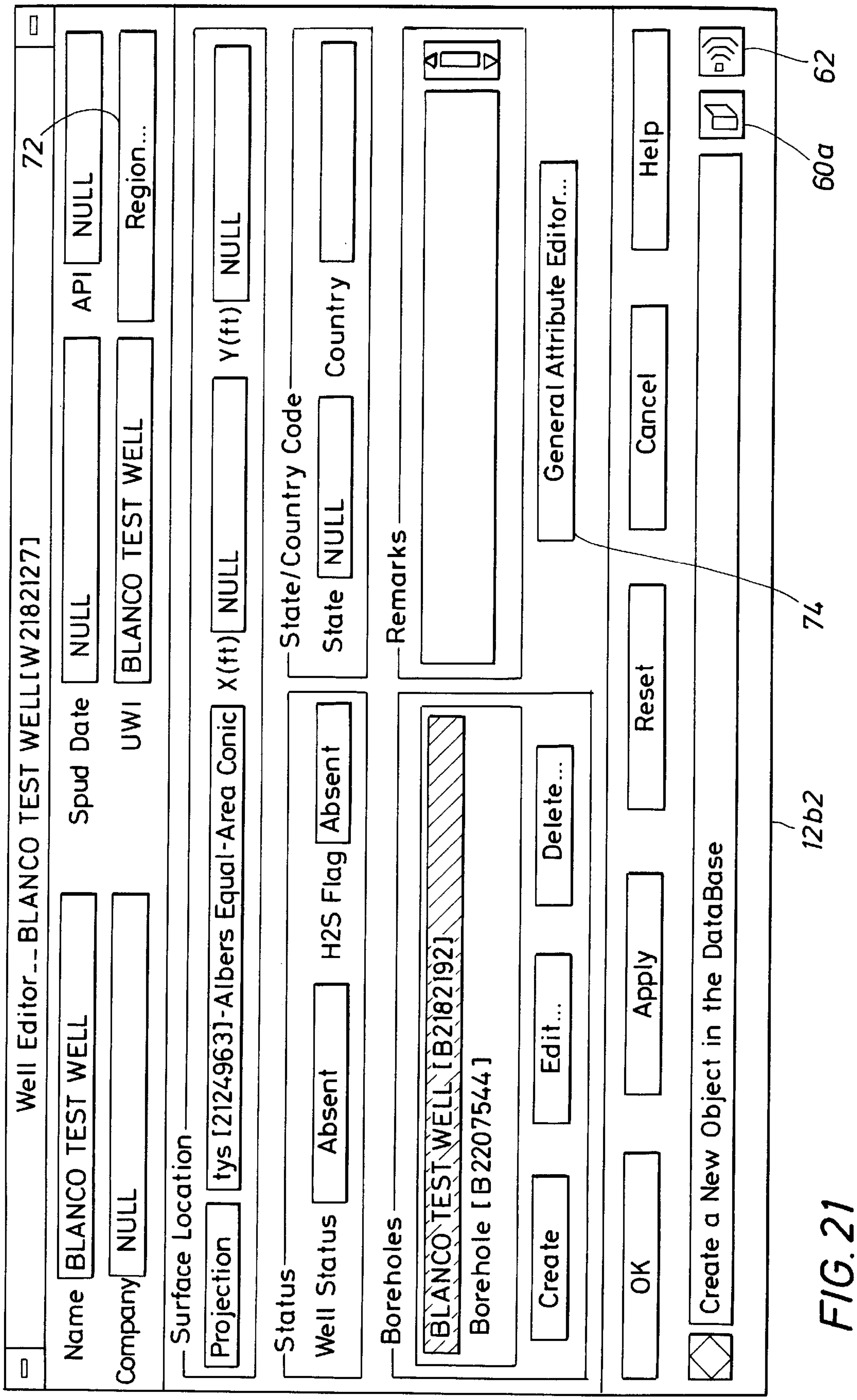
Figure 22:
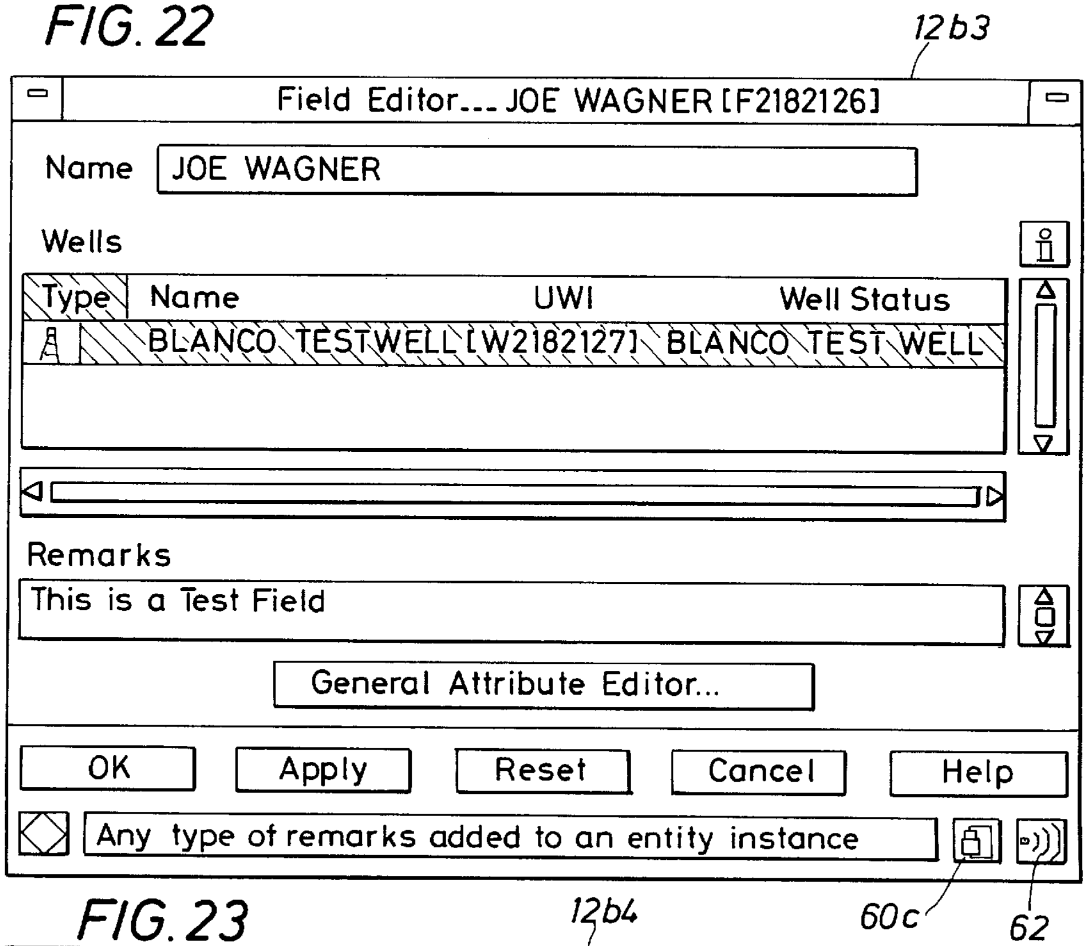
Figure 23:
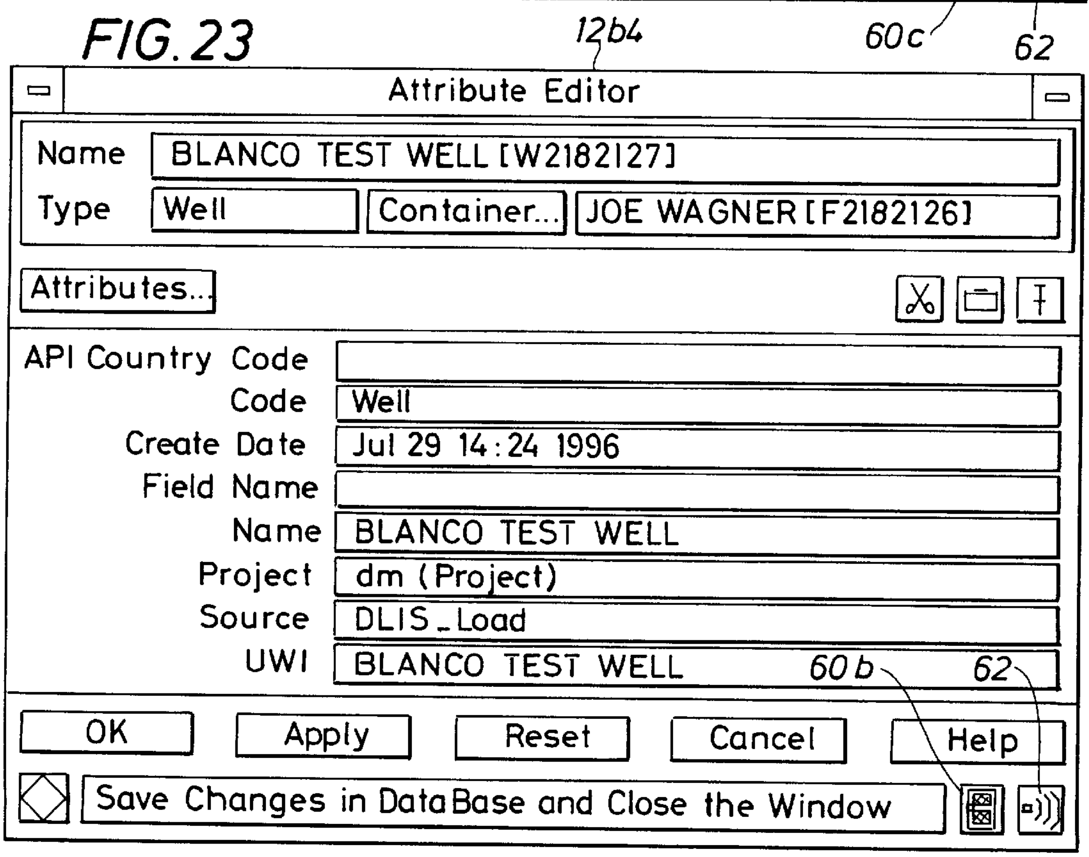

In FIGS. 20 through 23, referring initially to FIG. 20, an operator will view a master window 12*b*1 on the display screen 12*a* of FIG. 1 and, by using the mouse 18 of FIG. 1, the operator can subsequently obtain a number of sub-windows shown in FIGS. 21, 22, and 23. For example, the master window 12*b*1 of FIG. 20 includes an open state status icon 60*a* and a broadcast icon 62 in the bottom right hand corner of the window. However, the master window 12*b*1 of FIG. 20 also includes a box 70. If the operator uses the mouse 18 to click on the box 70 in the master window 12*b*1 of FIG. 20, in addition to the master window 12*b*1, a first sub-window 12*b*2 shown in FIG. 21 will be presented to the operator on the display screen 12*a* of the workstation 10 of FIG. 1. The first sub-window 12*b*2 includes an open state status icon 60*a* and a broadcast icon 62 in the bottom right hand corner of the first sub-window 12*b*2. The first sub-window 12*b*2 includes a second box 72 and a third box 74. If the operator uses the mouse 18 to click on the second box 72 in the first sub-window 12*b*2 of FIG. 21, a second sub-window 12*b*3 shown in FIG. 22 will be presented to the operator on the display screen 12*a* of the workstation 10 of FIG. 1. The second sub-window 12*b*3 includes a locked state status icon 60*c* and a broadcast icon 62 in the bottom right hand corner of the second sub-window 12*b*3. If the operator uses the mouse 18 to click on the third box 74 in the first sub-window 12*b*2 of FIG. 21, a third sub-window 12*b*4 shown in FIG. 23 will be presented to the operator on the display screen 12*a* of the workstation 10 of FIG. 1. The third sub-window 12*b*4 includes a closed state status icon 60*b* and a broadcast icon 62 in the bottom right hand corner of the third sub-window 12*b*4.

The above paragraphs have discussed the structure and function of the status icons which includes the open state status 60*a*, the closed state status icon 60*b*, and the locked state status icon 60*c*, in addition to the broadcast icon 62 and the event filter icon 64. Each of these icons would appear on the bottom right hand corner of a window 12*b* of FIG. 1. However, there is one additional icon to be disclosed, called the "Raised Application Manager Event" icon, that would appear on the bottom left hand corner of the window display 12*b* of FIG. 1 (not the right hand corner where the other icons discussed above appear). The "Raised Application Manager Event" icon is discussed in detail, as follows.

Raised Application Manager Event Icon 76

Figure 24:
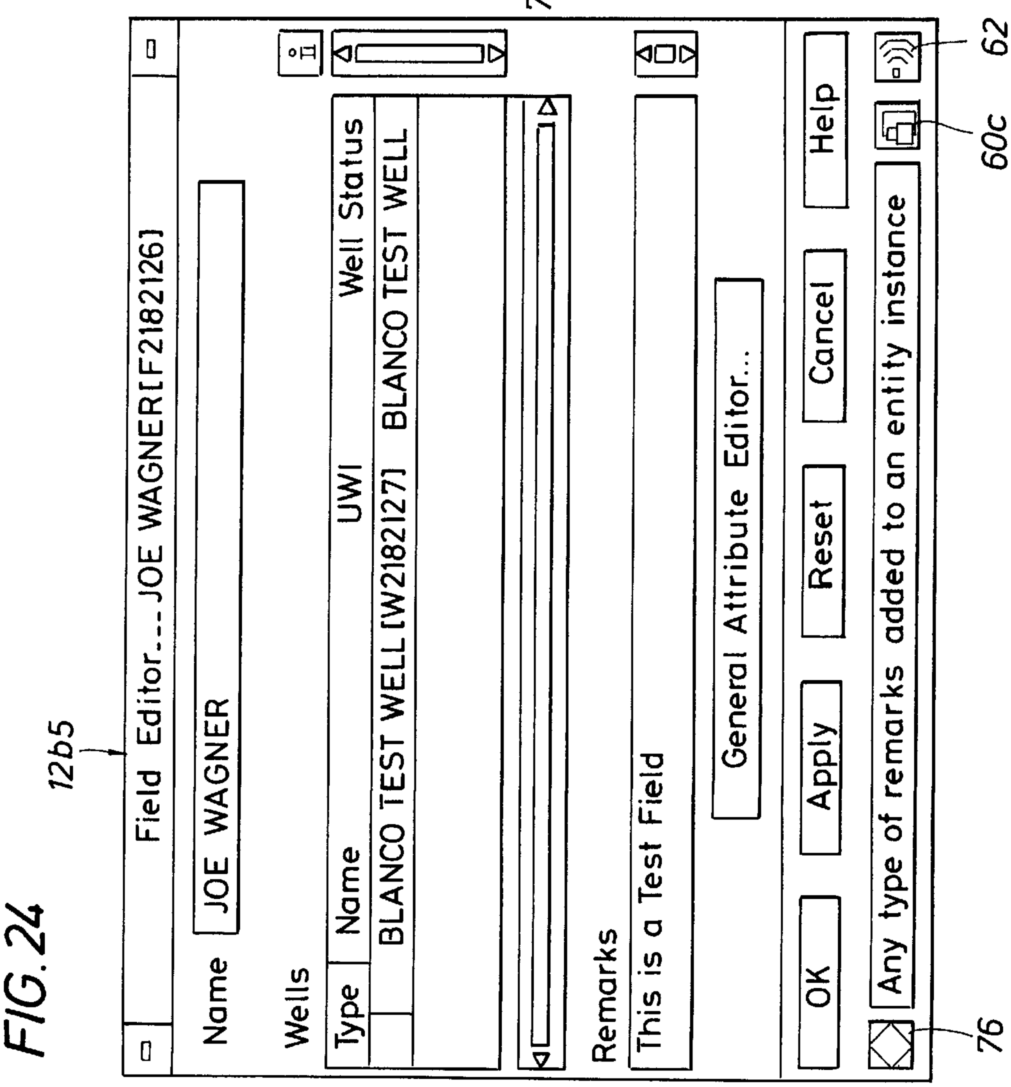
Figure 25:
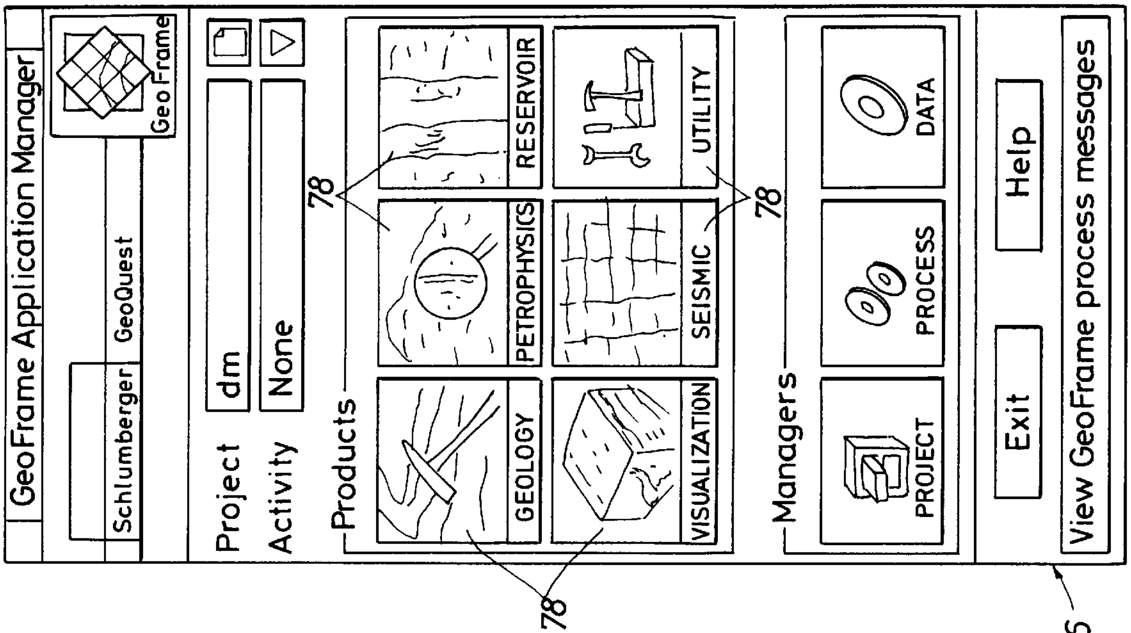

In FIGS. 1, 24 and 25, each of the windows 12*b* of FIG. 1 include a "Raised Application Manager Event" icon 76 (of FIG. 24) which is located in the bottom left hand corner of the window 12*b*. For example, one of the windows 12*b* of FIG. 1 could include the window 12*b*5 of FIG. 24.

In FIG. 24, the window 12*b*5 includes the Raised Application Manager Event icon 76 in the bottom left hand corner of the window 12*b*5. Assume now that a multitude of windows 12*b* are being presented to the operator on the display screen 12*a* of the workstation 10 of FIG. 1. Assume further that the operator wants to access a particular client application from the workstation 10; however, the multitude of windows 12*b* on the display screen 12*a* is obscuring the display screen 12*a* and, as a result, it is very difficult for the operator to access the particular client application.

In FIGS. 1 and 24, order to access the particular client application, the operator will find the "Raised Application Manager Event" icon 76 in the bottom left hand corner of any window 12*b* on the display screen 12*a* of FIG. 1 One of the windows 12*b* of FIG. 1 could include the window 12*b*5 of FIG. 24. The window 12*b*5 of FIG. 24 includes the "Raised Application Manager Event" icon 76 in the bottom left hand corner and a locked state status icon 60*c* and a broadcast icon 62 in the bottom right hand corner of the window 12*b*5. Using the mouse 18, the operator clicks "on" the Raised Application Manager Event icon 76 of FIG. 24. In response, a main launch window 12*b*6, illustrated in FIG. 25, is displayed on the display screen 12*a* of the workstation 10 of FIG. 1.

In FIGS. 2 and 25, the main launch window 12*b*6 of FIG. 25 includes a plurality of different client application icons 78 representing a respective plurality of different client application programs. The workstation 10 of FIG. 1 will execute any particular one of the different client application programs if and when the operator at the workstation 10 of FIG. 1 uses the mouse 18 to click "on" the client application icon 78 of FIG. 25 which corresponds to that particular client application program. See, for example, the different client applications 20 shown in FIG. 2. Each of the plurality of different client applications 78 shown in FIG. 25 could represent one of the plurality of client applications 20 shown in FIG. 2.

Figure 26:
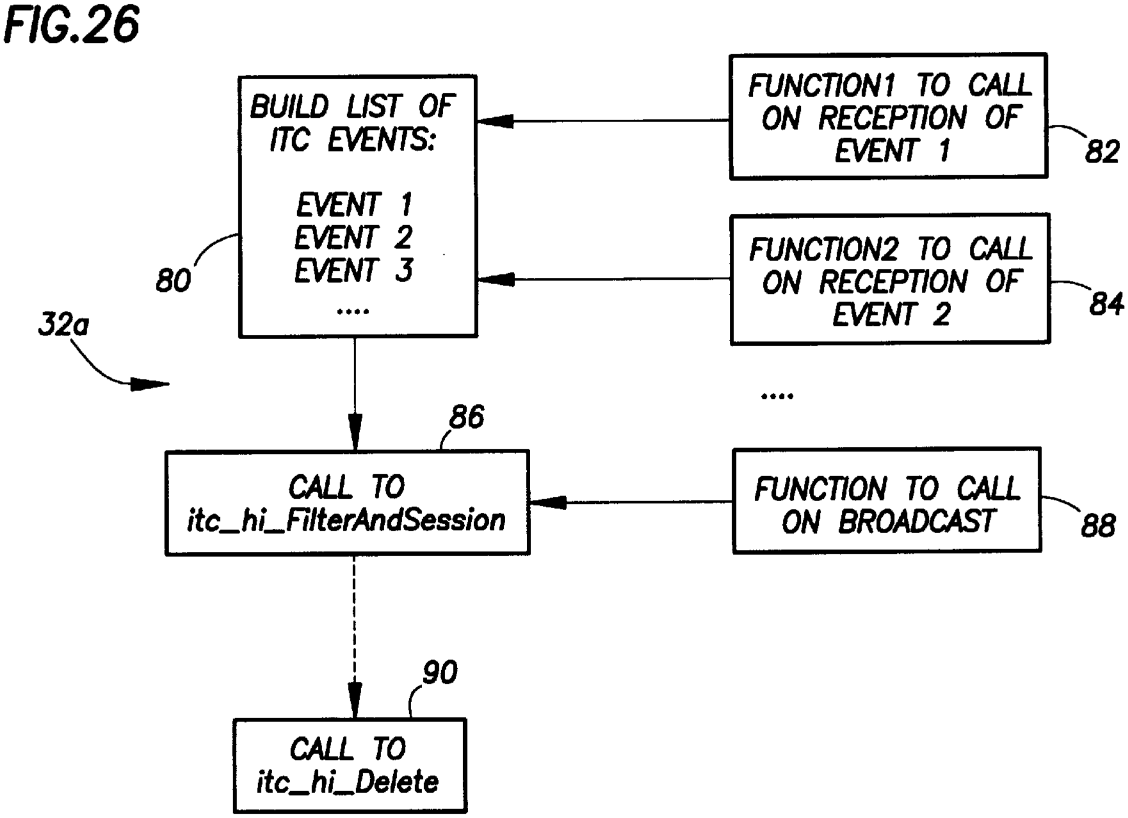
Figure 26A:
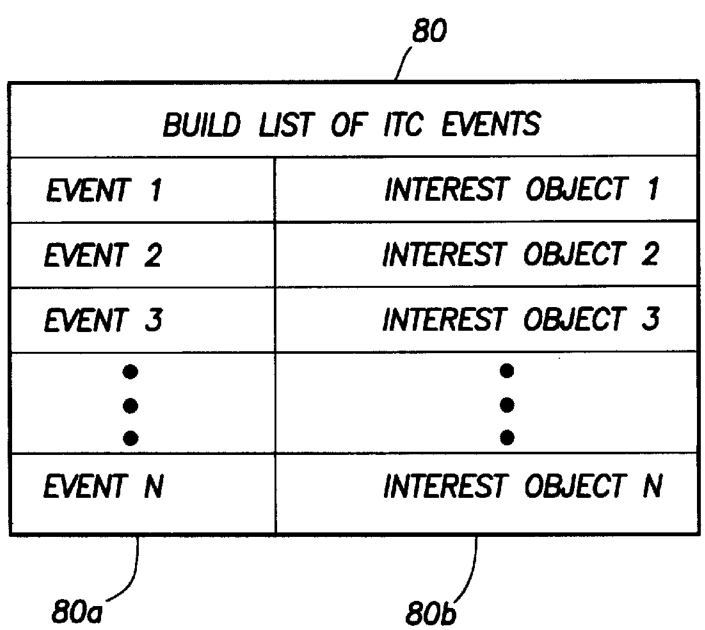
FIG. 26A illustrates a detailed construction of the "Build List of ITC Events" 80 which is illustrated in FIG. 26.

Referring to FIGS. 26, 26A, and 27, a detailed construction and a functional operation of the ITC HI Setup software 32*a*of FIG. 5 is illustrated.

In FIG. 26, the ITC HI Setup Software 32*a* of FIG. 5 includes (but is not limited to) the following blocks of code:

(1) "Build List of ITC Events" 80, (2) "Function 1 to call on reception of Event 1" 82, (3) "Function 2 to call on reception of Event 2" 84, (4) "Call to itc_hi_Filter And Session" 86, (5) "Function to call on Broadcast" 88, and (6) "Call to itc_hi_Delete" 90.

The "Build List of ITC Events" 80 block of FIG. 26 is illustrated in greater detail in FIG. 26A.

Each of these blocks of code is discussed below.

Build List of ITC Events 80

Function 1 to call on reception of Event 1 82

Function 2 to call on reception of Event 2 84

In FIGS. 3, 4, 5, and 6 recall from FIGS. 3 and 4 that the client 1 application 24c1 was stored in the memory 24c of the first workstation 24 of FIG. 3 and the client 2 application 26c1 was stored in the memory 26c of the second workstation 26 of FIG. 3. The client 1 application 24c1 and the client 2 application 26c1 each include: (1) the ITC Human Interface Code 32, and (2) the ITC Framework (ITC-Core) Code 34 of FIG. 4. The ITC Framework (ITC-Core) Code 34 was discussed above with reference to FIGS. 6 through 13. The ITC Human Interface Code 32 of FIG. 4 includes four parts: the ITC HI Setup software 32a of FIG. 5, the Send An Event software 32b of FIG. 5, the Receive An Event software 32c of FIG. 5, and the Operator Interaction Display Software 32d of FIG. 5.

When the client 1 application 24c1 wants to receive "event information" regarding "event X" from the client 2 application 26c1, the client 1 application 24c1 will send an "interest object" in event X to the server 26c2 in FIGS. 3 and 6. In response to the receipt by the server 26c2 of the "interest object" in event X from client 1, the server 26c2 will: (1) register within itself the client 1's interest in event X, and (2) redistribute that interest object in event X from the server 26c2 to the client 2 application 26c1. When the client 2 application 26c1 practices or executes the event X, the event information associated with the practice of event X in client 2 will be sent directly from client 2 to client 1 (via line 40 in FIG. 6) without passing through and registering with the server 26c2.

Similarly, the client 2 application 26c1 of FIG. 3 will send an interest object in event X to the server 26c2, and the server 26c2 will: (1) register within itself client 2's interest in the event information associated with event X, and (2) send the interest object in event X to the client 1 application 24c1. When the client 1 application 24c1 practices or executes the event X, the event information associated with the event X will be sent directly by client 1 24c1 to client 2 26c1 (via line 40 in FIG. 6) without passing through and registering with the server 26c2.

Therefore, each client application program, including the client 1 application 24c1 and the client 2 application 26c1 of FIG. 3, must record and store within itself the identity of all of the specific events (such as "event X"), as well as their interest objects and their functions, in which that particular client application is interested.

In FIG. 26, each particular client application program, including the client 1 application 24c1 and the client 2 application 26c1 of FIG. 3 which generated two of the window displays 12b of FIG. 1, stores within itself a "list of ITC events" 80, a "list of functions" 82, 84 corresponding, respectively, to the "list of ITC events" 80, and a "list of interest objects" corresponding, respectively, to the "list of functions" and the "list of ITC events" 80.

As a result, in FIG. 26, block 80 stores a list of events called "Build a list of ITC Events" wherein a plurality of events (i.e. , event 1, event 2, event 3, . . . , event N) are stored. Blocks 80, 84 will store a plurality of functions (i.e., function 1, function 2, function 3, . . . , function N), which correspond, respectively, to the plurality of events of block 80, the plurality of functions being retrieved from memory and executed in response to the reception (by the ITC Framework 34 of FIG. 5 of a particular client application) of a respective plurality of events transmitted to the particular client application from the other client applications.

For example, a first function in FIG. 26 called "Function 1 to call on reception of Event 1" 82 represents the function associated with "event 1" in the block "Build a list of ITC Events" 80. A second function in FIG. 26 called "Function 2 to call on reception of Event 2" 84 represents the function associated with "event 2" in the block "Build a list of ITC Events" 80.

In addition, in FIG. 26A, the block 80 of FIG. 26 will also store a plurality of "interest objects" corresponding, respectively, to the plurality of "events". For example, in FIG. 26A, the block 80 of FIG. 26, which is called "Build List of ITC Events", will have at least two columns of stored information: (1) a first column 80a storing a plurality of events 80a, such as Event 1, Event 2, Event 3, . . . , and Event N; and (2) a second column 80b storing a plurality of interest objects 80b which correspond, respectively, to the plurality of events 80a, such as "Interest Object 1" associated with "Event 1", "Interest Object 2" associated with "Event 2", "Interest Object 3" associated with "Event 3", . . . , and "Interest Object N" associated with "Event N".

Therefore, when the particular client application program begins to execute, since the particular client application stored within itself a "list of ITC events" 80, the particular client application will send the interest object, associated with each of the events in the stored "list of ITC events" 80, from the particular client application to the other client applications via the server 26c2 as shown in FIG. 6.

In addition, if the a particular set of interest objects corresponding to a particular set of events are sent by the particular client application 24c1 to the other client applications 26c1 via the server 26c2, if the "Build a list of events" 80 in the other client applications 26c1 include the aforesaid particular set of events, and when the other client applications 26c1 practice or execute the particular set of events, the other client applications 26c1 will send a particular set of event information associated with the particular set of events directly to the particular client application (via line 40 in FIG. 6) without registering that event information with the server 26c2 and the particular client application will receive that particular set of event information.

In addition, when other client applications send an interest object in an event X to the particular client application via the server 26c2, since the particular client application stores within itself a "list of ITC events" 80 and a corresponding list of "interest objects" associated with the list of ITC events 80, the received interest object from the other client application is compared by the particular client application with the "list of interest objects" 80 of FIG. 26A stored in the particular client application, and, if a match if found, the event which corresponds to the matched interest object (i.e., "event X") will be transmitted from the particular client application directly to the other client applications (directly via line 40 in FIG. 6).

In addition, for each particular client application wherein a "list of ITC events" 80 is stored, a corresponding "list of functions" 82, 84 must be stored corresponding, respectively, to the stored "list of ITC events" 80. As a result, when another client application practices or executes the requested "event X", the event information associated with that event X will be sent directly from that other client application to the particular client application (via line 40 in FIG. 6) without passing through and registering with the server. When the event information associated with event X is received by the particular client application, the received event information will be compared by the particular client application with the "list of ITC events" 80 and their corresponding "list of functions" 82, 84 stored in the particular client application. When a match is found, by the particular client application, between the event information received from the other client application and "one particular event" in the "list of ITC events" 80, the "particular function" 82, 84 which is associated with that "one particular event" will be automatically recalled from memory 24c, 26c, the "particular function" 82, 84 being executed by the processor 24a or 26a of FIG. 3 in the workstation 10 which is executing the particular client application. The Operator Interation Display Software 32d of FIG. 5 will ensure that the "particular function" (i.e, the received event information, such as depth change or color change or line thickness change) will be displayed on the display screen 12a of the workstation 10 of FIG. 1.

Call to itc hi Filter And Session 86

In FIG. 26, the "Call to itc hi Filter And Session" 86 is the portion of the ITC-HI Setup software 32a of FIG. 5 which performs the "human interface" function.

In FIG. 5, note the intermediate location of the ITC-HI Setup" 32a between the "Operator Interaction Display software" 32d, which displays the icons and the event information, and the "Send An Event" 32b and the "Receive An Event" 32c software which sends event information to and receives event information from other client applications.

In FIG. 26, since the "Call to itc Filter And Session" 86 is an integral part of the ITC-HI Setup software 32a, it is evident from the intermediate location of the ITC-HI Setup 32a software in FIG. 5 (between the "Operator Interaction Display software" 32d and the "Send An Event" 32b and the "Receive An Event" 32c software) that the "Call to itc hi Filter And Session" 86 portion of the ITC-HI Setup Software 32a in FIG. 26 will function as a coordinator located between two ends for receiving information from one end and, in response thereto, for instructing the other end.

For example, in FIGS. 5 and 26, the "Call to itc hi Filter And Session" 86 will receive event information from the "Receive An Event" software 32c (where the event information originated from another client application and is associated with an event X) and, in response thereto, will drive the "Operator Interaction Display" software 32d for displaying that event information associated with the event X on the display screen 12a of FIG. 1 for a particular client application.

In addition, in FIGS. 5 and 26, the "Call to itc hi Filter And Session" 86 will receive event information (e.g.—changed parameters, color, thickness, font size) from the "Operator Interaction Display" software 32d of a particular client application and, in response thereto, will drive the "Send An Event" software 32b which will further instruct the ITC Framework 34 to send the aforementioned event information to other interested client applications.

Therefore, the "Call to itc hi Filter And Session" 86 will make all the connections; that is: it will send all interest objects from the "Build list of ITC Events" 80 of a particular client application to the server 26c2 for further transmission to other client applications; it will associate event information received from other client applications with a particular function 82, 84 of FIG. 26 in a particular client application for executing that particular function in the particular client application; it will cause the Operator Interaction Display Software 32d to build the various icons (status icons 60, broadcast icon 62, event filter icon 64) for display in a particular client application on the display screen 12a; and it will notify the ITC Framework (ITC Core) 34 of FIG. 5 of a particular client application which will, in turn, notify the server 26c2 that the particular client application is interested in the plurality of events that are listed in its "Build list of ITC Events" 80 of FIG. 26.

Function to call on Broadcast 88

In FIG. 26, the "Function to call on Broadcast" 88 part of the ITC-HI Setup Software 32a of FIG. 5 is associated with the "Call to itc_hi_Filter And Session" 86. In order to explain the function of the "Function to call on Broadcast" 88, it is necessary to recall the function of the "Broadcast" Icon 62 of FIG. 14.

When the broadcast icon 62 for a particular client application 12b is clicked "on" by an operator at workstation 10 using the mouse 18, in most cases, all of a plurality of newly created events in the particular client application, which were generated by an operator at the workstation 10 during a period of time after the closed state status icon 60b was clicked "on", will be simultaneously transmitted from the particular client application to all other "interested client applications" executing in the network of workstations.

For example, for a particular client application where particular events consisting of color events, font size events, and line thickness events can be transmitted to and received from other client applications, when the operator of the particular client application clicks "on" the broadcast icon 62 after a period of time elapses following the clicking "on" of the closed state status icon 60b, in most cases, event information associated with all of the particular events will be transmitted to the other client applications.

However, the "Function to call on Broadcast" 88 will allow the particular client application developer to decide whether or not event information associated with "all" of the particular events will be transmitted to the other client applications when the broadcast icon 62 is clicked "on" by the operator. More particularly, using the "Function to call on Broadcast" 88, event information associated with "some" of the particular events (which were newly created in the particular client application after the closed state status icon was clicked "on" by the operator) will be transmitted to the other client applications when the broadcast icon 62 is clicked "on" by the operator.

In FIGS. 5 and 26, when the operator clicks "on" the broadcast icon 62 for a particular client application after a period of time elapsed following the clicking "on" of the closed state status icon 60b, the "Operator Interaction Display" software 32d in FIG. 5 for that particular client application will notify the ITC-HI Setup Software 32a in FIG. 5 that the operator clicked "on" the broadcast icon 62. In response, the "Call to itc_hi_Filter And Session" 86 portion of the ITC-HI Setup Software 32a in FIG. 26 will refer to and call up the "Function to call on Broadcast" 88 part of the ITC-HI Setup Software 32a.

Assume that a "plurality of newly created events" were practiced and executed by the particular client application between the time when the closed state status icon 60b was clicked "on" and the time when the broadcast icon 62 was clicked "on" by the operator executing the particular client application.

The "Function to call on Broadcast" 88 will determine whether "all" or "some" of the "plurality of newly created events" will be transmitted to the other client applications in response to the clicking "on" of the broadcast icon 62 by the operator executing the particular client application. The "Function to call on Broadcast" 88 will determine how many events of the "plurality of newly created events" (i.e.—some, all, or none) will be transmitted to the other client applications.

In FIGS. 5 and 26, using the above example, for a particular client application where particular events consisting of color events, font size events, and line thickness events can be transmitted to and received from other client applications, when the operator of the particular client application clicks "on" the broadcast icon 62 after a period of time elapses following the clicking "on" of the closed state status icon 60*b* and when the Operator Interaction Display software 32*d* of FIG. 5 notifies the ITC-HI Setup Software 32*a* that the broadcast icon 62 has been clicked "on", the "Call to Itc_hi_Filter And Session" 86 will call up and retrieve the "Function to call on Broadcast" 88 part of the ITC-HI Setup Software 32*a*, and, in response thereto, the "Function to call on Broadcast" 88 can require that event information associated with only some of the events, such as only the color events for example, will be transmitted to the other client applications.

Call to itc hi Delete 90

In FIGS. 5 and 26, when the particular client application ceases to execute (i.e., the operator at the workstation 10 terminates a window display 12*b* representing the particular client application), the operator interaction display software 32*d* of FIG. 5 will notify the ITC-HI Setup software 32*a*. In response thereto, the "Call to itc_hi_Delete" 90 portion of the ITC-HI Setup software 32*a*will notify ITC Framework 34 and the ITC Framework 34 will notify the server 26*c*2 that the particular client application has terminated. In response, the server 26*c*2 will un-register any and all interest objects stored therein which are associated with the particular client application, and then the server 26*c*2 will notify all other client applications. In response, the other client applications will un-register the particular client application's interests in certain previously registered events. As a result, the other client applications will not send any event information corresponding to the previously registered events to the particular client application.

In FIG. 27, the actual program code which corresponds to the ITC-HI Setup software 32*a* of FIGS. 5 and 26 is illustrated.

Referring to FIGS. 28 and 29, a detailed construction and a functional operation of the Send An Event Software 32*b* of FIG. 5 is illustrated.

In FIG. 28, the Send An Event software 32*b* of FIG. 5 includes two blocks of code: (1) Get Data Structure to Send 92, and (2) Call to itc_hi_Transmit Event 94. Each of these blocks of code will be discussed individually.

Get Data Structure to Send 92

In FIG. 28, the "Get Data Structure to Send" 92 block of code responds to three different types of input data: (1) input data originating from a user interaction, (2) input data originating from a Database, and (3) input data originating from an I/O Stream.

In FIGS. 5 and 28, the Operator Interaction Display software 32*d* responds to any changes which are made to a particular client application by an operator at workstation 10 of FIG. 1 by generating the "user interaction" type of input data which is ultimately input to the "Get Data Structure to Send" 92 block of code associated with the Send An Event software 32*b*. For example, when the operator at workstation 10 of FIG. 1 is working with a particular client application as represented by one of the window displays 12*b* of FIG. 1, the operator may change the color, or the font size, or he may make some other change to the particular client application. If those changes are in the list of events in the "build list of events" 80 of FIG. 26 and when another client application has requested event information associated with those changes, the Operator Interaction Display software 32*d* of FIG. 5 will respond to the changes made by the operator to the particular client application by notifying the ITC-HI Setup software 32*a*.

The "Call to itc_hi_Filter and Session" 86 portion of the ITC-HI Setup software 32*a* will provide the following information to the "Get Data Structure to Send" 92 portion of the "Send An Event software" 32*b* of FIG. 28: (1) the name of the event which is associated with the aforementioned changes which were made by the operator to the particular client application, and (2) the data or event information which is associated with the aforementioned named event.

However, there are two other origins of the information (name of the event, and data or event information associated with the named event) which is provided by the ITC-HI Setup software 32*a* to the "Get Data Structure to Send" 92 portion of the "Send An Event software" 32*b* of FIG. 28: (1) input data originating from a Database, and (2) input data originating from an I/O Stream.

Call to itc hi Transmit Event 94

In FIG. 28, when the "Get Data Structure to Send" 92 portion of the "Send An Event software" 32*b* of FIG. 28 receives (1) the name of the event which is associated with the changes which were made by the operator to the particular client application, and (2) the data or event information which is associated with the aforementioned named event, a call is made to the "itc hi Transmit Event" 94 software. The "itc hi Transmit Event" 94 software will transmit the name of the event and the data or event information associated with that named event to the ITC-Framework (ITC Core) 34 of the particular client application of FIGS. 4 and 5. For example, for a depth event, the depth data and the depth event name will be sent, by the "itc hi Transmit Event" 94 software, to the ITC Framework (ITC Core) 34. For a color event, the new color data and the color event name will be sent, by the "itc hi Transmit Event" 94 software, to the ITC Core 34.

In FIG. 29, the actual program code which corresponds to the "Send An Event software" 32*b* of FIGS. 5 and 28 is illustrated.

Referring to FIGS. 30 and 31, a detailed construction and a functional operation of the "Receive An Event Software" 32*c* of FIG. 5 is illustrated.

In FIG. 30, assume that a particular client application sends a plurality of interest objects to the other client applications via the server 26*c*2, and that one or more of the other client applications will, in response thereto, send the requested events directly to the particular client application via line 40 in FIG. 6. The ITC Framework (otherwise known as the "ITC Core") 34 associated with the particular client application will receive the one or more events from the line 40 of FIG. 6 which originated from the other client applications.

Call to Reception Function 96

In FIGS. 5 and 30, the ITC Framework (Core) 34 of the particular client application will input the received events (which are received from the other client applications via line 40 of FIG. 6) to the "Receive An Event" software 32*c* of FIG. 5. The "Receive An Event" software 32*c* of FIG. 5 includes a block of code which is hereinafter called the "Call to Reception Function" 96 code.

Recall from FIGS. 26 and 26A that the block 80, stored in the ITC HI Setup 32*a* software of FIG. 5 of a particular client application and called the "Build List of ITC Events", stored a list of events, a list of functions corresponding respectively to the list of events, and a list of interest objects corresponding respectively to the list of events and the list of functions. The "Call to Reception function" 96 code of the Receive An Event 32*c* software of FIGS. 5 and 30 will compare the received events (received from the other client applications via the ITC Core 34) with the plurality of events listed in the "Build List of ITC Events" 80 stored in the ITC HI Setup software 32*a* of the particular client application, and, when one or more matches are found between a received event and an event stored in the "Build List of ITC Events" block 80, the "Call to Reception function" 96 code will cause the particular functions (82, 84 of FIG. 26) associated with the matched events to be executed by the processor (24*a*, 26*a* of FIG. 3) of the particular client application. In FIG. 30, when the functions associated with the matched events are executed by the processor of the particular client application, the particular client application will react accordingly, as indicated by the "Application to React" block 98 in FIG. 30; that is, the functions will be displayed on the window 12*b* of the display screen 12*a*.

In FIG. 31, the actual program code which corresponds to the "Receive An Event software" 32*c* of FIGS. 5 and 30 is illustrated.

Figure 32:
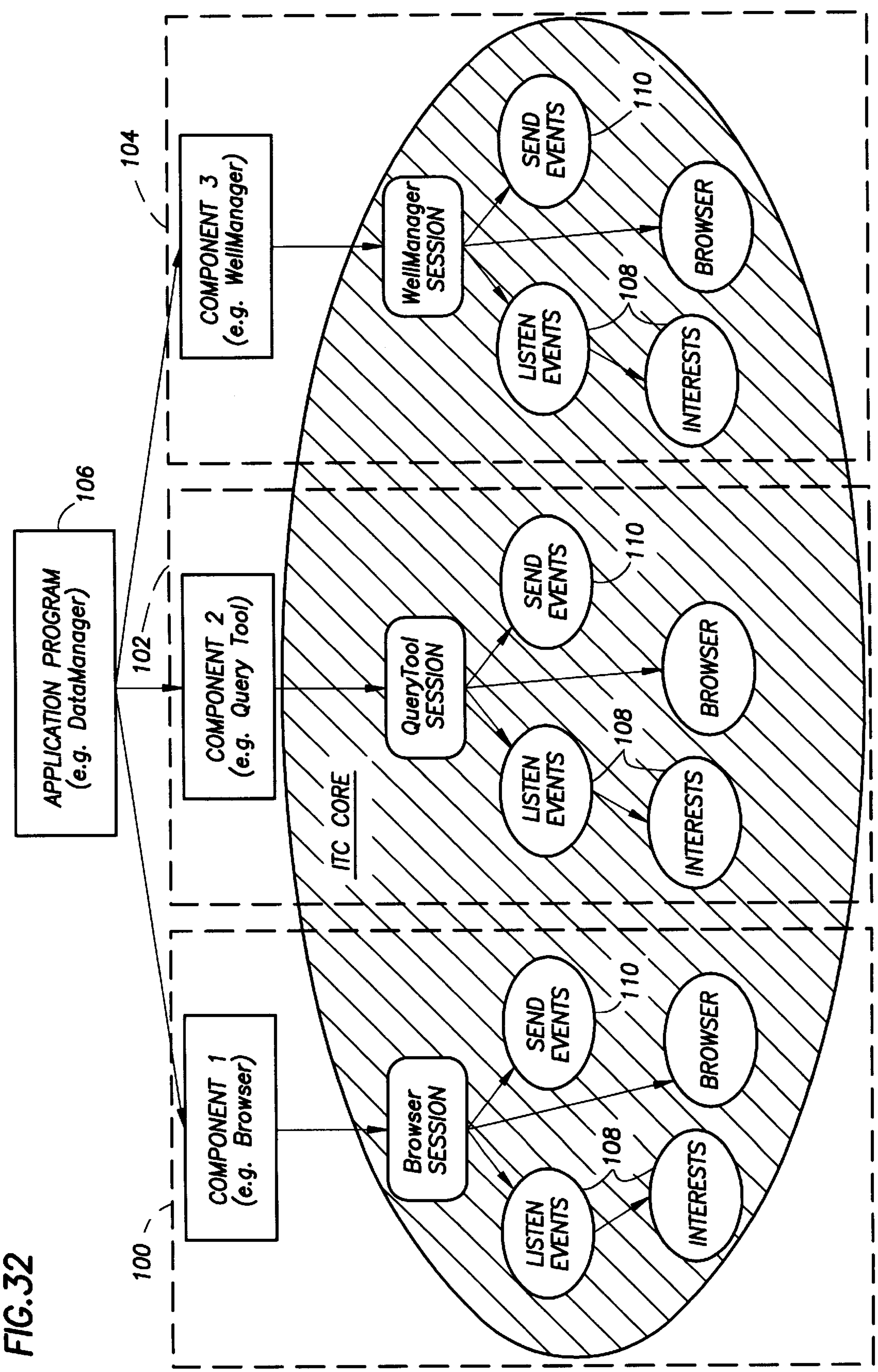

Referring to FIG. 32, an Intertask Communication (ITC) Sessions Model is illustrated. In FIG. 1, a workstation 10 is illustrated having a screen display 12*a* which shows a plurality of different windows 12*b*. Since each window 12*b*represents a different client application program 10 executing in the workstation, a single workstation 10 can therefore simultaneously execute a plurality of different client application programs 20. In FIG. 2, the plurality of different windows 12*b* or client application programs 20 displayed on the display screen 12*a* could include or consist of a plurality of different client applications 20, such as modelling or Cross View or MapView or 3D View or Seismic or Well View or ELAN or Litho or Bor View.

FIG. 32 illustrates the plurality of different client applications 20 executing in the workstation 10. For example, in FIG. 32, a first client application 100, a second client application 102, and a third client application 104 can execute concurrently in the workstation 10 of FIG. 1. An application program data manager 106 manages the concurrently executing client applications 100, 102, 104. The client applications 100, 102, 104 can listen (108) for interest objects received from another client application via the server 26*c*2, and, when the interest objects associated with a particular event is received by the client applications 100, 102, 104, the client applications 100, 102, 104 will send (110) the particular event directly to the other client application (but not by way of the server).

A functional description of the operation of the Distributed Framework Method and Apparatus of the present invention for Intertask Communication between Workstation Applications is set forth in the following paragraphs with reference to FIGS. 1 through 31 of the drawings.

Assume that a plurality of workstations, similar to the workstation 10 of FIG. 1, are interconnected together in the manner shown in FIG. 2. Each workstation 10 of the plurality has at least one window display 12*b* presented to the operator on the display screen 12*a* of the workstation 10. Each window display 12*b* on each workstation 10 is being generated by the Operator Interaction Display software 32*d* of FIG. 5 of a "client application program" (otherwise known as a "client application") and each client application may present to an operator, sitting at the workstation 10, a different functional representation. For example, as shown in FIG. 2, one client application 20 may present to the operator at the workstation 10 a modelling functional representation, another client application 20 may present to the operator a Cross View functional representation, and another may present to the operator either a MapView or a 3D View or a Seismic or a Well View or an ELAN or a Litho or a Bor View functional representation. Therefore, as indicated in FIG. 2, a plurality of different client applications 20 are interconnected together by the "Distributed Framework" method and apparatus of the present invention adapted for providing an intertask communication between workstation applications.

One of the workstations 26 of FIG. 3, representing one client application 20 of FIG. 2, stores the server 26*c*2 as well as its own particular client application 26*c*1 as shown in FIG. 3, and the other workstation 24, representing another client application 20 of FIG. 2, stores its own particular client application 24*c*1 of FIG. 3.

Assume that an operator at workstation 24 of FIG. 3 is viewing the log chart 12*b* shown in FIG. 16 on a window display 12*b* of the display screen 12*a* of FIG. 1, the log chart 12*b* of FIG. 16 including the closed state status icon 60*b*, the broadcast icon 62, and the event filter icon 64 appearing on the bottom right hand corner of the log chart 12*b*. The operator does not click "on" the closed state icon 60*b*, and the operator does not click "on" either the broadcast icon 62 or the event filter icon 64. As a result, the operator's "door is open"; that is, all events previously requested from other client applications will be received by the log chart 12*b* client application from other client applications, and all events created by the operator on the log chart 12*b* client application, which were previously requested by other client applications, will be sent by the log chart 12*b* client application to the other interested client applications.

As a result, when the window display 12*b*, on the display screen 12*a* of the workstation 24 of FIG. 3 displaying the log chart 12*b* client application of FIG. 16, is called up by the operator, the operator interaction display software 32*d* of FIG. 5 will: (1) display the log chart 12*b* client application of FIG. 16 in the window 12*b* of the display screen 12*a* of the workstation 24 of FIG. 3, and (2) instruct the "Call to itc_hi_Filter and Session" 86 of FIG. 26 of the ITC-HI Setup software 32*a* of FIG. 5 to send the interest objects 80*b* of FIG. 26A, associated with the plurality of events 80*a* in the "list of ITC events" 80 in the ITC HI Setup software 32*a* of FIG. 5, to the Send An Event software 32*b* of FIG. 5. The Send An Event software 32*b* will, in turn, send the interest objects 80*b* to the ITC Framework 34, of the log chart 12*b* client application 24*c*1, of FIG. 5. The ITC Framework 34 of the log chart 12*b* client application 24*c*1 will send the interest objects 80*b* to the server 26*c*2 via line 36 of FIG. 6. The server 26*c*2 will register the interest objects therein and will send the interest objects to all other client applications 20 of FIG. 2 including the client application 2 26*c*1 shown in FIG. 6. The ITC Framework 34 of the client application 2 26*c*1 will send the received interest objects to the Receive An Event software 32*c* of FIG. 5, which will, in turn, send the received interest objects to the "Call to itc_hi_Filter And Session" 86 of FIG. 26 of the ITC HI Setup Software 32*a* of FIG. 5 of the client application 2 26*c*1. The "Call to itc hi filter And Session" 86 of client application 2 26*c*1 will compare the received interest objects with the interest objects 80*b* stored in the "Build List of ITC Events" 80 of FIGS. 26 and 26A of client application 2. When a match is found between a received interest object and one of the interest objects 80*b* of FIG. 26A for client application 2 corresponding to a particular event, such as "event N", the "Call to itc_hi_Filter and Session" 86 will send the "event N" to the Send An Event software 32*b* of FIG. 5 of the client application 2 26*c*1 which will, in turn, send the "event N" to the ITC Framework 34 of the client application 2 26*c*1 of FIG. 5. The ITC Framework 34 for client application 2 26*c*1 of FIG. 5 will send the "event N" directly to the log chart client application 24*c*1 of FIG. 6 via line 40 of FIG. 6 without requiring the "event N" to register with and pass through the intervening server 26*c*2.

Assume now that the operator at the workstation 24 of FIG. 3, viewing the log chart 12*b* client application of FIG. 16 on the window 12*b* of the display screen 12*a*, clicks "on" the event filter icon 64 in FIG. 16. The "clicking on" of the event filter icon 64 in FIG. 16 will call up the event filter subwindow 64*a* in FIGS. 15*c*, 15*d*, and 15*e*. The subwindow 64*a* will have a plurality of events listed therein, the plurality of events consisting of the events (event 1, event 2, event 3, . . . , and event N) shown in FIG. 26A.

In FIG. 15*e*, assume that the operator clicks "on" the "all" portion 64*a* 4 and 64*a*5 in the "send" and "receive" column 64*a*1 and 64*a*2 of the event filter subwindow 64*a*. As a result, when the log chart 12*b* client application 24*c*1 sends the interest objects 80*b* of FIG. 26A to the server 26*c*2 of FIG. 6 and the server 26*c*2 sends the interest objects to the client application 2 26*c*1, the client application 2 will send event information associated with any one or all of the events 1, . . . , event N directly to the client application 1 via line 40 of FIG. 6 and the client application 1 24*c*1 will receive all of the events.

Conversely, when the client application 2 26*c*1 sends the interest objects 80*b* of FIG. 26A to the server 26*c*2 of FIG. 6 and the server 26*c*2 sends the interest objects to the log chart client application 1 24*c*1, the client application 1 will send event information associated with any one or all of the events 1, . . . , event N directly to the client application 2 via line 40 of FIG. 6 and the client application 2 26*c*1 will receive all of the events.

However, assume that the operator viewing the subwindow 64*a* of the event filter icon 64 of FIG. 15*e* (of the log chart 12*b* client application 24*c*1 of FIGS. 3 and 16 on the workstation 24 of FIG. 3) clicks "send" (1A1 of FIG. 15*e*) but not "receive" (2A1 of FIG. 15*e*) for event 1, but clicks both "send" (1A2, 1A3, 1A4) and "receive" (2A2, 2A3, and 2A4) for all other events, event 1, event 2, . . . , and event N in the event filter icon subwindow 64*a* of FIG. 15*e*. The log chart client application 24*c*1 will send the event 1 to the client application 2 26*c*1 of FIG. 3 via line 40 of FIG. 6 (when the client application 2 requested the event 1 from the log chart client application 1 via the server), but the log chart client application 24*c*1 will not receive the event 1 from the client application 2 26*c*1 of FIG. 3 via line 40 of FIG. 6 (when the log chart client application 1 requested the event 1 from the client application 2 via the server). However, all other events, event 2, event 3, . . . , and event N, will be received from client application 2 by the log chart client application 24*c*1 and will be sent to the client application 2 by the log chart client application 24*c*1.

Part 2—Integrated Data Communication and Data Access System including the Application Data Interface

Background

In a prior pending application Ser. No. 08/758,833 filed Dec. 4, 1996 and entitled "Distributed Framework for Intertask Communication Between Workstation Applications" to Shamim Ahmed and Serge J. Dacic (termed the "ITC application"), a Distributed Framework method and apparatus was disclosed for providing direct inter-task communications (ITC) between concurrently operating computer program applications executing in one or more computer workstations that provide a window display to an operator. The aforementioned "ITC application" was discussed above and has already been incorporated by reference into the specification of this application.

Although not disclosed in the "ITC Application", the above referenced "ITC Application" utilizes an underlying apparatus which interfaces with a Database, and that underlying apparatus is called the "Application Data Interface" or "ADI". The "Application Data Interface (ADI)" is embodied in a system called the "Integrated Data Communication and Data Access System" which is the subject matter of the invention of this application.

The remaining portion of this specification discloses in detail the "Integrated Data Communication and Data Access System" of the present invention and it is comprised of two parts: a "General Description" which discloses the broader concepts of the Integrated Data Communication and Data Access System of the present invention, and a "Detailed Description" which discloses the more detailed aspects of the Integrated Data Communication and Data Access System.

Recall from FIGS. 6 through 9B that a first client application will notify a server when the first client application is interested in receiving event information from another second client application. The server will then further notify the second client application regarding the first client application's interest in the event information. When the second client application practices an event which produces that event information, the second client application will send that event information directly to the first client application without first registering that event information with the server. For example, consider the following FIGS. 33 through 35 which will serve as a review of the above referenced concept.

Figure 33:
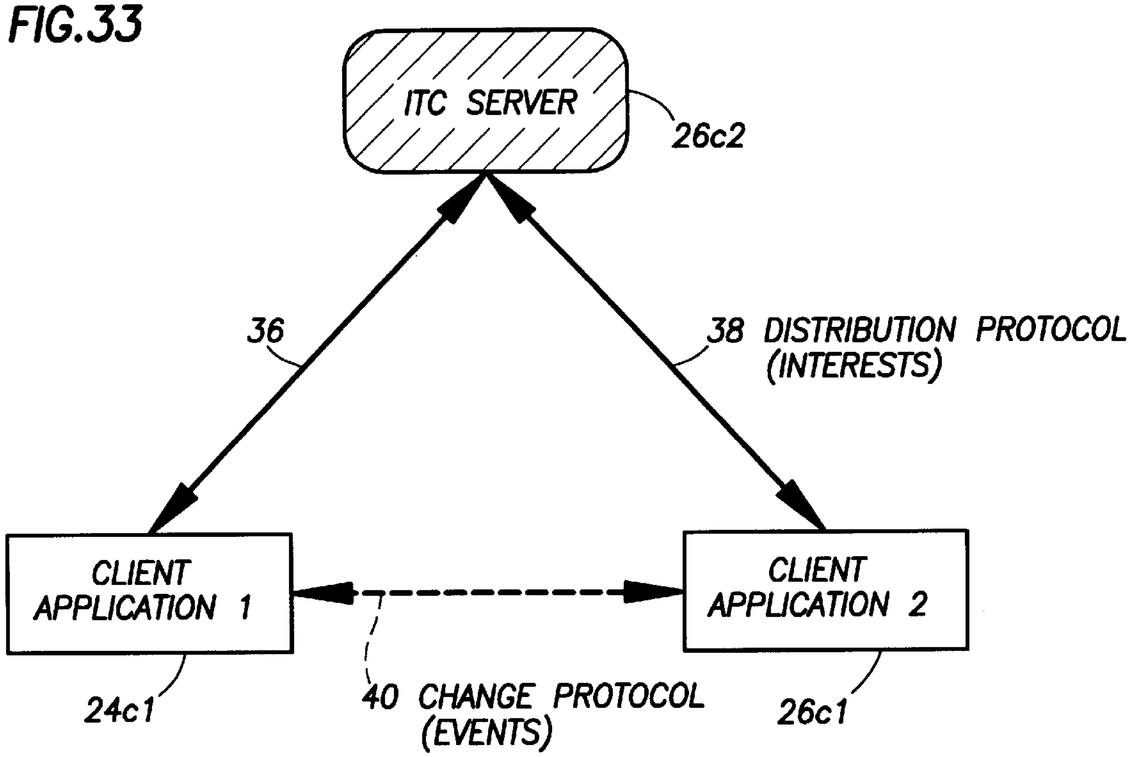
Figure 34:
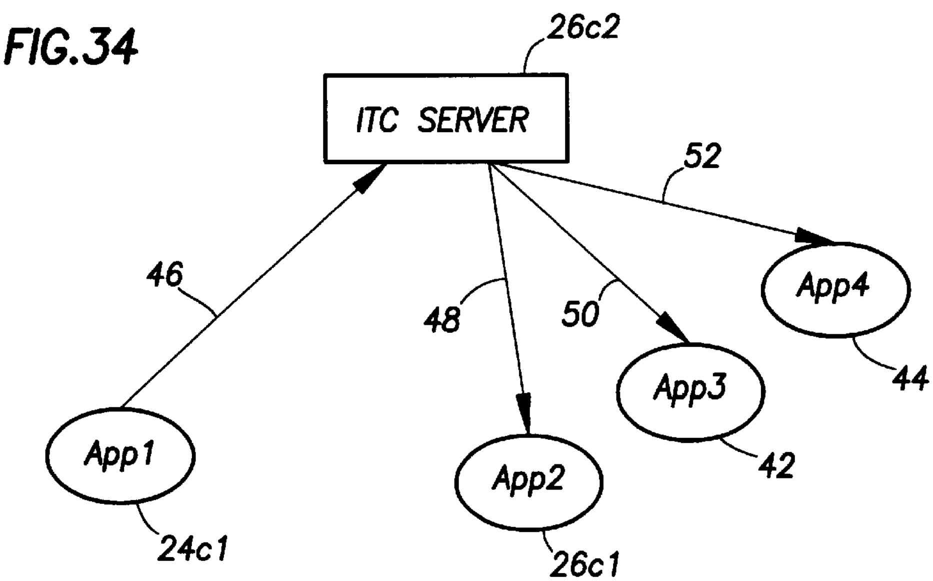
Figure 35:
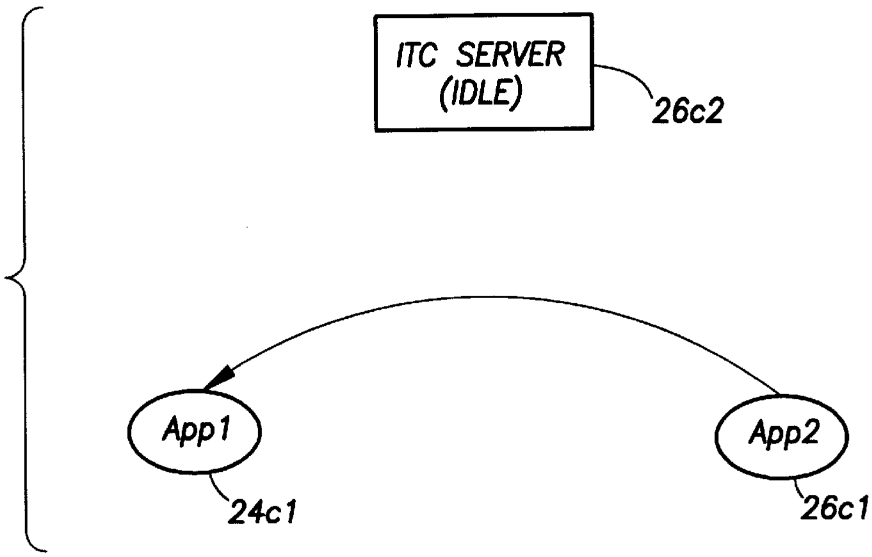

Referring to FIGS. 33 through 35, the drawings of FIGS. 6, 8A, and 9A are again illustrated.

In FIG. 33, a client application 1 24*c*1 sends an interest object, via line 36, to the server 26*c*2 requesting to receive certain event information when client application 2 26*c*1 practices an event which produces that event information. The server 26*c*2 will forward that request, via line 38, directly to client application 2 26*c*1. When client application 2 26*c*1 practices an event which produces that requested event information, the client application 2 26*c*1 will send the requested event information, via line 40, directly to client application 1 24*c*1 without registering the requested event information with the server 26*c*2.

In FIG. 34, the application 1 (App 1) 24*c*1 requests that event information by sending the interest object, via line 46, to the server 26*c*2, and the server 26*c*2 forwards that interest object to application 2 (App 2) 26*c*1 via line 48, application 3 (App 3) 42 via line 50, and application 4 (App 4) 44 via line 52.

In FIG. 35, when "App 2" 26*c*1 practices an event which produces that event information, "App 2" 26*c*1 transmits the requested event information directly to "App 1" 24*c*1 without first registering that event information with the server 26*c*2 (the server remains idle).

Referring to FIGS. 36 through 76, the "Integrated Data Communication and Data Access System" in accordance with the present invention is illustrated.

In FIGS. 45 through 76, the "Detailed Description" set forth below refers to FIGS. 45 through 76 and provides a detailed discussion of the "Application Data Interface (ADI)" which is embodied in the Integrated Data Communication and Data Access System.

In FIGS. 36 through 44, however, the "General Description" set forth below refers to FIGS. 36 through 44 and provides a general discussion of the concepts associated with the "Integrated Data Communication and Data Access System" of the present invention which includes the ADI of FIGS. 45–76.

General Description

Refer now to FIGS. 36 through 39.

Figure 36:
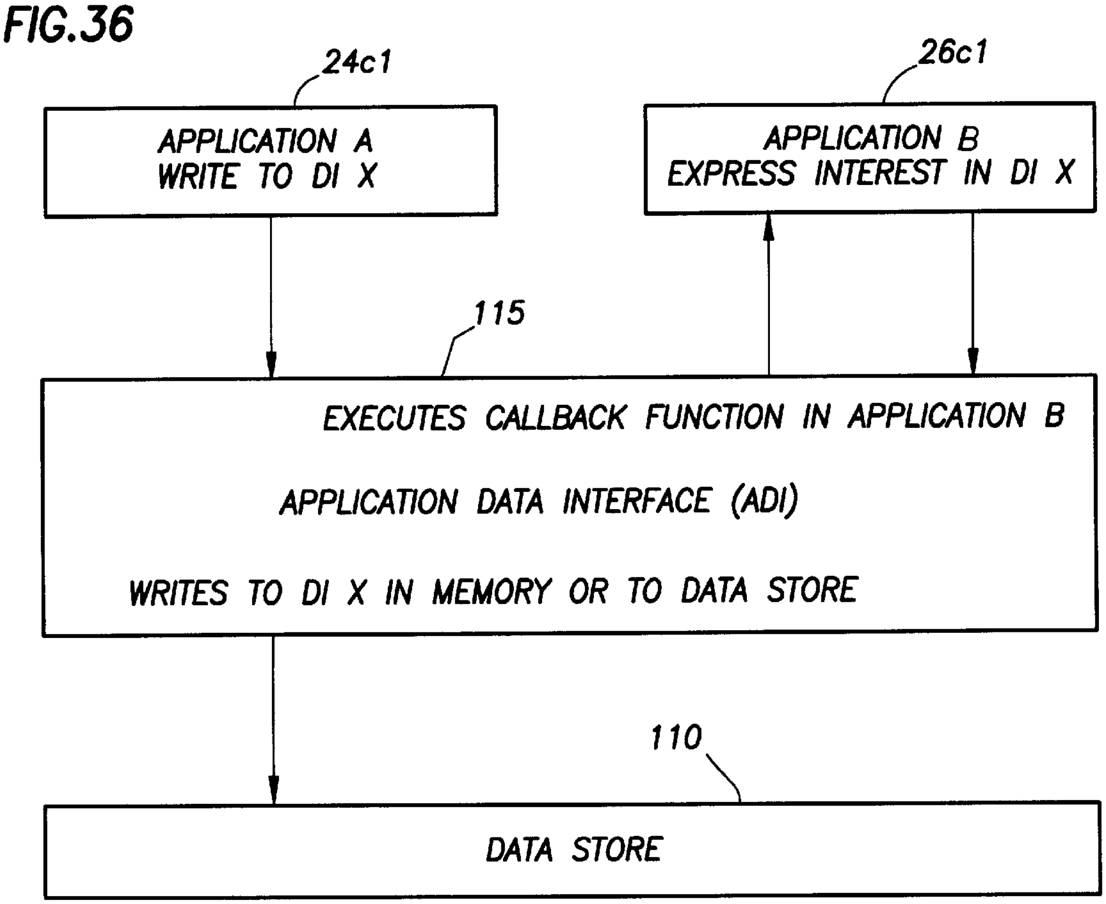

In FIG. 36, an "Integrated Data Communication and Data Access System" is illustrated which includes an "Application Data Interface" or "ADI" 115 that is operatively interconnected between a data store or database 110, an Application A (or first client application) **24*c*1, and an Application B (or second client application) 26*c*1. The Application data interface 115 will write a "dataItem X" to the database 110, and it executes a callback function in Application B 26*c*1**.

Figure 37:
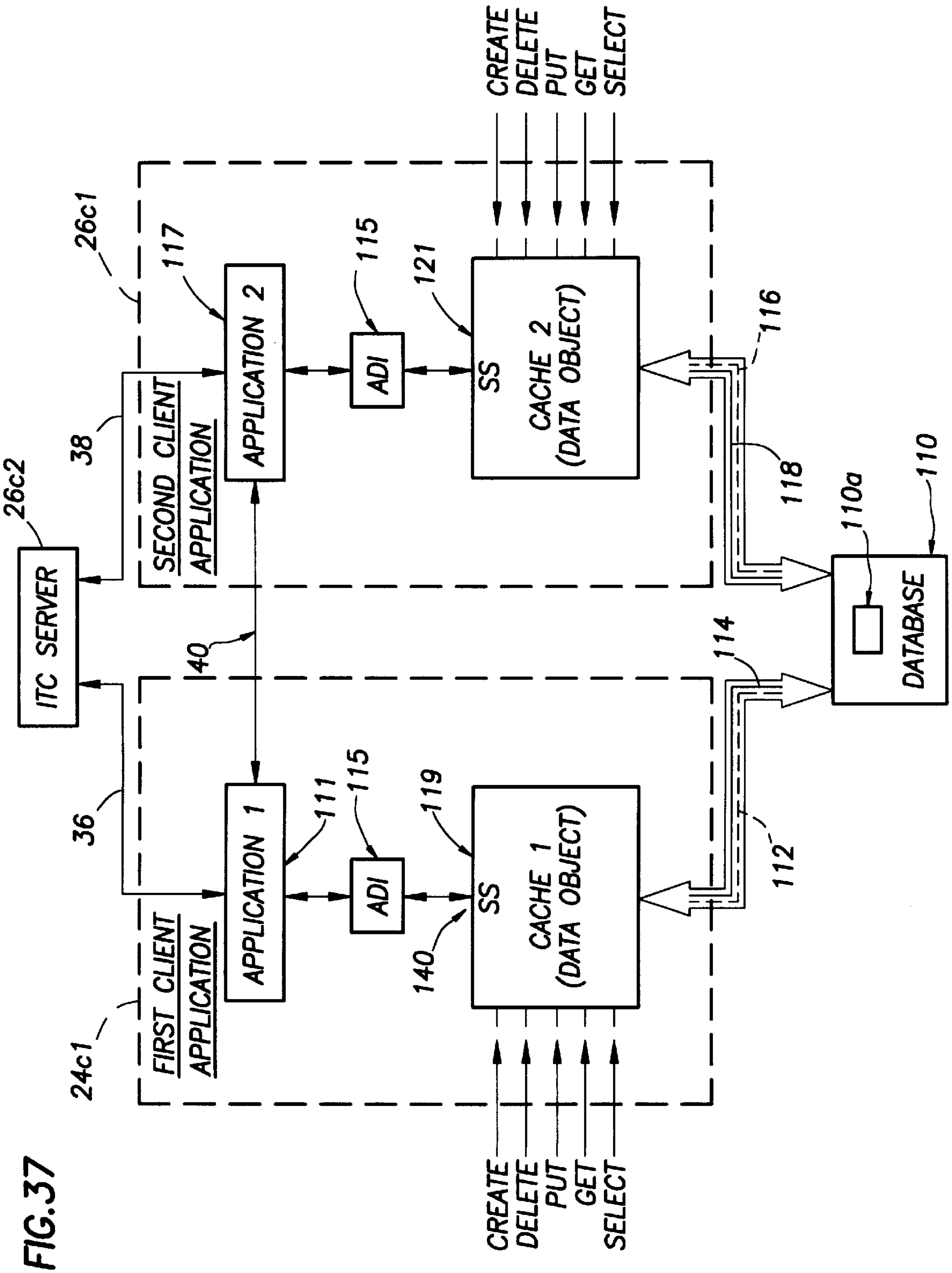

In FIG. 37, a further construction of the "Integrated Data Communication and Data Access System" of FIG. 36 is illustrated. In particular, the Application Data Interface (ADI), embodied in the system of FIG. 37, is discussed below in terms of the function the "ADI" performs in the system of FIG. 37 relative to the transfer and intercommunication of originally created and subsequently modified data between a first client application and its cache memory, a database, a server, and a second client application and its cache memory.

In FIG. 37, the Integrated Data Communication and Data Access System of FIG. 36 includes first client application **24*c*1 is operatively connected the server 26*c*2 via an operative connection 36, as before. The first client application 24*c*1 is also operatively connected to the second client application 26*c*1 via the operative connection 40. The second client application 26*c*1 is also operatively connected to the server 26*c*2 via the operative connection 38. The first client application 24*c*1 includes an "Application 1" 111, which communicates with the server 26*c*2, and a cache memory (cache 1) 119 operatively connected to the "Application 1" via the Application Data Interface (ADI) 115. The "cache 1" 119 stores a Data Object 119 that is generated by the "Application 1". The "cache 1" 119 which stores the Data Object 119 responds to a "create" command, a "delete" command, a "put" command, a "get" command, and a "select" command originating from "Application 1". The second client application 26*c*1 also includes an "Application 2" 117 which communicates with the server 26*c*2 and a cache memory (cache 2) 121 operatively connected to the "Application 2" via the Application Data Interface (ADI). The "cache 2" 121 stores a Data Object 121 that is generated by the "Application 2" (usually, the Data Object in "cache 2" is the same as the Data Object in "cache 1"). The "cache 2" 121 which stores the Data Object also responds to a "create" command, a "delete" command, a "put" command, a "get" command, and a "select" command originating from "Application 2". These commands will be discussed later. The "Application 1" is operatively connected to a database 110 via two operative connections (connection 112 and connection 114) for the purpose of storing data in the database 110 when "cache 1" is set in a transient state or when "cache 1" is set in a persistent state. The "Application 2" is also operatively connected to the database 110 via two operative connections (connection 116 and connection 118) for the purpose of storing data in the database 110 when "cache 2" is set in a transient state or when "cache 2" is set in a persistent state. When "Application 1" stores data in the database 110 during the transient state, it will do so via operative connection 112; however, when "Application 1" stores data in the database 110 during the persistant state, it will do so via operative connection 114. Similarly, when "Application 2" stores data in the database 110 during the transient state, it will do so via operative connection 116; however, when "Application 2" stores data in the database 110 during the persistant state, it will do so via operative connection 118. The terms "transient" and "persistent" will be defined later in this specification. The database 110 stores a plurality of Data Objects, including a Data Object 110*a*. Usually, the Data Object 110*a* in the Database 110 is the same as the Data Object in "cache 1and the Data Object in "cache 2". In response to the "put" storage state (ss) command originating from "Application 1" and received by the "cache 1" 119 which stores the Data Object 119, the "cache 1" of the first client application 24*c*1 will be set in one of three separate storage states (ss): the "persistent" storage state or the "transient" storage state or the "memory" storage state. When the "cache 1" is set in one of these storage states, the "cache 2" will be automatically set in the same storage state as that of "cache 1". Similarly, in response to the "put" command originating from "Application 2" and received by the "cache 2" 121 which stores the Data Object 121, the "cache 2" of the second client application 26*c*1** will be set in one of the three above referenced separate storage states (ss): the "persistent" storage state or the "transient" storage state or the "memory" storage state. When the "cache 2" is set in one of these storage states, the "cache 1" will also be automatically set in the same storage state as that of "cache 2".

In FIG. 37, as noted earlier, the cache memories 119, 121 which store the first and second Data Objects 119, 121 are each adapted to receive either a "create" command, or a "delete" command, or a "put" command or a "get" command or a "select" command from "Application 1" and "Application 2", respectively. When the cache memories 119, 121 storing the Data Objects 119, 121 receive any one of these commands, the "cache 1" or the "cache 2" will respond accordingly. For example, when the cache memories 119, 121 storing the Data Objects 119, 121 each receive the "put" storage state command from "Application 1" and "Application 2" respectively, the "cache 1" or "cache 2" will be set in either the "persistent" storage state or the "transient" storage state or the "memory" storage state; and, after the appropriate "storage state" is set, the Data Objects 119, 121 can then be modified or changed by "Application 1" or "Application 2".

When, in response to the "put" command, the "Application 1" sets the "persistent" storage state, and when the "Application 1" subsequently creates an "original set of data" and then subsequently modifies or changes the original set of data to create "modified data", both the "original set of data" and the "modified data" will be stored in the database 110 via the operative connection 114 (because the "persistant" storage state has been set). On the other hand, when, in response to the "put" command, the "Application 1" sets the "transient" storage state, and when the "Application 1" subsequently creates the "original set of data" and then subsequently creates the "modified data", the "original set of data" will be stored in the database 110 via the operative connection 112, however, the "modified data" will not be stored in the database 110 (because the "transient" storage state has been set). On the other hand, when, in response to the "put" command, the "Application 1" sets "memory" storage state, and when the "Application 1" subsequently creates the "original set of data" and then subsequently creates the "modified data", none of the "original set of data" and none of the "modified data" will be stored in the database 110 (because the "memory" storage state has been set).

Similarly, when, in response to the "put" command, the "Application 2" sets the "persistent" storage state, and when the "Application 2" subsequently creates an "original set of data" and then subsequently modifies or changes the original set of data to create "modified data", both the "original set of data" and the "modified data" will be stored in the database 110 via the operative connection 118 (because the "persistent" storage state has been set). On the other hand, when, in response to the "put" command, the "Application 2" sets the "transient" storage state, and when the "Application 2" subsequently creates the "original set of data" and then subsequently creates the "modified data", the "original set of data" will be stored in the database 110 via the operative connection 116, however, the "modified data" will not be stored in the database 110 (because the "transient" storage state has been set). On the other hand, when, in response to the "put" command, the "Application 2" sets "memory" storage state, and when the "Application 2" subsequently creates the "original set of data" and then subsequently creates the "modified data", none of the "original set of data" and none of the "modified data" will be stored in the database 110 (because the "memory" storage state has been set). When the cache memory 119 or 121 storing the Data Object 119 or 121 receives the "create" command, and the "persistant" or "transient" storage state has been set, the "Application 1" or "Application 2" will create and store another Data Object 110*a* in the data base 110. When the cache memory 119 or 121 storing the Data Object 119 or 121 receives the "select" command, the "Application 1" or "Application 2" will select a Data Object 110*a* stored in the data base 110, and when the cache memory 119, 121 storing the Data Object 119 or 121 receives the "get" command, the "Application 1" or the "Application 2" will retrieve the selected Data Object 110*a* from the data base 110. When the cache memory 119, 121 storing the Data Objects 119 or 121 receives the "delete" command, the "Application 1" or the "Application 2" will delete the Data Object 110*a* from the data base 110.

Figure 38A:
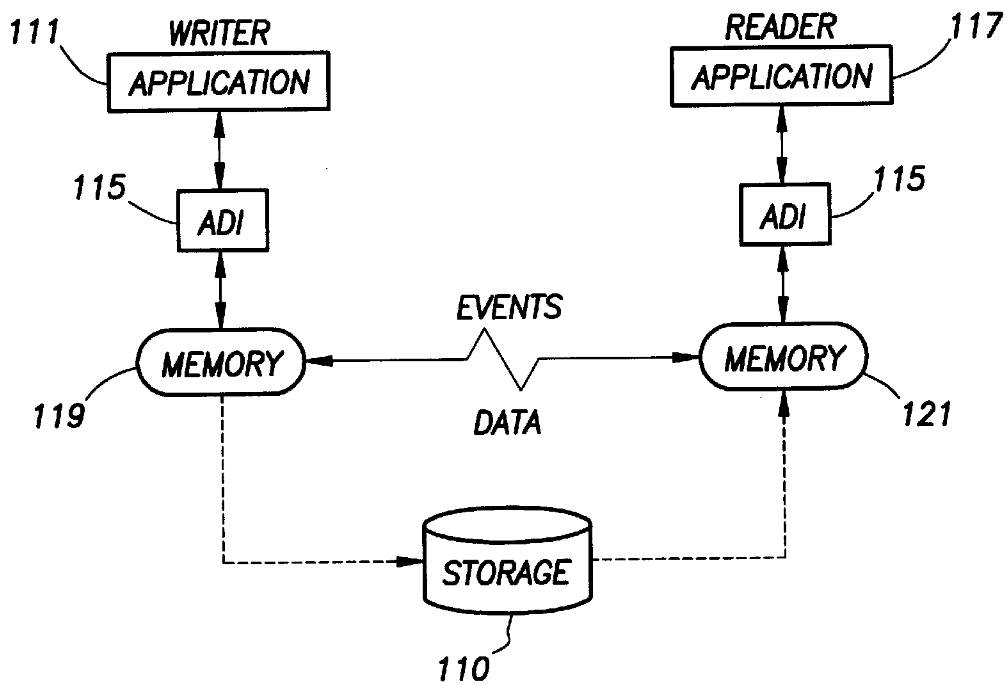
Figure 38B:
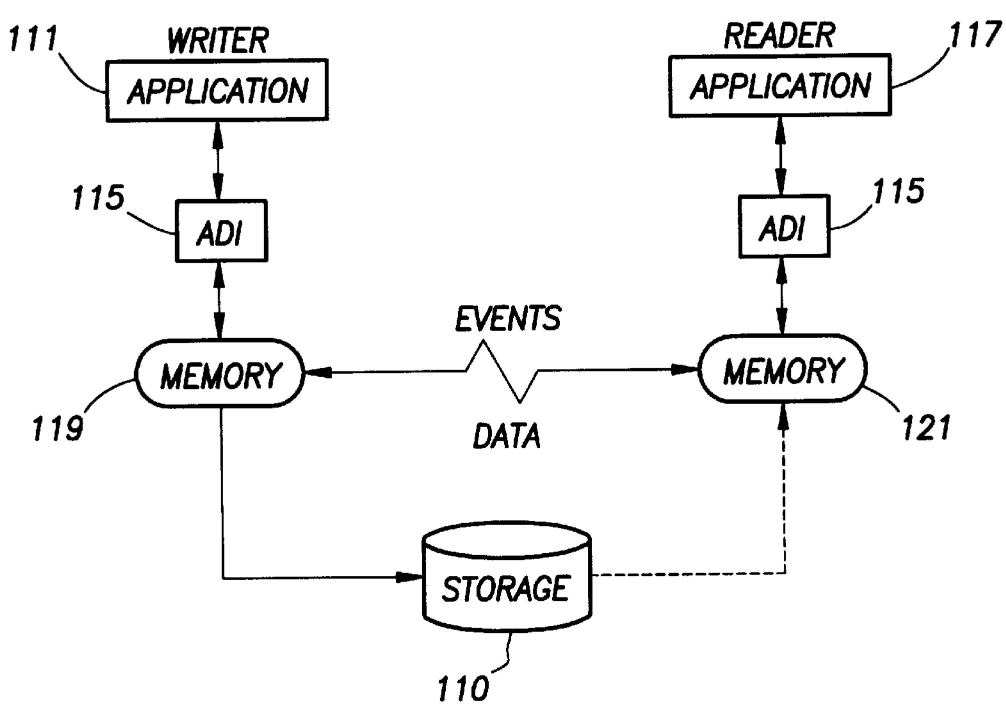

In FIG. 38*a* and 38*b*, block diagrams are presented which illustrate the definitions of the "transient" data transfer and the "persistent" data transfer.

In FIG. 38*a*, the definition of "transient" data transfer" is illustrated. In FIG. 38*a*, an application data interface 115 assists the transfer of data from a writer application 111 and a temporary cache memory 119. Since, in FIG. 38*a*, we are illustrating the function of the "transient" data transfer, the original, initially created data currently residing in the temporary memory 119 will be written into the database storage 110; however, because we are in the "transient" data transfer mode, no further corresponding modified data will be written into the database storage 110. In FIG. 38*a*, the ADI 115 will also assist the reading of the initially stored data from the database storage 110 to another temporary cache memory 121, and from the temporary memory 121 to the reader application 117 for the modified data via operative connection 40.

In FIG. 38*b*, the definition of the "persistent" data transfer is illustrated. In FIG. 38*b*, an application data interface 115 also assists the transfer of data between a writer application 111 and a temporary cache memory 119. Since, in FIG. 38*b*, we are illustrating the function of the "persistent" data transfer, the original, initially created data currently residing in the temporary cache memory 119 will be written into the database storage 110; however, because we are in the "persistent" data transfer mode, all further corresponding modified versions of the data will also be written into the database storage 110. In FIG. 38*b*, the ADI 115 will also assist the reading of the initially stored data from the database storage 110 to another temporary cache memory 121, and from the temporary cache memory 121 to the reader application 117.

Figure 39:
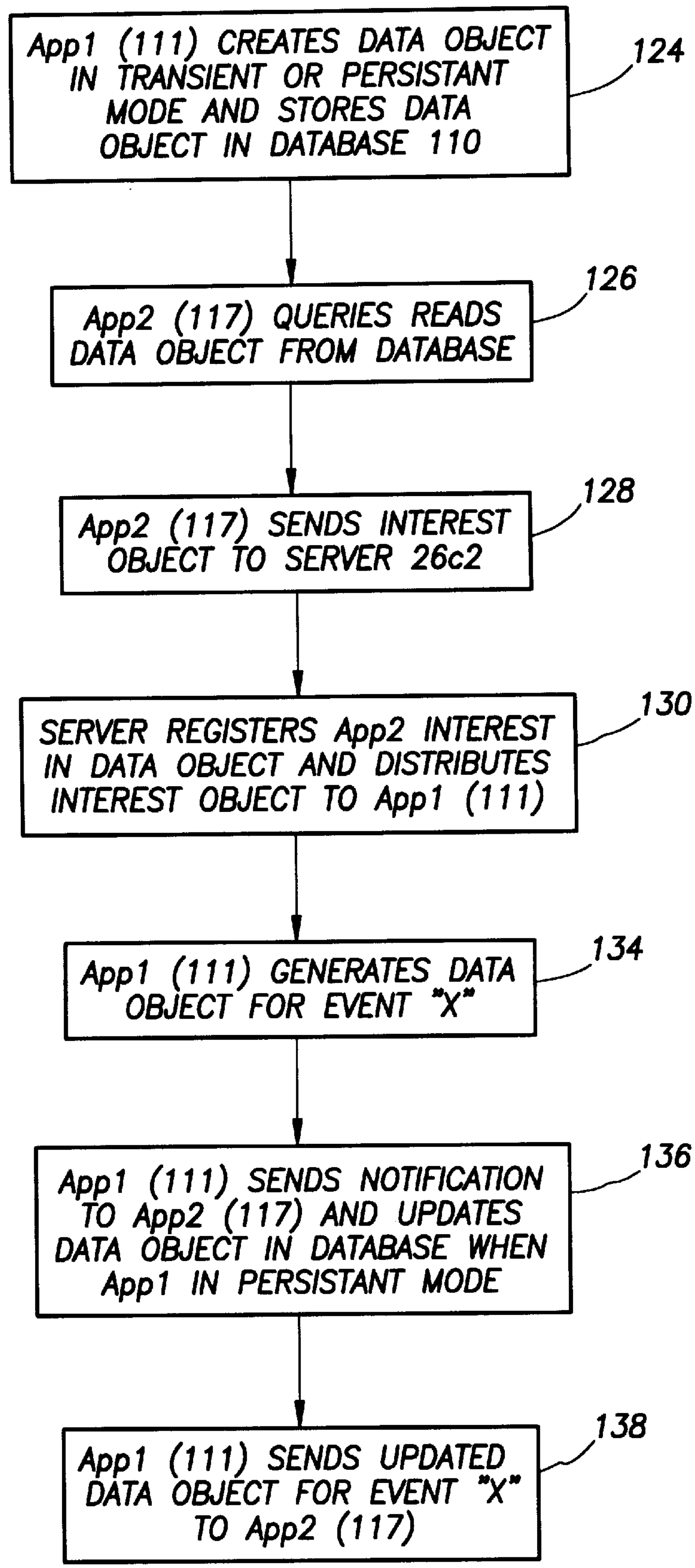

In FIG. 39, a flow diagram is illustrated which describes the functional operation of the interactive data communication system of FIGS. 36 and 37. In particular, the diagram of FIG. 39 describes the functional operation of the "Application Data Interface (ADI)" inherently embodied in the system of FIG. 37 which governs the transfer and intercommunication of originally created and subsequently modified data throughout the system of FIG. 37. In FIG. 39, the following functional steps are performed by the system of FIG. 37, which steps are governed by the Application Data Interface of the present invention:

(1) App 1 (111) creates a Data Object 110*a* in a cache memory, while in the transient or persistant mode, and then stores the newly-created Data Object in the database 110, block 124, (2) App 2 (117) queries/reads the Data Object 110*a* from the database 110, block 126, (3) App 2 (117) sends an interest object to the server 26*c*2, block 128, (4) the server 26*c*2 registers the App 2 interest in the Data Object 110*a* and distributes the interest object to App 1 (111), block 130, (5) App 1 (111) generates a Data Object for Event "X", block 134, (6) App 1 (111) sends a notification to App 2 (117) and updates the Data Object 110*a* in the database 110 when App 1 is in the persistent mode, block 136, and (7) App 1 sends an updated Data Object for Event "X" directly to App 2, via line 40, without registering the updated Data Object with the server, block 138.

Each of these steps in the flow diagram of FIG. 39 will be discussed in detail in the following functional description of the operation of the Integrated Data Communication and Data Access System of FIG. 37, the sequential flow of data through such System being governed by the Application Data Interface (ADI) of the present invention.

In FIG. 37, a functional description of the operation of the "Integrated Data Communication and Data Access System" of FIG. 37, including the Application Data Interface 115 embodied therein, will be set forth in the following paragraphs with reference to FIG. 37.

In FIG. 37, assume that the "Application 1" of the first client application 24*c*1 has set the "memory" storage state. While in the "memory" storage state, the "Application 1" creates "new data", stores that new data in the cache memory 119 in the form of a Data Object 119, changes/modifies that new data thereby creating "modified data", re-stores the modified data in the cache memory 119 in the form of a new Data Object 119, continuously modifies the "modified data" thereby creating "further modified data", and restores the further modified data in the cache memory 119 in the form of a further new Data Object 119. Since this function occurred after the "Application 1" set the "memory" storage state, none of the newly or subsequently created data was stored as a Data Object 110*a* in the database 110, that is, the new data, the modified data, and the further modified data was not stored as a Data Object 110*a* in the database 110.

Assume now that the "Application 1" sets the persistent or transient storage state by generating the "put" storage state command which is received by the cache memory 119. Therefore, the cache memory 119 is now set in the persistant or transient storage state. When the "persistant" or the "transient" storage state is set by "Application 1", assume that "Application 1" practices an event (called "event X")

and thereby generates a set of "original and newly created data". When the "original and newly created data" is generated by "Application 1", since the "persistent" or "transient" storage state has been set, the ADI 115 will respond to the "Application 1" by storing the "original and newly created data" in the form of the Data Object 119 in the cache memory 119 of the first client application 24c1; and, in addition, the ADI 115 will also respond to the "Application 1" by storing the "original and newly created data" in the form of the Data Object 110a in the Database 110. Therefore, the Data Objects 119 and 110a were both created in response to and as a direct result of the function of the ADI 115 responsive to the practice of event X by "Application 1" during the setting of the "persistant" or "transient" storage state. However, if the "memory" storage state had been set, the ADI 115 would have stored the "original and newly created data" in the cache memory 119 in the form of the Data Object 119; but the ADI 115 would not have stored the "original and newly created data" in Database 110 in the form of Data Object 110a.

If the "Application 1" set the persistant storage state, the "cache 1" and the "cache 2" are both set in the persistant storage state. As a result, the operative connection 118 indicative of the "persistent" storage state is now open and the "Application 2" of the second client application 26c1 can update the Data Object 110a in the database 110 whenever that Data Object 110a is changed or modified by the "Application 2". The "Application 2" of the second client application 26c1 queries the database 110, via operative connection 118, and notices that the Data Object 110a (which was previously stored in the database 110 by "Application 1") exists and is stored in the database 110. When the "Application 2" notices that Data Object 110a, the "Application 2" of the second client application 26c1 becomes interested in receiving more data associated with that Data Object 110a from "Application 1" of the first client application 24c1 whenever "Application 1" again practices or continues to practice the "event X"which created the Data Object 110a in the database 110. As a result, the "Application 2" of the second client application 26c1 sends an interest object to the server 26c2 via operative connection 38. The server 26c2 registers that interest object from "Application 2" and forwards that interest object to the "Application 1" of the first client application 24c1 via operative connection 36. Whenever "Application 1" of the first client application 24c1 again practices the "event X" thereby creating "newly updated data", the "newly updated data" associated with the practice of "event X" will be transmitted directly from "Application 1" to "Application 2" via the operative connection 40 in FIG. 37 without passing through and registering with the server 26c2.

Assume now that the "Application 1" of the first client application 24c1 sets the "persistent" storage state by generating the "put" storage state command which is received by the cache memory 119. As a result, the" cache 1" and the "cache 2" are both set in the "persistent" storage state. Assume now that the "Application 1" of the first client application 24c1 begins to practice the "event X". During the practice of "event X" by "Application 1", some "original and newly created data" is generated by the "Application 1" and some "further subsequently modified data" is subsequently generated by the "Application 1". In other words, during the practice of "event X" by "Application 1", the data resultant from the practice of event X is constantly changing. Since the "Application 1" of the first client application 24c1 is set in the "persistent" storage state, the ADI 115 will respond to the "Application 1" by storing the "original and newly created data" as Data Object 110a in the Database 110 via operative connection 114, and the ADI will further respond to the "Application 1" by further storing the "further subsequently modified data" as Data Object 110a in the Database 110 via the operative connection 114.

Assume now that the "Application 1" of the first client application 24c1 sets the "transient" storage state by generating the "put" storage state command which is received by the cache memory 119 which stores the Data Object 119. As a result, the "cache 1" and the "cache 2" are both set in the "transient" storage state. Since the "cache 1" is set in the "transient," storage state, whenever any "original and newly created data" is generated by "Application 1" as a result of the practice by "Application 1" of "event X", the ADI 115 will respond to the "Application 1" by storing that "original and newly created data" as Data Object 110a in the Database 110 via the operative connection 112. However, during the continual practice of "event X" by "Application 1", further "modified and subsequently created data" will be generated by "Application 1". Since the "cache 1" is set in the "transient" storage state, the ADI 115 will respond to the "Application 1" by not storing any of the "modified and subsequently created data" as Data Object 110a in the Database 110.

Assume now that the "Application 1" sets the "memory" storage state by generating the "put" storage state command which is received by the cache memory 119. Since the "cache 1" is set in the "memory" storage state, if any "original, newly created data" is produced by the "Application 1", and if any "further, subsequently modified data" is produced by "Application 1", none of the "original, newly created data" and none of the "further, subsequently modified data" will be stored in the Database 110 as a Data Object 110a.

Refer now to FIGS. 40 through 44.

Figure 40:
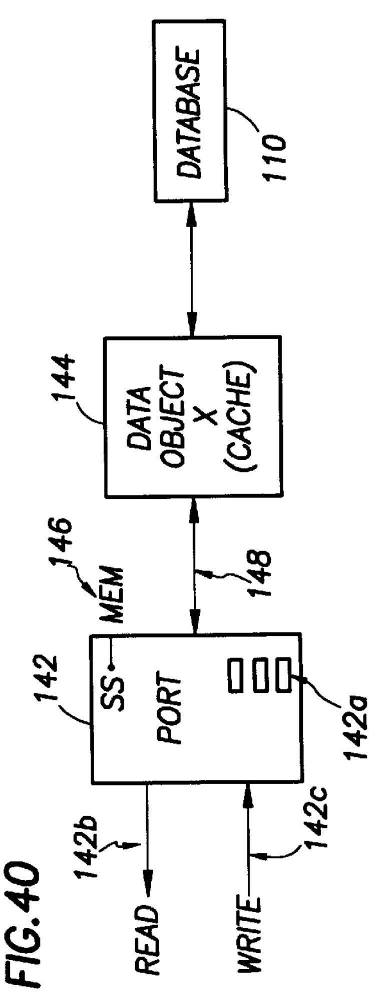

In FIG. 40, a port 142 is operatively connected to a cache memory 144 (or it can be a buffer memory) which stores a Data Object 144, and the Data Object 144 is operatively connected to a database 110. The port 142 includes a converter 142a. The port 142 responds to a read command, at terminal 142b and a write command, at terminal 142c. The port 142 is an opaque handle that can be used to access associated structures. It is a special type of file handle where the handle itself contains all the information to access the data. The port 142 is discussed in detail in the "Detailed Description of the Preferred Embodiment" set forth below. The port 142 is always in the "memory" storage state, as indicated by numeral 146 in FIG. 40.

Figure 41:
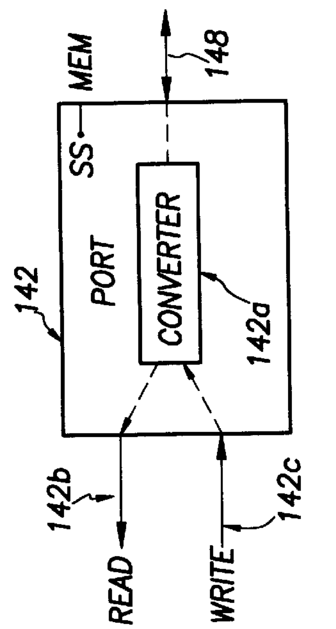

In FIG. 41, the port 142 includes a converter 142a. The port 142 is adapted to transfer data between an output terminal 148 (which operatively interconnects the port 142 to the cache 144 which stores the Data Object 144) and either the read command terminal 142b or the write command terminal 142c. When the data is being transferred between the output terminal 148 and either the read command terminal 142b or the write command terminal 142c, the data undergoes a conversion process within the converter 142a. For example, if the data is being transferred from the output terminal 148 and to the read command terminal 142b, the data is converted, by the converter 142a, from a format A (at terminal 148) to a format B (at terminal 142*b*); however, if the data is being transferred from the write command terminal 142*c* to the output terminal 148, the data is reconverted back, by the converter 142*a*, from the format B (at terminal 142*c*) to the format A (at terminal 148). For example, the data may be converted from a metric unit of measure to an English or Canadian unit of measure. The significance of this function will become evident from a reading of the following functional description of the Integrated Data Communication and Data Access System of the present invention, which includes the Application Data Interface 115, with reference to FIGS. 42 through 44.

Figure 42:
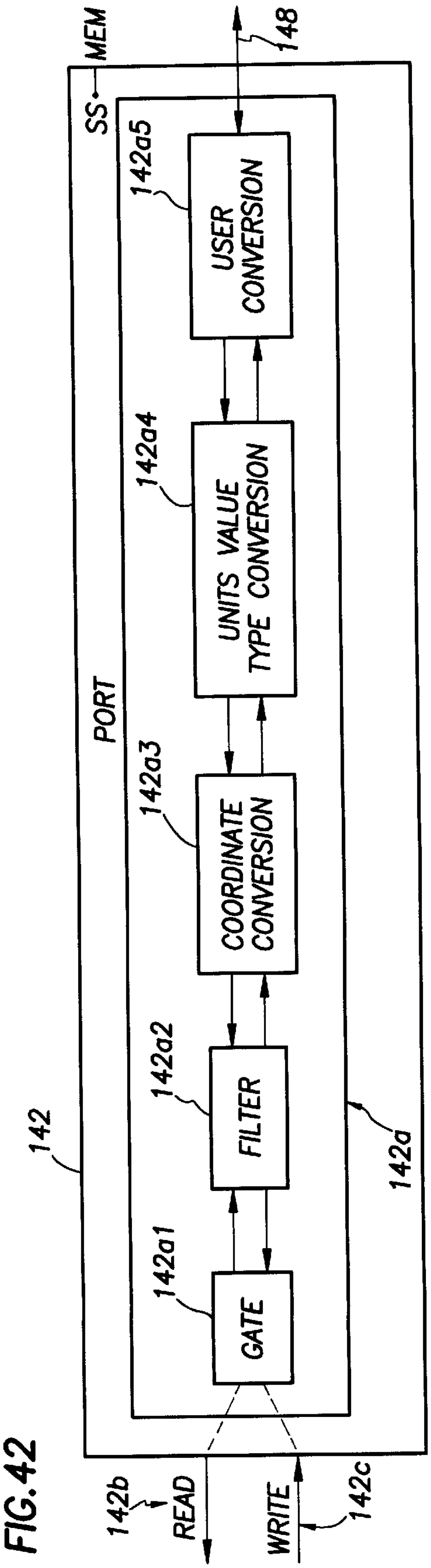

In FIG. 42, a more detailed construction of the converter 142*a* of the Port 142 of FIG. 41 is illustrated. In FIG. 42, when the data is transferred between the output terminal 148 and either the read command terminal 142*b* or the write command terminal 142*c*, the data will pass through a plurality of conversion units, as follows: the data will pass through a gate conversion unit 142*a*1, a filter conversion unit 142*a*2, a coordinate conversion unit 142*a*3, a units value type conversion unit 142*a*4, and/or a user conversion unit 142*a*5. Each of these conversion units 142*a*1 through 142*a*5 are discussed in detail in the "Detailed Description of the Preferred Embodiment" set forth below.

Figure 43:
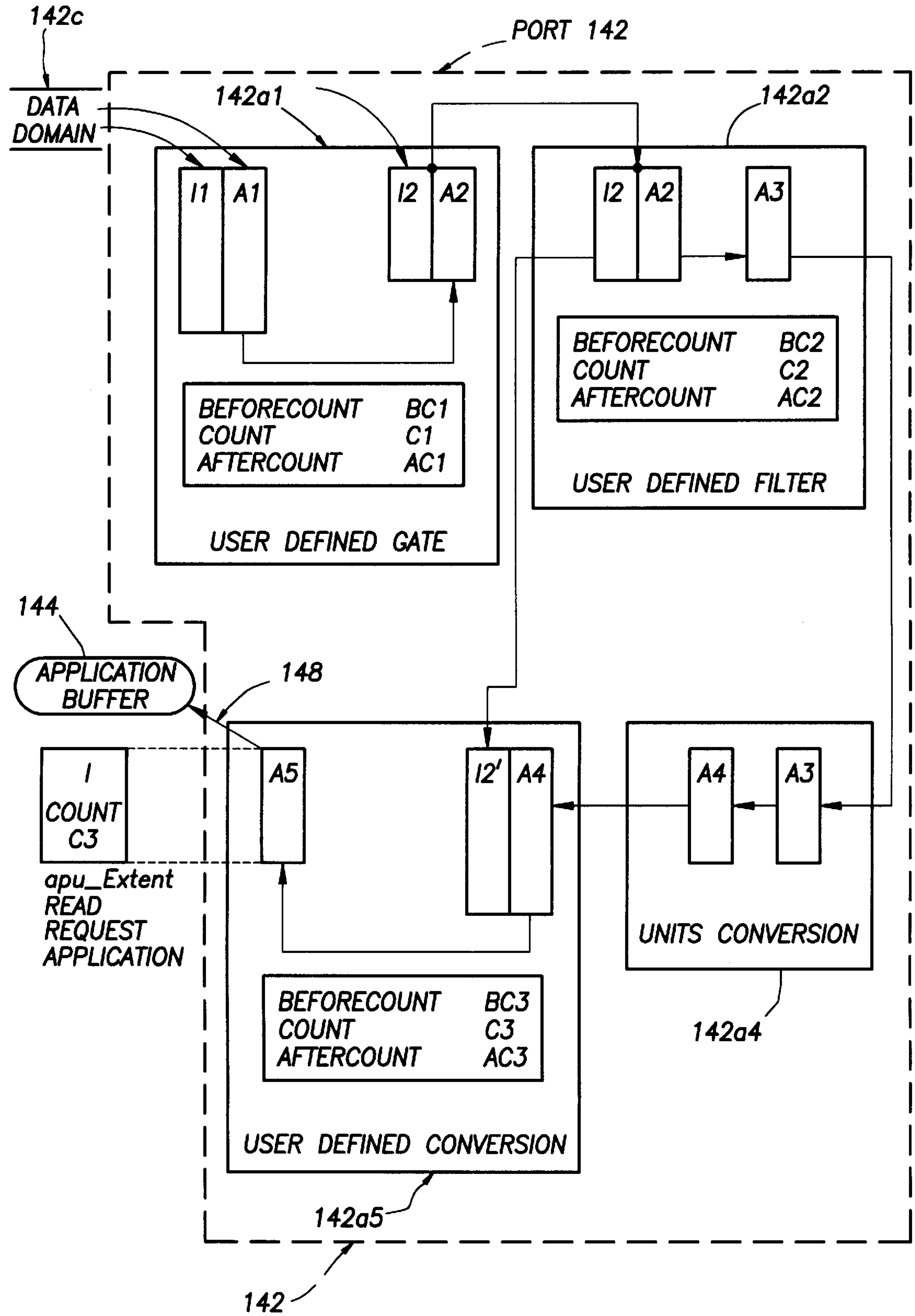

In FIG. 43, by way of example, data from a "data domain" is being written into the port 142 via the write command terminal 142*c*. When that data is written into the port 142 via the write command terminal 142*c*, that data undergoes a first conversion in the user defined gate conversion unit 142*a*1; then, the data undergoes a second conversion in the filter conversion unit 142*a*2; then, the data undergoes a third conversion in the units value type conversion unit 142*a*4; and then the data undergoes a fourth conversion in the user conversion unit 142*a*5. After the data undergoes conversion in the user conversion unit 142*a*5, the converted data passes to the cache 144 which stores the Data Object 144 via the output terminal 148. An example of a typical conversion executed by the converter 142*a* in port 142, similar to the conversion described above in FIGS. 42 and 43, will be provided below with reference to FIG. 44 of the drawings.

Figure 44:
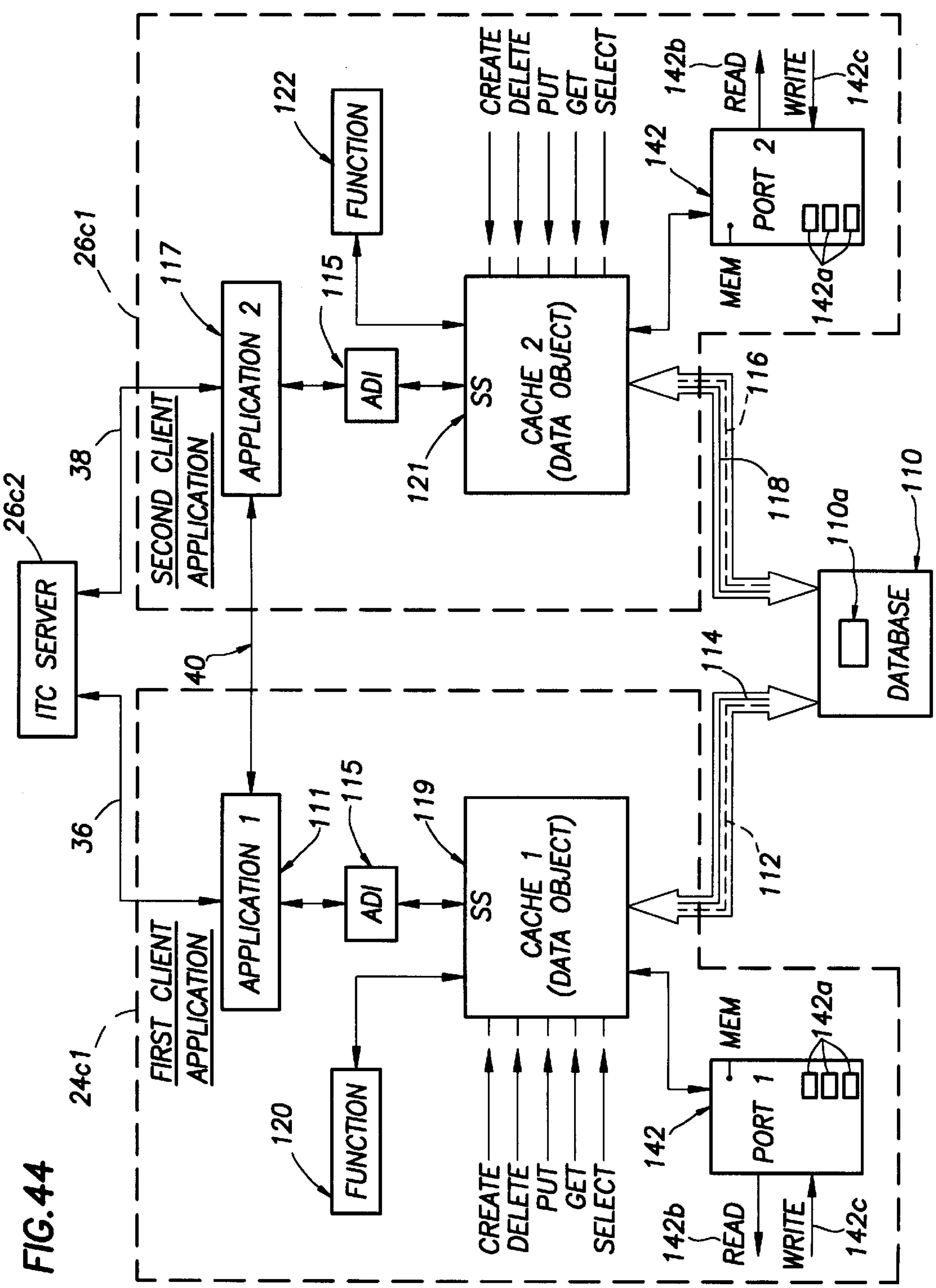

In FIG. 44, the Integrated Data Communication and Data Access System of FIG. 37 is again illustrated in FIG. 44; however, in FIG. 44, the first client application 24*c*1 and the second client application 26*c*1 of the Integrated Data Communication and Data Access System each further include the apparatus of FIG. 40, that is, the port 142 including the converter 142*a* operatively connected to the cache 119, 121 which stores the Data Object 119, 121. For example, the first client application 24*c*1 includes a "port 1" 142 (including a "converter 1" 142*a*) operatively connected to the cache memory (cache 1) 119 which stores the Data Object 119, and the second client application 26*c*1 includes a "port 2" 142 (including a "converter 2" 142*a*) operatively connected to the cache memory (cache 2) 121 which stores the Data Object 121. In addition, a "function" 120 is associated with the "cache 1" 119, and a "function" 122 is associated with the "cache 2" 121. The purpose of the "function" 120, 122 in the Integrated Data Communication and Data Access System of FIG. 44 will become clear following a reading of the following functional description of the operation of the present invention.

A functional description of the operation of the Integrated Data Communication and Data Access System of FIG. 44, including the function of the Application Data Interface (ADI) 115, is set forth in the following paragraphs with reference to FIG. 44.

In FIG. 44, assume that the first client application 24*c*1 is located in a first location on earth having a first system of data measure (e.g., the English unit of measure) and the second client application 26*c*1 is located in a second location on earth having a second system of data measure (e.g., the Canadian unit of measure). The first client application 24*c*1 is a windowed application program being presented to a first operator sitting at a first workstation located in the first location on earth, and the second client application 26*c*1 is another windowed application program being presented to a second operator sitting at a second workstation located in the second location on earth. The "Application 1" 111 of the first client application 24*c*1 represents a particular program application that is being executed; and, during the execution of "Application 1", a certain type of data is required from the first operator viewing the first client application 24*c*1. During the execution of the "Application 1", an "event" is being practiced by the "Application 1". In order to provide the required certain type of data, the first operator viewing the first client application 24*c*1 provides that certain type of data by writing a "first type of data having the English units of measure", via the write command terminal 142*c*, to the "port 1" 142 of the first client application 24*c*1. The converter 142*a*of the "port 1" 142 will receive the "first type of data having the English units of measure" and it will convert the "first type of data having the English units of measure" into the "first type of data having a metric unit of measure". The "port 1" 142 in the first client application 24*c*1 has already been set in the "memory" storage state in response to the "put" storage state command received by the "Port 1" 142. The "first type of data having the metric units of measure", that is being output from the "port 1" 142, is input to the "cache 1" 119 and is stored as a Data Object 119 in the "cache 1" of the first client application 24*c*1. Assume that the "cache 1" was previously set in the persistant storage state. As a result, the "first type of data having the metric units of measure", which is temporarily stored in the "cache 1" 119 as Data Object 119 of the first client application 24*c*1, can now be transferred from the "cache 1" 119 to the database 110, via the "persistent" operative connection 114, and stored therein in the form of a Data Object 110*a*.

As a result, the "Application 1" practiced an "event", and, when that "event" was practiced by "Application 1", certain "event information" was generated by "Application 1". That "event information" was stored in the database 110 in the form of the Data Object 110*a*, the Data Object 110*a* representing the aforementioned "first type of data having the metric units of measure".

The second operator viewing the second client application 26*c*1 reads the Data Object 110*a* (representing the "first type of data having the metric units of measure") by issuing a read command via the read command terminal 142*b* of the "Port 2" of the second client application 26*c*1. As a result, the "first type of data having the metric units of measure", stored as the Data Object 110*a* of the database 110, is transferred from the database 110 and to the "cache 2" 121, via the "persistent" operative connection 118, and is temporarily stored in the "cache 2" 121 as the Data Object 121 of the second client application 26*c*1. This transfer of the "first type of data having the metric units of measure" from the database 110 to "cache 2" can occur because the "Application 2" 117 has already set the "persistant" storage state in response to the "put" command received in the "cache 2"

121. The "first type of data having the metric units of measure", now stored in the "cache 2" 121 as Data Object 121 of the second client application 26c1, is transferred from the "cache 2" 121 to the "port 2" 142 of the second client application 26c1. The converter 142a of the "port 2" converts the received "first type of data having the metric units of measure" into the "first type of data having the Canadian units of measure". When the converter 142a converts the "first type of data having the metric units of measure" into the "first type of data having the Canadian units of measure", the second operator viewing the second client application 26c1 can now read the "first type of data having the Canadian units of measure" by issuing a read command via the read command terminal 142b of the "port 2" 142 of the second client application 26c1. Assume that, when the second operator of the second client application 26c1 views (on his display screen of his workstation) the "first type of data having the Canadian units of measure", the second operator of the second client application 26c1 becomes interested in receiving more "subsequently created and updated data" that is associated with the "first type of data having the Canadian units of measure". As a result of this increased interest in the "subsequently created and updated data" on the part of the second operator of the second client application 26c1, the second operator will express that interest by writing an "interest object" from the write terminal 142c to the "port 2" 142 of the second client application 26c1. That "interest object" is not converted by the converter 142a; rather, the "interest object" passes directly to the "cache 2" 121. When the "interest object" is received by the "cache 2" 121, the "function" 122 is set. Now that the "function" 122 is set, when the "subsequently created and updated data" is received in the "cache 2" from the first client application 24c1 via operative connection 40, the particular function associated with that "updated data" will be implemented by the "Application 2" 117 and that particular function will be presented to the second operator of the second client application 26c1 for viewing on his display screen on his workstation. The ADI 115 of the second client application 26c1 passes the "interest object" to the "Application 2" 117, whereupon, the "Application 2" 117 of the second client application 26c1 will pass that "interest object" to the Server 26c2 via operative connection 38. The server 26c2 registers the "interest object" received from the second client application 26c1, and then the server 26c2 forwards that "interest object" to the "Application 1" 111 of the first client application 24c1. The ADI 115 of the first client application 24c1 will pass that "interest object" to the "cache 1" 119. When that "interest object" is received by the "port 1" 142, it does not undergo conversion in the converter 142; rather, it is read from the "port 1" 142 via the read terminal 142 and it is presented to the first operator of the first client application 24c1 for viewing on the first operator's workstation display screen. When that "interest object" is received by the "Application 1" 111, the "interest object" is associated with a particular "event" in the "Build List of ITC Events" 80 of FIG. 26A.

Assume now that the "Application 1" 111 re-practices the same "event" which originally generated the "event information" representing the "first type of data having the metric units of measure". Recall that the "first type of data having the metric units of measure" was stored in the database 110 as Data Object 110a. When the "Application 1" re-practices that same "event", the "Application 1" will generate the requested "subsequently created and updated data". Recall that the "Application 2" of the second client application 26c1 has already expressed interest in the "subsequently created and updated data".

When the "event" is re-practiced, "Application 1" 111 of the first client application 24c1 is executing, and the execution of "Application 1" requires that certain "updated input data in the English units of measure" be provided by the first operator of the first client application 24c1. The first operator therefore provides that "updated input data in the English units of measure" by writing that data to the "port 1" 142 of the first client application 24c1 via the write terminal 142c. The "updated input data in the English units of measure" provided by the first operator represents the "subsequently created and updated data" that was requested by the second client application 26c1. The converter 142a of the "port 1" converts the "updated input data in the English units of measure" into a "updated input data in the metric units of measure", and the "updated input data in the metric units of measure" is temporarily stored in the "cache 1" 119 in the form of a Data Object 119 of the first client application 24c1. However, at this point, the ADI 115 of the first client application 24c1 transfers this "updated input data in the metric units of measure" from the "cache 1" to the "Application 1", and the "Application 1" transfers this "updated input data in the metric units of measure" directly from "Application 1" to "Application 2" of the second client application 26c1 via operative connection 40 in FIG. 44 without registering that "updated input data" with the server 26c2. The "updated input data in the metric units of measure" is also stored in the database 110 if the "cache 1" was set in the persistant storage state. The "updated input data in the metric units of measure" is received in and temporarily stored in the "cache 2" 121 of the second client application 26c1 in the form of the Data Object 121. The presence of the "updated input data in the metric units of measure" stored in "cache 2" in the form of Data Object 121 of the second client application 26c1 triggers the "function" 122. The "updated input data in the metric units of measure" is transferred from the "cache 2" to the "port 2" 142 of the second client application 26c1; and the converter 142a of the "port 2" 142 will convert the "updated input data in the metric units of measure" into "updated input data in the Canadian units of measure". Since the "function" 122 has been triggered, the "function" 122 will display the "updated input data in the Canadian units of measure" in the window (12b of FIG. 1) of "Application 2" which is being displayed on the second operator's workstation display screen. The second operator viewing the second client application 26c1 can now read the "updated input data in the Canadian units of measure".

Detailed Description

A detailed discussion of the "Application Data Interface" of the present invention in the context of the "Integrated Data Communication and Data Access System" of the present invention is set forth below in the remaining portion of the "Description of the Preferred Embodiment".

Concepts

Introduction

The Application Data Interface (ADI) is a library of routines for interacting with Schlumberger's geoscience database and bulk data storage systems.

The ADI library presents an object-oriented or logical view of all data and, thus, frees the programmer from having to know how or where data is stored. The ADI accesses data objects, which are called *DataItems (DIs)*, and their *Attributes*, which are used to characterize them and their relationships to other DIs. Examples of DIs include Fields, Wells, Arrays, Parameters, Zones, Horizons, and Faults. The Well DI, for example, contains Attributes such as a name, a creation date, and an identifier linking it to a particular Field.

The ADI library provides programmers with the ability to

Figure 45:
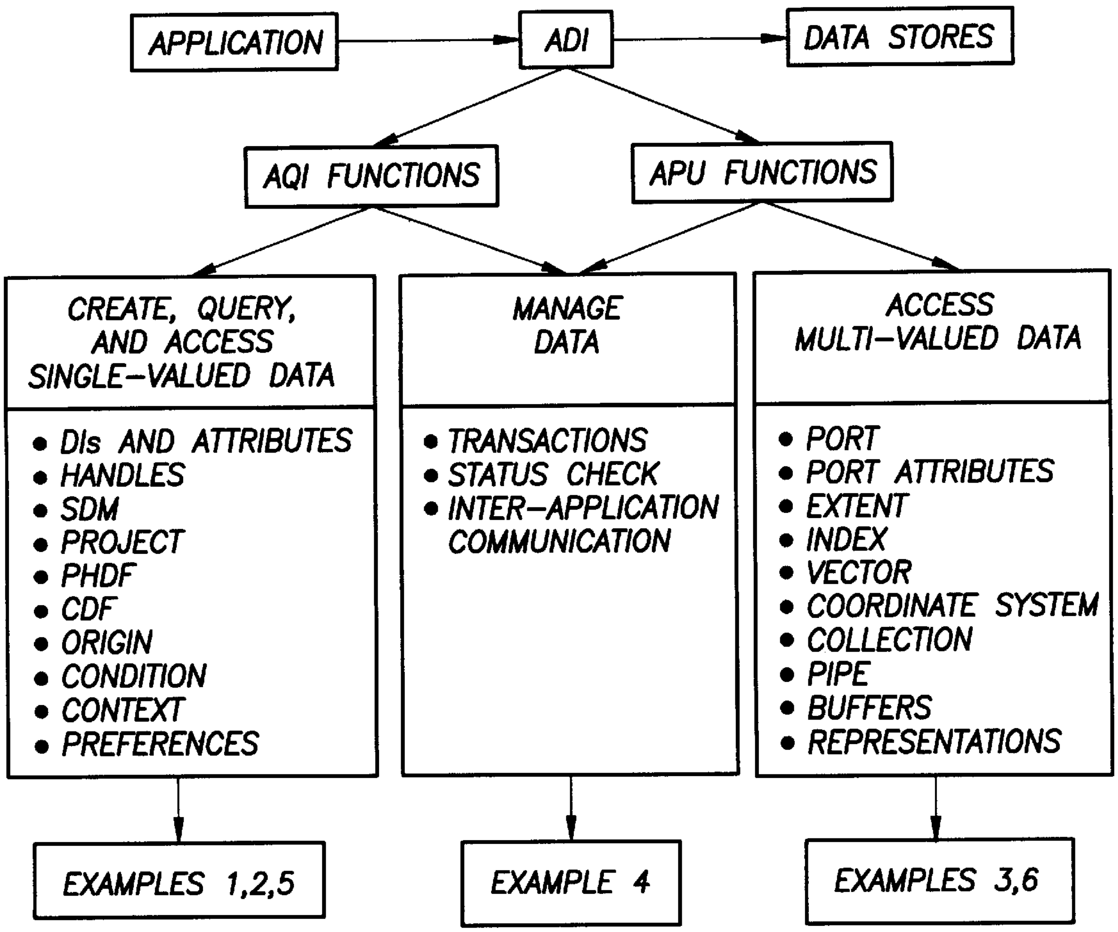

- create, query, and delete DIs and read and write their Attributes
- specify the boundaries within which operations on DIs are to be considered atomic in order to control when modified data becomes visible to others
- perform any meaningful conversion between supported data types, units of measurement and coordinate systems
- specify pre-defined or user-defined resampling and conversion filters that are to be applied to DIs
- determine when DIs have been modified by another program
- lock and unlock access to DIs explicitly in order to control concurrent access . define and add application specific DIs In figure 45, the concepts necessary in order to understand the ADI and how its calls work are shown graphically in figure 45.

As you can see from figure 45, an application uses the set of ADI calls to asccess data in the data stores.

The ADI, in turn, consists of two sets of calls, one to locate data and access single-valued data (AQI functions) and th eother to access more complex multi-valued data (APU functions). A subset of each set of these calls is used to handle data management tasks, such as restricting concurrent access to data, reporting the status of calls made for data, and sharing data between applications.

08834820.043097

Understanding how the data is organized is essential for understanding how the ADI calls locate and access the data. Data in the data stores is viewed as a set of objects called DataItems or DIs and their Attributes. These DIs are actually accessed programmatically via data Handles. The relationships among all these DIs form a hierarchical structure called the Schlumberger Data Model or SDM. Data that is loaded into this SDM hierarchy by a user running an application and that is available to him later is called Project data. A user may establish a data focus (PHDF & CDF, explained later) for this project data, which specifies the rules for searching the project data. ADI search calls use the concept of an Origin to designate where to begin the search and the concept of a Context to specify such information as the unit, coordinate system, and data type of the data. A Condition is also available to further restrict the set of DIs returned by a query. Individual DIs may be marked as Preferred to accelerate searches for them.

For reading and writing more complex, multi-valued data, the concept of a Port has been introduced. A C structure, this Port contains Port Attributes that may be set to specify how the ADI will access the requested data: the Extent of the data to be read or written, what the Index will be used for array or bulk data, how data values (Vectors) will be stored and how they will be sorted, what Coordinate System will be used, what data will be accessed together as a Collection, what Pipe functions will be used to convert the data, and how Buffers will be used to transfer the data. Individual DIs may be created with multiple Representations, such that, for example, the same data for a Surface may be accessed and returned as a grid or as a contour.

ADI calls also allow programmers to specify boundaries within which its Transactions should be considered atomic in order to control when modified data is written to the data stores. Inter-application communication calls allow an application to determine when data has been modified by another application. Also, within each call is a Status Check mechanism that allows programmers to check the call's success or failure.

A more detailed discussion of these concepts is given below, followed by several examples illustrating these concepts.

Data Stores

The geoscience bulk and non-bulk data available to the ADI are stored in an Oracle relational database and associated bulk data files (called Array Data Server or ADS files). The ADI locates data in , reads data from , and writes data to the data stores, performing all the alignment, gating (resampling), filtering, and conversion on this data. The ADI consists of two sets of functions: AQI (Application Query Interface) functions for accessing single-valued data and APU (Application Port Utility) functions for accessing multi-valued bulk data.

DataItems & Attributes

Applications using ADI calls view and access the data in the data stores as a pre-defined set of data objects called DataItems, or DIs for short. Each DI has a set of Attributes that describe it and its relationships with other DIs. These Attributes may be specific to a particular DI or common across DIs, dictionary-controlled, with values of a fixed data type and a mixture of read-only and read-write (duplex) type. Together, a DI and its Attributes may be thought of as a single logical structure, since it may be assembled by the ADI from the different physical storage resources. The Well DI is shown below with several of its associated Attributes.

DI = Well

| *Attribute Name* | *Data Type* | *Comment* |
|---|---|---|
| Id | Int32 | Read |
| Name | String | Duplex |
| Container_Id | Int32 | Duplex |
| Create_Date | String | Duplex |

Handles for Creating & Accessing DataItems

From a programming point of view, DIs (and their Attributes) are actually accessed via handles. The ADI's AQI functions are used to create, delete, and query DIs and read and write persistent attributes of the DIs. An AQI call that creates a new Well DI, for example, will return a handle to the DI. This handle can then be used as part of other calls to perform such operations as setting the value of its Name or Create_Date Attributes. In the following abbreviated example, a data handle called WellDataHandle is returned by the call aqi_CreateDI to create a new Well DataItem. This handle is then used as an argument by the call aqi_PutAttributes to specify its Name.

```
WellDataHandle = aqi_CreateDI (Well...)
aqi_PutAttributes  (WellDataHandle...)
```

Or suppose that there are defined DIs called Field and Well, and that there are many wells in a field. An application could make an AQI query for all the wells in a field, then use the returned handle to make another call to get the value of the Well Name attribute of a particular well. Other AQI functions are provided that can be used by applications to lock and unlock DIs to access. These functions, prefaced with AQI (Application Query Interface), are presented later.

Schlumberger Data Model

The DIs and their relationships to one another make up a hierarchical structure called the Schlumberger Data Model or SDM. As one example, the SDM allows many gamma ray arrays to be associated with a single well and many wells to be associated with a single field. These relationships are represented hierarchically by a Field DI, which can contain many Well DIs, which in turn can contain many Array DIs. DIs such as Field or Well that may contain other DIs are called Component DIs. All other DIs are called non-Component DIs. In the AQI query call, a Component DI may be used as the reference point for locating data. A particular Field DI could, for example, be specified to retrieve all of the Wells it contains. A Non-Component DI may also be used.

Figure 46:
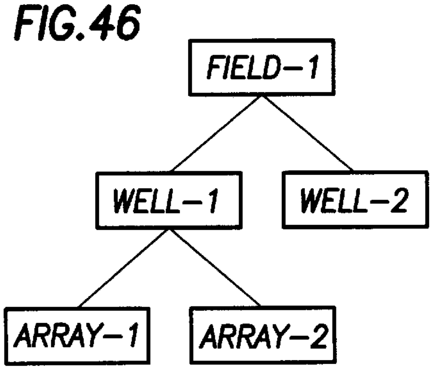

Refer to figure 46.

A number of intermediate abstract classes of DIs also exist and serve to group DI instances. For example, a Dense_Array DI is an abstract class of DIs that is used to represent types of indexed buik data, such as Array, Grid, and Mesh. A query on the abstract Dense_Array DI can then be used to return instances of Array, Grid, and Mesh DIs.

Figure 47:
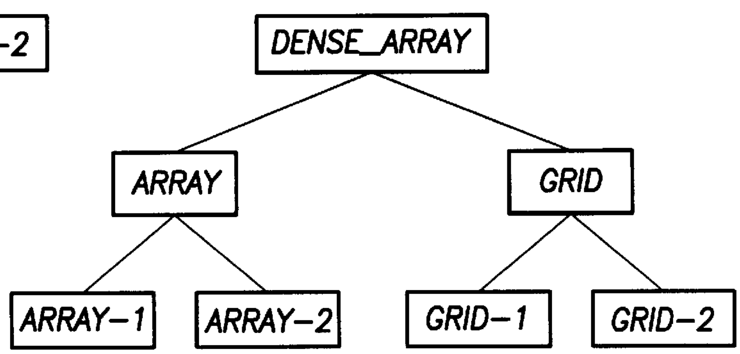

Refer to figure 47.

08984805 .043087

Some DIs, which may be referred to as intersection DIs, may be contained in multiple DIs. For example, because a well marker may occur at the intersection of a wellbore and a horizon, the Well marker DI must, thus, be contained in a wellbore DI and a horizon DI, as figure 48 indicates.

Figure 48:
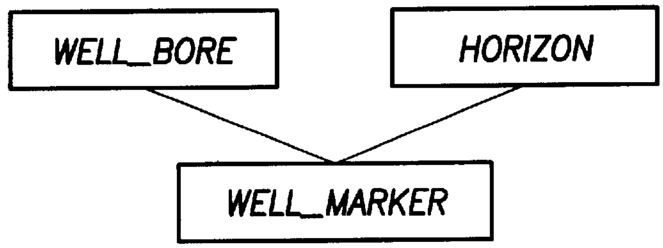

Refer to figure 48 for an example of intersection Dataitem (DI) relationships.

Intersection DIs that are contained in multiple container DIs will have read-only container attributes that explicitly point to their container DIs. An intersection DI could subsequently be used in an AQI query call as a reference point for locating data. For example, Well_Marker could be specified to retrieve all the properties from container DIs like Well_Bore and Horizon above it.

Project

After data is loaded by a user into the system's data stores with a loading application, this data is then accessible via the ADI as a set of related DIs to the other applications that this user selects and runs. The collection of data loaded, created, or updated is associated with a particular database account and is called a Project. This distinct Project data is only available to those users who have access to the Project account.

Process History Data Focus

For the purpose of establishing a data context for a particular application, a number of DIs associated with a Project may be collected together into a set called a Data Focus. In a typical working session, a user will link together a sequence of applications to accomplish a particular task.

Figure 49:
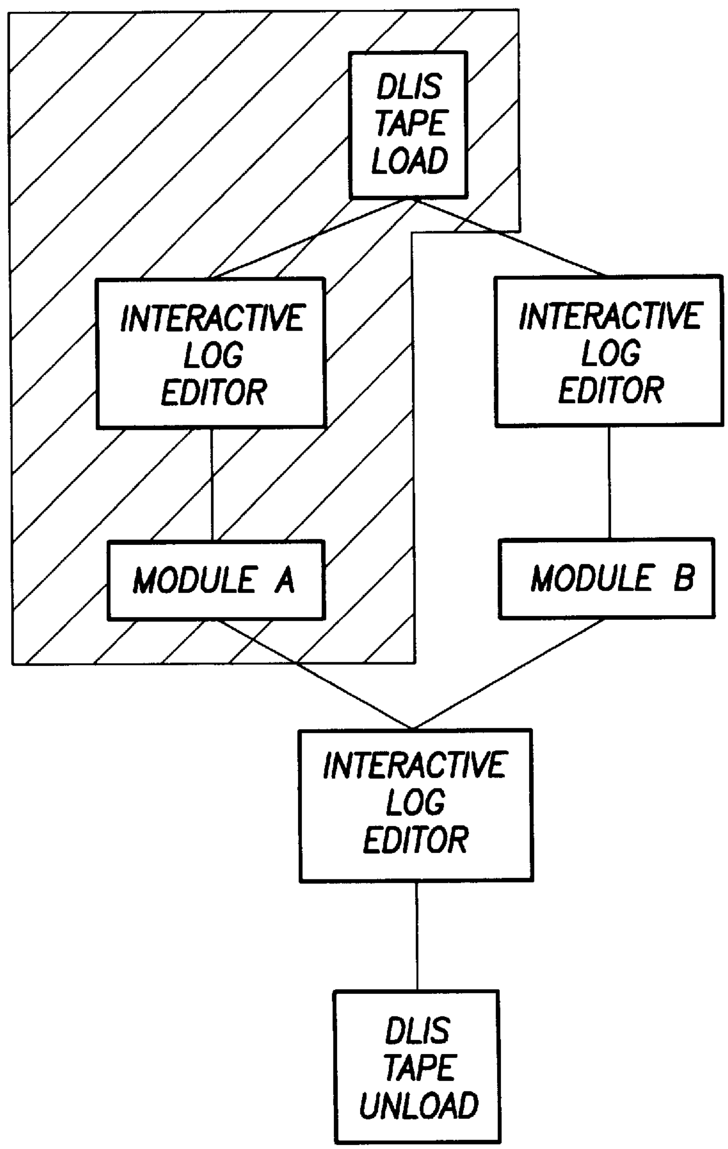

Referring to figure 49, an example of one sequence of applications is shown in figure 49.

The user has the capability to use data in different branches of the sequence, perform processing using different parameter settings or even different applications, and combine elements from both processing branches in the sequence for the final output. The sequence that the user establishes provides what is called a Process History Data Focus or PHDF. This PHDF is actually an ordered collection of DIs called Module_Run DIs, and all other DIs associated with these Module_Runs. The PHDF for the application called Module A is shown inside the shaded area above. When a user makes a query, the ADI searches Module A's PHDF, the highest precedence goes to the DIs associated with the application immediately preceding Module A, and the lowest precedence to the DIs associated with the application furthest away. The DIs referred to in each application are also ordered with outputs having a higher precedence than inputs.

Component Data Focus

Each Module-Run DI may also have a what is called a Component Data Focus or CDF associated with it. Also set by the user, the CDF is a collection of those DIs that are contained in the component DI specified as the CDF.

Figure 50:
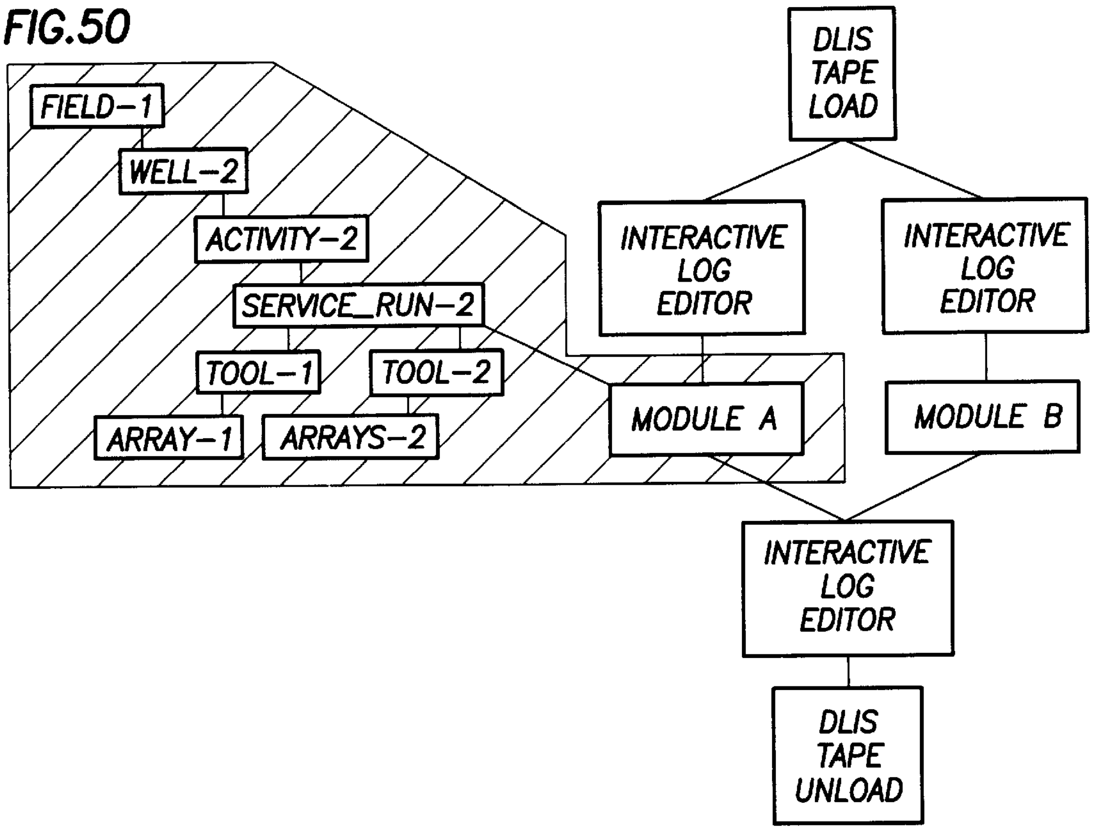

Referring to figure 50, for example, suppose the Service_Run DI called "Service_Run-2" is defined as the CDF, as shown by the shaded area in figure 50.

The CDF will then contain all the DIs lower in the component hierarchy (in this case, Tool-1, Tool-2, Array-1, and Array-2) and only those DIs higher in the component hierarchy of which the Service_Run-2 DI is considered to be a component (in this case, Field-1, Well-2, and Activity-2). The search then is first up, then down.

08984205.043097

Finer Granularity for Data Focus

Figure 51:
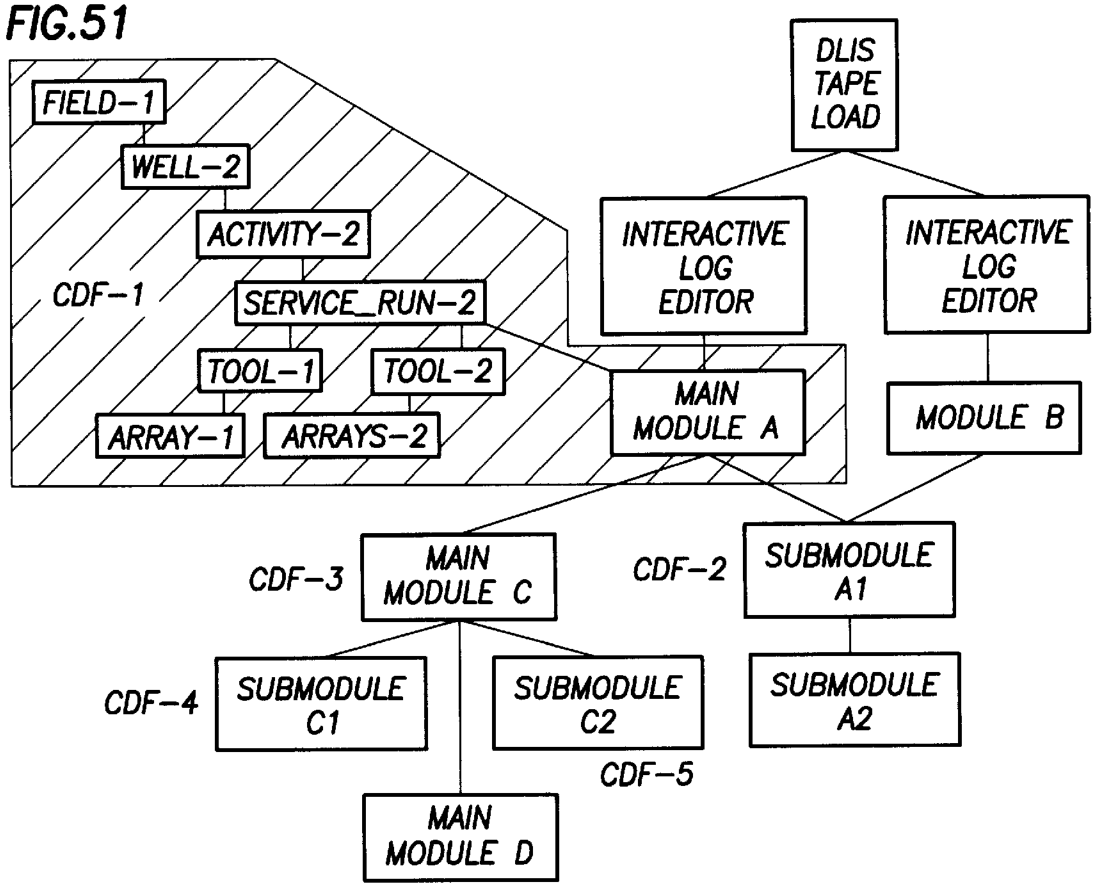

Referring to figure 51, an example of a more complex Data Focus is illustrated.

Finer granularity for the Process History Data Focus (PHDF) is allowed by what are called "Sub Module_Runs". A Sub Module_Run is a Module_Run DI where the attribute called "Super_Module_Run" points to some other Module_Run.

Main Module A has 2 subordinate modules, Sub Module A1 and Sub Module A2. Thus, the attribute Super_Module_Run for the 2 sub modules is set to point to Main Module A. Main Module C also has 2 subordinate modules, Sub Module C1 and Sub Module C2. The 2 sub modules also have the attribute Super_Module_Run set to point to Main Module C. Main Module A and Main Module C represent applications that might be created by a central process manager. Sub Modules A1, A2, C1, and C2 represent subprocesses created by these main applications.

The CDF may be set specifically for each of them, indicated in the figure by CDF-n alongside the appropriate module, or it may be inherited from the preceeding module. Thus, Main Module A has a CDF as CDF-1, Sub Module A1 has a CDF set as CDF-2, Sub Module A2 has a CDF as that for Sub Module A1, and so on.

The following table specifies what the CDF & PHDF is for each of the modules.

| Module | CDF | PHDF |
| --- | --- | --- |
| Sub Module A2 | CDF-2 | A2,A1,A,ILE,DLIS |
| Main Module A | CDF-1 | A,A1,A2,ILE,DLIS |
| Main Module C | CDF-3 | C,C1,C2,A,ILE,DLIS |
| Sub Module C2 | CDF-5 | C2,C,A,A1,A2,ILE,DLIS |
| Main Module D | CDF-3 + CDF-4 + CDF-5 | D,C,C1,C2,A,A1,A2,ILE,DLIS |

It should be noted that the origin for a subordinate module can be any valid container, namely any valid container for its predecessor module. For example, Sub Module C1 could have its Super_Module_Run attribute point to Well-2.

Origin

An Origin or list of Origins can be thought of as a mechanism used by the ADI to define where to search for a particular DI. As the first argument of the ADI's query functions (aqi_Query & aqi_Select), the Origin may be

- NULL, in which case the ADI searches the entire SDM hierarchy and, thus, the entire data stores associated with a particular project.
- a Component DI, in which case the ADI searches only the DIs in the SDM hierarchy it contains, as well as those DIs higher in the component hierarchy of which the specified Component DI is considered to be a component.
- a Module_Run DI associated with an application, in which case the ADI searches the Data Focus of the Module_Run DI. This Data Focus will include all the DIs associated with the processing history of the applications that have been run, then the DIs associated with the CDF. For more information about how Data Focus works, see the section above on Data Focus.
- a list of DIs, in which case the ADI has a list of starting points for its search through the SDM.
- a Non-Component DI, such as an Array, in which case the ADI searches up the SDM hierachy once when looking for Component DIs and down in the SDM hierarchy once when looking for Non-Component DIs.
- an abstract class DI, such as Dense_Array, in which case the ADI searches down the SDM hierarchy once when looking for DIs belonging to this class of DIs, in this case Array, Grid, Mesh, and so on.

Origin &Type

The use of Origins and the type of DI desired provides for some very simple queries.

- To find all of the porosity arrays in a field, query for Array DIs, specifying the attribute to identify them as porosity arrays, and using a Field DI as the Origin. This will find the data by looking down the component hierarchy.
- To find all of the porosity arrays in a well, query for Array DIs, specifying the attribute to identify them as porosity arrays, and, using a Well DI as the Origin. This will find the data by looking down the component hierarchy.
- To find the well for a particular porosity array, query for a Well DI with no attribute qualifiers, using the Array DI as the Origin. This will find the data by looking up the component hierarchy.

Let's take a more specific example. Here's a sequence of ADI calls to get the name of a particular well.

- Locate the Field called "MyField". Using the terminology of the ADI, get a data handle to the DI Field whose Attribute Field_Name is "MyField". The beginning NULL implies an unfocused query, and the entire data stores are searched for the DI type.

```
Fieldi = aqi_Query (NULL, qField, &Status, qField_Name,
                    "MyField",NULL);
```

- Locate all the Wells associated with this Field. In ADI terms, get a data handle to the DI Well instances associated with the Field "MyField".

```
Welli = aqi_Query (Field0, qWell, &Status, NULL);
```

- For this list of Wells, get their Well Names. In ADI terms, return the value of the Attribute Well_Name of the DI Well instances.

```
for (i=0; nwells)
aqi_GetAttributes (Welli, &Status, qWell_Name, &Name, NULL);
```

- Now locate all the arrays, grids, and meshes associated with this Field. In ADI terms, get a data handle to the DI instances by querying on the abstract class DI called Dense_Array, which itself refers to all Array, Grid, and Mesh DIs.

```
DIList = aqi_Query (Field0, 0, qDense_Array, &Status, NULL);
```

Condition

A Condition further restricts the set of DataItems returned by a query (see the call aqi_Select). The condition is a combination of DataItem attributes, operators, and values that evaluates to either TRUE or FALSE. For example, a query could be restricted to DataItems where its Code attribute = 'GR' (Gamma Ray) and the Create_Date attribute < '30-July-92'. A derived attribute can also be used as part of a Condition, when the attribute can be reduced to its base relational attributes.

Sorting

The default ordering of DIs returned by a query is derived from the Origin or derived from a programmer-supplied ordering (e.g., Sort on DI Well's Create_Date Attribute). A programmer-supplied ordering will completely override ordering based on the Origin. Sorts can be made on any string or numeric valued Attributes and can be either ascending or descending.

Preferences

A user may mark individual DataItems as Preferred. DataItems marked as Preferred have priority over other unmarked DataItems. Preferences provide a way to override the default ordering of return values from queries, which is based on the distance from the specified Origin, and to access quickly all of the preferred DataItems associated with a well or other entity.

Preferences are handled with a Query_Preference (QP) DataItem. A QP DataItem is contained in some other entity (e.g., Region and Well) and has a set of preferred DataItems. The user tags a DataItem as preferred by adding the DataItem to the QP's preferred list. A search based on preferences is simply a partial ordering of the default search behavior normally associated with a specific type of Origin. One restriction: the QP DataItem can not have DataItems that cannot be found via a normal search from the container of the QP. Running with or without preferences results in several search options:

- Run without preferences. This implies normal search behavior based on Origin.
- Run with preferences. This implies normal search behavior except that preferred DataItems have priority over non-preferred DataItems base on the same Origin.
- Run with preferences only. This implies that the query functions only return DataItems if they are preferred. With this option, batch applications would have to include its outputs in a new QP DataItem.
- Include QP DataItems in the Component Data Focus (CDF). The search strategy associated with a QP DataItem returns DataItems that are in the QP's set of preferred DataItems. This may be a useful mode in multi-well studies.

Following are three examples of running with preferences. In the first example, there are three wells in the data domain. Each well has a sub-hierarchy of DataItems and Attributes. Each well also has a QP DataItem. Each QP Dataitem references a set of preferred DataItems and Attributes (GR-2, GR-4, GR-5) that can be found in the associated well.

Figure 52:
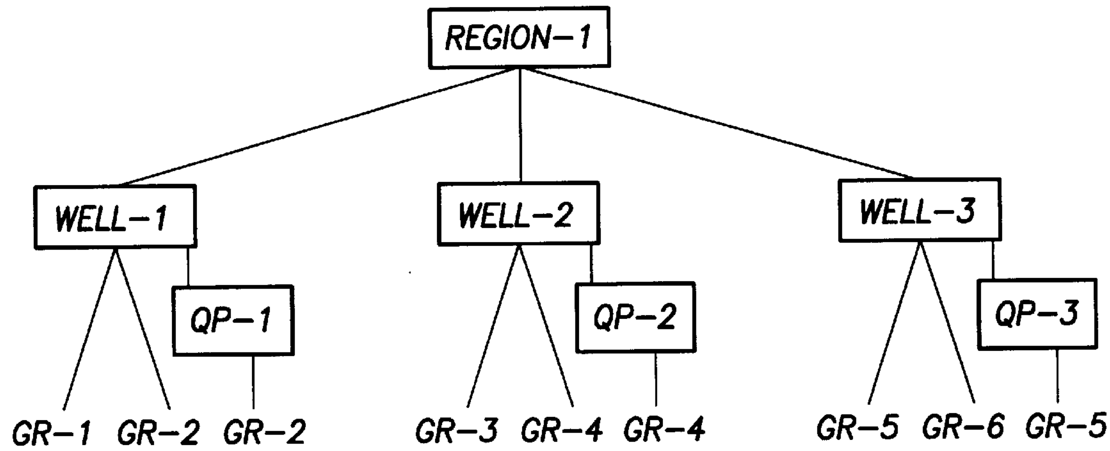

Referring to figure 52, three examples are illustrated pertaining to running with preferences. In the first example, there are three wells in the data domain. Each well has a sub-hierarchy of DataItems and Attributes. Each well also has a QP DataItem. Each QP DataItem referenecs a set of preferred Dataitems and Attributes (GR-2, GR-4, GR-5) that can be found in the associated well.

Figure 53:
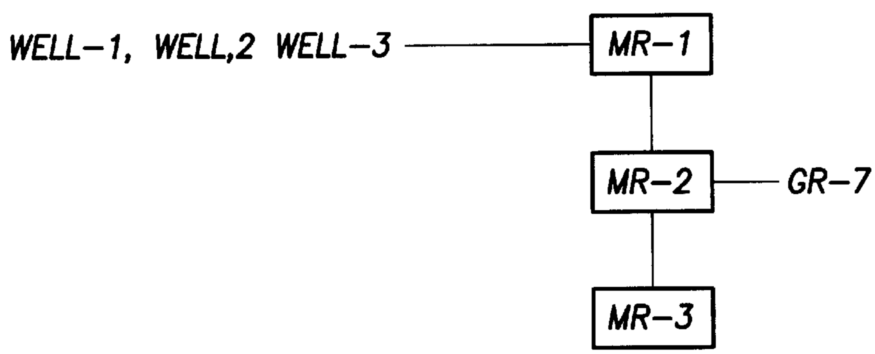

Referring to figure 53, a chain of Module-Runs with three wells as CDF is illustrated. Figure 53 shows a chain of Module_Runs with the three wells as a Component Data Focus. DataItems in the PHDF (GR-7) still have precedence over DataItems in the CDF. Preferences in the history focus may be generated by binding QP DataItems to individual Module_Runs.

Figure 54:
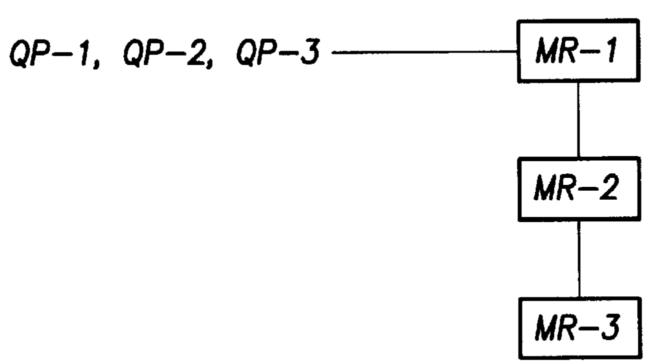

Referring to figure 54, a chain of Module_Runs with three Query_Preferences as CDF is illustrated. Figure 54 shows a chain of Module_Runs with three QP DataItems as the CDF. Note that only preferred DataItems will be retrieved from the CDF.

08874825.042697

Context

The Context DataItem is provided to control the context in which an application executes. Attributes to this DataItem include data type (ValueType), Unit, and Coordinate System. In the absence of a Context DataItem, default or storage ValueTypes, Units, and Coordinates are used.

When the ADI is initialized, it will instantiate a system's default Context DI with default values and store it internally. Applications can access the handle to the system's Context DataItem and, thus, change these default values by calling the aqi_GetDefaultContext and aqi_PutDefaultContext functions.

Applications can also specify an optional Context with some ADI accesses. Access calls such as aqi_CreateDI, aqi_GetAttribute, aqi_PutAttribute, aqi_Select, and aqi_SelectAttributes have a Context argument. If contextual information is required by the call but is not specified in the call, then the system Context is used.

A user can determine which attributes of a DataItem are convertible by calling the function aqi_GetAttributeNames where the argument AttributeType = ATTR_UNIT_CONVERTIBLE or ATTR_COORD_CONVERTIBLE.

The attributes in the Context DataItem are used as follows:

- Project Attribute points to the Project DataItem, which specifies attributes for the Project such as Coordinate Systems and Unit Systems. For example, when creating a DI, the ADI will determine what units and coordinate system to use for the storage from the Storage_Unit_System and Storage_Coordinate_System attributes of the Project DataItem.
- Default_Port Attribute specifies the default attributes for a Port, describe later and used for accessing bulk data associated with a multi-valued DI.
- Computation_Unit_System_Id specifies the unit system to use during access via calls like aqi_GetAttributes and aqi_PutAttributes involving unit conversion.
- Computation_Coordinate_System_id specifies the coordinate system to use during access via calls like aqi_GetAttributes and aqi_PutAttributes involving coordinate conversion.
- Numeric_Value_Type specifies the data type of numeric values to use during access via calls like aqi_GetAttributes and aqi_PutAttributes involving data type conversion.

Dictionary DataItems

The AQI functions can also be used to access information in the ADI's dictionaries by acessing the DIs associated with these dictionaries (now called Catalogs). For example, to get the codes from the Array Catalog, a user could use the following calls:

```
aqi_SelectAttributes (NULL, 0, qArray_Cat, NULL, &Status, NULL,
qCodes, &allCodes, NULL);
```

To get the Shape from the Array Catalog for an Array whose Code=GR and Contractor=SLB:

```
DI = aqi_Query(NULL, 0, qArray_Cat, &Status, qCode, "GR", qContractor,
"SLB", NULL);

aqi_GetAttribute (DI, NULL, &Status, qShape, &Shape, NULL);
```

or

```
aqi_SelectAttributes (NULL, 0, qArray_Cat, NULL, qCode, "GR",
qContractor, "SLB", NULL, qShape, &aShape, NULL);
```

Zone Interval DataItems

As the name implies, the Zone_Set DI defines a set of zone boundaries and lengths. A Zone_Interval DI defines one of these pair of values, a starting depth and length for a zone. A Zone_Interval DI can be created for each of these zone intervals, with an additional attribute pointing to the Zone_Set DI collecting these Zone_Interval DIs together. This is actually what the ADI does when when a Zone_Set is created. The attributes of the Zone_Interval DIs may, then, be accessed individually or accessed directly from the Zone_Set DI, as illustrated below.

```
aqi_GetAttributes (ZoneSet, &Status,
                   qZone_Start, &Starts,
                   qZone_Length, &Lengths, NULL);
```

or

```
ZoneIntervals = aqi_Query (NULL, 0, qZone_Interval, &Status
                                   qZone_set_Id, ZoneSetId, NULL);
ZoneIntervalA = vt_Nth (ZoneIntervals, 0);
aqi_GetAttributes (ZoneIntervalA, &Status),
                   qZone_Start, &Start),
                   qZone_Length, &Length, NULL);
```

The Zone_Interval DI does not have to be contained in a Zone_Set, but may instead be contained in any container DI like Well.

APU Functions & Accessing Bulk Data

The ADI's APU functions are used to read and write multi-valued attributes of DIs where more complex access is required. The value may be thought of as a special attribute of the DI. For example, for a multi-valued, bulk DI such as Array, an application might want to specify a beginning extent, interval between consecutive values, count of how many values to access, along with any filtering or units or coordinate conversion to perform on the values. The application uses the APU functions to accomplish such access. Other APU functions are provided that can be used by applications to lock and unlock DIs to access and to send notification when a DI has been changed. These functions, prefaced with APU (Application Port Utility), are presented later.

Port

Accessing bulk data values of DIs like Array requires the use of a mechanism called a Port.

A port is an opaque handle that can be used to access associated structures. It is a special type of file handle where the handle itself contains all the information to access the data. For example, one of the elements of the port structure will specify the DI to be accessed by the port. The port is dynamic and is procedurally created and manipulated by the application at run time. From the application programmer's point of view, the general steps to access the data using the port mechanism follow:

- Use the aqi_Query call to get the DIs whose data is to be accessed.
- Open a port and specify its DI. Optionally set up the pointers for the secondary index extent structures.
- Use the handle to the port for all subsequent reads and writes. The ADI will decode what the application has specified as the values of the port structure and satisfy the application's request based on these values.
- Close the port.

There are some important principles to remember when using ports. An application can optionally have many ports. A port can reference one and only one DI. A DI can be referenced by more than one port. Each port can optionally have many extents. An extent specifies what values are returned--for example, the beginning value, the interval between consecutive values, and how many values to return. Each extent can optionally belong to many ports or be referenced by many read/writes. Each port may have an optional buffer for read/writes. An application can optionally have many read/writes active at the same time, but to different ports. Each read/write must have one port. Each read/write can have an optional buffer.

Using the comparison of a port to a C structure, the port then contains a pointer to a DI. The extents are secondary structures associated with the port. These structures are used by the application to specify the index--that is, which elements of the DI are to be accessed. The buffer is an optional pointer that the application can set in the port structure. If set, this is the buffer that will be used to pass data between the application and the ADI. The buffer may be associated with the read/write operation rather than the port.

Port Attributes

Attributes in the ADI's APU functions may be considered as elements of the port structure and describe the behavior of a port. These attributes exist only as long as the Port exists. The attributes that an application programmer may set are:

- BulkAttributes: list of bulk attributes which are to be accessed from the port. A value of NULL implies the default value for the DI attached to the port.
- VectorFormat: the structure of the data. A value of NULL implies the format is APU_UNPACKED for fixed size values and APU_UNPACKED_PTR for variable size values.
- IndexSorts: the type of sort to apply and what are the indexes. A value of NULL implies the default Index and Sorts for the DI attached to the port.
- CoordinateSystem: the coordinate system for the data. If not specified, it defaults to the coordinate system attribute of the DI attached to the port.
- Units: the units requested for the data in the application. If not specified, it defaults to the unit attribute of the DI associated with the port.
- ValueType: the type of data in the application. If not specified, it defaults to the data type of the DI associated with the port.
- GateFunction: the gate or resampling function performed on the data. Default is Linear One Point Interpolation Gate.
- FilterFunction: the filter function performed on the data. Default is none.
- ConversionFunction: the user conversion performed on the data. Default is none.
- Extents: of type apu_Extent_t, the extent of the data that the programmer is interested in when doing a read/write.
- ReturnExtents: the container of the actual data read at the completion of a port read operation. This extent has to be allocated and set by the application.
- IndexMajor: TRUE/FALSE, default is FALSE. Values are normally stored in IO Buffers in "port-major" order--namely, all values for one port before any values of the next port. If IndexMajor is TRUE, values are stored in "first dimension major" order—namely, all values corresponding to the first value of the first dimension (typically the grow dimension or primary index dimension) before any values for the second value of this dimension.

- IndexOrdering: the ordering of data for the port. Of type Int32L_t. Default is NULL, implying no index ordering. The values of this attribute specify a permutation of the dimensions of multi-dimensioned DIs bound to the port. For example, (0 1 2) specifies normal ordering for a 3D array, with dimension 0 varying most rapidly, and dimension 2 least rapidly. It is equivalent to specifying NULL for IndexOrdering. In contrast, (1 2 0) specifies that data for the port is ordered with dimension 1 varying most rapidly, and dimension 0 varying least rapidly.
- IOBufferAddress: the address of buffer data or pointer to buffer data if IndirectBuffer is TRUE. The programmer must declare all variables that will be updated as a side effect of an IO operation as volatile, so that the Optimizer does not optimize away any code with those variables.
- SysAllocatedBuffer: the system-allocated buffer for the programmer. TRUE/FALSE, default is FALSE. TRUE implies that the system will allocate the Buffer for the programmer. This only applies for reads.
- IndirectBuffer: TRUE/FALSE, default is FALSE.
- IndexTranslator: the Index DI that may be used to map the values of an Array using the values of another Array as an Index. Default is none.
- PortIdentifier: the name for the port. Default is none.

Extent

The apu_Extent_t attribute of a port is used to define the extent of data a programmer is interested in when doing a read or write. The apu_Extent_t has itself 5 major attributes for defining the data access extent:

- Begin: the beginning value of the extent. This may be expressed in any units. If it is specified to be APU_BEGIN_OF_DATA or APU_END_OF_DATA respectively, then the first and/or last defined data value is returned. If APU_MOST_RECENT is used, the most recent value is returned.
- Interval: the interval between consecutive values. This should match the Begin units and is always a positive number.
- Count: an integer number that specifies how many values to access. This could be negative to imply Count values before Begin are to be accessed. In a typical log interpretation application, up-logged data would be accessed by setting Begin equal to the deepest depth and using a negative Count and AutoIncrementCount.
- AutoIncrementCount: an integer that specifies by how many Counts to increment the Begin value after an access operation. This is designed to facilitate the next read/write. This could be negative. The Begin attribute is updated by the AutoIncrementCount interval at the completion of the read/write.
- ExplicitIndexArray: an array containing the values of the index at which explicit access is desired. This will point to the element in the array starting from which Count Index values are to be read. If the Count is +ve, the Explicit Index values are read in the increasing address space; if the Count is -ve, the Explicit Index values are read in decreasing address space.
- OptionsMask: a mask for the extent options.

These 6 attributes control whether access is defined implicitly or explicitly. For implicit access, Begin, Interval, and Count must be specified. For explicit access, Interval is undefined, and Count and ExplicitIndexArray are used to specify the extent. The ExplicitIndexArray takes precedence over the Begin and Interval.

The apu_Extent_t also has 3 other attributes: ValueType, Units, and Coordinate-System. These specify how to decode the Begin, Interval, and ExplicitIndexArray values.

Extent for Parameter & Zone_Set DIs

Figure 55:
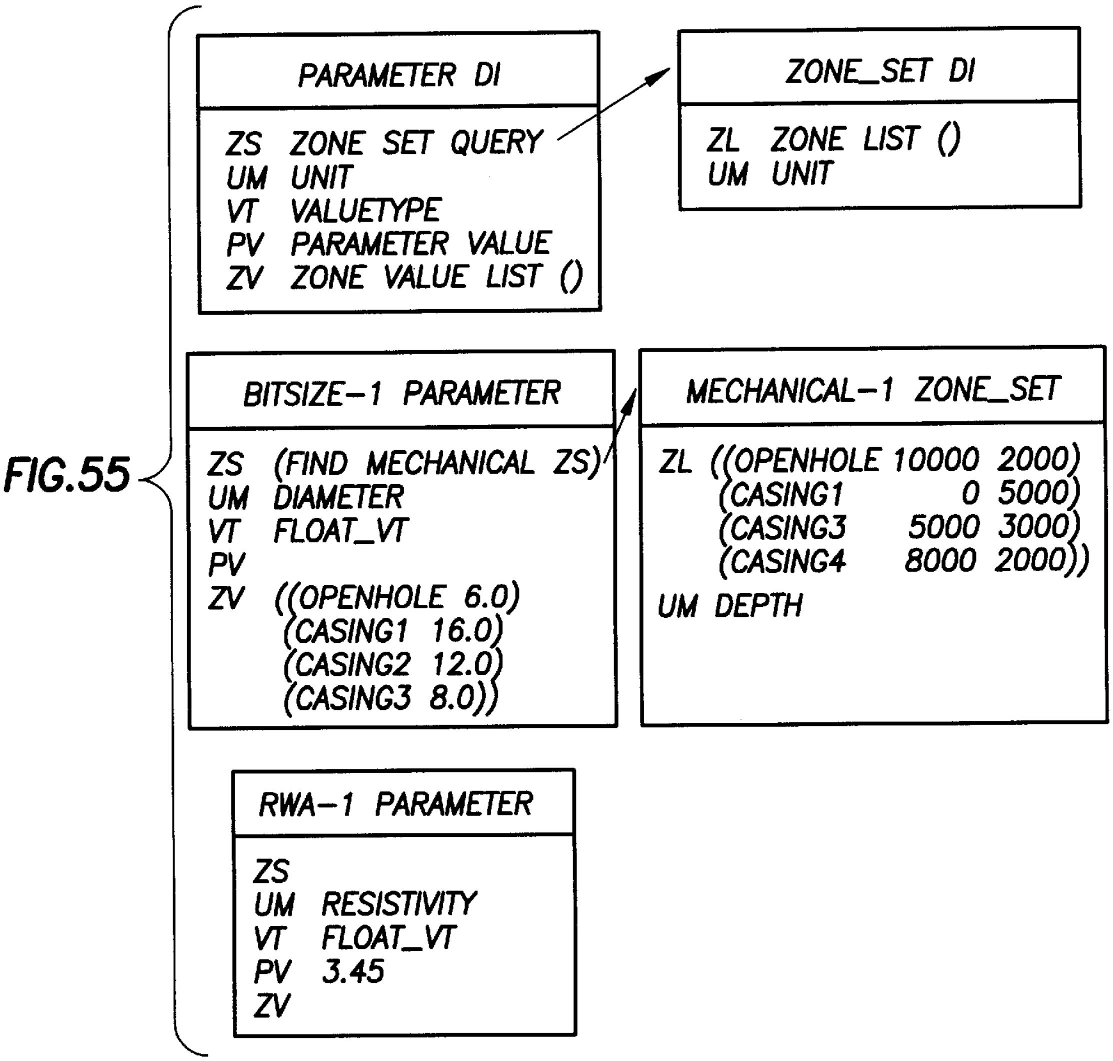

Referring to figure 55, an example of Parameter & Zone_Set Extents is illustrated.

In figure 55, in order to better understand how extents work, lets consider how the ADI handles the non-component DataItems (DIs): Parameter and Zone_Set. The attributes discussed in figure 55 for these DIs are abstract to illustrate their relationships more easily.

A Parameter is a DI whose values are constant over a defined set of intervals. A Parameter may be either zoned or non-zoned. For non-zoned Parameters, PV must be defined. A Parameter can be converted from non-zoned to zoned and vice-versa. For a zoned Parameter, ZV and ZS must be defined. ZV is a list of zones and zone values: ((Zone ZoneValue)...). ZS points to a Zone_Set.

A Zone_Set provides a list of the relationship between a zone name and zone boundaries. There is one entry in ZL per zone interval of this form: ((Zone Zone_Start Zone_Length) . . . ).

A Zone_Interval is defined as one pair of values, a starting depth and length for a zone. A Zone_Interval DI can be created for each of these zone intervals with a Zone_Start and Zone_Length, with an additional attribute pointing to the Zone_Set DI containing the Zone_Interval DIs. This is actually what the ADI does when when a Zone_Set is created. The attributes of the Zone_Interval DIs may be accessed individually or accessed from the Zone_Set DI.

Port extents that might be created for these DIs with the apu_CreateExtent-FromDI call, for example, are shown below.

| DI | ValueType | Begin | Interval | Count | ExplicitArray |
|---|---|---|---|---|---|
| Mechanical-1 | String | "Casing1" | "" | 4 | ("Casing1", "Casing3", "Casing4", "OpenHole") |
| Mechanical-1 | Float32 | 0.0 | 0.0 | 5 | (0.0, 5000.0, 8000.0, 10000.0, 120000.0) |
| BitSize-1 | String | "OpenHole" | "" | 4 | ("OpenHole", "Casing1", "Casing2", "Casing3") |
| BitSize-1 | Float32 | 0.0 | 0.0 | 5 | (0.0, 5000.0, 8.000.0, 10000.0, 120000.0.) |
| RWA-1 | NULL Extent is returned for unzoned parameters | | | | |

Extent for Array & Index DIs

Figure 56:
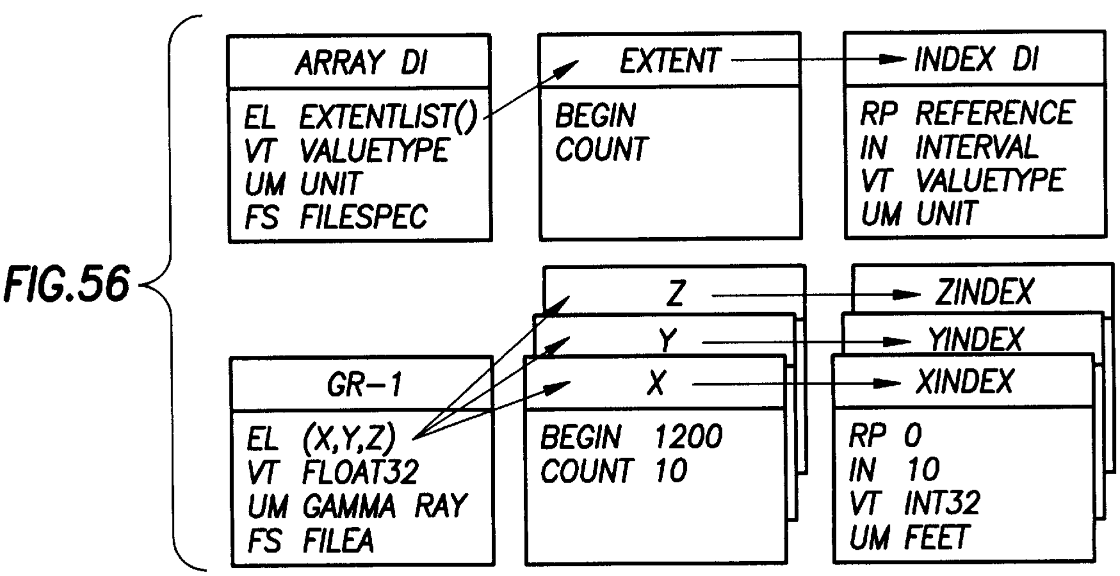

Referring to figure 56, an example of Array & Index Extents is illustrated.

In figure 56, attributes for Array and Index DIs are abstractly presented in figure 56.

An Array defines an N-dimensional set of values, where each dimension of the Array has an Index and an Extent. The Index defines the grid. The Extent defines for which part of the grid the values of the Array are specified. In an explicit index a finite set of values are specified. An implicit index with an infinite ordered set of values is defined by a Reference Point RP and an Interval IN. Thus, if RP=0 and IN=1, then the values could be the set (...,-2.0,-1.0,0.0,1.0,2.0,...).

The example above shows an Array with an Implicit XIndex and YIndex and an explicit ZIndex. XIndex has a RP of 0 and IN of 10, YIndex has a RP of 0 and IN of 100, and ZIndex has the following values: (0.0,0.2,1.0). Port extents that may be created for these DIs with the apu_CreateExtentFromDI call, for example, are shown below.

| DI | ValueType | Begin | Interval | Count | ExplicitArray |
|---|---|---|---|---|---|
| XIndex | Int32 | 0 | 10 | 0 | NULL |
| YIndex | Int32 | 0 | 100 | 0 | NULL |
| ZIndex | Float32 | 0.0 | 0.0 | 11 | (0.0,0.2,1.0) |
| GR-1/Dim0 | Int32 | 1200 | 10 | 10 | NULL |

Extent for SubArray

Figure 57:
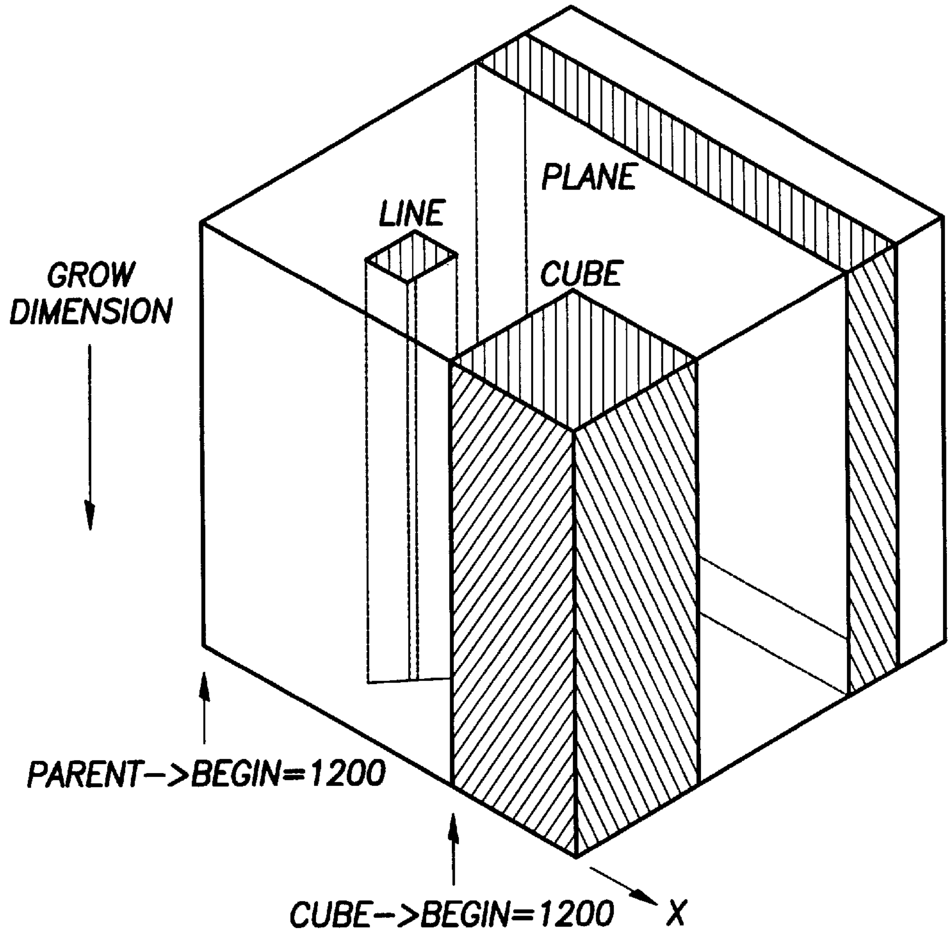

Referring to figure 57, an example of a SubArray is illustrated.

In figure 57, a SubArray is a view of a Parent Array and represents part of this Parent Array. Consider the cube shown in figure 57.

The difference between accessing the SubArray and accessing the Parent Array lies in the number of extents that must be specified. A one-dimensional array (Line) requires only one extent. Likewise, Plane and Cube require 2 and 3 extents respectively. Also, the positions of the first element of the extents for SubArrays is always zero (0) or the associated Index Reference Point. Above, where the Parent'a first element (Begin) is 1200 along X, the Cube SubArray's first element is 0 along X. The ADI will internally determine how to map the Cube to the appropriate offset in the Parent.

Simple Extent Example

To illustrate how the ADI uses ports and attributes, let's suppose we have a 1-dimensional array of gamma ray values indexed by borehole depth. This would actually be represented internally by two DIs: an Array DI and an Index DI related to it.

| Index Depth | Array Value |
|---|---|
| 1200 | 888 |
| 1210 | 670 |
| 1220 | 110 |
| 1230 | 79 |
| 1240 | 99 |
| 1250 | 81 |
| 1260 | 83 |
| 1270 | 131 |
| 1280 | 157 |
| 1290 | 66 |
| 1300 | 13 |
| 1310 | 55 |

1 To access values from depth 1200 to 1250 of Array A, create a port for Array A.

```
DI_Handle = aqi_Query (Array A)
Port = apu_OpenPortByDI (DI_Handle)
```

2. Then, create the user extent for the port and set the port attributes in the way you want your reads: in this case, so that Count=5, BeginValue=1200, Interval=10, and AutoIncrementCount=5 (used for subsequent reads).

```
Extent = apu_CreateExtent()
apu_SetAttributes (Port, Extent);
```

3. The first read will return 5 values (Count=5), beginning at depth 1200 (Begin-Value=1200), at an interval of 10 (Interval=10), or values (888, 670, 110, 79, 99). The second read will return the next 5 values (81, 83, 131, 157, 66). And so on.

```
apu_Read (Port)
```

Note that the extent need not be specified as a port attribute—it can also be passed directly to the apu_Read.

Figure 58:
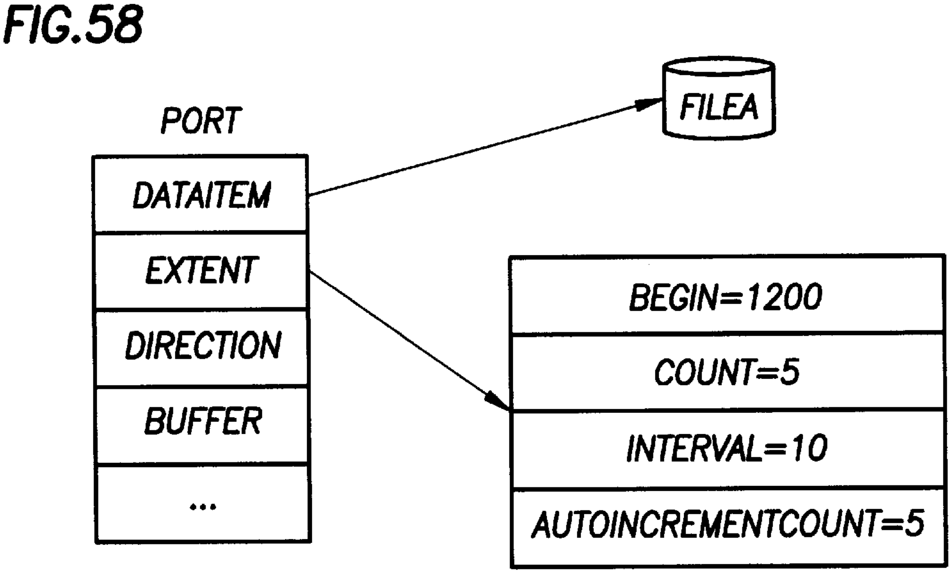

Referring to figure 58, an example of Indexed Access is illustrated.

In figure 58, conceptually, this is how it might look.

If a different extent were specified, say, Count=5, BeginValue=1200, Interval=5, AutoIncrementCount=5, the first read would return values at depths 1200, 1205, 1210, 1215, and 1220, and the ADI would perform resampling based on the function, default or user-specified, as part of the port definition.

Thus, the port extent structure gives the programmer the flexibility to specify what values are to be accessed. The port attributes also give the programmer the flexibility to access data in a format different than what is in the data store. The ADI will perform, for example, the unit conversion, dimension conversion, and resampling of data from the data store to the program and vice versa. Multiple dimensions are handled in a similar fashion.

Extent & Non-monotonic Explicit Index

To read explicit indexed data at explicit indexes, a user has to specify the explicit indexes in the extent. An explict index must be monotonic in storage, a problem in some cases for horizontal wells with non-monotonic indexes. For example, suppose a 1-dimension array has an explicit index of {10,20,35,30,35,40}. A problem arises in reading the value of the array at the second 35. This problem is solved by allowing access to the data using natural indexes. For all indexes, there is an associated implicit natural index. In the above example, the natural index is {0,1,2,3,4,5}. The data at the second 35 can be read by setting the extent's OptionsMask = APU_NATURAL, Begin = 4, and Count = 1.

Dense vs Sparse Extents

Thus far, the discussion has focused on bulk data whose values can be logically viewed as an array where the width of the array is of fixed size. This type of array is called a dense array. Take the case below of a 2D array DataItem whose number of values is the same at different values of the Index--here, two. At each index along the grow dimension of an array, however, the count of the number of values may be different. Such an array is called a sparse array. Take the case below of a DataItem whose values do vary at different values of the Index.

| Index | Values | |
|---|---|---|
| 0 | 10 | 14 |
| 1 | 12 | 39 |
| 2 | 15 | 50 |
| 3 | 18 | 67 |
| 4 | 19 | 89 |

Dense

| Index | Values | |
|---|---|---|
| 0 | 10 | 14 |
| 1 | 12 | |
| 2 | 15 | |
| 3 | | 67 |
| 4 | 19 | |

Sparse

In the Dense array, the first extent has Count=5 and the second has Count=2. In the Sparse array, however, the extent contains an indice for every value in the array. In the above case, the index along the first axis is from 0 to 4 and the index along the second axis is either 0 or 1. The first extent has Count=6 and ExplicitIndexArray={0,0,1,2,3,4}, and the second extent has Count=6 and ExplicitIndexArray={0,1,0,0,1,0}. The values in the ExplicitIndexArrays together represent the indexes for each value in the Sparse array.

Vectors

A value in bulk data may comprise several vectors. The vectors in arrays can even have different ValueTypes and Units. Take the case below of a Waveform-Cluster, in which there is a 7-vectored values of traces, source positions, and receiver positions.

Index

| i |
|---|
| |
| · |
| |

Values

| T | S_0 | S_1 | S_2 | R_0 | R_1 | R_2 |
|---|---|---|---|---|---|---|
| | | | | | | |
| | | | | | | |
| | | | | | | |

The values S_0, S_1, S_2 are the 3 vectors that represent the source position at the Indexes i. These 3 vectors are logically grouped and together describe the source positions. The values S_0 could have a different valuetype and units from that of S_2 and applications have the capability to access the vectors in some other valuetype and units. The values S_0, S_1, S_2 may also be coordinate converted.

Vector Format

Figure 59:
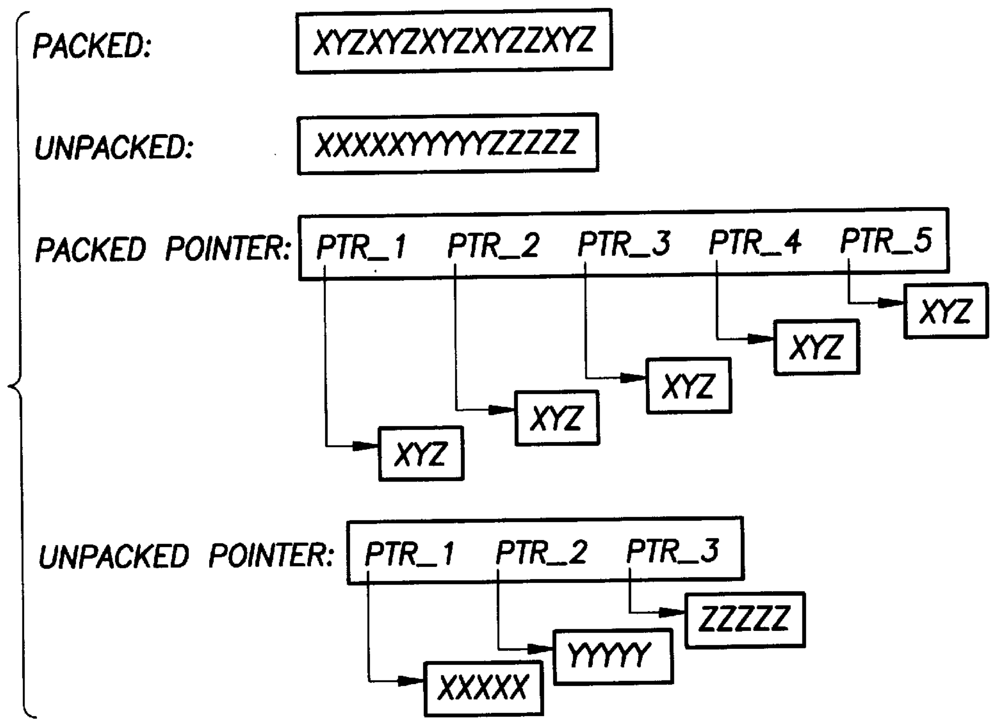

Referring to figure 59, multi-vectored values can be represented in memory in 4 formats: Packed, Packed Pointer, Unpacked, and Unpacked Pointer. These formats are best explained using an example, shown in figure 59.

In figure 59, let us assume that we have a value comprised of 3 vectors "x", "y", and "z", where the count of the number of elements is "5". The 4 formats that will be supported are shown in figure 59.

Multiple Bulk Attributes

Some bulk DataItems have multiple value attributes. Each of these has characteristics--for example, a unit of measurement or data type. A DataItem like Scatter_-Set DI is a collection of points in a space, where each point is defined by an x, y, and one or more values. How would you find the units, data type, or other characteristics associated with each of these bulk data values? A DataItem called Bulk DataItem is available with the following attributes:

| | | | |
|---|---|---|---|
| vt_Atom_t | Code | read only | |
| vt_ValueType_t | Value_Type | read, write | |
| vt_Atom_t | Units | read, write | |
| vt_Atom_t | Group_Code | read only | |
| Int32_t | Position | read only | Position in the group |
| Int32_t | Rank | read only | Rank relative to all |
| aqi_DataItem_t | DataItem | read only | |
| vt_Atom_t | DIType | read only, value = Bulk | |

These attributes may be thought of as characteristics of the attributes of bulk DataItems like Scatter_Set. All bulk DataItems like Scatter_Set have an attribute called Bulk_Data_Items, which contains the list of Bulk DataItems associated with each of the Scatter_Set's bulk data attributes--one Bulk DataItem per Scatter_Set bulk data attribute. Once a handle to a Bulk DataItem is obtained from the list, you could change its data type (Value_Type) or units, thus changing the data type or units for the value associated with a Scatter_Set attribute.

You can also query and obtain a handle to any of the Bulk DataItems. For example:

```
BulkDI=aqi_Query(Scatter_Set,0,qBulk, &Status, qCode, qXValue, NULL);
```

will return only the Bulk DataItem that contains the characteristics for the XValue attribute of the Scatter_Set.

Extents & Coordinate System

Extents can be created with reference to a local coordinate system whose origin is {0,0} for indexes with a reference point = 0. Extents can also be created with reference to another coordinate system. For Dense arrays, when creating an Extent using the apu_CreateExtentFromPort call, if the angle of rotation between the coordinate systems is 0 or a multiple of 90, then a dense extent is returned. If the angle is anything else, then a sparse extent is returned, which will contain the indexes for every value in the array.

Figure 60:
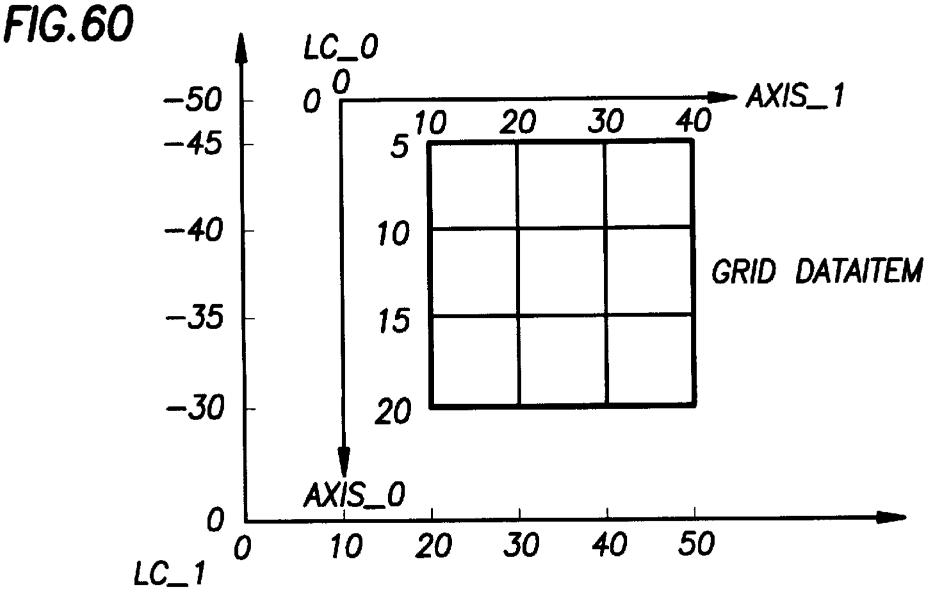

Referring to figure 60, look at the figure shown in figure 60. The Grid DataItem is stored with respect to a local coordinate system LC_0.

The Extents for this DataItem with respect to LC_0 are:

Extent_0: Begin = 5, Interval = 5, Count = 4
Extent_1: Begin = 10, Interval = 10, Count = 4

We can obtain the Extents for the Grid with respect to some other coordinate system such as LC_1. If LC_0 is offset from LC_1 by {10,-50}, then the Extents for the Grid with respect to LC_1 are:

Extent_0: Begin = -45, Interval = 5, Count = 4
Extent_1: Begin = 20, Interval = 10, Count = 4

The values in the Grid can then be accessed using these Extents. For all cases, irrespective of the angle, an application can manually create any Extent with reference to LC_1 and access values in the Grid using these Extents.

Collection

The ADI allows DIs to be grouped or collected by an application so that they can be accessed as a single unit. These DIs are called Collection DIs. All data in a collection can, then, be accessed together.

Figure 61:
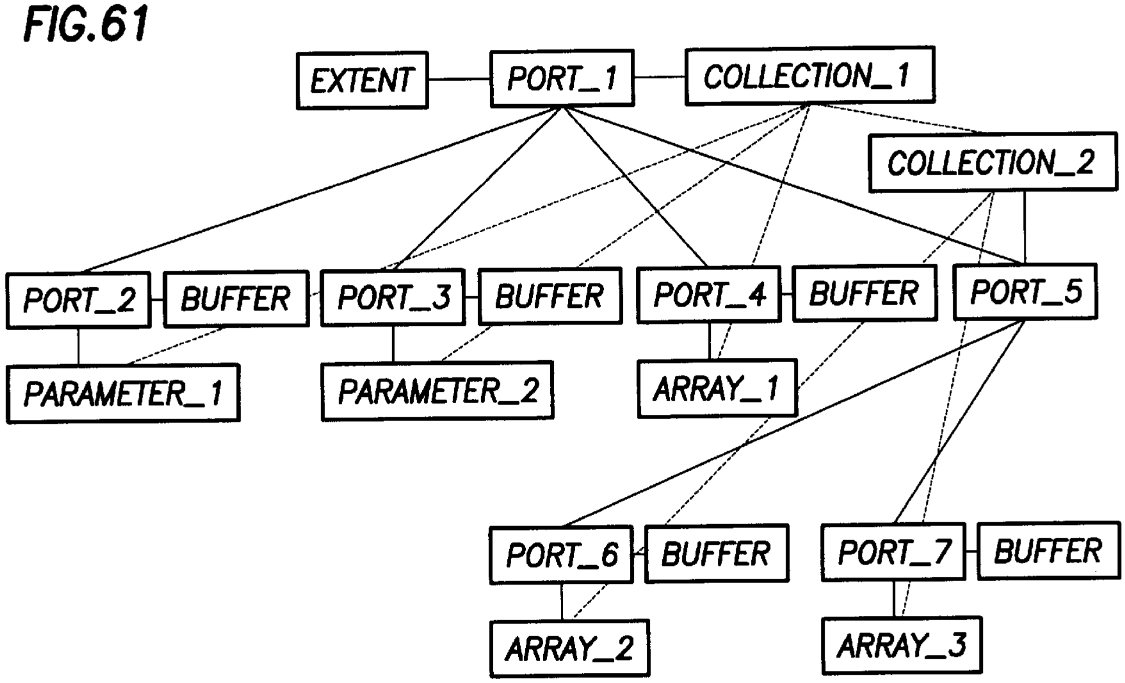

Referring to figure 61, an example of Collection Access is illustrated. As shown in figure 61, a Collection can contain other Collections. A channel set is an example of a collection where all the members are 1-dimensional arrays. Each port associated with a Collection DI can optionally contain other ports.

Assume that all the DIs except Collection_1 already exist. The steps to access data for the above Collection follow:

- Query and obtain handles for the existing Parameter-1, Parameter-2, Array-1, and Collection-2 DIs.
- Create Collection-1 and specify that Parameter-1, Parameter-2, Array-1 and Collection-2 are members of it.
- Create a Port on Collection-1. The ADI will recursively create Ports, which we'll call leaf Ports for clarity, for all the DIs associated with Collection-1..
- Specify the Extents for each leaf Port. Assuming the same depth index is applied to these Ports, the Index Extent needs to be specified only for Port-1. The others will inherit it. The Extent could also be specified with the read/write operations.
- Specify the buffer for each leaf Port. We could have specified a buffer at the Port-1 level, but instead choose to associate buffers with the leaf Ports.
- Specify the index value at which values are desired and do the read. The ADI will fetch the values at depth=100.0 and stuff them in each leaf Port buffer.

Note the flexibility in terms of what is obtained at the leaf Port level when you do, say, a single read at the main Port. This is done by defining different Index Extents and Buffers at the leaf Port level.

For purposes of accessing individual leaf Ports, the leaf Ports are flattened into a list that encompasses all the nested Collections and their members. For the example above, the port order would be: Port-1, Port-2, Port-3, Port-4, Port-5, Port-6, Port-7. The Port at Position 0 is Port-1 (the Collection Port), the Port at Position 1 is Port-2, and so on.

Figure 62:
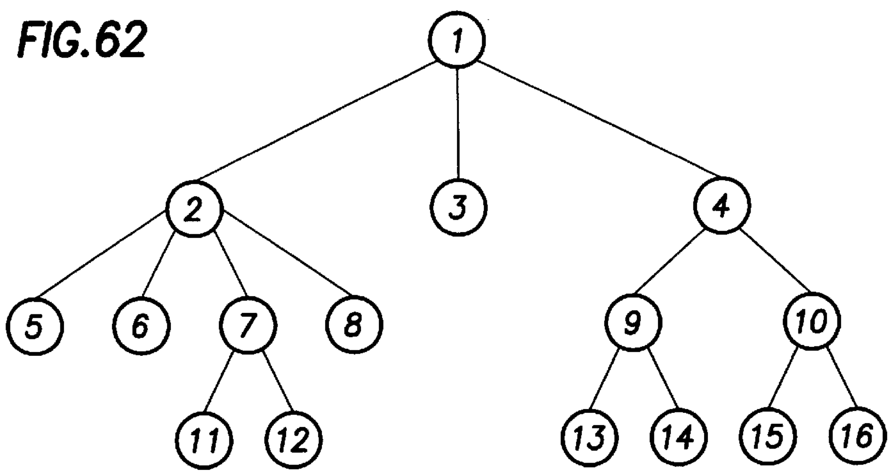

Refer to figure 62 for an example of Leaf Port Access.

For a more complex case, as shown above, the port order would be: 1, 2, 5, 6, 7, 11, 12, 8, 3, 4, 9, 13, 14, 10, 15, and 16, where the ports 1, 2, 7, 4, 9, 10 are Collection Ports.

08884205.043097

Index Alternative

The ADI also allows DIs to be accessed using Indexes other than the ones with which it was created. This is best explained by an example.

Figure 63:
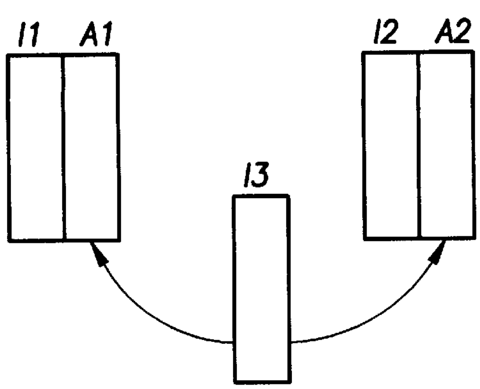

Refer to figure 63 for an example of Alternative Index Access.

Let's say there exists 2 Arrays (I1,A1) and (I2,A2). Since both Indexes I1 and I2 are related to Depth, it is possible to access values of A2 using A1 as the Index. You can read the value of A2 at, say, A1=some value. The ADI will internally do the mapping and provide the appropriate value. The programmer steps to do this follow:

- Query and obtain the handle of A2.
- Query and see if an explicit Index I3 with A1 as its Array exists. If it does not exist, then create the explicit Index I3 and specify that its Array is A1.
- Open a Port on A2.
- Specify that the IndexTranslator Attribute for A2 is I3.
- Specify the Index Extent and do the read. The Index Extent should be based on I3.

The alternative index is not specified at the time the DI is created. The flexibility is provided to specify any existing Array as the Index for another Array at the time of the read. The only rule is that the Index for both Arrays must belong to the same class (depth, etc.).

Pipe

Figure 64:
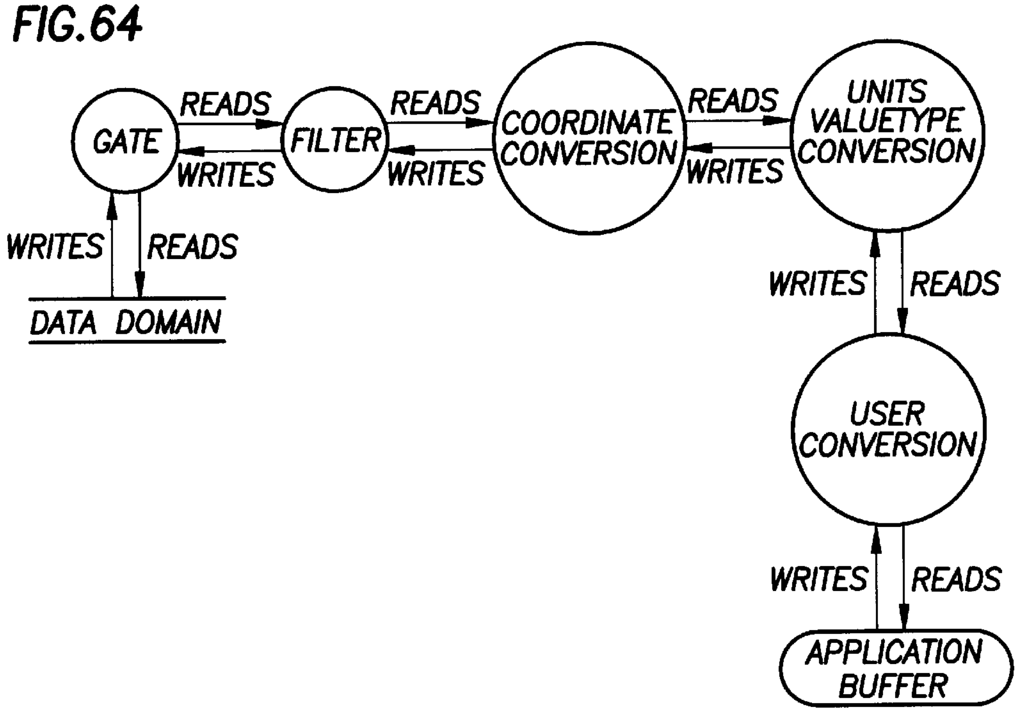

Referring to figure 64, a Pipe Access Model is illustrated.

In figure 64, the Application Data Interface (ADI) will perform gating (resampling), filtering, and user conversion on the data that is transferred from the data store to the program and vice versa using the pipeline mechanism shown in figure 64.

This pipeline can include one of each type of function that will be applied to data. The gate and units conversion functions will be automatically executed by the ADI depending on what is specified in the index extents and port attributes. The programmer must specify the filter and user conversion functions that he wants executed. All the functions are optional and need not get executed. For example, if the data is accessed with the stored format, the same units and grid, and no filter or user conversion function is specified, then none of the intermediary functions will get executed. The programmer can choose from a set of system functions or he can specify his own. The functions are specified using the port attributes: GateFunction, FilterFunction, and ConversionFunction.

08984820 . 043097

Here are the possible set of Gates, Filters, and User Conversions. For user-defined ValueTypes (BLOBS), only the functions marked with a asterisk (*) are available.

| Gates | Filters | User Conversion |
|---|---|---|
| Maximum | Averaging | User defined |
| Minimum | WeightedAverage | |
| Average | Log10Average | |
| Interpolate | ReciprocalAverage | |
| Azimuth | HodgesLehmann | |
| LowerValue* | Clamp | |
| UpperValue* | User defined Filter* | |
| LogicalOr | | |
| LogicalAnd | | |
| Absent* | | |
| ClosestValue | | |
| User defined Gate* | | |

Each pipe function may have a

- set of variants associated with them, which may be set by the programmer to control the runtime behavior of the related pipe function.
- Count value that tells the function how many values are to be output from this function.
- set of attributes named BeforeCount and AfterCount, which are set by the programmer and which specify how many values before count and how many values after count should be input into a function so that it can meaningfully create count outputs. BeforeCount + Count + AfterCount represent how many values are input into the function.

In the example below, the clamp filter, APU_CLAMP_FILTER, is used to restrict the values between a lower and upper boundary.Its variants are LowerBoundary and UpperBoundary, the values of which may be set.

```
Filter = apu_GetPipeFunction (APU_CLAMP_FILTER, Status,
                    qLowerBoundary, vt_Float32ToDatum(5.0),
                    qUpperBoundary, vt_Float32ToDatum(20.0),
                    qLowerValue, vt_Float32ToDatum(5.5), NULL);
apu_PutAttributes(Port, Status, qFilterFunction, Filter, NULL);
```

Here, the data is restricted to be between 5.0 and 20.0. Wherever the data falls below 5.0, it is replaced by 5.5.

Pipe Read Functions

Referring to figure 43, an example of Pipe Read is illustrated.

In figure 43, the diagram illustrated in figure 43 shows an application making a request for Count values at Index I. The Count and Index are specified using an Extent. The diagram also shows how this request is translated by the ADI, and the resulting data processing chain that may be executed to satisfy this request to transfer the data from the data stores to the application buffer. When a request is made for C3 values at Index I by an application, the ADI will first determine the Count values C2 and C3 for the other functions by checking the BeforeCount and AfterCount of the Conversion, Filter, and Gate functions in that order. It will then read (BC1+C1+AC1) values from the data domain and input these into the Gate function. The functions are executed in the order Gate, Filter, Units Conversion, and User Conversion. The C3 values from the user conversion function is what is given to the application.

Pipe Write Functions

Before and After Counts are computed and used for writes in the same manner as for reads. The difference is this: for writes, the ADI may do internal buffering. For reads, the ADI has a source to which it can read the appropriate window of data to satisfy the requirement of every component of the pipe. But in the case of writes, the ADI must buffer the data it receives from the application. Only when it has sufficient data to satisfy the requirements of the pipe components will it execute these components and write out the data to storage.

For writes, buffering is restricted to monotonic increasing indexes and one-dimensional DIs. Pipe functions will only get executed when adequate values exist in the buffer for BeforeCount, Count, and AfterCount. The buffer will be padded with Absent values at the beginning and end of the stream. Write events will be posted only when an actual write occurs to storage. Values in the buffer not yet flushed may be lost in the event of catastophic failure. The padding at the beginning and end of the buffer with absent values is done to ensure that for every application write, some value will be written later to storage; it is the responsibility of the pipe function to specify what its output is at boundary conditions.

In the example below, a filter has a BeforeCount and AfterCount of 2. The application is writing values with a Count of , and writes a total of 5 values in a loop.

Figure 65:
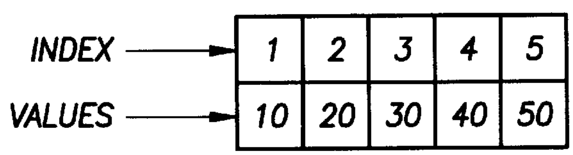

Referring to figure 65, an example of pipe write is illustrated. In the example of figure 65, a filter has a BeforeCount and AfterCount of 2. The application is writing values with a Count of 2, and writes a total of 5 values in a loop.

After each write, the following occurs:

Write 1 => ADI internally buffers, buffer contains 10

Write 2 => ADI internally buffers, buffer contains 10, 20

Write 3 => Internal buffer contains 10, 20, 30
Filter function executed with values -999, -999, 10, 20, 30
The Filter is called with a Before = 2, Count = 1, After = 2
The Filter outputs whatever value it wants
The output value is written to storage at Index 1

Write 4 => Internal buffer contains 10, 20, 30, 40
Filter function executed with values -999, 10, 20, 30, 40
The Filter is called with a Before = 2, Count = 1, After = 2
The Filter output value is written at storage Index 2

Write 5 => Internal buffer contains 10, 20, 30, 40, 50
Filter function executed with values 10, 20, 30, 40, 50
The Filter is called with a Before = 2, Count = 1, After = 2
The Filter output value is written at storage Index 3
Internal buffer reset to 20, 30, 40, 50

Port Close => Internal buffer contains 20, 30, 40, 50
Filter function executed with values 20, 30, 40, 50, -999, -999
The Filter is called with a Before = 2, Count = 2, After = 2
The Filter output values are written at storage Index 4, 5

In case only one Write is done, then at Port close time, the filter is executed with a buffer of -999, -999, 10, -999, -999. The filter must be written so that it will output the appropriate values based on BeforeCount, Count, AfterCount and the Absent values it finds in the buffer. The Filter remains the same whether it is for Reads or Writes.

Buffers

The buffer is used to store the data that will be transferred from the program to the data store and vice versa. The buffer is viewed as a contiguous block of memory at an address. This contiguous block will linearly hold all the values associated with the read/write. Since the buffer is language-independent, it is the responsibility of the application to interpret the buffer appropriately for the programming language being used. For values whose valuetype is of varying length, such as strings, the buffer will contain pointers to secondary buffers that will contain the varying length values.

Figure 66:
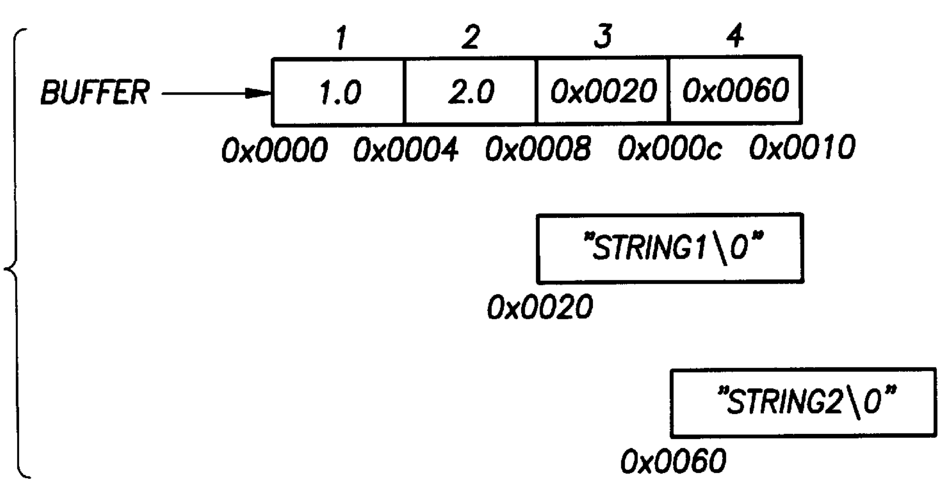

Referring to figure 66, an example of a Collection Buffer is illustrated. In figure 66, an example of a buffer is illustrated which is used to read a Collection DI that contains both fixed length and varying length values.

The first 2 locations contain float values; the next 2 locations contain string values. There are float values at address 0x0000 and 0x0004. Address 0x0008 and 0x000c contain the addresses of the string values. To access such data, a buffer of size 16 bytes must be allocated. For an application-allocated buffer, besides the allocation of the 16 bytes buffer, the application may also allocate the secondary buffer for the string values and place the addresses of these buffers in location 3 and 4. The system will only allocate such secondary buffers if it finds NULL at locations 3 and 4. The system will allocate all buffers if the port attribute SysAllocatedBuffer is TRUE for reads.

Figure 67:
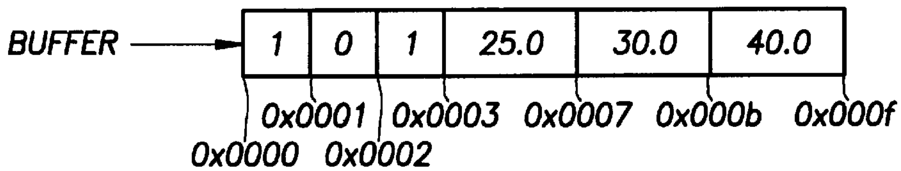

Referring to figure 67, an example of a System Buffer is illustrated. In figure 67, for systems where buffers must be longword aligned, the buffer will still appear as a contiguous block with no gaps in between, as when the individual values are not aligned to hardware boundaries. For example, to read 3 bytes and 3 floats, the buffer and the addresses will look like that which is shown in figure 67.

It is the responsibility of the application to use the proper method to pack and unpack such buffers.

There are three port attributes related to buffers:

- IndirectBuffer: a boolean value, TRUE if buffer points to a program variable.
- SysAllocatedBuffer: a boolean value, TRUE if system allocates buffer for reads.
- IndexMajor: a boolean value, TRUE if the buffer contains the value of all ports at first value dimension 0, then value of all ports at second value of dimension 0, and so on. This is only applicable to Collection Ports.

Figure 68:
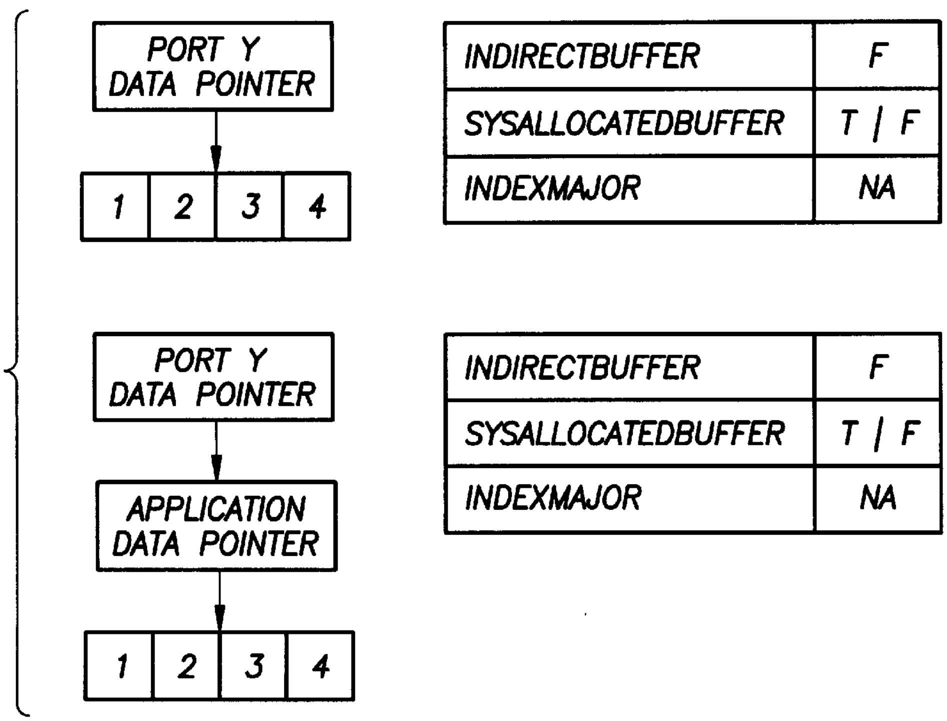

Referring to figure 68, this figure shows an example of what these attributes would be for a read/write operation on a Port Y with 4 elements.

Transactions

Concurrent access will only be permitted to DI values that are committed and if these DIa are not locked for access by some other process. The apu_BeginTransaction and apu_EndTransaction functions are used to explicitly lock a DI for access by others. The ADI will implicitly lock the DI associated with the read/write for the duration of the time that the operation completes, and all read/writes will complete serially.

There is an implicit way to commit data as well as explicit way to commit data. The fundamental rule is that, once data is committed, there is no way to rollback the commit. The following block of pseudo code shows how this is done:

```
BeginTransaction();
DataWrite (1);
DataWrite (2);
DataWrite (3);
EndTransaction (Commit|Abort);
```

All writes between the BeginTransaction and EndTransaction are only committed by the EndTransaction (Commit) call. The EndTransaction (Abort) call will invalidate all the data writes. In the absence of explicit transaction calls, the completion of a write implies that the data is committed. For bulk data, transactions only apply when extending files.

The ADI allows applications to express interest in the transactions to data that are made by other applications, as described in the Inter-application Communication section below. It also allows an application to make multiple express interest calls within the same application. For example, suppose Application A makes two express interests calls: A1, which expresses an interest in knowing when DIs 1 and 2 change, and A2, which expresses an interest in knowing when DIs 2 and 3 change. Now suppose Application B updates an attribute in DI1 and DI2, deletes DI 3, and commits these changes to the database. In this case, A1 would receive notification that DI1 and DI2 had changed; A2 would receive notification that DI2 had changed and DI3 was deleted. The following block of pseudo code shows this scenario performed by Application B:

```
BeginTransaction();
ChangeDI1 ();
ChangeDI2 ();
DeleteDI3 ();
EndTransaction (Commit);
```

In Application A, what happens is this: the events performed by Application B will be marked with a transcation id; the events expressed interest in by Application A will be numbered in decreasing order for any transaction made (N-1 to 0 if N events are generated). Application A's A1 interest call would receive events for DI1 and DI2, numbered 1 and 0 respectively; Application A's A2 interest call would receive events for DI2 and DI3, numbered 1 and 0 respectively.

Status Check

The status of any ADI function call will always be returned as the last fixed argument in the function. In all the ADI functions that return a value, if the Status is not adi_OK, then NULL is returned.

Inter-application Communication

The ADI provides inter-application communication with the aqi_ExpressInterest and apu_ExpressInterest function calls. For example, an application A reads/writes a DI X. An application B can express an interest in the DI X and specify a callback function to be executed whenever the value of X changes. The application A does not need to be aware of application B and vice versa.

Referring to figure 36 for a block diagram of an Inter-application communication mechanism.

Interest may be made on intermediate abstract class DataItems, such as the Dense_Array DataItem, rather than on its instance DataItems, such as Array, Grid, or Mesh, so that a change to any one of these instances will notify the application of a change.

It is possible to transfer data between applications without the need to go through storage, since applications can control how much, if any, of a DataItem is written to storage. This is accomplished with an Attribute called Storage_State for all DataItems. This attribute can have four values:

- Memory, meaning the DataItem is completely memory-based. Nothing is written to storage. DataItems in Memory state cannot be located via queries. This state may be used only for communication between applications in the same image.
- Memory_Only, meaning the DataItem is completely memory-based AND can never be changed. Some DIs, such as Context, may only have storage state set to Memory_Only; all other DI types may be created with storage set to Memory_Only, but cannot be changed subsequently.
- Transient, meaning that default values of DataItem attributes, together with the ones specified at creation time, are written to storage, but that once created, further changes are not written to storage unless the state is changed to Persistent. The part that is written to storage is there so that the DataItem can be located by a query. Full power of the PHDF and CVDF is available for the query. This state can be used for communication between different images with the maximum performance. The data is transferred from image to image via memory links using RPCs. Currently, the memory transfer only applies to non-bulk DataItems; bulk DataItems will continue to be communicated via storage. Transient DataItems are not purged from storage if they are not made persistent when the image exits.
- Persistent, meaning that the DataItem is written to storage when the transaction ends.

The state can be changed on most DataItems that are modifiable. The possible state changes are: Memory to Transient, Memory to Persistent, Transient to Persistent, and Persistent to Transient. The rules for state change are:

- There are some DataItems whose state can never be changed. This applies to DataItems that are read-only and to the Memory_Only based DataItems. The Context DataItem belongs to this category; its state is always Memory_Only.
- Persistent DataItems can be made Transient and vice-versa.
- Persistent and Transient DataItems can be created initially in a Memory state. During the create, the storage will be accessed for getting the meta information about the DataItem irrespective of the state, but nothing will be written out to storage. Subsequent changes to the DataItem will be made to contents in memory. If the state is changed to Transient, then a snapshot of the DataItem is made to storage, and subsequent changes will be made to memory. A change of state to Persistent ensures that all changes are flushed to storage. It is not possible to make a Persistent or Transient DataItem back to the Memory state.

- The system will define what is the default state of the DataItem. For a DI that is Memory_Only based with no state change allowed, there will be no access to the storage for its creation. All access is from memory and no part of the DataItem is written to Storage.

The aqi_GetAttributes and aqi_PutAttributes functions are used to get and put the State attribute of DataItems. An example showing pseudo code of how to use it follows.

```
DI = aqi_CreateDI(Type = Parameter, State = Transient);

/* Attr values are changed in memory & committed at next transaction*/
aqi_PutAttributes(DI, SomeAttributes);

/* DI is flushed to storage */
aqi_PutAttributes(DI, State = Persistent);

/* DI is again made Transient for further work */
aqi_PutAttributes(DI, State = Transient);
```

Referring to figures 38a and 38b data transfer examples are illustrated. In figures 38a and 38b, the memory to memory transfer of data will be used to keep the cache memory consistent for the same DIs in the applications where they are open for access. To ensure consistent initialization, aqi_GetAttributes on a transient DI will preferentially pull attribute values from other interested applications rather than from the database.

The following table summarizes the storage states applicable to AQI functions.

| Operation | Storage State | Comments |
|---|---|---|
| aqi_ValidateDI | Memory, Memory_Only<br>Transient, Persistent | ADI_Error returned<br>ADI_OK if DI exists |
| aqi_CreateDI | Memory, Memory_Only<br>Transient, Persistent | No database change<br>Snapshot to database on next flush/commit |
| aqi_DeleteDI | Memory, Memory_Only<br>Transient, Persistent | No database change<br>DI deleted from database on next flush/commit |
| aqi_GetAttributes | Memory, Memory_Only<br>Transient<br>Persistent | Those set in aqi_CreateDI & aqi_PutAttributes & Catalog attributes are visible<br>Preferentially from interested applications, then from database<br>From database |
| aqi_PutAttributes | Memory, Memory_Only<br>Transient<br>Persistent | Local only<br>Flushed to database at next flush/commit if Create still pending; attr event sent to interested applications<br>Flushed to database at next flush/commit; attr event sent to interested applications |
| aqi_Query | Memory, Memory_Only<br>Transient<br>Persistent | Never visible to queries<br>Indeterminate results, since some predicates are evaluated in memory & have last snapshot value, others are evaluated locally & have last value put in DI<br>All pending changes flushed before query evaluated |

Representations for Bulk DataItems

Before we present some specific examples using ADI calls to access data, it will helpful to look in abstract terms at some specific DataItems, particularly those for specific representations of bulk data, and how their port attributes are used by the ADI.

Some DataItems have a variety of representations. For example, a Surface instance can be represented as a Contour; another Surface can be represented as a Grid. DataItems with multiple representations are called Entity DataItems; the representations are called Representation DataItems. For example, here are the calls to create a Surface DataItem and a Representation DataItem for it:

```
SurfaceDI = aqi_CreateDI(OriginDI,/* Origin such as a Module Run *

                    "Surface",                /* Type */
                    "Horizon",                /* Code */
                    NULL,                     /* Context */
                    &Status,
                    NULL);


ContourDI = aqi_CreateDI(SurfaceDI, /*Origin is the above Surface DI*/
                    "Contour",                /* Type */
                    "FormationThickness",     /* Code */
                    NULL,                     /* Context */
                    &Status,
                    NULL);
```

A user can associate multiple Representations to an Entity by creating the Representations explicitly with the Entity as the Origin.

Every Representation DI has an attribute called Property_Code. The ADI assigns the Property_Code value to the Representation DI at creation time as a default. The DataItems may then be queried by Property_Code. For example, to get all DataItems whose Property_Code="Mud_Resistivity", the query is:

```
DIs = aqi_Query(SomeOrigin,                   /* Origin */
                    0,                        /* Cardinality */
                    NULL,                     /* Type */
                    &Status,
                    qProperty_Code, "Mud_Resistivity",
                    NULL);
```

The APU is used to access data only from Representation DataItems, namely DataItems that contain bulk attributes. The access behavior of these Representation DataItems can be understood by looking at the class hierarchy for these DataItems.

Figure 69:
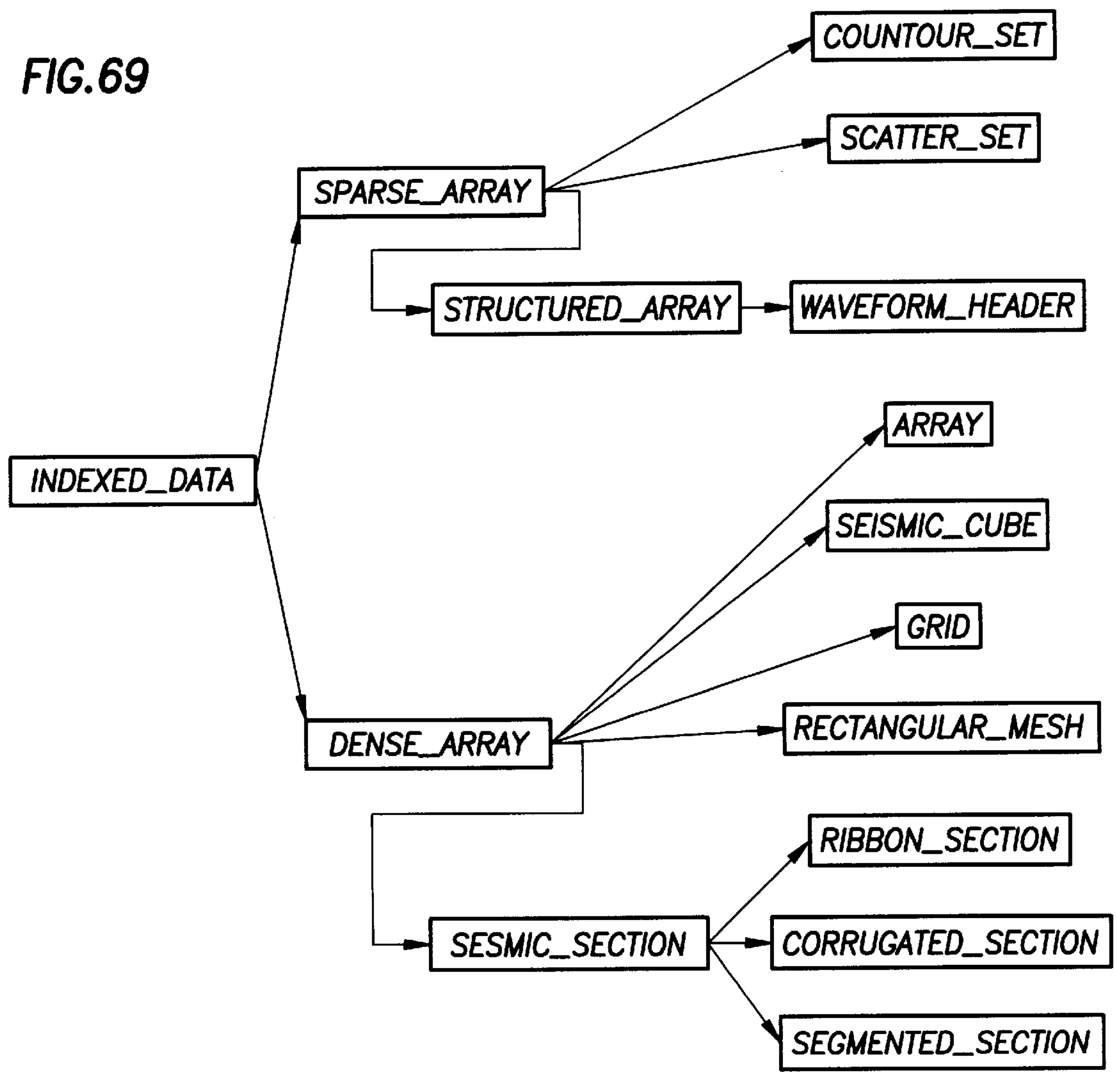

Referring to figure 69 for Representative DataItems.

The classes to the far right are the Representative DataItems. Their main behavior is summarized below.

| | |
|---|---|
| Sparse_Array: | Sparse Indexes<br>Sparse Extents, Dense Extents, default is sparse |
| Dense_Array: | Dense Indexes<br>Dense Extents, Sparse Extents, default is dense |
| Seismic_Section: | Compute sections from Seismic Cube<br>Results are persistent or transient |
| Structured_Array: | Sorting by value columns<br>Access by any of the sorted value columns as indexes |

08834825.041397

*Contour_Set*

Figure 70:
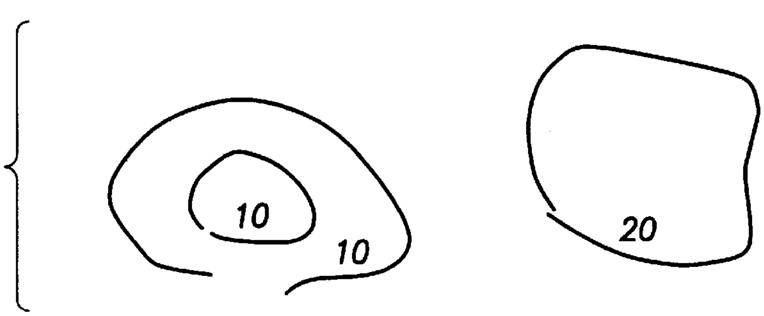

A Contour_Set is a collection of Segments where each Segment has a list of x,y values at some z value. All x,y values in a Segment are assumed to be connected. There can be several Segments at a z value. Its characteristics:

- Number of dimensions = 2
- Axis0 = z values
- Axis1 = segment number, typically ordinal
- Bulk attributes: x values, y values
- Default bulk attributes: all associated values Refer to figure 70 which shows three (3) Contour lines at depth 10, 10, and 20.

These are represented as:

| Natural Index | Index<br>z n | Values |
|---|---|---|
| 0 | 10 0 | x0,x1,...xm<br>y0,y1,...ym |
| 1 | 10 1 | x0,x1,...xn<br>y0,y1,...yn |
| 2 | 20 0 | x0,x1,...xp<br>y0,y1,...yp |

Extent0: Count = 3, Explicit_Array = {10, 10, 20}
Extent1: Count = 3, Explicit_Array = {0, 0, 1}

*Scatter_Set*

A Scatter_Set is a collection of points in a space, with one or more values at each point. It is described by a set of positions giving the coordinates of the points, and one or more data array giving the data values. Its characteristics:

- Number of dimensions = minimum of 2
- Axis0 = x values
- Axis1 = y values
- Axis2 = z values
- Bulk attributes: 1 or more values
- Default bulk attributes: all associated values These might be represented as:

| Natural_Index | IndexesValue<br>x y z |
|---|---|
| 0 | 10 10 2010.5 |
| 1 | 10 10 2011.5 |
| 2 | 12 11 3012.5 |
| 3 | 15 12 2013.5 |

The Scatter values are accessed using the Sparse Extents:

Extent0: Count = 4, ExplicitIndexArray = {10, 10, 12, 15}
Extent1: Count = 4, ExplicitIndexArray = {10, 10, 11, 12}
Extent2: Count = 4, ExplicitIndexArray = {20, 20, 30, 20}

*Grid*

Figure 71:
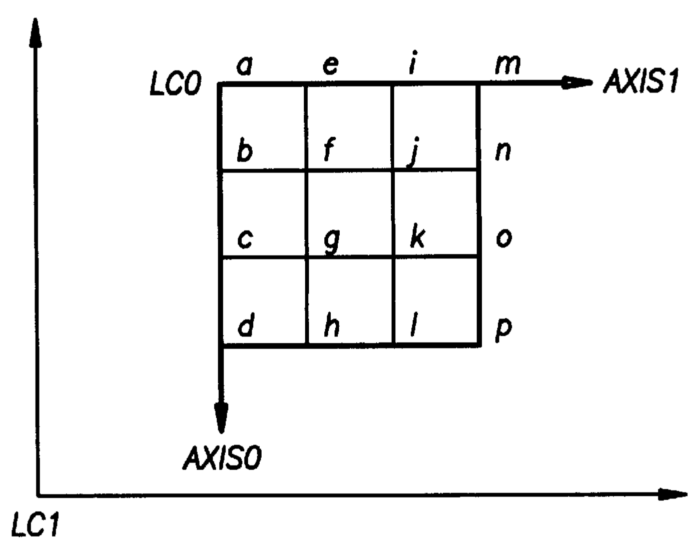

A grid is an N-diminsional (typically 2-dimensional) rectangular structure. In a grid, all indexes are regular. A given grid encodes one data value at each grid point. It has the following characteristics:

- Number of dimensions = minimum of 2
- Axis0 = x values
- Axis1 = y values
- Axis2 = z values
- Bulk attributes: 1 or more values
- Default bulk attributes: all associated values Refer to figure 71 which shows a grid in a local coordinate system LC0.

The values of the Grid are stored with reference to the origin of the Grid (LC0). The Extents returned for the Grid will be with reference to LC0 as a default. Let's assume:

Extent0: Begin = 0, Interval = 1, Count = 4
Extent1: Begin = 0, Interval = 1, Count = 4

A read with the above Extent returns the values {a, b, c, d, e, f, h, i, j, k, l, m, n, o, p}

A read with: Extent0: Begin = 3, Interval = 1, Count = -4
Extent1: Begin = 0, Interval = 1, Count = 4 returns the values {m, n, o, p, i, j, k, l, e, f, g, h, a, b, c, d}

A read with: Extent0: Begin = 3, Interval = 1, Count = -3
Extent1: Begin = 3, Interval = 1, Count = -3 returns the values {p, o, n, l, k, j, h, g, f}

The IndexOrdering Port attribute is applicable to Grids. By setting the values of the Begins, Counts and IndexOrdering, you can read the data with different buffer organizations. The values in the Grid can be read with reference to some other Coordinate system such as LC1 by setting the CoordinateSystem Port attribute.

*Rectangular_Mesh*

Figure 72:
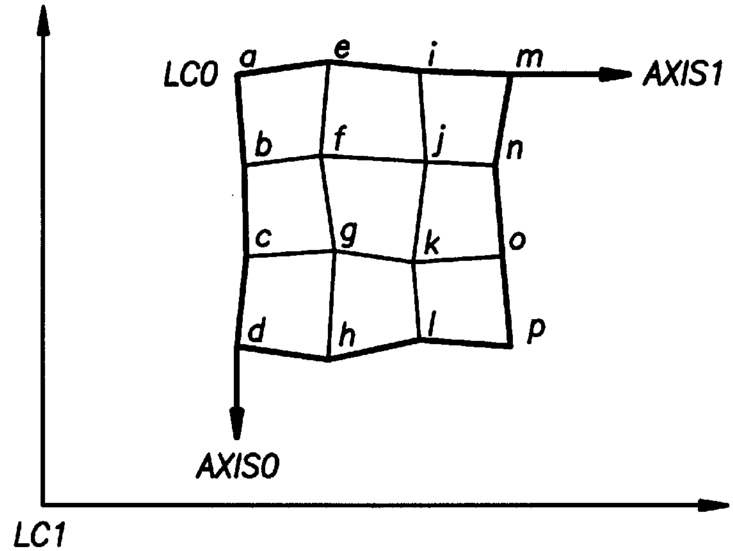

A Rectangular_Mesh is an N-dimensional (typically 2-dimensional) grid-like structure with N irregular indexes. A given mesh encodes one data value at each mesh point. It has the following characteristics:

- Number of dimensions = minimum of 2
- Axis0 = ordinal
- Axis1 = ordinal
- Bulk attributes: x values, y values, z values
- Default bulk attributes: all associated values The following figure shows a rectangular mesh in local coordinate system LC0:

Refer to figure 72 which shows a rectangular mesh in local coordinate system LC0.

The connectivity is implicit in this type of Mesh. Reading values is performed as it is with grids.

*Seismic_Cube*

Figure 73:
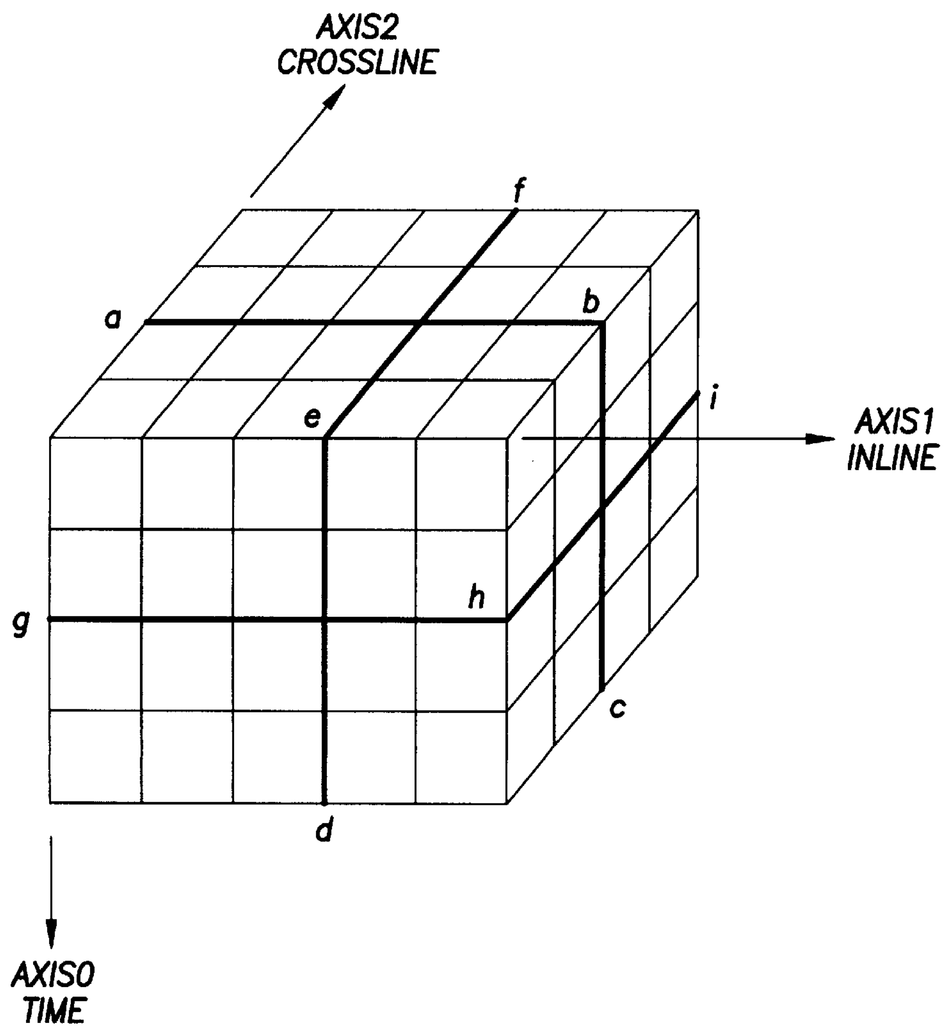

A Seismic_Cube is a the same as a 3-dimensional array. Its characteristics:

- Number of dimensions = 3
- Axis0 = time
- Axis1 = any
- Axis2 = any
- Bulk attributes: values
- Default bulk attributes: all associated values Refer to figure 73 which shows a seismic cube whose values are trace values.

*Seismic_Section*

A Seismic_Section is a 2-dimensional array similar to a grid. Access is performed as it is for grids. Inline, Crossline, and Slice Sections are planes or sections which are perpendicular to an axis of the Seismic Cube. In the figure above, a-b-c is an Inline Section, d-e-f is a Crossline Section, and g-h-i is a Slice Section. These sections can be obtained from a Seismic Cube using appropriate extents similar to what is done for an Array.

*Corrugated_Section*

Figure 74:
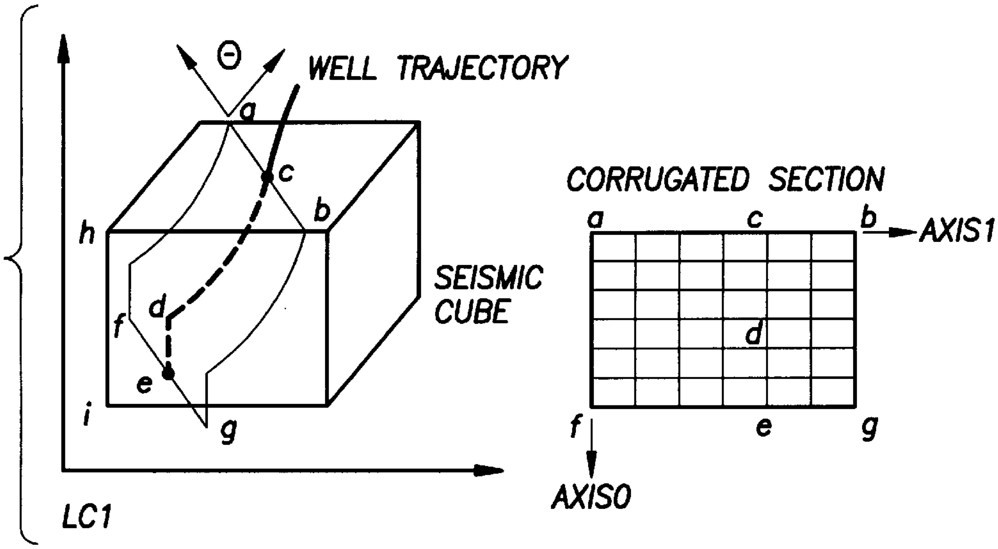

A Corrugated_Section is a seismic section of arbitrary azimuth on which the deviated well trajectory is coincident. Its has the following characteristics:

- Number of dimensions = 2
- Axis0 = any
- Axis1 = any
- Bulk attributes: values
- Default bulk attributes: values Refer to figure 74 which shows a corrugated section.

The Corrugated Section is determined from the following inputs:

- A Seismic Cube which is oriented with respect to some coordinate system.
- A Well trajectory. The trajectory comprises of an array of XValues and YValues which are indexed similarly as the Seismic Cube (Time). The rate of indexing may be different. The trajectory is given with reference to some coordinate system. It need not be the same as the cube coordinate system.
- An azimuth angle measured counter-clockwise from Axis2 (normally CDP) in the range 0 to 180 degrees or 0 to pi radians.
- The number of divisions along the width of the section.

The inputs are given in the form of attribute values to the Corrugated_Section DataItem.

*Ribbon_Section*

Figure 75:
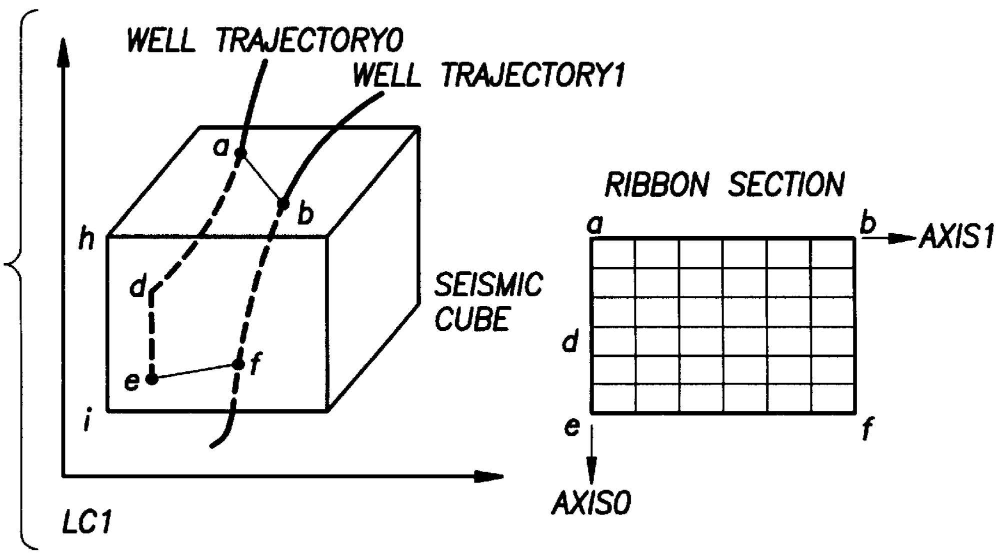

A Ribbon_Section is a seismic section defined by two well traces on which the deviated well traces are coincident. It has the following characteristics:

- Number of dimensions = 2
- Axis0 = any
- Axis1 = any
- Bulk attributes: values
- Default bulk attributes: values Refer to figure 75 which shows a ribbon section.

The Ribbon Section is determined from the following inputs:

- A Seismic Cube which is oriented with respect to some coordinate system.
- Two Well trajectories, each trajectory is as described in Corrugated section.
- The number of divisions or interval along the width of the section.
- The inputs are given in the form of attribute values to the Corrugated_Section DataItem.

In case the trajectory ends inside the cube as shown at d, then an imaginary trajectory will be assumed vertical down till the bottom of the cube (d-e). In the above figure, the section is determined for trajectory a-d-e-f-b. Points on the Section that fall outside the boundaries of the cube will be filled with absent values.

*Segmented_Section*

Figure 76:
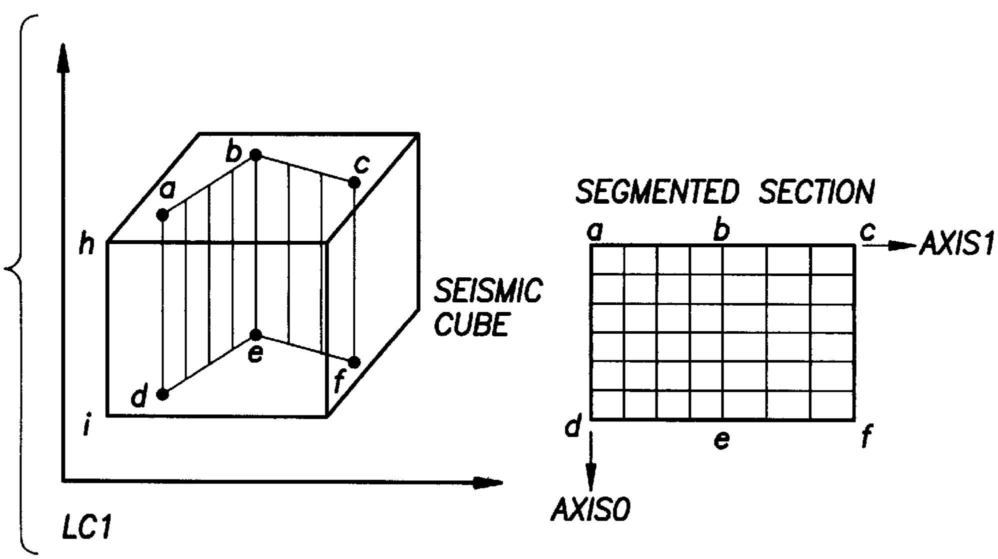

A Segmented_Section is a seismic section defined by two segments, each being a collection of points assumed to be joined by lines. It has the following characteristics:

- Number of dimensions = 2
- Axis0 = any
- Axis1 = any
- Bulk attributes: values
- Default bulk attributes: values Refer to figure 76 which shows a Segmented Section.

The Segmented Section is determined from the following inputs:

- A Seismic Cube which is oriented with respect to some coordinate system.
- A list of Segments points (a, ...b, ...c). The line/cdp values are given of the points with respect to the Cube origin. The points are given for all the intervals along the segment.

08834205 .041397

Examples

In the examples that follow, some function calls from Schlumberger's ValueTypes (VT) library package are used. The VT package provides a mechanism for tagging the type of data that moves around through a system and, at the same time, gives application programmers a set of useful utilities to perform some operations on the information returned. Several specific functions used in the examples involve a dynamcially extended array called a list. Like an array, all of its elements must be of the same type. The functions used are:

- *vt_LengthList*, which returns the number of elements in a list.
- *vt_List*, which creates a list of a specified data type and adds elements to it.
- *vt_Nth*, which returns the Nth element of a list.

Example 1: Non-bulk Data Store Access by a Single Application (aqi_Query)

This example demonstrates how an application uses the ADI to store and retrieve non-bulk data, in this case the well names from a field.

```
/*************/
/* Example 1 */
/*************/
Get_Well_Names()
{
    /* Get Well names from a Field */
    aqi_DataItem_t Field;
    aqi_DataItemL_t Fields;
    aqi_DataItem_t Well;
    aqi_DataItemL_t Wells;
    adi_Status_t Status;
    vt_Atom_t WellName;
    Int32_t i, len;
    /* Query and get a handle to a Field with name = "MyField"*/
    Fields=aqi_Query(NULL,1,qField,&status,qName,
                    vt_Quote(MyField),NULL);
    Field = vt_Nth(Fields, 0);
    /* Get all the Wells in this Field */
    Wells = aqi_Query(Field, 0, qWell, &Status, NULL);
    len = vt_LengthList(Wells);
    /* Get the name of each Well and print it */
    for (i=0; i<len; i++)
    {
                    Well = vt_Nth(Wells, i);
                    aqi_GetAttributes(Well, &Status, qName,
&WellName, NULL);
                    printf("%d - Well Name = %s\n", WellName);
    }
}
```

Example 2: Non-bulk Data Store Access by a Single Application (aqi_Select)

This example demonstrates how to perform queries using the aqi_Select call.

```
/*************/
/* Example 2 */
/*************/
/*  This example demonstrates how to do queries using the aqi_Select
**  function. It also includes the case of doing selects using search
**  masks or conditions.
*/
Query_Select()
{
    aqi_DataItem_t  Field;
    aqi_DataItemL_t Fields;
    aqi_DataItem_t  Well;
    aqi_DataItemL_t Wells;
    adi_Status_t    Status;
    vt_Atom_t       WellName;
    Int32_t         i, len;
    Int32_t         SearchMask;
 /* Get Well names from a Field */
 /* Query and get a handle to a Field with name = "MyField" */
    Fields = aqi_Select(NULL, 1, qField, NULL, &Status, qName, qEQ,
   vt_Quote(MyName), NULL);
    Field = vt_Nth(Fields, 0);
/*  Get all the Wells in this Field */
    Wells = aqi_Select(Field, 0, qWell, NULL, &Status, NULL);
    len = vt_LengthList(Wells);
/*  Get the name of each well and print it */
    for (i=0; i<len; i++)
    {
   Well = vt_Nth(Wells, i);
   aqi_GetAttributes(Well, NULL, &Status, qName, &WellName, NULL);
   printf("%d: Well Name = %s\n", i, WellName);
    }
/*
** In all the Wells, find at least 1 parameter with a value
** greater than or equal to 10.0
*/
    SearchMask = AQI_CARD_N_FROM_EACH | AQI_ORIGIN_SEARCH;
    LocalContext = aqi_CreateDI(NULL, qContext, NULL, NULL, &Status,
   qNumeric_Value_Type, Float32_vt,qSearch_Mask, SearchMask,NULL);
    Parameters = aqi_Select(Wells, 1, qParameter, LocalContext,
   &Status,qValue, qGE, vt_Float32ToDatum(10.0), NULL);
}
```

Example 3: Bulk Data Store Access by a Single Application

This example demonstrates how an application uses the ADI to store and retrieve bulk data, in this case the array values of a Gamma Ray.

```
/*************/
/* Example 3 */
/*************/
Apu_Reader()
{
/*  In this example, we Query and locate an Array with Code = "GR".
    We then read the values in this array using a Port */
    aqi_DataItem_t Array;
    aqi_DataItemL_t Arrays;
    apu_Port_t Port;
    apu_Extent_t Extent;
    apu_ExtentL_t Extents;
    Int32_t AbsCount
    Float32_t FValue;
/*  Well is obtained from Example 1 */
    Arrays=aqi_Query(Well,1,qArray,&Status,qCode,vt_Quote(GR),NULL);
    Array = vt_Nth(Arrays, 0);
/*  Create an Extent for the entire array along the 0
    (grow) dimension. Set it to do auto incrementing.
    Then create a list of size 1 that contains this Extent */
    Extent = apu_CreateExtentFromDI(Arrays, (vt_ValueType_t) NULL,
                    (vt_Atom_t) NULL, 0, 0, &Status);
    Extent->AutoIncrementCount = 1;
    Extents = vt_List(apu_ExtentL_vt, 1, Extent);
    AbsCount = abs(Extent->Count),
    Extent->Count = 1;
    Port = apu_OpenPortByDI(NULL, Array, APU_READ, &Status);
/*  Specify Port attributes such that the data for the
    array is returned as Float and has a Units of mV
    irrespective of what it is in storage */
    apu_PutAttributes(Port,&Status,qValueType,Float32_vt,qUnits,
                    vt_Quote(mV),NULL);
    for (i=0; i<AbsCount; i++)
    {
                    apu_Read(Port, Extents, &FValue, NULL,
&Status);
                    printf("Read %d: Array Value = %7.2f\n", i,
FValue);
    }
    apu_ClosePort(Port, &Status);
    apu_DeleteExtent(Extent, &Status); vt_DeleteList(Extents);
}
```

Example 4: Persistent Data Store Access by Multiple Applications

This example demonstrates how the ADI may be used for inter-application communication, that is, how one application uses the ADI for notification when selected data has been changed by another application.

```
/*************/
/* Example 4 */
/*************/
/* An example showing inter-application communication of data changes.
In this example, there are 2 applications. Appl writes to a Parameter
A, App2 automatically reads Parameter A whenever it is changed by
Appl. */
/****** Start Application 1 ******/
void
Appl_Writer(aqi_DataItem_t ParaA, Float32_t FValue)
/* We assume this function is executed from some HI. It opens a Port
on the Parameter and writes a value to the Parameter whenever it is
invoked from the HI.*/
{
    apu_Port_t Port;
    adi_Status_t Status;
    Port = apu_OpenPortByDI(NULL, ParaA, APU_WRITE, &Status);
    apu_Write(Port, NULL, &FValue, NULL, &Status);
    apu_ClosePort(Port, &Status);
}
/***** End Application 1 *****/
/***** Start Application 2 *****/
void
App2_cb(apu_Port_t Port, vt_Datum_t Context, apu_Event_t Event)
/* Callback is executed when the value of the Parameter is changed.*/
{
    adi_Status_t Status;
    Float32_t FValue;
    apu_Read(Port, NULL, &FValue, NULL, &Status);
    printf("App2 callback executed, Para value read = %f\n", FValue);
}
void
App2_Initialize(aqi_DataItem_t ParaA)
/* This function is called once to initialize the callback */
{
apu_Port_t Port;
apu_PortL_t Ports;
Int32_t EventMask;
adi_Status_t Status;
Port = apu_OpenPortByDI(NULL, ParaA, APU_READ, &Status); PortL
vt_List(apu_PortL_vt, 1, Port);
EventMask = APU_WRITEEVENT;
apu_ExpressInterest (PortL, (apu_EventCallback_t *) App2_cb,
    EventMask, NULL, &Status);
}
```

Example 5: Use of Context

This example demonstrates the use of the Context DataItem. It shows how the context affects DI creation and how it can be used when getting attributes.

```
/*************/
/* Example 5 */
/*************/
/*  This example demonstrates the use of the Context DataItem.
**  It shows how the context affects DataItem creates and
**  how it can be used when getting attributes.
*/
Use_Context(aqi_DataItem_t Module)
{
    aqi_Status_t     Status;
    aqi_DataItem_t   SystemContext, LocalContext;
    aqi_DataItem_t   ProjectDI;
    aqi_DataItem_t   EnglishSystem, MetricSystem;
    aqi_DataItemL_t DIL;
    aqi_DataItem_t   NewParameter;
    Float32_t        FValue;
    vt_Datum_t       DValue;
/*  Get the Project DataItem in the System Context */
    SystemContext = aqi_GetDefaultContext(&Status);
    aqi_GetAttributes(SystemContext, NULL, &Status, qProject,
   &ProjectDI, NULL);
/*  Find a English Unit System DataItem */
    DIL = aqi_Query(NULL, 1, qUnit_System, &Status,qCode,
   vt_Quote(English), NULL);
    EnglishSystem = (aqi_DataItem_t) vt_Nth(DIL, 0);
/*  Set the Storage Unit System in the Project DataItem to English */
   aqi_PutAttributes(ProjectDI, NULL, &Status,qStorage_Unit_System,
   EnglishSystem, NULL);
/*
** Now when we create a parameter, its storage system will be English
*/
    NewParameter = aqi_CreateDI(Module, qParameter, vt_Quote(GAIN),
   &Status,qValue_Type, Int32_vt, qValue, 10, NULL);
/*
**  We will get the same value of the Parameter in Metric system with
**  a value_type of float using a local Context
*/
    DIL = aqi_Query(NULL, 1, qUnit_System, &Status, qCode,
   vt_Quote(Metric), NULL);
    MetricSystem = (aqi_DataItem_t) vt_Nth(DIL, 0);
    LocalContext = aqi_CreateDI(NULL, qContext, NULL, NULL,&Status,
   qComputation_Unit_System, MetricSystem,qNumeric_Value_Type,
   Float32_vt,NULL);
    aqi_GetAttributes(NewParameter, LocalContext, &Status, qValue,
   &DValue, NULL);
    FValue = vt_DatumToFloat32(DValue);
}
```

Example 6: Multiple Representations

This example demonstrates how to create multiple representations for a surface entity, then to query for these representations.

```
/*************/
/* Example 6 */
/*************/
/*  This example demonstrates how to create multiple representations
**  for a Surface Entity and then query and find these representations.
*/
Create_Surfaces(aqi_DataItem_t Module)
{
    aqi_DataItem_t  Fault;
    aqi_DataItem_t  Scatter;
    aqi_DataItem_t  Grid;
    aqi_DataItem_t  Index1, Index2;
    aqi_DataItem_t  Indexes;
    aqi_DataItemL_t Reprs;
    aqi_DataItem_t  Repr;
    vt_Atom_t       Type;
    Int32_t         Id;
    Int32_t         i, len;
    Fault = aqi_CreateDI(Module, qSurface, vt_Quote(FAULT), NULL,
    &Status);
/* Create the scatter */
   Index1 = aqi_CreateIndex(Module, vt_Quote(MD), vt_Quote(in),
   Int32_vt, 0, NULL, NULL, &Status);
   Index2 = aqi_CreateIndex(Module, vt_Quote(MD), vt_Quote(in),
   Int32_vt, 0, NULL, NULL, &Status);
   Indexes = vt_List(aqi_DataItemL_vt, 2, Index1, Index2);
   Scatter = aqi_CreateDI(Fault, qScatter, vt_Quote(TEST_SCATTER),
   NULL,&Status,qIndexes, Indexes,qProperty_Code,
vt_Quote(GR),NULL);
/* Create the Grid */
   Index1 = aqi_CreateIndex(Module, vt_Quote(MD), vt_Quote(in),
   Int32_vt, 0, 1, NULL, &Status);
   Index1 = aqi_CreateIndex(Module, vt_Quote(MD), vt_Quote(in),
   Int32_vt, 0, 1, NULL, &Status);
   Indexes = vt_List(aqi_DataItemL_vt, 2, Index1, Index2);
   Grid = aqi_CreateDI(Fault, qGrid, vt_Quote(TEST_GRID), NULL,
   &Status,qIndexes, Indexes, NULL);
/* Get all the representations of the Fault surface */
   Reprs = aqi_Query(Fault, 0, qRepresentation, &Status, NULL);
   len = vt_Length_List(Reprs);
   for (i=0; i<len; i++)
   {
   Repr = vt_Nth(Reprs, i);
   aqi_GetAttributes(Repr, NULL, &Status, qId, &Id, qType, &Type,
   NULL);
   printf("%d:, Id = %d, Type = %s\n", i, Id, Type);
    }
}
```

Summary of Functions

The summary of the ADI data type definitions, macros, and functions follows.

Typedefs

| | |
|---|---|
| adi_Status_t | Status value returned |
| adi_TransactionFlag_t | Enumerator to specify how to end transactions |
| apu_Direction_t | Enumerator to specify direction for Port access |
| apu_EventCallback_t | Event structure for Port callbacks |
| apu_Event_t | Union of all event types |
| apu_Extent_t | Runtime Index Extent structure |
| apu_ExtentL_t | List of Index Extent structures |
| apu_IndexSort_t | Structure to specify sorts & indexes |
| apu_IndexSortL_t | A list of sorts |
| apu_CreateEvent_t | Event data for DI creation |
| apu_PipeContext_t | Structure to specify Context passed to Pipe |
| apu_PipeFunction_t | Structure to specify functions for Port Pipe |
| apu_PipeFunctionName_t | Enumerator that lists system Pipe function names |
| apu_Port_t | Port handle for transparent access |
| apu_PortEventPt | Event data for port creation/deletion |
| apu_PortL_t | List of Port handles |
| apu_Shape_t | Structure to specify Shape of a buffer |
| apu_Vector_t | Structure to specify vector characteristics |
| apu_VectorDirection_t | Structure to specify vector direction |
| apu_VectorDirectionL_t | List of vector directions |
| apu_VectorFormat_t | Format of vectors |
| apu_VectorL_t | List of vectors |
| aqi_AttributeType_t | Enumerator to specify type of a DI Attribute |

| | |
|---|---|
| aqi_DataItem_t | DI handle for transparent access |
| aqi_DataItemL_t | List of DI handles |
| aqi_State_t | Enumerator for DataItem states |

Macros

| | |
|---|---|
| APU_DO_NOT_BLOCK | Specifies that a thread should block |
| APU_WAIT_FOR_COMPLETION | Specifies that a thread should block until I/O operation completes |

Pipe Functions

| | |
|---|---|
| apu_ConversionFunction | Functions that impose programmer conversion |
| apu_GateFunction | Functions that interpolate data to an index |
| apu_FilterFunction | Functions that filter data as specified |

AQI Functions

| | |
|---|---|
| aqi_BeginTransaction | Begin a transaction on a list of DIs |
| aqi_CreateArray | Create an Array DI |
| aqi_CreateBinding | Create a Binding DI |
| aqi_CreateCollection | Create a Collection DI |
| aqi_CreateDI | Create a DI |
| aqi_CreateIndex | Create an Index DI |
| aqi_CreateParameter | Create a Parameter DI |
| aqi_CreateSubArray | Create a SubArray DI |
| aqi_CreateUserAttribute | Create a programmer-defined attribute |
| aqi_CreateZoneSet | Create a Zone_Set DI |
| aqi_DeleteDI | Delete a DI |
| aqi_EndTransaction | End a transaction on a list of DIs |
| aqi_ExpressInterest | Express interest in DI |
| aq-ExendInterest | Add DI instances or types to existing interest |
| aqi_GenFileSpec | Generate a FileName for the specified DI |
| aqi_GetAttributeNames | Get attribute names of a DI |
| aqi_GetAttributes | Get attributes of a DI with optional conversions |
| aqi_GetAttributeValueType | Get attribute ValueType of a DI type |
| aqi_GetCurrentOrigin | Get the default current origin |
| aqi_GetDefaultContext | Get the system default Context |
| aqi_GetDIAttributeValueType | Get attribute ValueType of a DI instance |
| sqi_GetDISubtypes | Return list of all system supported DI subtypes |
| aqi_GetDITypes | Return list of all system supported DI types |
| aqi_PrimeAttributes | Prepare system for efficient access to attributes |
| aqi_PutAttributes | Put attributes of a DI with optional conversions |
| aqi_Query | Query the Database for DIs by a single Origin |
| aqi_RegisterDI | Return a DI handle given its Type and Id |
| aqi_RevokeInterest | Revoke interest on DI |
| aqi_Select | Select DIs by Origin & Type |
| aqi_SelectAttributes | Select attributesfor DIs by Origin & Type |
| aqi_SetCurrentOrigin | Set the default current origin |

| | |
|---|---|
| aqi_SetDefaultContext | Set the system default Context |
| aqi_SQLQuery | Query the Database for DIs using SQL |
| aqi_ValidateDI | Validate DI after registration |

APU Functions

| | |
|---|---|
| apu_BeginTransaction | Begin a transaction on a list of Ports |
| apu_BufferSize | Return the Buffer size needed for I/O |
| apu_ClosePort | Close Port and free its resources |
| apu_ConvertBuffer | Convert Coordinate, Unit, ValueType, & Shape |
| apu_CreateExtent | Create Index Extent as per arguments |
| apu_CreateExtentFromDI | Create Index Extent from a DI list |
| apu_CreateExtentFromPort | Create an Extent on the DI in a Port |
| apu_DeleteExtent | Delete an Index Extent structure |
| apu_DIFromPort | Return the DI associated with the Port |
| apu_EndTransaction | End the transaction on the list of Ports |
| apu_ExpressInterest | Specify function to be called when DI changes |
| apu_GetAttributes | Get attributes of a Port |
| apu_GetPipeFunction | Get a system defined Pipe function |
| apu_MergeBuffers | Merge two buffers with optional conversions |
| apu_OpenPortByDI | Open a Port with the specified DI |
| apu_OpenPortByDIName | Open a Port with the specified DI name |
| apu_PutAttributes | Put attributes of a Port |
| apu_Read | apu_ReadRequest + apu_ReadComplete |
| apu_ReadComplete | Complete the read request |
| apu_ReadRequest | Initiate a read request |
| apu_ResampleBuffer | Resample data in application space |
| apu_SubPortByDIName | Return the SubPort given its DI name |
| apu_SubPortByPosition | Return the SubPort given its position |
| apu_Write | apu_WriteRequest + apu_WriteComplete |
| apu_WriteComplete | Complete the write request |
| apu_WriteRequest | Initiate a write request |

Typedefs

ValueTypes are used to represent data types in the fnnctions. The ValucTypes library provides a flexible mechanism for tagging the type of data that moves around through the system and, at the same timc, gives programmers a set of useful utilities to perform some operations on the information returned. Just as the C language provides for combining primitive C types into more complex types using structures and arrays, the ValueTypes librray also allows programmers to describe these types with a ValueType tag.

ValueTypes are typedefs of ordinary C types or structures with given naming conventions. All instances or occurrences of application data arc passed around the system as 32-bit quantities. Application data occupying more than this quantity are represented internally as 32-bit pointers to the data. This kind of multi-purpose type is called vt_Datum_t. This type name also illustrates the naming convention used. The first part of the name (vt) identifies the system that has defined the data type, in this case the ValueType library itself. The next part is the type name, which can also have a trailing L attached (vt_DatumL_t) to indicate that it is a list of variable length of vt_Datum_t instances. The last part is used to indicate that the type is, in fact, defined through the ValueType system.

Another important pre-defined ValueType is vt_Atom_t. This ValueType is used for all dictionary-controlled data, including Attribute names, DataItem names, and Unit names. The atom concept makes it possible to refer to the above mentioned data without using strings to represent them. All system-defined atom dictionaries are made available to the applications as include files, which the applications must include if they want to use the atoms.

The type vt_ValueType_t is used to denote ValueTypes themselves and is needed, for example, when you need to specify the wanted ValueType of the returned data in a query function.

The typedefs defined by the ADI library follow.

adi_Status_t

The ADI routines will return Status codes of this type. The basic Status values returned are:

```
adi_OK              call is successful

adi_Error           call is not successful
```

To gauge for success, applications should check for status equal adi_OK, rather than status not equal adi_Error. In the case of an exception, the return Status values will be one of the defined exception codes.

adi_TransactionFlag_t

This enumerated type is used to specify how to end a transaction. It may have any of the following values::

```
ADI_COMMIT          Commit the transaction
ADI_ABORT           Abort the transaction
```

apu_CreateEvent_t

This type specifies the event for DataItem creation events.

C Prototype

```
typedef struct{
APU_EVENT_COMMON;
}apu_CreateEvent_st,*apu_CreateEvent_t;
```

apu_Direction_t

This enumeration type specifies the access direction of the DataItem associated with a port.

C Prototype

```
typedef enum {
APU_READ,
APU_WRITE,
APU_DUPLEX
} apu_Direction_t;
```

apu_Event_t

This type represents a union which defines event information for all APU events. Each event has its own structure in which event-specific information is stored, but all events have the common fields identified in apu_AnyEvent. apu_Event_t is a handle to the structure that will be passed to callback functions that may be associated with Port events. This is modeled after the XEvent structure. The apu_Event_t handle can include information about read completion, information about write completion, and information that a DataItem has been deleted.

C Prototype

```
typedef union {
                    Int32_t                  Type;
                    /* generic event */
                    apu_AnyEvent_t           AnyEvent;

                    /* I/O completion events */
                    apu_ReadCompleteEvent_t ReadComplete;
                    apu_WriteCompleteEvent_tWriteComplete;

                    /* interest change events */
                    apu_DeleteEvent_t        Delete;
                    apu_AttrEvent_t          Attr;
                    apu_WriteEvent_t         Write;
                    apu_UnitSystemEvent_t    UnitSystem;

                    /* new event types*/
                    apu_CreateEvent_st       CreateEvent;
                    apu_PortEvent_st         PortEvent;

    /* internal events, not visible to applications */
                     apu_BeginTransEvent_t    BeginTrans;
                     apu_EndTransEvent_t      EndTrans;
} apu_EventStruct_t, *apu_Event_t;
```

Event types, used directly in EventMask

```
#define APU_COMPLETEEVENT (APU_READCOMPLETE |\APU_WRITE_COMPLETE)
#define APU_CHANGEEVENT \(APU_DELETEEVENT | APU_ATTREVENT |
APU_WRITEEVENT | APU_UNITSYSTEMEVENT |APU_OPENPORTEVENT |
aPU_CLOSEPORTEVENT | APU_CREATEEVENT)
```

Only APU_CHANGEEVENT event types will be accepted by apu_ExpressInterest. The following typedefs define the specific members of the apu_Event union:

```
#define APU_EVENT_COMMON
   Int32_t          Type;
   Int32_t          TimeSec;
   Int32_t          TimeMicroSec;
   aqi_DataItem_t   DataItem; /*DataItem that changed*/
   env_Address_t     AppAddr; /*address of image enerating event*/
   vt_Atom_t        SourcePortId; /*PortID attribute value*/
aqi_DataItem_t      Origin; /*Module_Run of that image*/
vt_Atom_t           DIType; /*Type of DI for class events*/
```

```
Int32_t             TransactionId; /*Transaction Id of event*/
Int32_t             EventNumber; /*Position of Event*/

typedef struct
{
  APU_EVENT_COMMON;
  Int32_t             Event_Flag;
  vt_Datum_t          Event_Data;
} apu_AnyEvent_st, *apu_AnyEvent_t;

typedef struct
{
  APU_EVENT_COMMON;
  pu_Direction_t      Direction;  /* APU_READ APU_WRITE APU_DUPLEX*/
  vt_Datum_t          Dummy;
}apu_ReadCompleteEvent_st,*apu_ReadCompleteEvent_t,
  apu_WriteCompleteEvent_st,*apu_WriteCompleteEvent_t,
  apu_DeleteEvent_st, *apu_DeleteEvent_t;

typedef struct
{
  APU_EVENT_COMMON;
  Int32_t             Ignored;
  vt_AtomL_t          AttrList; /* names of updated attributes */
} apu_AttrEvent_st, *apu_AttrEvent_t;

typedef struct
{
  APU_EVENT_COMMON;
  Int32_t             Ignored;
  apu_ExtentL_t       ExtentList; /*union of extents changed since

                                    last commit*/
} apu_WriteEvent_st, *apu_WriteEvent_t;

typedef struct
{
  APU_EVENT_COMMON;
  vt_Atom_t           UnitSystem; /*UNIT_STORAGE, UNIT_TAPE,

                                    UNIT_DISPLAY*/
  vt_Atom_t           SystemType; /* DISPLAY, STORAGE, or TAPE*/
} apu_UnitSystemEvent_st, *apu_UnitSystemEvent_t;
```

apu_EventCallback_t

This is the type for all Event Functions.

C Prototype

```
typedef
void
apu_EventCallback_t (apu_Port_t         Port,
                     vt_Datum_t         EventContext,
                     apu_Event_t        EventInfo);
```

Arguments

| | | |
|---|---|---|
| i | Port | The Port on which the function has been invoked. |
| i | EventContext | The context passed in to this function. |
| i | EventInfo | Information on the event that caused this function invocation. |

Notes

None.

08945205.043097 apu_Extent_t
apu_ExtentL_t

This is the primary run-time data structure needed to communicate with the APU for Port IO extents and Array DataItem extents. There is also a list of Index Extents.

C Prototype

```
typedef struct {
                    vt_ValueType_t          ValueType;
                    vt_Atom_t               Units;
                    vt_Datum_t              Begin;
                    vt_Datum_t              Interval;
                    Int32_t                 Count;
                    Int32_t                 AutoIncrementCount;
                    vt_Datum_t              *ExplicitIndexArray;

                    aqi_DataItem_t          CoordinateSystem;

                    Int32_t                 OptionsMask
} *apu_Extent_t;
```

Arguments

| | | |
|---|---|---|
| i | ValueType | The data type of the extent. |
| i | Units | The units of the extent. |
| i | Begin | The beginning value of the extent. This may be expressed in any units. Specify<br>APU_BEGIN_OF_DATAfor first value<br>APU_END_OF_DATAfor last value<br>APU_MOST_RECENTfor most recent value |
| i | Interval | The interval between consecutive values. This should match the Begin units and is always a positive number. |
| i | Count | An integer number that specifies how many values to access. This could be negative to imply Count values before Begin are to be accessed. |
| i | AutoIncrementCount | An integer that specifies by how many Counts to increment the Begin value after an access operation. This is designed to facilitate the next read/write. This could be negative. The Begin attribute is updated by the AutoIncrementCount interval at the completion of the read/write. |

| | | |
|---|---|---|
| i | ExplicitIndexArray | An array containing the values of the index at which explicit access is desired. This will point to the element in the array starting from which Count Index values are to be read. If the Count is +ve, the Explicit Index values are read in the increasing address space; if the Count is -ve, the Explicit Index values are read in decreasing address space. |
| i | CoordinateSystem | The coordinate system for the values in the extent. |
| i | OptionsMask | The extent options. These are: |

```
Min/Max Extent     APU_MINEXTENT (default)
                   APU_MAXEXTENT
Min/Max Interval   APU_MININTERVAL(default)
                   APU_MAXINTERVAL
Extent Type        APU_IMPLICIT (default)
                   APU_EXPLICIT
                   APU_NATURAL
                   APU_SPARSE
                   APU_DENSE
Direction   APU_UPDIRECTION
            APU_DOWNDIRECTION
            APU_OPTIMUMDIRECTION (default)
```

Notes

The ValueType and Units are used to decode the values of Begin, Interval and ExplicitIndexArray. The Interval is always positive.

The Count and AutoIncrementCount are signed. A positive value implies an increasing value from Begin as the reference point. A negative value implies a decreasing value from Begin as the reference point.

When specifying an explicit extent for read or write, the ExplicitIndexArray pointer should point to the first index value to be read, and the Count indicates the number of succeeding or preceding index values to use. That is, index values would be taken from ExplicitIndexArray[0], ..., ExplicitIndexArray[Count-1] when Count > 0, and from ExplicitIndexArray[0], ExplicitIndexArray[-1], ... ExplicitIndexArray [Count+1] when Count < 0.

apu_IndexSort_t
apu_IndexSortL_t

This structure is used to specify the sort and indexing to be applied to the data.

C Prototype

```
typedef struct {
                        vt_Atom_t               Name;
                        apu_VectorDirection_t   SortDirection;
                        Boolean_t               IsIndex;
                        void                      *CompareFunction;
} *apu_IndexSort_t;
```

Arguments

| | | |
|---|---|---|
| i | Name | Is the name of the Bulk Attribute in the DataItem to be sorted |
| i | SortDirection | Specifies in which direction the vector is to be sorted. NULL implies the increasing direction. |
| i | IsIndex | Controls if this value is an Index |
| i | CompareFunction | Specifies the compare function to be passed to the internal sort function. |

Notes

None.

08846205.043097 apu_PipeContext_t

This defines the Context that is passed into all Pipe functions.

C Prototype

```
typedef struct {
                        apu_Port_t              Port;
                        vt_ValueType_t          IndexValueType;
                        vt_ValueType_t          DataValueType,
                        Int32_t                 BeforeCount;
                        Int32_t                 AfterCount;
                        vt_Datum_t              ApplContext;
} apu_PipeContext_st, *apu_PipeContext_t;
```

The ApplContext is the same as the ApplContext in the apu_PipeFunction_t.

08834825.043097 aqi_SQLQuery

Find DataItems in the database.

C Prototype

```
aqi_DataItemL_t
aqi_SQLQuery        (aqi_DataItem_t      Origin,
                     Int32_t             Cardinality,
                     vt_Atom_t           DataItemType,
                     String_t            SQLCondition,
                     adi_Status_t        *Status)
```

Arguments

| | | |
|---|---|---|
| i | Origin | The initial DataItem specifying the Data Focus. Any of the component DataItems can be the origin of a query. If the origin is a Module_Run, then the query searches the Process History Data Focus (PHDF) and the Module_Run's Component Data Focus (CDF). A NULL Origin implies an unfocussed query and the entire database table for the DataItemType will be searched. |
| i | Cardinality | The number of DataItems to be returned. Zero (0) indicates that all DataItems that match the selection criteria and that are in the Data Focus will be returned. |
| i | DataItemType | The type of the DataItem. |
| i | SQLCondition | The string value is used to specify a SQL condition. A SQL condition is a combination of one or more expressions and logical operators that evaluates to either TRUE or FALSE. The string value must be a well formed SQL condition as it will be used in the WHERE clause of a SQL statement. An example value is: "!='CRC' ". |
| o | Status | The status of the call. |

Returns

A list of DataItems. NULL is returned if no DataItems are found to match the query. The Status will still be adi_OK in this case.

Notes

This is an auxiliary function used to find DataItems in the database. The caller specifies the Origin DataItem, the Cardinality desired, the DataItemType, and the SQLWhere key value.

aqi_ValidateDI

Validate a DataItem after it has been registered.

C Prototype

```
void
aqi_Validate        (aqi_DataItem_t        DI,
                     adi_Status_t          *Status)
```

Arguments

| | | |
|---|---|---|
| i | DI | The DataItem to validate. |
| o | Status | The status of the call. |

Returns

Void.

Notes

The Status will be adi_OK if DI is a valid DataItem in the current project.

08846205 .043007

Application Port Utilities (APU) Functions

Complete descriptions of the APU functions are presented on the following pages in alphabetical order by routine name.

apu_BeginTransaction

Begin a transaction on a list of Ports.

C Prototype

```
void
apu_BeginTransaction(aqi_DataItem_t        Module,
                     apu_PortL_t           LockDownPortList,
                     adi_Status_t          *Status)
```

Arguments

| | | |
|---|---|---|
| i | Module | The Module or Origin to which the Ports in the list belong. |
| i | LockDownPortList | The list of Ports whose DataItems are to be locked. |
| o | Status | The Status of operation. |

Returns

Void.

Notes

Together, the apu_BeginTransaction and apu_EndTransaction functions provide a convenient way to Begin and End transactions using Port lists to specify which DataItems should be locked down or released. In the case of a Port with SubPorts, namely the port associated with a Collection DataItem, all the DataItems associated with the SubPorts are locked down or released as well.

apu_BufferSize

Get the Buffer size (in Bytes) needed to perform IO operations on the specified Port with the specified access Index Extents.

C Prototype

```
Int32_t
apu_BufferSize       (apu_Port_t          Port,
                      apu_ExtentL_t       Extents,
                      adi_Status_t        *Status)
```

Arguments

| | | |
|---|---|---|
| i | Port | The Port whose Buffer size is needed for IO operations. |
| i | Extents | The Extents to be used to compute the Buffer size. |
| o | Status | The status of the call. |

Returns

The size of the Buffer in bytes.

Notes

This is accomplished by looking at the PortAccessIndexes attribute for each port (and possibly SubPorts), the Indexes specified in the function arguments, and the natural Index or the appropriate Index for the DataItem associated with a port (if not specified). If the ValueType Port attribute is set prior to making this call, then this ValueType is used to compute the Buffer Size; otherwise, the DataItem Storage ValueType is used.

apu_ClosePort

Close the specified port and free its resources. .

C Prototype

```
void  apu_ClosePort (apu_Port_t          Port,
                     adi_Status_t        *Status)
```

Arguments

| | | |
|---|---|---|
| i | Port | The Port to be closed. |
| o | Status | The status of the call. |

Returns

Void

Notes

This function cleans up a port and releases all its resources. It recurses on any SubPorts if appropriate. Also, if interest was expressed in this DataItem while the function was in process, a notification event will be generated. Specifically, it

- Cancels any Read/Write operations.
- Releases any system allocated Read/Write buffers.
- Releases any Read/Write locks specified for this port.
- Releases any dynamic memory.

apu_ConvertBuffer

Convert a multi-dimensional array of vector values.

C Prototype

```
void apu_ConvertBuffer(apu_Shape_t        FromShape,
                       vt_Datum_t         *FromBuffer,
                       apu_Shape_t        ToShape,
                       vt_Datum_t         *ToBuffer,
                       adi_status_t       *Status)
```

Arguments

| | | |
|---|---|---|
| i | FromShape | The Shape of the FromBuffer. |
| i | FromBuffer | The input buffer. The FromBuffer is fully described by the FromShape. |
| i | ToShape | The Shape of the ToBuffer. |
| i/o | ToBuffer | The output buffer. If this is specified as NULL, then the buffer is allocated by the function. In place conversion is allowed, i.e. the ToBuffer may be specified the same as the FromBuffer. The ToBuffer also serves as the converted output buffer. |
| o | Status | The status of the call. |

Returns

Void.

Notes

This is the general purpose function for converting an multi-dimensional array of vector values. The buffer may be converted in any combination of the following:

- Valuetype convert each vector
- Units convert each vector
- Index re-order the md-array
- Vector re-order, e.g. go from x,y,z to y,x,z vectors
- Reduce, e.g. go from x,y,z to x,y or from x,y to x,y,z vectors (z is absent filled) (the reduction can be both +ve or -ve, -ve reduction implies an expansion)

apu_CreateExtent

Create an Extent structure from the specified Information.

C Prototype

```
apu_Extent_t
apu_CreateExtent     (vt_ValueType_t         ValueType,
                      vt_Atom_t              Units,
                      vt_Datum_t             Begin,
                      vt_Datum_t             Interval,
                      Int32_t                Count,
                      vt_Datum_t             *ExplicitIndexArray,
                      adi_status_t           *Status)
```

| | | |
|---|---|---|
| i | ValueType | The ValueType of the elements of the Extent. |
| i | Units | The Units of the elements of the Extent. |
| i | Begin | The Begin value for implicit Extent. |
| i | Interval | The Interval for implicit Extent. |
| i | Count | The Count of values in the Array for Explicit Extent. |
| i | ExplicitIndexArray | An array of Count values that make up the Explicit Extent. |
| o | Status | The status of the call. |

Returns

A handle to the created Extent structure.

Notes

The apu_Extent_t structure can later be modified to specify which data is to be accessed via Port IO operations.

apu_CreateExtentFromDI

Create an Extent structure from a list of DataItems.

C Prototype

```
apu_Extent_t
apu_CreateExtentFromDI (aqi_DataItemL_t      DataItems,
                        vt_ValueType_t       ValueType,
                        vt_Atom_t            Units,
                        Int32_t              DimensionNumber,
                        Int32_t              OptionsMask,
                        adi_Status_t         *Status)
```

Arguments

| | | |
|---|---|---|
| i | DataItems | The DataItems that specify the sampling data (Indexes and Zone_Sets) either directly (e.g. actual Index or Zone_Set DataItems) or indirectly (e.g. Arrays or Parameters) from which Extents are to be computed. |
| i | ValueType | The ValueType to be used for the output extent. If NULL, then the optimum ValueType, namely the one that occurs most frequently in the list of DataItems, will be used. |
| i | Units | The Units for the created Extent. If NULL, then the optimum storage Units, namely the one occurring most frequently in the list of DataItems, will be used. An error status will be returned if the sampling data for any of the DataItems in the list has a measurement incompatible with the others. |
| i | DimensionNumber | If a multi-dimensional DataItem is encountered in the list, then this number specifies which dimension to use for creating the Extent. If APU_PRIMARYDIMENSION is passed for the DimensionNumber, then the DataItem's Grow_Dimension attribute is used. |
| i | OptionsMask | These are Options set to specify how to create the Extent. The Mask specifies options for ordering (up/down) and combining multiple extents. This encodes the following sets of options within which the choices are mutually exclusive. |

| | | |
|---|---|---|
| | Min/Max Extent | APU_MINEXTENT (default)<br>APU_MAXEXTENT |
| | Min/Max Interval | APU_MININTERVAL (default)<br>APU_MAXINTERVAL |
| | Extent Type | APU_IMPLICIT (default)<br>APU_EXPLICIT |
| | Direction | APU_UPDIRECTION<br>APU_DOWNDIRECTION<br>APU_OPTIMUMDIRECTION (default) |
| o | Status | The status of the call. |

Returns

A handle to the created Extent structure or NULL.

Notes

The Extent Type and Direction options also apply if the Extent is based on a single DataItem. An extent is computed for each DataItem in the list according to:

*Field, Well, Activity, Service_Run, Module_Run, Tool_Run*
The Extent is determined for all the contained arrays.

*Collection*
The Extent is determined for all the Elements that belong to the Collection.

*Array*
The Extent is computed from the extent information associated with the given array and the requested dimension (0-based)

*SubArray*
The Extent for the primary dimension is derived from the containing array, other dimension extents are derived from the sub array.

*Parameter*
If the requested ValueType is String_t, String-valued explicit extent is computed, otherwise a numeric explicit extent is derived from the Parameter's current ZoneSet, if any.

*ZoneSet*
If the requested ValueType is String_t, a String-valued explicit extent is computed from the zone names, with a null-string ("") representing gaps; otherwise, an Explicit Extent is computed from the given ZoneStarts and ZoneLengths.

*Index*
Explicit Index: Begin is the first value in the ExplicitIndexArray and Count is the size of the Array.
Implicit Index: Begin is set to the Reference, Interval is Index Interval, Count is 0

The resulting extents, if more than one, are combined according to the options specified.

apu_CreateExtentFromPort

Creates an Extent structure from the DataItem in a Port.

C Prototype

```
apu_Extent_t
apu_CreateExtentFromPort(apu_Port_t          Port,
                         vt_ValueType_t      ValueType,
                         vt_Atom_t           Units,
                         aqi_DataItem_t      CoordinateSystem,
                         Int32_t             DimensionNumber,
                         Int32_t             OptionsMask,
                         adi_Status_t        *Status)
```

Arguments

| | | |
|---|---|---|
| i | Port | The Port.. |
| i | ValueType | The ValueType to be used for the output extent. If NULL, then the optimum ValueType, namely the one that occurs most frequently in the list of DataItems, will be used. |
| i | Units | The Units for the created Extent. If NULL, then the optimum storage Units, namely the one occurring most frequently in the list of DataItems, will be used. An error status will be returned if the sampling data for any of the DataItems in the list has a measurement incompatible with the others. |
| i | CoordinateSystem | The Coordinate System to be used. |
| i | DimensionNumber | If a multi-dimensional DataItem is encountered in the list, then this number specifies which dimension to use for creating the Extent. If APU_PRIMARYDIMENSION is passed for the DimensionNumber, then the DataItem's Grow_Dimension attribute is used. |
| i | OptionsMask | These are Options set to specify how to create the Extent. The Mask specifies options for ordering (up/down) and combining multiple extents. This encodes the following sets of options within which the choices are mutually exclusive. |

| | |
|---|---|
| Min/Max Extent | APU_MINEXTENT (default)<br>APU_MAXEXTENT |
| Min/Max Interval | APU_MININTERVAL (default)<br>APU_MAXINTERVAL |
| Extent Type | APU_IMPLICIT (default)<br>APU_EXPLICIT |
| Direction | APU_UPDIRECTION<br>APU_DOWNDIRECTION<br>APU_OPTIMUMDIRECTION (default) |

| | | |
|---|---|---|
| o | Status | The status of the call. |

Returns

A handle to the created Extent structure or NULL.

Notes

This function is similar to the apu_CreateExtentFromDI. The difference is that this function is used for cases where the data is sorted based on the IndexSorts Port attribute. The returned Extent reflects the Index after the Sort.

apu_DeleteExtent

Delete an Extent structure.

C Prototype

```
void
apu_DeleteExtent(   apu_Extent_t          Extent,
                    adi_Status_t          *Status)
```

Arguments

| | | |
|---|---|---|
| i | Extent | The Extent to be deleted. |
| o | Status | The status of the call. |

Returns

Void.

Notes

This function deletes an extent created by the apu_CreateExtent or apu_CreateExtentFromDI call.

08846205.042097 apu_DIFromPort

Get the DataItem associated with the specified Port.

C Prototype

```
aqi_DataItem_t
apu_DIFromPort       (apu_Port_t          Port,
                      adi_Status_t        *Status)
```

Arguments

| | | |
|---|---|---|
| i | Port | The Port whose DataItem is to be returned. |
| o | Status | The status of the call. |

Returns

The handle to the DataItem.

Notes

None.

apu_EndTransaction

End a transaction on a list of Ports.

C Prototype

```
void
apu_EndTransaction  (aqi_DataItem_t         Module,
                     apu_PortL_t            LockDownPortList,
                     adi_TransactionFlag_t  Flag,
                     adi_Status_t           *Status)
```

Arguments

| | | |
|---|---|---|
| i | Module | The Module or Origin to which the Ports in the list belong. |
| i | LockDownPortList | The list of Ports which are to be released. |
| i | Flag | Flag whether the transaction should be ended with APU_COMMIT or APU_ABORT qualifier. |
| o | Status | The status of the call. |

Returns

Void.

Notes

Together, the apu_BeginTransaction and apu_EndTransaction functions provide a convenient way to Begin and End transactions using Port lists to specify which DataItems should be locked down or released. In the case of a Port with SubPorts, namely the port associated with a Collection DataItem, all the DataItems associated with the SubPorts are locked down or released as well.

apu_ExpressInterest

Request the ADI to notify the application with the specified callback when one of the Change Events specified in the EventMask occurs to one of the DataItems associated with the specified Port.

C Prototype

```
void
apu_ExpressInterest (apu_PortL_t           PortList,
                     apu_EventCallback_t   *EventFunction,
                     Int32_t               EventMask,
                     vt_Datum_t            EventContext,
                     adi_Status_t          *Status);
```

Arguments

| | | |
|---|---|---|
| i | Port | The port in whose DataItems interest is being expressed. |
| i | EventFunction | The Callback function invoked when a masked event occurs. |
| i | EventMask | The Mask indicating which event types are of interest. Formed by bit-wise combination (\|) of application-visible change event types: APU_DELETEEVENT, APU_ATTREVENT, APU_WRITEEVENT, and APU_UNITSYSTE-MEVENT. |
| i | EventContext | The Context to be passed to callback. |
| o | Status | The status of the call. |

Returns

Void.

Notes

Each notification is associated with a specific DataItem. The EventContext is passed to the callback.

- If the Port is open on a Collection DataItem, the interest is expressed on all SubPorts; however, the callback will identify the Port passed in the apu_ExpressInterest call.
- The interests are revoked when this function is called with a NULL EventFunction.

If apu_ExpressInterest has been called on two ports that are opened on the same DataItem, a callback will occur for BOTH ports. It should be noted that all callbacks for a given event in the same image receive the same event structure; therefore, it should be treated as a read-only structure.

apu_GetAttributes

Get the Attributes of the specified Port.

C Prototype

```
void
apu_GetAttributes     (apu_Port_t              Port,
                        adi_Status_t            *Status,
                        vt_Atom_t               Attribute1,
                        vt_Datum_t              *Attribute1Value,
                        ...                     ...,
                        vt_Atom_t               AttributeN,
                        vt_Datum_t              *AttributeNValue,
                        NULL)
```

Arguments

| | | |
|---|---|---|
| i | Port | The Port whose Attributes are to be fetched. |
| i | Attribute | The Attribute whose value is to be fetched. |
| i | AttributeValue | The Buffer that will contain the value of the Attribute. This must be supplied by the application. |
| o | AttributeValue | The value of the Attribute. |
| o | Status | The status of the call. |

Returns

Void.

Notes

None.

apu_GetPipeFunction

Get a system-defined Pipe function.

C Prototype

```
apu_PipeFunction_t
apu_GetPipeFunction (apu_PipeFunctionName_t Name,
                     adi_Status_t           *Status,
                     vt_Atom_t              Attribute1,
                     vt_Datum_t             Attribute1Value,
                     ...                    ...,
                     vt_Atom_t              AtributeN,
                     vt_Datum_t             AttributeNValue,
                     NULL)
```

Arguments

| | | |
|---|---|---|
| i | Name | The enumerated Name of the Pipe function you want. |
| i | Attribute | An Attribute specific to the Pipe function whose value is being set as part of the Get operation. |
| i | AttributeValue | The value of the Attribute. |
| o | Status | The status of the call. |

Returns

The structure that contains the specification of the Pipe function together with the values of the Variants (Attributes).

Notes

This function is used to get a PipeFunction structure that contains the definition of a system pipe function. The returned PipeFunction structure may then be used to set the GateFunction, FilterFunction or ConversionFunction attributes of a Port. Variants which are specific to the Pipe function may be set by specifying them as the variable arguments to this function.

apu_MergeBuffers

Merge two buffers that contain multi-dimensional arrays of vector values.

C Prototype

```
void apu_MergeBuffers(apu_Shape_t          FromShape1,
                      vt_Datum_t           *FromBuffer1,
                      apu_Shape_t          FromShape2,
                      vt_Datum_t           *FromBuffer2,
                      apu_Shape_t          ToShape,
                      vt_Datum_t           *ToBuffer,
                      adi_status_t         *Status)
```

Arguments

| | | |
|---|---|---|
| i | FromShape1 | The Shape of the first FromBuffer. |
| i | FromBuffer1 | The first input buffer. The FromBuffer1 is fully described by the FromShape1. |
| i | FromShape2 | The Shape of the second FromBuffer. |
| i | FromBuffer2 | The second input buffer. The FromBuffer2 is fully described by the FromShape2. The vectors in FromBuffer2 have precedence over similarly named vectors in FromBuffer1. |
| i | ToShape | The Shape of the ToBuffer. |
| i/o | ToBuffer | The output buffer. If this is specified as NULL, then the buffer is allocated by the function. This also serves as the merged output buffer. |
| o | Status | The status of the call. |

Returns

Void.

Notes

This function will internally call the apu_ConvertBuffer function to do any buffer conversion necessary. An example usage of this function is:

Given: Buffer1 = vectors x, y, z, a, b
Buffer2 = vectors x,y,z
ToShape = vectors x,y,z,b Then ToBuffer will contain vectors x,y,z from Buffer2 and vector b from Buffer1.

apu_OpenPortByDI

Create a Port by specifying a DataItem handle.

C Prototype

```
apu_Port_t
apu_OpenPortByDI      (aqi_DataItem_t        Origin,
                       aqi_DataItem_t        DataItem,
                       apu_Direction_t       Direction,
                       adi_Status_t          *Status)
```

Arguments

| | | |
|---|---|---|
| i | Origin | The Origin of the DataItem which will be associated with the created Port. This is usually the Module_Run. |
| i | DataItem | The handle of the DataItem to be associated with the created Port. |
| i | Direction | The direction for Port data flow and could be either of APU_READ, APU_WRITE or APU_-DUPLEX. |
| o | Status | The status of the call. |

Returns

The handle to the created Port.

Notes

If the DataItem associated with the Port is a Collection DataItem, then a SubPort is created for each DataItem in the Collection. This is a recursive operation. Also, if interest was expressed in this DataItem while the function was in process, a notification event will be generated.

If the DataItem is not recorded in the Process History for the Module_Run Origin, the system will generate a Binding DataItem internally. The Binding DataItem will be tagged with the Port Direction in the Binding table as follows:

- Input for APU_READ
- Output for APU_WRITE
- Input for APU_DUPLEX apu_OpenPortByDIName

Create a Port by specifying a DataItem name.

C Prototype

```
apu_Port_t
apu_OpenPortByDIName(aqi_DataItem_t       Origin,
                     vt_Atom_t            DICode,
                     apu_Direction_t      Direction,
                     adi_Status_t         *Status)
```

Arguments

| | | |
|---|---|---|
| i | Origin | The Origin of the DataItem to be associated with the created Port. |
| i | DICode | The Code of the DataItem to be associated with the created Port. |
| i | Direction | The direction for Port data flow, either APU_READ, APU_WRITE, or APU_DUPLEX. |
| o | Status | The status of the call. |

Returns

The handle of the created Port. NULL is returned if DataItem does not exist.

Notes

It looks through all the DataItems that have the specified Origin (no Process History or Component search is performed). If the DataItem name matches, it creates a Port and associates the DataItem with it. Otherwise, it return a NULL handle. Also, if interest was expressed in this DataItem while the function was in process, a notification event will be generated. If the DataItem is not recorded in the Process History for the current Module_Run Origin, the system will generate a Binding DataItem internally.

apu_PutAttributes

Write the Attributes of the specified Port.

C Prototype

```
void
apu_PutAttributes    (apu_Port_t          Port,
                      adi_Status_t        *Status,
                      vt_Atom_t           Attribute1,
                      vt_Datum_t          Attribute1Value,
                      ...                 ...,
                      vt_Atom_t           AtributeN,
                      vt_Datum_t          AttributeNValue,
                      NULL)
```

Arguments

| | | |
|---|---|---|
| i | Port | The Port whose Attributes are to be modified. |
| i | Attribute | The Attribute whose value is to be fetched. |
| i | AttributeValue | The value of the Attribute. This must be supplied by the application. |
| o | Status | The status of the call. |

Returns

Void.

Notes

The writes are not permitted while any IO operation is in progress for that Port.

apu_Read

Initiate and complete a read operation for the specified Port.

C Prototype

```
void  apu_Read      (apu_Port_t          Port,
                     apu_ExtentL_t       Extents,
                     vt_Datum_t          *Buffer,
                     Int32_t             Timeout,
                     adi_Status_t        *Status)
```

Arguments

| | | |
|---|---|---|
| i | Port | The read Port. |
| i | Extents | The Extents for the read operation. This should be NULL if the Extents are specified as a Port Attribute. |
| io | Buffer | As an input argument, the Buffer for the read operation. May be NULL if Buffer is specified as a Port Attribute. This will be output if there is a system allocated buffer and will contain the result of the read. |
| i | Timeout | This could be either APU_DO_NOT_BLOCK, APU_WAIT_FOR_COMPLETION or a Timeout value in milliseconds. |
| o | Status | The status of the call. |

Returns:

Void.

Notes

This function is a combination of the apu_ReadRequest and apu_ReadComplete functions. It can be used where callbacks are not to be associated with the read operation.

apu_ReadComplete

Complete the read operation for the specified port.

C Prototype

```
void
apu_ReadComplete     (apu_Port_t          Port,
                      Int32_t             Timeout,
                      adi_Status_t        *Status)
```

Arguments

| | | |
|---|---|---|
| i | Port | The read Port. |
| i | Timeout | This could be either APU_DO_NOT_BLOCK, APU_WAIT_FOR_COMPLETION or a Timeout value in milliseconds. |
| o | Status | The status of the call. |

Returns

Void.

Notes

This function may also be called to access Data on any Sub Ports. The following sequence of operations takes place:

- Waits for the current Read IO operation to complete on the Port, and if it times out, returns an appropriate Status.
- If the IO operation had any errors, returns the Status.

This function must be preceded by an apu_ReadRequest function to initiate the read operation.

apu_ReadRequest

Initiate a read operation for the specified port.

C Prototype

```
void
apu_ReadRequest      (apu_Port_t            Port,
                      apu_ExtentL_t         Extents,
                      vt_Datum_t            *Buffer,
                      apu_EventCallback_t   *EventFunction,
                      vt_Datum_t            EventContext,
                      adi_Status_t          *Status)
```

Arguments

| | | |
|---|---|---|
| i | Port | The read Port. |
| i | Extents | The Index Extents for the read operation. This should be NULL if the Extents are specified as a Port Attribute. |
| io | Buffer | As an input argument, the Buffer for the read operation. May be NULL if Buffer is specified as a Port Attribute. As an output argument, it will contain the read values. |
| i | EventFunction | The function to be called when the read completes. |
| i | EventContext | The context to be passed to the EventFunction. |
| o | Status | The status of the call. |

Returns:

Void.

Notes

The following sequence of operations take place:

- If another Read Operation is still in progress for this Port or any Parent Port, returns an error status.
- If no transaction is active, begins an implicit transaction.
- If a buffer is passed explicitly, uses it.; otherwise, uses the Buffer identified in the PortBuffer attribute.
- Initiates the IO Operation and returns the Status.
- When the IO completes, invokes the event function if specified. The argument for the event function is the Port, the user-specified event context, and a Port operation information structure.
- If an implicit transaction is active, ends it.

apu_ResampleBuffer

Re-sample a multi-dimensional array of a single vector value.

C Prototype

```
void apu_ResampleBuffer(apu_PipeFunction_t  GateFunction,
                        vt_ValueType_t       ValueType,
                        Int32L_t             IndexOrdering,
                        apu_ExtentL_t        FromExtents,
                        vt_Datum_t           *FromBuffer,
                        apu_ExtentL_t        ToExtents,
                        vt_Datum_t           *ToBuffer,
                        adi_status_t         *Status)
```

Arguments

| | | |
|---|---|---|
| i | GateFunction | The Gate function to use for the re-sampling. The apu_GetPipeFunciton() method has to be used to obtain a handle to the system GateFunctions. |
| i | ValueType | The valuetype of the data in the buffer. |
| i | IndexOrdering | The index ordering of the data in the buffer |
| i | FromExtents | The Extents of the from buffer. |
| i | FromBuffer | The input buffer. The FromBuffer is fully described by the FromExtents. |
| i | ToExtents | The Extents of the ToBuffer. The data is re-sampled to this extent. |
| i/o | ToBuffer | The output buffer. If this is specified as NULL, then the buffer is allocated by the function. In place conversion is allowed, i.e. the ToBuffer maybe specified the same as the FromBuffer. This also serves as the converted output buffer. |
| o | Status | The status of the call. |

Returns

Void.

Notes

Any of the system gate functions or a user defined gate function can be used for the re-sample.

apu_SubPortByDIName

Get the handle to the SubPort.

C Prototype

```
apu_Port_t
apu_SubPortByDIName (apu_Port_t          ParentPort,
                     vt_Atom_t           ChildDICode,
                     adi_Status_t        *Status)
```

Arguments

| | | |
|---|---|---|
| i | ParentPort | The Parent Port whose SubPort is desired. |
| i | ChildDICode | The Code of the DataItem associated with the Sub-Port. |
| o | Status | The status of the call. |

Returns

The handle to the SubPort. NULL if no Port is found that matches the name.

Notes

In this case, the name of the DataItem associated with the SubPort is specified.

apu_SubPortByPosition

Allow access to SubPorts so that attributes may be set and/or examined.

C Prototype

```
apu_Port_t
apu_SubPortByPosition(apu_Port_t          ParentPort,
                      Int32_t             Position,
                      adi_Status_t        *Status)
```

Arguments

| | | |
|---|---|---|
| i | ParentPort | The Parent Port whose SubPort is desired. |
| i | Position | A positive number that specifies the Position in the list of SubPorts. The first Position starts at 0. The Port at Position 0 is always the Parent Port. |
| o | Status | The status of the call. |

Returns

The handle to the SubPort. NULL is returned if there is no port at this Position, namely if the Position is outside the range of SubPort list. The Status will be adi_OK in this case.

Notes

This function is used in the case that a Port has SubPorts, namely when the DataItem associated with the Port is a Collection.

apu_Write

Initiate and complete a write operation for the specified Port.

C Prototype

```
void
apu_Write           (apu_Port_t           Port,
                     apu_ExtentL_t        Extents,
                     vt_Datum_t           *Buffer,
                     Int32_t              Timeout,
                     adi_Status_t         *Status)
```

Arguments

| | | |
|---|---|---|
| i | Port | The write Port. |
| i | Extents | The Index Extents for the write operation. This should be NULL if the Extents are specified as a Port Attribute. |
| i | Buffer | The Buffer for the write operation. May be NULL if Buffer is specified as a Port Attribute. The Buffer is always user allocated. |
| i | Timeout | This could be either APU_DO_NOT_BLOCK, APU_WAIT_FOR_COMPLETION or a Timeout value in milliseconds. |
| o | Status | The status of the call. |

Returns

Void.

Notes

This function is a combination of the apu_WriteRequest and apu_WriteComplete functions. It can be used where callbacks are not to be associated with the write operation.

apu_WriteComplete

Complete the write request.

C Prototype

```
void
apu_WriteComplete    (apu_Port_t          Port,
                      Int32_t             Timeout,
                      adi_Status_t        *Status)
```

Arguments

| | | |
|---|---|---|
| i | Port | The write Port. |
| i | Timeout | This could be either APU_DO_NOT_BLOCK, APU_WAIT _FOR_COMPLETION or a Timeout value in milliseconds. |
| o | Status | The status of the call. |

Returns

Void.

Notes

The following sequence of operations take place:

- Waits for current write IO operation to complete or timeout.
- If timeout, returns timeout status; otherwise, returns IO status.

This function must be preceded by an apu_WriteRequest function to initiate the write operation.

08848205 .043097 apu_WriteRequest

Initiate a write request.

C Prototype

```
void
apu_WriteRequest     (apu_Port_t              Port,
                      apu_ExtentL_t           Extents,
                      vt_Datum_t              *Buffer,
                       apu_EventCallback_t    *EventFunction,
                      vt_Datum_t              EventContext,
                      adi_Status_t            *Status)
```

Arguments

| | | |
|---|---|---|
| i | Port | The write Port. |
| i | Extents | The Index Extents for the write operation. This should be NULL if the Extents are specified as a Port Attribute. |
| i | Buffer | The Buffer for the write operation. May be NULL if Buffer is specified as a Port Attribute. |
| i | EventFunction | The function to be called when the read completes. |
| i | EventContext | The context to be passed to the EventFunction. |
| o | Status | The status of the call. |

Returns

Void.

Notes

The following sequence of operations take place:

- If another Write Operation is still in progress for this Port or any Parent Port, returns an error Status.
- If no transaction is active, begins an implicit transaction.
- If a Buffer is specified, use it, otherwise use the PortBuffer attribute.
- Initiates the IO Operation and returns the Status
- When the IO completes, indicates that the IO has completed.
- If a user defined a callback, invokes it.
- If an implicit transaction is active, ends it.

This function must be followed by an apu_WriteComplete function to complete the write operation.

apu_PipeFunction_t

This is used to attach a function to the GateFunction, FilterFunction, and ConversionFunction Attributes of a Port.

C Prototype

```
typedef struct {
                    void                    (*Gate)(,,,...);
                    void                    (*Filter)(,,,...);
                    void                    (*Conversion)(,,,...);
                    Int32_t                 BeforeCount;
                    Int32_t                 AfterCount;
                    vt_Datum_t              ApplContext;
} apu_PipeFunction_st, *apu_PipeFunction_t;
```

The ApplContext will contain the Application supplied Context which are the variants to the PipeFunction.

The arguments to the Gate, Filter and Conversion must match those of the Gate Function, Filter Function and Conversion Function prototypes. The appropriate function must be attached to one of these members.

apu_PipeFunctionName_t

This enumeration type specifies the names of all the system Pipe functions available.

C Prototype

```
typedef enum {
APU_INTERPOLATE_GATE, APU_CLAMP_FILTER, ......
} apu_PipeFunctionName_t;
```

apu_Port_t
apu_PortL_t

This is the application transparent handle for accessing Ports. One cannot directly access the members of this handle. The functions apu_PutAttributes and apu_GetAttributes will be used to access the members. There is also a list of Ports.

apu_PortEvent_t

This type specifies the event data for any type of event.

C Prototype

```
typedef struct{
APU_EVENT_COMMON;
apu_Port_t          Port; /*Port that got opened/closed*/
} apu_PortEvent_st, *apu_PortEvent_t;
```

apu_Shape_t

This structure is used to specify the shape of vector values in a md-array.

C Prototype

```
typedef struct {
apu_VectorL_t         Vectors;
apu_VectorFormat_t    Format;
Int32L_t              Counts;
Int32L_t              IndexOrdering;
} *apu_Shape_t;
```

Counts is the count of the elements along each dimension of the array.

apu_Vector_t
apu_VectorL_t

This structure is used to specify the characteristics of a Vector. There is also a list of Vectors

C Prototype

```
typedef struct {
vt_Atom_t           Name;
vt_ValueType_t      ValueType;
vt_Atom_t           Units;
vt_Atom_t           Field;
Int32_t             Position;
} *apu_Vector_t;
```

apu_VectorDirection_t
apu_VectorDirectionL_t

This is an enumerated type that is used to specify the Direction of vector elements. Its values are:

| | |
|---|---|
| APU_NOTDEFINED | Direction not defined |
| APU_INCREASING | Increasing direction |
| APU_DECREASING | Decreasing direction |

apu_VectorFormat_t

This is an enumerated type that is used to specify the format of the vector buffer. Its values are:

| | |
|---|---|
| APU_PACKED | Packed format |
| APU_UNPACKED | Unpacked format |
| APU_PACKED_PTR | Packed Pointer format |
| APU_UNPACKED_PTR | Unpacked Pointer format |

aqi_AtttributeType_t

This enumerated type is used as a key to specify types of DataItem attributes to be accessed via the appropriate AQI functions. It may have any of the following values:

| | |
|---|---|
| ATTR_ALL | Applies to any attribute |
| ATTR_READ_ONLY | Attributes that cannot be changed |
| ATTR_DUPLEX | Attributes that are writeable |
| ATTR_NON_NULLABLE | Attributes whose value has to be supplied |
| ATTR_APPLICATION | Attributes that are typically of interest to applications |
| ATTR_PARAMETRIC | Parametric Attributes |
| ATTR_RELATIONAL | Relational Attributes |
| ATTR_SYSTEM | System Attributes |
| ATTR_CATALOG | Catalog Attributes |
| ATTR_DERIVED | Attributes computed from database attributes |
| ATTR_FORWARDED | Attributes not defined in data model, forwarded property representation (e.g.Parameters) |
| ATTR_UNIT_CONVERTIBLE | Attributes that are Unit convertible |
| ATTR_COORD_CONVERTIBLE | Attributes that are Coordinate convertible |

Attribute types overlap, but APPLICATION, SYSTEM and CATALOG partition the attribute domain.

aqi_DataItem_t
aqi_DataItemL_t

This is the handle for accessing DataItems from the database. You cannot directly access the members of this handle. The functions aqi_PutAtributes and aqi_GetAttributes will be used to access the members. There is also a handle to a list of DataItems.

aqi_State_t

This is an enumerated type that specifies the value of the State attribute of a DataItem. It may take any of the following values:

| | |
|---|---|
| AQI_MEMORY | Applies to DataItems that are memory based |
| AQI_MEMORY_ONLY | Applies to DataItems that are memory only |
| AQI_TRANSIENT | Applies to non-bulk DataItems that are not written to storage |
| AQI_PERSISTENT | Applies to DataItems that are written to storage |

Macros

Complete descriptions of the Macros are presented below in alphabetical order by routine name.

APU_WAIT_FOR_COMPLETION

Specifies that a thread should block until I/O operation completes.

APU_DO_NOT_BLOCK

Specifies that a thread should not block

Pipe Functions

The list of available system pipe functions are given below.

- APU_MAXIMUM_GATE
  The new value is equal to the Maximum of the Before and After value.
  BeforeCount = 1
  AfterCount = 1
  Variants = None
- APU_MINIMUM_GATE
  The new value is equal to the Minimum of the Before and After value.
  BeforeCount = 1
  AfterCount = 1
  Variants = None
- APU_AVERAGE_GATE
  The new value is equal to the Average of the Before and After value.
  BeforeCount = 1
  AfterCount = 1
  Variants = None
- APU_INTERPOLATE_GATE
  This is the default Gate that will be always applied in the absence of an explicit GateFunction Port Attribute. A simple 1 point linear interpolation is used to compute the new value.
  BeforeCount = 1
  AfterCount = 1
  Variants = None

- APU_AZIMUTH_GATE
  This Gate is used to interpolate radial values (radians or degrees) where the data wraps around and fluctuates between 0 to 360 degrees.
  BeforeCount = 1
  AfterCount = 1
  Variants = None

- APU_LOWER_GATE
  The new value is equal to the value at the Lower index of the Before and After index
  BeforeCount = 1
  AfterCount = 1
  Variants = None

- APU_UPPER_GATE
  The new value is equal to the value at the Upper index of the Before and After index
  BeforeCount = 1
  AfterCount = 1
  Variants = None

- APU_ABSENT_GATE
  The new value is equal to the Absent value if the index does not exist.
  BeforeCount = 1
  AfterCount = 1
  Variants = None

- APU_CLOSEST_GATE
  The new value is equal to the value at the Closest index of the Before and After index.
  BeforeCount = 1
  AfterCount = 1
  Variants = None

- APU_WEIGHTED_AVERAGE_FILTER
  Perform weighted vertical averaging on an array of values of type Float32.
  BeforeCount = User specified
  AfterCount = User specified
  Variants = Weights (Float32), NumWeights (Int32). The NumWeights must equal BeforeCount + AfterCount + 1

- APU_LOG10_AVERAGE_FILTER
  Perform log10 vertical averaging on an array of values of type Float32.
  BeforeCount = User specified
  AfterCount = User specified
  Variants = Weights (Float32), NumWeights (Int32)

- APU_RECIPROCAL_AVERAGE_FILTER
  Perform reciprocal vertical averaging on an array of values of type Float32.
  BeforeCount = User specified
  AfterCount = User specified
  Variants = Weights (Float32), NumWeights (Int32)
- APU_HODGES_LEHMANN_FILTER
  Perform weighted vertical averaging on an array of values of type Float32 using Hodges-Lehmann's method for finding the arithmetic median of a set of numbers.
  BeforeCount = User specified
  AfterCount = User specified
  Variants = None apu_GateFunction

Specify gate functions that impose programmer conversion.

C Prototype

```
void
apu_GateFunction      (apu_PipeContext_t,      Context,
                       Int32_t                 InCount,
                       vt_Datum_t              *IndexIn,
                       vt_Datum_t              *DataIn,
                       Int32_t                 OutCount,
                       vt_Datum_t              *IndexOut,
                       vt_Datum_t              *DataOut,
                       adi_Status_t            *Status)
```

Arguments

| | | |
|---|---|---|
| i | Context | The Context passed in to the Gate function. |
| i | InCount | The Count of values in IndexIn and DataIn |
| i | IndexIn | The index of the data to be gated. |
| i | DataIn | The data elements to be gated. |
| i | OutCount | The count of values in IndexOut and DataOut |
| i | IndexOut | The index to which the DataIn should be gated to. |
| o | DataOut | The data elements on the access grid. |
| o | Status | The status of the call. |

Returns

Void.

Notes

None.

apu_FilterFunction

Specify the filter functions that interpolate data to an index.

C Prototype

```
void
apu_FilterFunction  (apu_PipeContext_t,    Context,
                     Int32_t               InCount,
                     vt_Datum_t            *DataIn,
                     Int32_t               OutCount,
                     vt_Datum_t            *DataOut,
                     adi_Status_t          *Status)
```

Arguments

| | | |
|---|---|---|
| i | Context | The Context passed in to the Filter function. |
| i | InCount | The Count of values in DataIn . |
| i | DataIn | The data elements to be filtered |
| i | OutCount | The count of values in DataOut. |
| o | DataOut | The filtered data elements. |
| o | Status | The status of the call. |

Returns

Void.

Notes

None.

apu_ConversionFunction

Specify the conversion functions that filter data as specified.

C Prototype

```
void
apu_ConversionFunction(apu_PipeContext_t    Context,
                       Int32_t              InCount,
                       vt_Datum_t           *DataIn,
                       Int32_t              OutCount,
                       vt_Datum_t           *DataOut,
                       adi_Status_t         *Status)
```

Arguments

| | | |
|---|---|---|
| i | Context | The Context passed in to the Conversion function. |
| i | InCount | The Count of values in DataIn. |
| i | DataIn | The data elements to be converted. |
| i | OutCount | The count of values in DataOut. |
| o | DataOut | The converted data elements. |
| o | Status | The status of the call. |

Returns

Void.

Notes

None.

Application Query Interface (AQI) Functions

Complete descriptions of the AQI functions are presented below in alphabetical order by routine name.

aqi_BeginTransaction

Broadcast intention to lock DataItems.

C Prototype

```
void
aqi_BeginTransaction(aqi_DataItemL_t        DataItemList,
                     Int32L_t               AccessList,
                     adi_Status_t           *Status)
```

Arguments

| | | |
|---|---|---|
| i | DataItemList | The list of DataItems to be locked. |
| i | AccessList | The access direction to be associated with the locks on the DataItems. The values can be APU_READ, APU_WRITE or APU_DUPLEX. There is one access per DataItem. |
| o | Status | The Status of the call. An error is returned if more than one explicit transaction is attempted. |

Returns

Void.

Notes

Together, the aqi_BeginTransaction and aqi_EndTransaction provide some degree of consistency in the database. The aqi_BeginTransaction call broadcasts an intention to lock DataItems according to their access. Other incoming transactions will block accordingly. The aqi_EndTransaction call releases these locks. At most, one transaction may be active at any time in the same image. If a second aqi_BeginTransaction call is made while a transaction is active, the call will be rejected.

If the transaction is ended with a Commit qualifier, then if any DataItems are modified, the applications that have expressed an interest in the DataItems are notified.

Note that the actual blocking or locking of the DataItems does not occur immediately when the aqi_BeginTransaction is called. It occurs when the first access is made to any of the DataItems in the list.

aqi_CreateArray

Create a multi-dimensional Array DataItem in the database.

C Prototype

```
aqi_DataItem_t
aqi_CreateArray     (aqi_DataItem_t      Origin,
                     vt_Atom_t           Code,
                     vt_AtomL_t          Modifiers,
                     aqi_DataItemL_t     Indexes,
                     adi_Status_t        *Status)
```

Arguments

| | | |
|---|---|---|
| i | Origin | The DataItem to be used as the Origin for the Array. This is usually the Module_Run. |
| i | Code | A unique abbreviation that identifies the DataItem. This is dictionary-controlled. |
| i | Modifiers | Modifiers are used to indicate the processing history of the array of data; typically, each application will add a modifier to the list of modifiers to indicate that it was involved in the creation of the data. For example, a GR array output by a borehole correction module might have a CRC modifier to indicate that it was a corrected array. If that array were then edited, the new GR array would have (EDT, CRC) as its list of modifiers. Standard Modifiers are defined in a dictionary, but modifiers are not restricted to this dictionary. This may be NULL. |
| i | Indexes | A list of Indexes. There is one Index per dimension of the Array. The Indexes are ordered by Dimension. This is a mandatory argument. |
| o | Status | The status of the call. |

Returns

An Array DataItem handle.

Notes

The DataItem is not locked after creation.

aqi_CreateBinding

Create a Binding DataItem in the database.

C Prototype:

```
aqi_DataItem_t

aqi_CreateBinding    (aqi_DataItem_t        Origin,
                      aqi_DataItem_t        Dataitem,
                      vt_Atom_t             Port_Identifier,
                      vt_Atom_t             Direction,
                      String_t              Source,
                      adi_Status_t          *Status)
```

Arguments

| | | |
|---|---|---|
| i | Origin | The DataItem to be used as the Origin for the Binding. This can only be a Module_Run. |
| i | DataItem | The DataItem that is bound to the Module_Run. |
| i | Port_Identifier | An application name that can be used to identify the Binding, e.g. InputChannelOne. Not dictionary-controlled. |
| i | Direction | One of Input, Output or Duplex. |
| i | Source | The source of the Binding. Suggested values are User, Search, Default and Script. Not dictionary-controlled. |
| o | Status | The status of the call. |

Returns

A Binding DataItem handle.

Notes

A Binding is the association of a DataItem with a Module_Run and is the implementation of Process History. Bindings are identified by the attributes Port_Identifier, Direction (one of Input, Output or Duplex) and Source. The system will automatically create an Output Binding when a Data or Sampling DataItem is created with a Module_Run Origin. The system will also create Bindings in certain Port operations (see apu_OpenPortByDI).

The DataItem is not locked after creation.

aqi_CreateCollection

Create a Collection DataItem in the database.

C Prototype:

```
aqi_DataItem_t
aqi_CreateCollection(aqi_DataItem_t      Origin,
                     vt_Atom_t           Code,
                     aqi_DataItemL_t     DataItems,
                     adi_Status_t        *Status)
```

Arguments

| | | |
|---|---|---|
| i | Origin | The DataItem to be used as the Origin for the Collection. This is normally the Module_Run. |
| i | Code | A unique abbreviation that identifies the DataItem. This is dictionary-controlled. |
| i | DataItems | The list of DataItems that belong to the Collection. |
| o | Status | The status of the call. |

Returns

A Collection DataItem handle.

Notes

The DataItem is not locked after creation.

aqi_CreateDI

Create any DataItem in the database.

C Prototype

```
aqi_DataItem_t
aqi_CreateDI        (aqi_DataItem_t      Origin,
                     vt_Atom_t           Type,
                     vt_Atom_t           Code,

                     aqi_DataItem_t      Context,
                     adi_Status_t        *Status,
                     vt_Atom_t           Attribute1,
                     vt_Datum_t          Attribute1Value,
                     ...                 ...
                     vt_Atom_t           AttributeN,
                     vt_Datum_t          AttributeNValue,
                     NULL)
```

Arguments

| | | |
|---|---|---|
| i | Origin | The DataItem to be used as the Origin for the created DataItem. This is usually the Module_Run. |
| i | Type | The type of the DataItem being created. |
| i | Code | A unique abbreviation that identifies the DataItem. This will usually be catalog-controlled. |
| i | Context | An optional Context. The storage units, valuetype, and coordinate system are obtained from the Context in the absence of arguments that specify these attributes explicitly. |
| i | Attribute | A DataItem attribute. |
| i | Attribute Value | The value of the attribute. |
| o | Status | The status of the call. |

Returns

The handle of the created DataItem.

Notes

This is the primitive DataItem creation function on which all the other creation functions are based.

The system will automatically create an Output Binding when a Data or Sampling DataItem is created with a Module_Run Origin (see aqi_CreateBinding). When creating a Data or Sampling DataItem, aqi_CreateDI allows the application programmer to specify special attributes whose values are forwarded on to the associated Binding DataItem.These special attributes are Port_Identifier, Direction and Binding_Source. Their valuetypes are the same as the corresponding attributes in the Binding DataItem.

aqi_CreateIndex

Create an Index DataItem in the database.

C Prototype

```
aqi_DataItem_t
aqi_CreateIndex      (aqi_DataItem_t          Origin,
                      vt_Atom_t               Code,
                      vt_Atom_t               Units,
                      vt_ValueType_t          ValueType,
                      vt_Datum_t              Reference,
                      vt_Datum_t              Interval,
                      aqi_DataItem_t          Array,
                      adi_Status_t            *Status)
```

Arguments

| | | |
|---|---|---|
| i | Origin | The DataItem to be used as the Origin for the Index. This is usually the Module_Run. |
| i | Code | A unique abbreviation that identifies the DataItem. This is dictionary-controlled. |
| i | Units | The Units of the Index. |
| i | ValueType | The ValueType of the Reference, Interval and the Index. |
| i | Reference | The Index Reference Point. NULL for explicit index. |
| i | Interval | The interval between adjacent Index values. NULL for explicit index. |
| i | Array | The Array DataItem that contains or will contain the explicit Index values. This is NULL for implicit Index and may be NULL for explicit Index. |
| o | Status | The status of the call. |

Returns

An Index DataItem handle.

Notes

To create an implicit index, specify Reference and Interval. To create an explicit index, Reference and Interval must be NULL and the Array may be optionally specified. If the Array is NULL, an aqi_Array with no data will be automatically created by the function.The DataItem is not locked after creation.

aqi_CreateParameter

Create a Parameter DataItem in the database.

C Prototype:

```
aqi_DataItem_t
aqi_CreateParameter (aqi_DataItem_t        Origin,
                     vt_Atom_t             Code,
                     vt_AtomL_t            Modifiers,
                     adi_Status_t          *Status)
```

Arguments

| | | |
|---|---|---|
| i | Origin | The DataItem to be used as the Origin for the Parameter. This is usually the Module_Run. |
| i | Code | A unique abbreviation that identifies the DataItem. This is dictionary-controlled. |
| i | Modifiers | A list that is used to store the history. Standard Modifiers are defined in a Dictionary, but the modifiers are not restricted to this dictionary. This may be NULL. |
| o | Status | The status of the call. |

Returns

A Parameter DataItem handle.

Notes

The DataItem is not locked after creation. The value of the parameter must be set with the apu_Write operation.

aqi_CreateSubArray

Create a multi-dimensional SubArray DataItem in the database.

C Prototype:

```
aqi_DataItem_t
aqi_CreateSubArray    (aqi_DataItem_t        Origin,
                       vt_Atom_t             Code,
                       vt_AtomL_t            Modifiers,
                       aqi_DataItem_t        Parent,
                       adi_Status_t          *Status)
```

Arguments

| | | |
|---|---|---|
| i | Origin | The DataItem to be used as the Origin for the SubArray. This is usually the Module_Run. |
| i | Code | A unique abbreviation that identifies the SubArray. This is dictionary-controlled. |
| i | Modifiers | A list that is used to store the history. The Modifiers are dictionary-controlled. This may be NULL. |
| i | Parent | The Array DataItem that is the Parent of the SubArray. |
| o | Status | The status of the call. |

Returns

A SubArray DataItem handle.

Notes

The SubArray references a Parent Array which must already exist in the DataBase. The SubArray has all the characteristics of an Array. It simply represents a contiguous sub part of the Parent Array.

The DataItem is not locked after creation.

aqi_CreateUserAttribute

Create a UserAttribute (programmer-defined attribute) for the given DataItem.

C Prototype

```
void
aqi_CreateUserAttribute(aqi_DataItem_t      DataItem,
                        vt_Atom_t           AttributeName,
                        vt_ValueType_t      ValueType,
                        adi_Status_t        *Status)
```

Arguments

| | | |
|---|---|---|
| i | DataItem | The DataItem whose attribute is to be created. |
| i | AttributeName | The name of the new user attribute. This is not dictionary-controlled. |
| i | ValueType | The value type of the new attribute which may be application defined. This is not dictionary-controlled. |
| o | Status | The status of the call. |

Returns

Void

Notes

A new entry is made in the user attributes table for the given DataItem, and the value of the new user attribute is initialized to NULL. This function is not recommended for use since it is being phased out; it is included here for backwards compatibility.

aqi_CreateZoneSet

Create a Zone_Set DataItem in the database.

C Prototype:

```
aqi_DataItem_t
aqi_CreateZoneSet    (aqi_DataItem_t         Origin,
                      vt_Atom_t                Code,
                      adi_Status_t           *Status)
```

Arguments

| | | |
|---|---|---|
| i | Origin | The DataItem to be used as the Origin for the Zone_Set. This is usually the Module_Run. |
| i | Code | A unique abbreviation that identifies the DataItem. This is dictionary-controlled. |
| o | Status | The status of the call. |

Returns

A Zone_Set DataItem handle.

Notes

None.

08846205.043097 aqi_DeleteDI

Delete a DataItem if the DataItem is owned by the specified Origin.

C Prototype:

```
void
aqi_DeleteDI        (aqi_DataItem_t        Origin,
                     aqi_DataItem_t        DataItem,
                     adi_Status_t          *Status)
```

Arguments

| | | |
|---|---|---|
| i | Origin | The callers Origin. This will typically be the Module_Run. |
| i | DataItem | The DataItem to be deleted. |
| o | Status | The status of the call. |

Returns

Void.

Notes

A write lock is placed on the DataItems while the deletion is in progress. If anyone has expressed an interest in this DataItem, a notification event is generated after the delete completes, or at the end of the Explicit Transaction, if one is pending.

This function will also delete all other DataItems contained in the deleted DataItem.

Collection members are not deleted when a Collection DataItem is deleted.

aqi_EndTransaction

Release the locks on the DataItems locked by aqi_BeginTransaction call.

C Prototype

```
void
aqi_EndTransaction  (aqi_DataItemL_t           DataItemList,
                     adi_TransactionFlag_t     Flag,
                     adi_Status_t              *Status)
```

Arguments

| | | |
|---|---|---|
| i | DataItemList | The list of DataItems which are to be released. |
| i | Flag | Flag whether the transaction should be ended with ADI_COMMIT or ADI_ABORT qualifier. |
| o | Status | The status of the call. |

Returns

Void

Notes

Together, the aqi_BeginTransaction and aqi_EndTransaction provide some degree of consistency in the database. The aqi_BeginTransaction call broadcasts an intention to lock DataItems according to their access. Other incoming transactions will block accordingly. The aqi_EndTransaction call releases these locks. At most, one transaction may be active at any time in the same image. If a second aqi_BeginTransaction call is made while a transaction is active, the call will be rejected.

If the transaction is ended with a Commit qualifier, then if any DataItems are modified, the applications that have expressed an interest in the DataItems are notified.

Note that the actual blocking or locking of the DataItems does not occur immediately when the aqi_BeginTransaction is called. It occurs when the first access is made to any of the DataItems in the list.

aqi_ExpressInterest

Register interest directly on DataItems (equivalent to apu_ExpressInterest) & return an id that will be used in the aqi_RevokeInterest call.

C Prototype

```
adi_InterestId
aqi_ExpressInterest (aqi_DatumL_t           DataItemList,
                     apu_EventCallback_t    *EventFunction,
                     Int32_t                EventMask,
                     vt_Datum_t             EventContext,
                     adi_Status_t           *Status)
```

Arguments

| | | |
|---|---|---|
| i | DataItemList | The list of DataItems in which interest is expressed. |
| i | EventFunction | Callback function to be invoked to handle event. |
| i | EventMask | Mask indicating which event types are of interest. |
| i | EventContext | Context to be passed to callback. |
| o | Status | The status of the call. |

Returns

A unique identifier for interest.

Notes

A status of adi_OK is returned if DI is valid in the current project.

aqi_ExtendInterest

Extend an existing interest by adding new DataItem instances or types to it. These DataItem instances or types will get the same event function, mask, and context, as exists for the Interest.

C Prototype

```
void
aqi_ExtendInterest  (vtDatumL_t          DataItemList,
                     Int32_t             InterestId,
                     adi_Status_t        *Status)
```

Arguments

| | | |
|---|---|---|
| i | DataItemList | The list of DataItems added. |
| i | InterestId | Identifier returned by ExpressInterest. |
| o | Status | The status of the call. |

Returns

Void.

Notes

A status of adi_OK is returned if DI is valid in the current project.

09854825.042907 aqi_GenFileSpec

Generate a filename for the specified DataItem.

C Prototype

```
String_t
aqi_GenFileSpec      (aqi_DataItem_t          Origin,
                      aqi_DataItem_t          DataItem,
                      String_t                Extension,
                      adi_Status_t            *Status)
```

Arguments

| | | |
|---|---|---|
| i | Origin | The Container of the DataItem. This will typically be the Module_Run. |
| i | DataItem | The (optional) DataItem with which the file is associated. |
| i | Extension | An optional extension to be added to the generated name. |
| o | Status | The status of the call. |

Returns

A string specifying a filename for the specified DataItem.

Notes

The file specification will be composed of a path specification, if a DIRECTORY parameter is found with a component query starting at Origin, and filename of the following format:

<Name>_<Id>.Extension if the DataItem has a Name attribute
<Code>_<Id>.Extension otherwise.

If no DataItem is supplied, the value of the DIRECTORY parameter will be returned. If the DIRECTORY parameter does not begin with "/" (indicating an absolute path name) or "$" (indicating a pathname relative to an environment variable), "$PROJECT" will be added to the beginning of the path specification (ndicating that the file is to be located according to the directory specification, but relative to the current Project).

aqi_GetAttributeNames

Get the names of all the Attributes of a DataItem.

C Prototype

```
vt_AtomL_t
aqi_GetAttributeNames(vt_Atomt                DataItemType,
                      aqi_AttributeType_t     AttributeType,
                      adi_Status_t            *Status)
```

Arguments

| | | |
|---|---|---|
| i | DataItemType | The DataItem Type whose Attribute names you want. |
| i | AttributeType | The Type of Attributes whose names you want. |
| o | Status | The status of the call. |

Returns

An Atom list representing the Attribute names.

Notes

The list returned may be restricted by specifying the type of attributes to return.

08848205.043097 aqi_GetAttributes

Get the values of Attributes of DataItems.

C Prototype:

```
void
aqi_GetAttributes    (aqi_DataItem_t      DataItem,

                      aqi_DataItem_t      Context,
                      adi_Status_t        *Status,
                      vt_Atom_t           Attribute1,
                      vt_Datum_t          *Attribute1Value,
                      ...                 ...
                      vt_Atom_t           AttributeN,
                      vt_Datum_t          *AttributeNValue,
                      NULL)
```

Arguments

| | | |
|---|---|---|
| i | DataItem | The DataItem whose Attributes we want. |
| i | Attribute | The Attribute whose value is to be fetched. |
| o | AttributeValuc | The Buffer that will contain the value of the Attribute. This must be supplied by the |
| i | Context | The DataItem that describes the context of the attributes.. |
| o | Status | The status of the call. |

Returns

Void.

Notes

This function returns pointers to ADI internal cache values. Changes should not be made to these returned values, since this will make changes to the ADI internal caches and may result in changes to the storage values as well. If changes are to be made, then these should be done to local copies of the returned values only.

The Context is used to specify the attributes such as ValueType, Units and Coordinate System of the attributes in application space. The function will internally convert the attributes to Context attributes before returning them. The conversion will only be done if Context attributes are different that the storage attributes.

A read lock is placed on the DataItem while it is being accessed.

aqi_GetAttributeValueType

Get the ValueType of an Attribute of a DataItem Type.

C Prototype

```
vt_ValueType_t
aqi_GetAttributeValueType(vt_Atom_t         DataItemType,
                          vt_Atom_t         AttributeName,
                          adi_Status_t      *Status)
```

Arguments

| | | |
|---|---|---|
| i | DataItemType | The DataItem Type to which the Attribute belongs. |
| i | AttributeName | The Attribute whose ValueType you want. |
| o | Status | The status of the call. |

Returns

The ValueType of the attribute.

Notes

None.

08843205 .041307 aqi_GetCurrentOrigin

Get the current Origin.

C Prototype

```
aqi_DataItem_t
aqi_GetCurrentOrigin(adi_Status_t          *Status);
```

Arguments

| | | |
|---|---|---|
| o | Status | The status of the call. |

Returns

Current Origin if one exists or NULL if there is none.

Notes

The returned value is the last value set by aqi_SetCurrentOrigin or, when running with ARC library and under Process Manager control, the value of arc_Current-ModuleRun, if any, and NULL otherwise.

aqi_GetDefaultContext

Get the value for the system default Context.

C Prototype

```
aqi_DataItem_t aqi_GetDefaultContext          (adi_Status_t *Status);
```

Arguments

| | | |
|---|---|---|
| o | Status | The status of the call.. |

Returns

The current system Context.

Notes

None.

08848205 .043007 aqi_GetDIAttributeValueType

Get the ValueType of the actual value of an Attribute of a DataItem instance.

C Prototype

```
vt_ValueType_t
aqi_GetDIAttributeValueType(aqi_DataItem_t  DataItem,
                            vt_Atom_t       AttributeName,
                            adi_Status_t    *Status)
```

Arguments

| | | |
|---|---|---|
| i DataItem | | The DataItem to which the Attribute belongs. |
| i AttributeName | | The Attribute whose ValueType you want. |
| o Status | | The status of the call. |

Returns

The ValueType of the attribute.

Notes

None.

aqi_GetDISubtypes

Get the abstract subtypes supported.

C Prototype

```
vt_AtomL_t
aqi_GetDISubtypes    (vt_Atom_t          Type,
                      Boolean_t          GetAbstracts,
                      adi_Status_t       *Status);
```

Arguments

| | | |
|---|---|---|
| i | Type | Abstract DI type name whose subtypes are to be returned. |
| i | GetAbstracts | If true, all leaf & abstract subtypes to return; otherwise, only leaf subtypes. |
| o | Status | The status of the call. |

Returns

An Atom List with the all of the supported DataItem subtypes.

Notes

None.

08848205.043097 aqi_GetDITypes

Get the list of all the DataItem types supported by the system.

C Prototype

```
vt_AtomL_t
aqi_GetDITypes       (adi_Status_t          *Status);
```

Arguments o Status — The status of the call.

Returns

An Atom List with the all of the supported DataItem types.

Notes

None.

aqi_PrimeAttributes

Indicate a program's intention to access the attributes of a set of DataItems.

C Prototype

```
void
aqi_PrimeAttributes (aqi_DataItemL_t        DataItemList,
                     adi_Status_t           *Status,
                     vt_Atom_t              Attribute1,
                     ...                    ...
                     vt_Atom_t              AttributeN,
                     NULL)
```

Arguments

| | | |
|---|---|---|
| i | DataItemList | The DataItems whose Attributes you want. |
| i | Attribute | The Attribute which is to be primed. |
| o | Status | The status of the call. |

Returns

Void

Notes

This function is not required for attribute access, but may result in substantial speedup during attribute access. A read lock is placed on the DataItem while it is being accessed.

aqi_PutAttributes

Modify the values of Attributes of DataItems.

C Prototype

```
void
aqi_PutAttributes   (aqi_DataItem_t     DataItem,

                     aqi_DataItem_t     Context,
                     adi_Status_t       *Status,
                     vt_Atom_t          Attribute1,
                     vt_Datum_t         Attribute1Value,
                     ...                ...
                     vt_Atom_t          AttributeN,
                     vt_Datum_t         AttributeNValue,
                     NULL)
```

Arguments

| | | |
|---|---|---|
| i | DataItem | The DataItem whose Attributes are to be modified. |
| i | Context | The DataItem that describes the context of the attributes. |
| i | Attribute | The Attribute whose value is to be modified. |
| i | AttributeValue | The Buffer that contains the value of the Attribute. |
| o | Ststus | The status of the call. |

Returns

Void

Notes

A write lock is placed on the DataItems while the update is in progress, and if anyone has expressed interest in this DataItem, a notification event will be generated after the Put is completed or at the end of the Explicit Transaction, if one is pending.

The Context is used to specify the attributes such as ValueType, Units, and Coordinate System of the attributes. The function will internally convert the attributes to storage attributes. The conversion will only be done if the Context attributes are different than the storage attributes.

aqi_Query

Find DataItems in the database.

C Prototype

```
aqi_DataItemL_t
aqi_Query           (aqi_DataItem_t          Origin,
                     Int32_t                 Cardinality,
                     vt_Atom_t               DataItemType,
                     adi_Status_t            *Status,
                     vt_Atom_t               Key1,
                     vt_Datum_t              Key1Value,
                     ..........              ..........,
                     vt_Atom_t               KeyN,
                     vt_Datum_t              KeyNValue,
                     NULL)
```

Arguments

| | | |
|---|---|---|
| i | Origin | The initial DataItem specifying the Data Focus. Any of the Component DataItems can be the origin of a query. If the origin is a Module_Run, then the query searches the Process History Data Focus (PHDF) and the Module_Run's Component Data Focus (CDF). A NULL Origin implies an unfocussed query and the entire database table for the DataItemType will be searched. |
| i | Cardinality | The number of DataItems to be returned. Zero (0) indicates that all DataItems that match the selection criteria and that are in the Data Focus will be returned. |
| i | DataItemType | The type of DataItem. |
| o | Status | The status of the call.. |
| i | KeyN | An attribute name. |
| i | KeyNValue | The attribute value. |

Returns

A list of DataItems. NULL is returned if no DataItems are found to match the Query. The Status will still be adi_OK in this case.

Notes

This is the primary function used to find DataItems in the database. The caller specifies the Cardinality desired and the Origin DataItem. The purpose for the Origin DataItem is to help the query code to find the Data Focus. The Data Focus will be used by the search mechanism to find data. A list of Attribute/AttributeValues is also specified for qualification purposes.

The following {KeyN KeyNValues} are supported as selection criteria. Multiple {KeyN KeyNValues} imply an implicit AND.

{qAttributeName Value} will retrieve DataItems whose attributes match the Value given. For example, the attribute and value pair {qModifier "CRC"} can be used to retrieve DataItems whose Modifier attribute includes "CRC". The Value-Type of the KeyNValue must match the ValueType of the attribute.

{qDirection Value} where Value is either qInput, qOutput, or qDuplex, will retrieve only DataItems with the specified direction. For example, if the direction is qInput, only DataItems that are Input Bindings will be retrieved.

{qIn ListOfDataItems} will retrieve DataItems that are members of the In list. The list of DataItems is used as a SQLCondition.

The aqi_Query is actually converted into an aqi_Select call, where the Operator is assumed to be qEQ (see aqi_Select).

08834825 .043097 aqi_RegisterDI

Get a handle to a DataItem, given its Type and Id.

C Prototype

```
aqi_DataItem_t
aqi_RegisterDI       (vt_Datum_t          Id,
                      vt_Atom_t           Type,
                      adi_Status_t        *Status)
```

Arguments

| | | |
|---|---|---|
| i | Id | The Id of the DataItem. The Id will be: |
| | | - Int32_t for all DataItems except for those below |
| | | - vt_AtomL_t for Catalog DataItems |
| | | - vt_Atom_t for Attribute DataItems |
| i | Type | The Type of the DataItem, such as qArray. |
| o | Status | The status of the call. |

Returns

A DataItem handle.

Notes

This function returns a DataItem handle given a DataItem Type and ID. It is assumed that the DataItem already exists in the database and that its Type and Id were determined by some other means, such as by a query operation. Zero (0) and NULL are not valid values for Id.

aqi_RevokeInterest

Revoke interest in DataItems identified by InterestId.

C Prototype

```
void
aqi_RevokeInterest  (aqi_DataItemL_t       DataItemList,
                     adi_InterestId_t      InterestId,
                     adi_Status_t          *Status)
```

Arguments

| | | |
|---|---|---|
| i | DataItemList | The list of DataItems in which interest is expressed. |
| i | InterestId | Identifier returned by ExpressInterest. |
| o | Status | The status of the call. |

Returns

Void.

Notes

A status of adi_OK is returned if DI is valid in the current project.

This call is equivalent to apu_ExpressInterest and a null EventFunction. Parial revocations are permitted; not all of the DataItems identified in the original ExpressInterest call, nor all events identified by the original EventMask need be revoked in a single RevokeInterest call.

aqi_Select

Select DataItems from the Database by Origin and Type..

C Prototype

```
aqi_DataItemL_t aqi_Select(aqi_DataItemL_t  OriginList,
                           Int32_t          Cardinality,
                           vt_Atom_t        DataItemType,
                           aqi_DataItem_t   Context,
                           adi_Status_t     *Status
                           vt_Atom_t        Key1,
                           vt_Atom_t        Key1Operator,
                           vt_Datum_t       Key1Value,
                           ...
                           vt_Atom_t        KeyN,
                           vt_Atom_t        KeyNOperator,
                           vt_Datum_t       KeyNValue,
                           NULL)
```

Arguments i OriginList — A list of DataItems that specify the starting points for the search through the Data Model. By Default, if an OriginList element is a Module_Run the query searches the Module_Run's PHDF and

| | | |
|---|---|---|
| | | CDF. Otherwise the default search strategy is Up*,Down*. A NULL OriginList implies an unfocussed query and the entire data domain is searched. |
| | | The query function will examine a Context DataItem for user preferences. If a preferences specification exists, it will be used to order DataItems returned from a DataFocus. |
| | | It is possible that a query based on a homogeneous OriginList consisting of all Containers or of all Representations will be faster than a query using a heterogeneous OriginList. |
| i | Cardinality | The number of DataItems to be returned. 0 (Zero) indicates that all DataItems that match the selection criteria and are in the DataFocus will be returned. |
| i | DataItemType | The type or supertype of DataItem. Dictionary attributes can be retrieved with this function by using a dictionary name for the DataItemType. |
| i | Context | The DataItem that describes the context of the Value_Type, Unit and Coordinate controlled selection criteria. |
| o | Status | The status of the call. |
| i | KeyN | An Attribute name. |
| i | KeyNOperator | An operator applied to the stored value of Attribute KeyN and the supplied KeyNValue. |
| i | KeyNValue | The supplied attribute value. If qSort is specified as the operator, then this field should be either qAscending or qDescending. |

Returns

A list of DataItems. If no DataItems are found to match the query then NULL is returned and Status is set to adi_OK. The list returned by the query must be freed by the application program.

Notes

The following {KeyN KeyNOperator KeyNValues} triples are supported as selection criteria. Multiple triples is an implicit AND. The triples do not support the use of OR. OR can be handled with SQLCondition or with a series of queries.

{qAttributeName Operator Value} If the function Operator(stored value of AttributeName, Value) returns TRUE then the DataItem will be retrieved from the DataFocus. For example, the triple {qUnit , qEQ, "m"} can be used to retrieve DataItems whose Unit is m (meters). A complete list of attributes is in the APRG. Numeric values which are always taken as Float32.

{qDI Operator ListOfDataItems} The valid operators are qIn and qNotIn.

{qDI qWhere SQLCondition} The SQL condition is a String valued combination of one or more expressions and logical operators that evaluates to either TRUE or FALSE. It must be a well formed SQL condition as it will be used in the WHERE clause of a SQL statement. An example SQLCondition is: "Unit = 'm'". See aqi_SQLQuery for details.

Allowed operators:

| Operator | Function Code | Explanation |
|---|---|---|
| < | qLT | Less than |
| > | qGT | Greater than |
| >= | qGE | Greater than or equal to |
| <= | qLE | Less than or equal to |
| != | qNE | Not equal |
| = | qEQ | Equal |
| Like | qLike | Matches the following pattern |
| Not Like | qNotLike | Does not match the following pattern |
| Sort | qSort | Sort on attribute |
| In | qIn | Equal to any member of |
| Not In | qNotIn | Not equal to any member of |
| Where | qWhere | String valued SQL Condition |

The valuetype of the value passed in to aqi_Select depends upon the cardinality of the operator. For example a single-valued operator like qEQ expects a single value. A multi-valued operator like qIn expects a list.

For multi value attributes, like Modifier, the operators are applied to individual elements of the stored value and any match is acceptable. This can be illustrated with examples where X represents an element of the stored multi-valued attribute and Vn represents the supplied query value.

| | |
|---|---|
| X qEQ V1 | There exists an X = V1 |
| X qIn (V1, V2, ...) | There exists an X = V1 OR an X = V2 OR ... |

| | |
|---|---|
| X qNE V1 | For all X, X != V1 |
| X qNotIn (V1, V2, ...) | For all X, X != V1 AND X!= V2 AND ... |

aqi_SelectAttributes

Select attributes from database. The OriginList and DataItemType arguments specify the search strategy to be used. No registration or caching of DataItems is involved.

C Prototype

```
Void aqi_SelectAttributes(aqi_DataItemL_t   OriginList,
                          Int32_t           Cardinality,
                          vt_Atom_t         DataItemType,
                          aqi_DataItem_t    Context,
                          adi_Status_t      *Status
                          vt_Atom_t         Key1,
                          vt_Atom_t         Key1Operator,
                          vt_Datum_t        Key1Value,
                          ...
                          vt_Atom_t         KeyN,
                          vt_Atom_t         KeyNOperator,
                          vt_Datum_t        KeyNValue,
                          NULL,
                          vt_Atom_t         Attribute1,
                          vt_DatumL_t       *Attribute1Value,
                          ...
                          vt_Atom_t         AttributeN,
                          vt_DatumL_t       *AttributeNValue,
                          NULL)
```

Arguments i OriginList

A list of DataItems that specify the starting points for the search through the Data Model. By Default, if an OriginList element is a Module_Run the query searches the Module_Run's PHDF and

| | | |
|---|---|---|
| | | CDF. Otherwise the default search strategy is Up*,Down*. A NULL OriginList implies an unfocussed query and the entire data domain is searched. |
| i | Cardinality | The number of AttributeNValues to be returned. 0 (Zero) indicates that all AttributeNValues that match the selection criteria and are in the DataFocus will be returned. |
| i | DataItemType | The type or supertype of DataItem. Dictionary attributes can be retrieved with this function by using a dictionary name for the DataItemType. |
| i | Context | The DataItem that describes the context of the Value_Type, Unit and Coordinate controlled selection criteria. |
| o | Status | The status of the call. |
| i | KeyN | An Attribute name. |
| i | KeyNOperator | An operator applied to the stored value of Attribute KeyN and the supplied KeyNValue. |
| i | KeyNValue | The supplied attribute value. If qSort is specified as the operator, then this field should be either qAscending or qDescending. |
| i | AttributeN | The Attribute whose values are to be retrieved. |
| i | AttributeNValue | The address of the buffer that will contained the list of Attribute values for AttributeN. This must be supplied by the user. Attributes that need Value-Type forwarding (e.g. Value_Number) would always be returned in their native format, i.e. numbers as Float32, strings and longs as String. |

The following {KeyN KeyNOperator KeyNValues} triples are supported as selection criteria. Multiple triples is an implicit AND. The triples do not support the use of OR. OR can be handled with qWhere or with a series of queries.

{qAttributeName Operator Value} If the function Operator(stored value of AttributeName, Value) returns TRUE then the DataItem will be retrieved from the DataFocus. For example, the triple {qModifier, qIn, ("CRC")} can be used to retrieve DataItems whose Modifier attribute includes "CRC". Numeric values which are always taken as Float32.

{qDI Operator ListOfDataItems} The valid operators are qIn and qNotIn.

{qDI qWhere SQLCondition} The SQL condition is a String valued combination of one or more expressions and logical operators that evaluates to either TRUE or FALSE. It must be a well formed SQL condition as it will be used in the WHERE clause of a SQL statement. An example SQLCondition is: "Modifier != 'CRC'". See aqi_SQLQuery for details.

Allowed operators:

| Operator | Function Code | Explanation |
|---|---|---|
| < | qLT | Less than |
| > | qGT | Greater than |
| >= | qGE | Greater than or equal to |
| <= | qLE | Less than or equal to |
| != | qNE | Not equal |
| = | qEQ | Equal |
| Sort | qSort | Sort on attribute |
| Like | qLike | Matches the following pattern |
| Not Like | qNotLike | Does not match the following pattern |
| In | qIn | Equal to any member of |
| Not In | qNotIn | Not equal to any member of |
| Where | qWhere | String valued SQL Condition |

The valuetype of the value passed in to aqi_Select depends upon the cardinality of the operator. For example a single-valued operator like qEQ expects a single value. A multi-valued operator like qIn expects a list.

For multi value attributes, like Modifier, the operators are applied to individual elements of the stored value and any match is acceptable. This can be illustrated with examples where X represents an element of the stored multi-valued attribute and Vn represents the supplied query value.

| | |
|---|---|
| X qEQ V1 | There exists an X = V1 |
| X qIn (V1, V2, ...) | There exists an X = V1 OR an X = V2 OR ... |
| X qNE V1 | For all X, X != V1 |
| X qNotIn (V1, V2, ...) | For all X, X != V1 AND X!= V2 AND ... |

Returns

Void.

Notes aqi_SelectAttributes is eqivalent to calling aqi_GetAttributes on each DataItem returned by a call to aqi_Select. It should increase performance by eliminating DataItem registration and attribute caching.

aqi_SetCurrentOrigin

Set a default value for Origin.

C Prototype

```
void
aqi_SetCurrentOrigin(aqi_DataItem_t         Origin,
                     adi_Status_t           *Status);
```

Arguments

| | | |
|---|---|---|
| i Origin | | The new value for the default Current Origin. |
| o Status | | The status of the call. |

Returns

Void.

Notes

The Origin is used in event generation and available to the application by calling aqi_GetCurrentOrigin. When running with ARC linked under Process Manager, this call will override the value of arc_CurrentModuleRun.

aqi_SetDefaultContext

Set the value for the system default Context.

C Prototype

```
void aqi_SetDefaultContext(aqi_DataItem_t   Context,
                           adi_Status_t     *Status);
```

Arguments

| | | |
|---|---|---|
| i | Context | The Context DataItem that contains the Context attribute. |
| o | Status | The status of the call.. |

Returns

Void.

Notes

None.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In an integrated data communication and data access system comprising a first client non-server application including a first cache memory, a second client non-server application including a second cache memory, a database interconnected between the first client non-server application and the second client non-server application, and a server interconnected between the first client non-server application and the second client non-server application, a method of communicating between client applications, comprising the steps of:

(a) generating, by said second client non-server application, an original set of data, said second client non-server application adapted to set a persistent storage state and a transient storage state and a memory storage state, said second client non-server application attempting to store said original set of data in said second cache memory and in said database after said second client non-server application sets said persistent storage state and said transient storage state and said memory storage state;

(b) storing, by said second client non-server application, said original set of data in said second cache memory when said second client non-server application sets said persistent storage state or said transient storage state or said memory storage state, (c) storing, by said second client non-server application, said original set of data in said database when said second client non-server application sets said persistent storage state or said transient storage state, and not storing, by said second client non-server application, said original set of data in said database when said second client application sets said memory storage state;

(d) retrieving by said first client non-server application said original set of data from said database and storing the retrieved original data in said first cache memory of said first client non-server application;

(e) in response to said retrieved original data stored in said first cache memory of said first client non-server application, expressing interest by said first client non-server application in a subsequently modified version of said original set of data by transmitting an interest object associated with an event from said first client non-server application to said server;

(f) receiving said interest object in said server and retransmitting said interest object from said server to said second client non-server application;

(g) generating by said second client non-server application said subsequently modified version of said original set of data when the second client non-server application practices said event, said second client non-server application notifying said first client non-server application when the subsequently modified data is generated and attempting to store said subsequently modified version of said original set of data in said second cache memory and in said database;

(h) storing, by said second client non-server application, said subsequently modified version of said original set of data in said second cache memory when said second client non-server application sets either said persistent storage state or said transient storage state or said memory storage state;

(i) storing, by said second client non-server application, said subsequently modified version of said original set of data in said database when said second client non-server application sets said persistent storage state, and not storing the subsequently modified data in said database when said second client non-server application sets either said transient storage state or said memory storage state; and (j) transmitting, by said second client non-server application, said subsequently modified version of said original set of data associated with said event from said second client non-server application directly to said first client non-server application without routing the subsequently modified data through said server.

2. The method of claim 1, further comprising:

(k) responding by said server to one or more revocation objects received from one or more client non-server applications; and (l) responding by said server to additional interest objects received from other additional client applications.

3. The method of claim 2, wherein the responding step (l) comprises the steps of:

transmitting said interest object associated with said event from a third client non-server application to said server;

retransmitting said interest object from said server to said second client non-server application; and transmitting said subsequently modified version of said original set of data associated with said event from said second client non-server application to said first client non-server application and to said third client non-server application without routing said subsequently modified version of said original set of data through said server when said second client non-server application practices said event.

4. The method of claim 2, further comprising the steps of:

(m) transmitting a revocation object from said first client non-server application to said server, (n) in response thereto, transmitting said revocation object from said server to said second client non-server application; and (o) in response to said revocation object, un-registering, within said second client non-server application, said interest object of said first client non-server application associated with said event and refraining, by said second client non-server application, from sending said event information associated with said event directly to said first client non-server application when said second client non-server application practices said event.

5. The method of claim 2, wherein said first client non-server application is adapted to terminate its execution, and wherein the responding step (l) comprises the steps of:

responding, by said server, to a revocation object received from said first client non-server application and transmitting said revocation object from said server to said second client non-server application when said first client non-server application terminates its execution; and in response to said revocation object, un-registering, within said second client non-server application, said interest object of said first client non-server application corresponding to said event and refraining, by said second client non-server application, from transmitting said subsequently modified version of said original set of data associated with said event directly to said first client non-server application when said second client non-server application practices said event.

6. An integrated data communication and data access system adapted for intercommunicating between client applications, comprising:

a second client non-server application adapted to generate an original set of data, said second client non-server application including a second cache memory and adapted to set either a persistent storage state or a transient storage state or a memory storage state;

a database operatively connected to said second client non-server application, said second client non-server application storing said original set of data in said second cache memory when said second client non-server application sets either said persistent storage state or said transient storage state or said memory storage state, said second client non-server application storing said original set of data in said database when said second client non-server application sets either said persistent storage state or said transient storage state, and not storing said original set of data in said database when said second client non-server application sets said memory storage state;

a first client non-server application operatively connected to said database and to said second client non-server application, said first client non-server application retrieving said original set of data from said database and subsequently expressing interest in a subsequently modified version of said original set of data by generating and transmitting an interest object corresponding to an event;

a server operatively interposed between and connected to said first client non-server application and said second client non-server application, said first client non-server application transmitting said interest object to said server, said server re-transmitting said interest object to said second client non-server application, said second client non-server application practicing said event and thereby generating a subsequently modified version of said original set of data in response to the practice of said event, said second client non-server application attempting to store said subsequently modified version of said original set of data in said second cache memory and in said database, said second client non-server application storing said subsequently modified version of said original set of data in said second cache memory when said second client non-server application sets either said persistent storage state or said transient storage state or said memory storage state, said second client non-server application storing said subsequently modified version of said original set of data in said database when said second client non-server application sets said persistent storage state, and not storing said subsequently modified version of said original set of data in said database when said second client non-server application sets either said transient storage state or said memory storage state, said second client non-server application, responsive to said interest object, transmitting said subsequently modified version of said original set of data directly to said first client non-server application without routing the subsequently modified data through said server when said second client non-server application practices said event.

7. The integrated data communication and data access system of claim 6, wherein said server responds to a revocation object from said first client non-server application and transmits said revocation object to said second client non-server application when said first client non-server application terminates its execution, said second client non-server application not transmitting said subsequently modified version of said original set of data to said first client non-server application in response to said revocation object when said second client non-server application practices said event.

8. A data communication and data access system, comprising:

a first client application including, a first application adapted to set a persistent storage state or a transient storage state or a memory storage state, a first cache memory operatively connected to said first application and responsive to the storage state set by said first application, first interface apparatus operatively interposed between said first application and said first cache memory adapted to coordinate a transfer of data between said first application and said first cache memory, and first conversion apparatus operatively connected to said first cache memory and interfacing between a first operator of said first client application and said first cache memory adapted to receive data having a first format from said first operator and convert said data having said first format to data having a second format for storage in said first cache memory, said first conversion apparatus adapted to convert said data having said second format to said data having said first format for use by said first operator, a second client application including, a second application adapted to set a persistent storage state or a transient storage state or a memory storage state, a second cache memory operatively connected to said second application and responsive to the storage state set by said second application, second interface apparatus operatively interposed between said second application and said second cache memory adapted to coordinate a transfer of data between said second application and said second cache memory, and second conversion apparatus operatively connected to said second cache memory and interfacing between a second operator of said second client application and said second cache memory adapted to receive data having a third format from said second operator and convert said data having said third format to said data having said second format for storage in said second cache memory, said second conversion apparatus converting said data having said second format to said data having said third format for use by said second operator;

a server operatively interconnected between the first application and the second application; and a database operatively interconnected between the first cache memory and the second cache memory, said first conversion apparatus receiving an original set of said data having said first format from said first operator and converting said original set of data having said first format into an original set of data having said second format, said first application storing said original set of said data having said second format received from said first conversion apparatus into said first cache memory when said first application sets either said persistent storage state or said transient storage state or said memory storage state, said first application storing storing said original set of said data having said second format received from said first conversion apparatus into said database when said first application sets either said persistent storage state or said transient storage state, said first application not storing said original set of said data having said second format into said database when said first application sets said memory storage state, said second client application retrieving said original set of said data having said second format from said database and storing said original set of data having said second format in said second cache memory, said second conversion apparatus converting said original set of data having said second format into an original set of data having a third format for use by said second operator, said second operator expressing interest in a subsequently modified version of said original set of data having said third format by generating an interest object corresponding to an event, said second application transmitting said interest object to said server, said server re-transmitting said interest object to said first application, said first application subsequently generating a subsequently modified version of said original set of data having a second format and attempting to store said subsequently modified version of said original set of data having said second format into said first cache memory and into said database, said first application storing said subsequently modified version of said original set of data having a second format into said first cache memory when said first application sets either said persistent storage state or said transient storage state or said memory storage state, said first application storing said subsequently modified version of said original set of data having a second format into said database when said first application sets said persistent storage state, but not storing said subsequently modified version of said original set of data having a second format into said database when said first application sets either said transient storage state or said memory storage state, said first application responding to said interest object received from said server by transmitting said subsequently modified version of said original set of said data having said second format directly to said second application without routing said subsequently modified version of said original set of said data having said second format through said server, said subsequently modified version of said original set of said data having said second format received by said second application being converted by said second conversion apparatus into a subsequently modified version of said original set of said data having a third format for viewing by said second operator.

9. The data communication and data access system of claim 8, wherein said subsequently modified version of said original set of data having said second format which is received by said second application is stored in said second cache memory when said first application or said second application sets either said memory storage state or said persistent storage state or said transient storage state, said second conversion apparatus converting said subsequently modified version of said original set of data having said second format into said subsequently modified version of said original set of data having said third format for viewing by said second operator.

10. In a data communication and data access system including a first client application which further includes a first application and a first cache memory and a first conversion unit, a second client application which further includes a second application and a second cache memory and a second conversion unit, a server operatively interconnected between the first application and the second application, and a database operatively interconnected between said first cache memory and said second cache memory, a method of data communication and data access, comprising the steps of:

(a) supplying, by a first operator, original data having a first format to said first conversion unit and converting, in said first conversion unit, said original data having said first format to original data having a second format, said first application and said second application adapted for setting a persistent storage state or a transient storage state or a memory storage state, (b) storing, by said first application, said original data having said second format in said first cache memory when said first application sets either said persistent storage state or said transient storage state or said memory storage state;

(c) storing, by said first application, said original data having said second format in said database when the first application or the second application sets either the persistent storage state or the transient storage state but not storing said original data having said second format in said database when the first application or the second application sets the memory storage state;

(d) retrieving by said second application said original data having said second format from said database and converting, in said second conversion unit, said original data having said second format into original data having a third format for use by a second operator, (e) in response to said original data having said third format, expressing interest in a modified version of said original data having said third format by transmitting an interest object from said second application to said server and then re-transmitting said interest object from said server to said first application;

(f) supplying, by said first operator, modified data having a first format to said first conversion unit and converting, in said first conversion unit, said modified data having said first format into modified data having a second format;

(g) storing said modified data having said second format in said first cache memory when said first application or said second application sets said persistent storage state or said transient storage state or said memory storage state, (h) storing said modified data having said second format in said database when the first application or the second application sets the persistent storage state but not storing said modified data having said second format in said database when the first application or the second application sets either the transient storage state or the memory storage state; and (i) in response to said interest object retransmitted from said server to said first application during step (e), transmitting said modified data having said second format from said first application directly to said second application without routing said modified data having said second format through said server.

11. The method of claim 10, wherein the retrieving and converting step (d) further comprises the steps of:

(d1) reading said original data having said third format from said second conversion unit and supplying said interest object pertaining to said original data having said third format to said second application.

12. The method of claim 11, further comprising the steps of:

(j) storing, by said second application, said modified data having said second format, in said second cache memory when said first application or said second application sets either said persistent storage state or said transient storage state or said memory storage state; and (k) converting, in said second conversion unit, said modified data having said second format to modified data having a third format for use by said second operator.

* * * * *